United States Patent [19]

Edstrom

[11] 3,806,878

[45] Apr. 23, 1974

[54] CONCURRENT SUBSYSTEM DIAGNOSTICS AND I/O CONTROLLER

[75] Inventor: Gene H. Edstrom, Longmont, Colo.

[73] Assignee: International Business Machines Corporation, Armonk, N.Y.

[22] Filed: Aug. 5, 1971

[21] Appl. No.: 169,193

[52] U.S. Cl. .............................................. 340/172.5

[51] Int. Cl. .......................... G06f 9/00, G06f 11/00

[58] Field of Search .................. 340/172.5; 235/153

[56] References Cited

UNITED STATES PATENTS

| | | | |
|---|---|---|---|
| 3,343,141 | 9/1967 | Hackl | 340/172.5 |
| 3,504,347 | 3/1970 | Harmon et al. | 340/172.5 |
| 3,519,808 | 7/1970 | Lawder | 340/172.5 X |
| 3,585,599 | 6/1971 | Hitt et al | 340/172.5 |
| 3,588,835 | 6/1971 | Enabit | 340/172.5 |
| 3,633,178 | 1/1972 | Zopf | 340/172.5 |
| 3,659,273 | 4/1972 | Knauft et al. | 340/172.5 |

*Primary Examiner*—Paul J. Henon
*Assistant Examiner*—Melvin B. Chapnick
*Attorney, Agent, or Firm*—Herbert F. Somermeyer

[57] ABSTRACT

Diagnostics in a peripheral subsystem for a data processing system are performed on a concurrent basis with other programs in the data processing system. The peripheral subsystem has capabilities of generating indications for the data processing system representative of operational conditions that could be encountered; the data processing system is programmed to respond to said indications for diagnosing the operational capabilities of the connected peripheral subsystem. Included in the diagnostics are interface checking between the subsystem and the rest of the data processing system, device status, capability of stacking status, capability of handling nonstackable status, verifying enable/disable operation, and checking device busy status and the like.

1 Claim, 6 Drawing Figures

MPUX MICROPROGRAMS

CONCURRENT SUBSYSTEM DIAGNOSTICS AND I/O CONTROLLER

DOCUMENTS INCORPORATED BY REFERENCE

1. IBM SYSTEMS JOURNAL, "The Structure of System/360", Parts I and II, Vol. 3, No. 2, 1964, Pages 119 and 142, respectively by G. A. Blaauw and F. P. Brooks, Jr., and W. Y. Stevens.
2. "IBM System/360 Engineering," by P. Fagg et al, PROCEEDINGS-FALL JOINT COMPUTER CONFERENCE, 1964, Pages 205–231.
3. U.S. Pat. No. 3,214,739 (a two-channel switch or multiple interface switch).
4. U.S. Pat. No. 3,303,476 (channel).
5. U.S. Pat. No. 3,336,582 (CPU channel commands to control unit).
6. U.S. Pat. No. 3,372,378 (a switching system for a data processing system).
7. U.S. Pat. No. 3,400,371 (a CPU).
8. U.S. Pat. No. 3,550,133 (a channel).
9. U.S. Pat. No. 3,377,619 (polling in a channel including select out).
10. Commonly assigned patent application Cormier et al., Ser. No. 101,079, filed Dec. 22, 1970, entitled "Command Retry Control by Peripheral Devices," now U.S. Pat. No. 3,688,274.

BACKGROUND OF THE INVENTION

The present invention relates to data processing systems having peripheral device subsystems and particularly to concurrent diagnostics as between a data processing system and the peripheral subsystem, for concurrently diagnosing the present operational capability of the peripheral subsystem.

Because of equipment complexities and high performance operating capabilities, data processing systems, and particularly peripheral device subsystems, are periodically analyzed for proper operational status and capabilities. Also, when an error is introduced into the data processing system, apparently by a peripheral device subsystem, certain diagnostic procedures should be invoked for diagnosing the cause of the error so that corrective maintenance can be expedited. In most prior systems, diagnostics relating to a peripheral device subsystem, such as a printer system, magnetic tape subsystem, disk system, drum system, communication system, and the like, either require dedication of a central processing unit (CPU) for diagnosing the present operational capabilities of the peripheral device subsystem (control mode) or that the peripheral device subsystem be completely disconnected from the data processing system and be operated in a diagnostic mode by maintenance personnel (off-line mode). The above procedures, while effective to perform the diagnostics and the maintenance, are quite expensive because: (1) the cost per hour of a data processing system is extremely high; therefore, to assign the entire data processing system for maintaining one peripheral device subsystem is a very expensive procedure. (2) Disconnecting a peripheral device subsystem from a data processing system in many instances may require the data processing system to be stopped while the peripheral device subsystem is disconnected. This means additional start-ups and, again, a waste of data processing system total time which becomes expensive. Further, no portion of the peripheral device subsystem is then available for any usage by the data processing system. Maintenance personnel must slowly diagnose the operational status of the peripheral device subsystem without the assistance of automated analysis generally available through a CPU. While some automatic test equipment may be employed, the analysis performable by a CPU usually is much greater than that which can be performed by test equipment. Again, once the subsystem has been diagnosed, it must be reconnected to the data processing system. (3) While disconnecting a peripheral device subsystem from a data processing system may be effective to diagnose operational status of the peripheral device subsystem, some errors can occur in the interface portion. Such disconnection may or may not detect such error-causing conditions. Accordingly, it is highly desirable that concurrent diagnostics be performed on a peripheral device subsystem by a data processing system.

As used in this application, the term "concurrent mode" indicates that the data processing system has other tasks or jobs in the system that are active and share system facilities with the diagnostic programs and procedures. This does not necessarily indicate that a given CPU will operate simultaneously on a data processing job or task and a diagnostic job or task. Such jobs or tasks may be interleaved within the CPU with the peripheral device subsystem diagnostics being performed simultaneously with data processing systems or other operations being performed by other subsystems or CPU's.

"Quiescent mode" means that all operations with respect to a peripheral device subsystem are complete except those initiated directly or indirectly by an OLT (on-line test) such that the peripheral device subsystem is dedicated to diagnostics initiated by the OLT. The CPU may be still operating in a concurrent mode.

On-Line Test (OLT) — A computer program in a CPU designed to initiate diagnostic procedures in a peripheral device subsystem upon command from an operating system within the CPU. Such OLT's supervise diagnostic procedures.

On-Line Test Executive Program (OLTEP) — The interfacing program between the CPU operating system and OLT's. It is a supervisory program effecting proper sequencing of diagnostics effected by OLT's.

Control Mode — A peripheral device subsystem is entirely dedicated to diagnostics. The OLT responds to all communications with the peripheral device subsystems and operates to the peripheral device subsystem via OLTEP and can act in the supervisory mode. OLT restricts its activities to those devices in the peripheral device subsystem assigned to it by and through OLTEP before entry into the control mode. Entry of control mode usually requires a console entry and an OLT request. Exit from either the quiescent or control mode is by initiation from a request via the console into OLTEP.

Accordingly, for concurrent diagnostic purposes, computer programs have been established including an on-line test executive program (OLTEP) for initiating and supervising concurrent diagnostic procedures. Some of the test requirements to date have required the device being diagnosed to be off-line for effecting a full test of the operating capabilities. Partial tests have been operated on a concurrent mode for a limited number of device operating characteristics. Limited testing on a concurrent basis does not provide sufficient meaningful diagnostic information for minimizing down time of a data processing system. Accordingly, it is very desirable and important that concurrent diagnostic capabilities be enhanced.

SUMMARY OF THE INVENTION

It is an object of this invention to provide enhanced concurrent diagnostic procedures for interface checking, status reporting, enable/disable, tag signals, and the like.

A peripheral device subsystem utilizing the teachings of the present invention includes means for performing signal processing or data processing operations in connection with a data processing system. Additionally, means are provided for generating operating condition indications responsive to channel commands to esablish conditions within the subsystem representative of operating conditions not permissible during normal signal processing operations. The above usually follows a SET DIAGNOSE channel command which initiates a diagnostic mode within the peripheral subsystem. Preferably, chaining to an OLT operated CPU is required. During such diagnostic mode, a series of channel commands are issued by the CPU to the peripheral device subsystem forcing stacking status, forcing a falsely indicated control unit busy (CUB) or device busy (DVE BSY), and initiating enable/disable operations and checking response of the peripheral subsystem to nonstackable status as well as to device and I/O controller stackable status. Dedication of the interface between a data processing system and a peripheral device subsystem is performed on a concurrent basis for diagnosing responses and actuations of the peripheral device subsystem with respect to such interface.

The foregoing and other objects, features, and advantages of the invention will be apparent from the following more particular description of a preferred embodiment of the invention, as illustrated in the accompanying drawings.

THE DRAWINGS

GLOSSARY OF ABBREVIATIONS AND ACRONYMS

Figure 1:
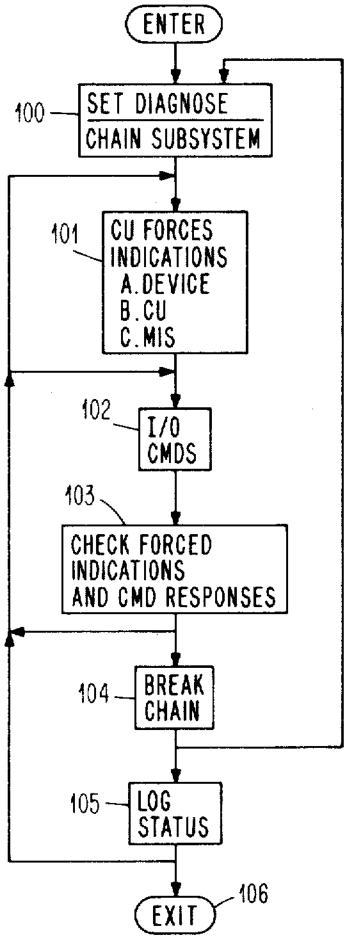
FIG. 1 is a simplified flowchart showing a sequence of concurrent testing usable in connection with the present invention.

This glossary provides a ready reference to the abbreviations repeatedly used in describing the invention:

| | |
|---|---|
| ADDR | Address |
| ADDRI | Address In (a tag signal supplied by an I/O controller indicating address signals appear on CBI) |
| ADDRO | Address Out (a tag signal indicating address signals are being sent in bus out lines) |
| ALU | Arithmetic-Logic Unit |
| BKWD | Backward |
| BLK INT | Block Interrupt (I/O controller flag blocking SUPPRI) |
| BLK UC | Block Unit Check (I/O controller flag blocking UC status after a burst operation) |
| BOC | Branch on Condition |
| BOR | Beginning of Record (remains active during entirety of record readback signal envelope) |
| BOT | Beginning of Tape |
| CBI | Channel Bus In (lines for carrying data signals from I/O controller to CPU via INTFX) |
| CBO | Channel Bus Out (lines for carrying data signals from a channel to an I/O controller) |
| CCW | Channel Control Word |
| CHNL | Channel |
| CMD | Command (a set of control signals) |
| CMDO | Command Out (a tag signal telling an I/O controller to change operation in accordance with predetermined criteria) |
| CPU | Central Processing Unit |
| CTI | Channel Tag In (a set of lines for tag signals supplied from an I/O controller to a data channel concerning the interpretation of other signals supplied over CBI) |
| CTO | Channel Tag Out (a set of lines for tag signals supplied from a data channel to an I/O controller interpreting other signals supplied over CBO) |
| CU | Control Unit; an I/O Controller |
| CUB | Control Unit Busy (a tag signal) |
| DE | Device End (a tag signal from an I/O device indicating end of an operation) |
| DEP | Device End Prime (see below) |
| DEPRIME | Device End Prime (a flag signal in a memory unit indicating a data channel has previously requested access to an I/O device. Upon receipt of a device end (DE), signals are supplied to the channel to provide access to the I/O device) |
| DIAG | Diagnostic |
| DIAGNOSE | A command ordering an I/O controller to enter a diagnostic mode of operation. |
| FWD | Forward |
| GENRST | General Reset |
| IBG | Interblock Gap |
| IC | Instruction Counter |
| IDLEPEND | A wait routine for the channel microprogram unit used to wait for further instructions from a data channel |
| IDLESCAN | A microprogram used to scan for DEPRIMES |
| IHS | Information Handling System |
| INTF | Interface Circuits |
| I/O | Input/Output or Input/Output Device |
| IOS | I/O System (a CPU program operating under OS and added to control I/O operations) |
| IR | Instruction Register |
| LSR | Local Store Register |
| MIS | Multiple Interface Switch |
| MPU | Microprogrammable Unit |
| MPUX | Microprogrammable Unit No. X (used in connection with a data channel) |
| MPUY | Microprogrammable Unit No. Y (used in connection with an I/O device) |
| MTU | Magnetic Tape Unit |
| NOP | No Operation (do-nothing command) |
| OLT | On-Line Test (a CPU program for exercising and testing a peripheral device connected to the CPU) |
| OLTEP | On-Line Test Executive Program (a controlling program for OLT's) |

| | |
|---|---|
| OP | Operation |
| OPIN | Operation In (a tag signal) |
| OS | Operating System (a CPU control program) |
| RES | Reserved |
| ROS | Read Only Store |
| RST | Reset |
| RTN | Return |
| SDI | Subsystem Device Interface (a multiplexing switch selectively connecting several CU's to a plurality of I/O devices) |
| SELO | Select Out (a tag signal from channel to CU attempting a selection (connection)) |
| SELRST | Selective Reset |
| SFBKWD | Space File Backward |
| SFFWD | Space File Forward |
| SIO | Start I/O (a command initiating an I/O OP) |
| SPACE OP | An MTU Space Operation (moves or spaces tape) |
| STAT | Status |
| STATIN | Status In (a tag signal indicating CBI has a status byte) |
| STIN | Status In (see STATIN) |
| STS | Status |
| SUPPRI | Suppressible Request In (a tag signal) |
| SUPPRO | Suppress Out (a tag signal) |
| SVCI | Service In (a tag signal) |
| SVCO | Service Out (a tag signal) |
| TACH | Tachometer |
| TAPE OP | Tape Operation |
| TCB | Task Control Buffer |
| TIO | Test I/O |
| TM | Tape Mark |
| TU | Tape Unit, also MTU |
| TUADDR | Tape Unit Address Register |
| TUBI | Tape Unit Bus In |
| TUBO | Tape Unit Bus Out |
| TUTAG | Tape Unit Tag Register |
| XA | Exchange Register XA |
| XB | Exchange Register XB |
| YA | Exchange Register YA |
| YB | Exchange Register YB |

GENERAL PROCEDURE

Referring now to FIG. 1, the general procedure followed by a data processing system and a peripheral device subsystem for effecting concurrent diagnostics using the present invention is explained. First, a CPU at 100 supplies a SET DIAGNOSE channel command to the peripheral device subsystem for initiating diagnostic mode in the connected subsystem. It then forces the subsystem to be chained to the DIAGNOSE command such that no other data processing system can interrupt the diagnostic procedures and thereby introduce errors inadvertently into the interrupting data processing system. The SET DIAGNOSE command is initiated by an OLT via OLTEP to a channel processor. The subsystem is responsive to the command and its CCW to establish a diagnostic mode in accordance with the CCW as has been well known. Upon completion of step 100, the peripheral device subsystem is ready to perform concurrent diagnostics.

CPU then sends diagnostic commands to the peripheral subsystem at 101. This includes forced indications in the I/O controller with regard to I/O devices, the control unit (CU), and to an MIS (multiple interface switch). Other indications, as well, may be forced for indicating operating status for diagnostic purposes, as will become apparent. At the end of step 101, the peripheral device subsystem has been set for diagnosing responsiveness to selected input/output commands and operational status with respect to certain selected channel commands.

The CPU then supplies one or more chained I/O commands at 102. At 103, after the connected peripheral device subsystem has responded to the I/O commands supplied at 102, the CPU checks the forced indications and command responses for diagnostic purposes. In accordance with the OLT, steps 102 and 103 may be repeated. Alternatively, step 101 may be reinitiated for performing a second concurrent diagnostic procedure. Chaining may be maintained as steps 101, 102, and 103 and repeated for different operating diagnostics. It may be desirable for fully utilizing the concurrency of the diagnostic procedures to break the chaining at 104 for permitting interleaved data processing operations. That is, the concurrent diagnostics may be performed in connection with one or two peripheral devices. The other devices are available for data processing operations, and it may be desirable to interleave the diagnostics with the data processing operations at the subsystem level in order to reduce diagnostic cost to the data processing system. Accordingly, when the chain is broken at 104, other programs within the operating system or other data processing systems connected to the peripheral device subsystem can initiate data processing operations. After the chain is broken at 104, step 100 may be repeated for a subsequent diagnostic, with the steps 100, 101, 102, and 103 also repeated. Finally, after the concurrent diagnostics, as requested by an initial program load (IPL) operating through OLTEP, the status is logged in CPU at 105 and probably printed out for use by maintenance personnel assigned to the data processing subsystem. The programming exits at 106 completing the diagnostic task.

SYSTEM ORGANIZATION

Figure 2:
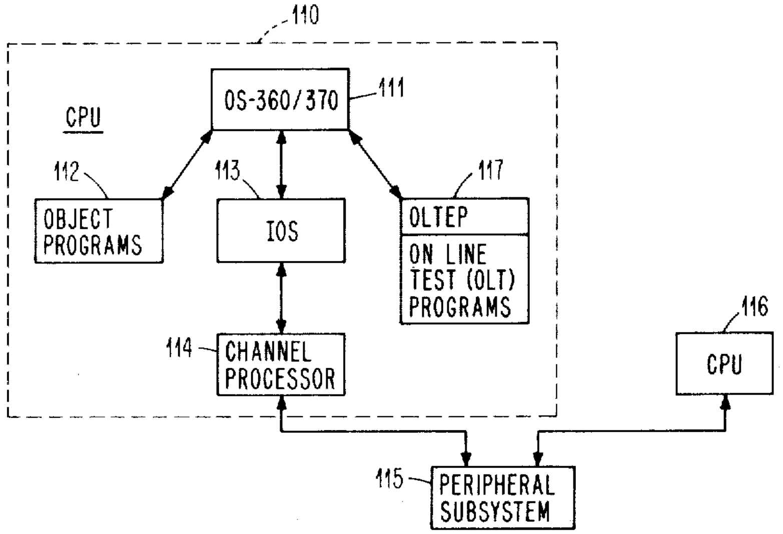
FIG. 2 is a simplified operating system diagram illustrating the broad aspects of the present invention.

Referring to FIG. 2, the environment in which the present invention may be practiced is shown in simplified form. CPU 110 has an operating system such as OS/360 or OS/370 at 111. OS is an executive which calls in object programs 112 for performing data processing operations, as is well known. The input/output program module 113 (IOS) program connects a channel processor 114 to OS 111 for effecting input/output operations. Channel processor 114, in turn, communicates with one or more peripheral subsystems 115 which performs the actual I/O operations. The peripheral subsystem additionally, through MIS, is connectable to another CPU 116 which is organized in the same manner as CPU 110. Additionally, CPU 110 has a set of diagnostic programs 117 which includes OLTEP and a set of OLT's. The OLT's may be resident on a disk subsystem (not shown) and callable into magnetic core memory of CPU 110 upon initiation by an IPL. Once an OLT is resident in CPU 110, it calls in operation of peripheral subsystem 115 through the programmed and hardware chains just described. The OLT controls CPU 110 just long enough to initiate operations of peripheral subsystem 115 during a diagnostic mode. During such diagnostic mode, channel processor 114 may be dedicated to the diagnostic procedure. Additionally, CPU 110 may have a plurality of such channel processors. In the alternative, channel processor 114 may service several I/O subsystems with each subsystem being, in turn, dedicated to an I/O function such as concurrent diagnostic or a data processing operation. Each channel processor 114, of course, services several peripheral subsystems, only one of which is shown in FIG. 2.

PERIPHERAL SUBSYSTEM HARDWARE CONFIGURATION

Figure 3:
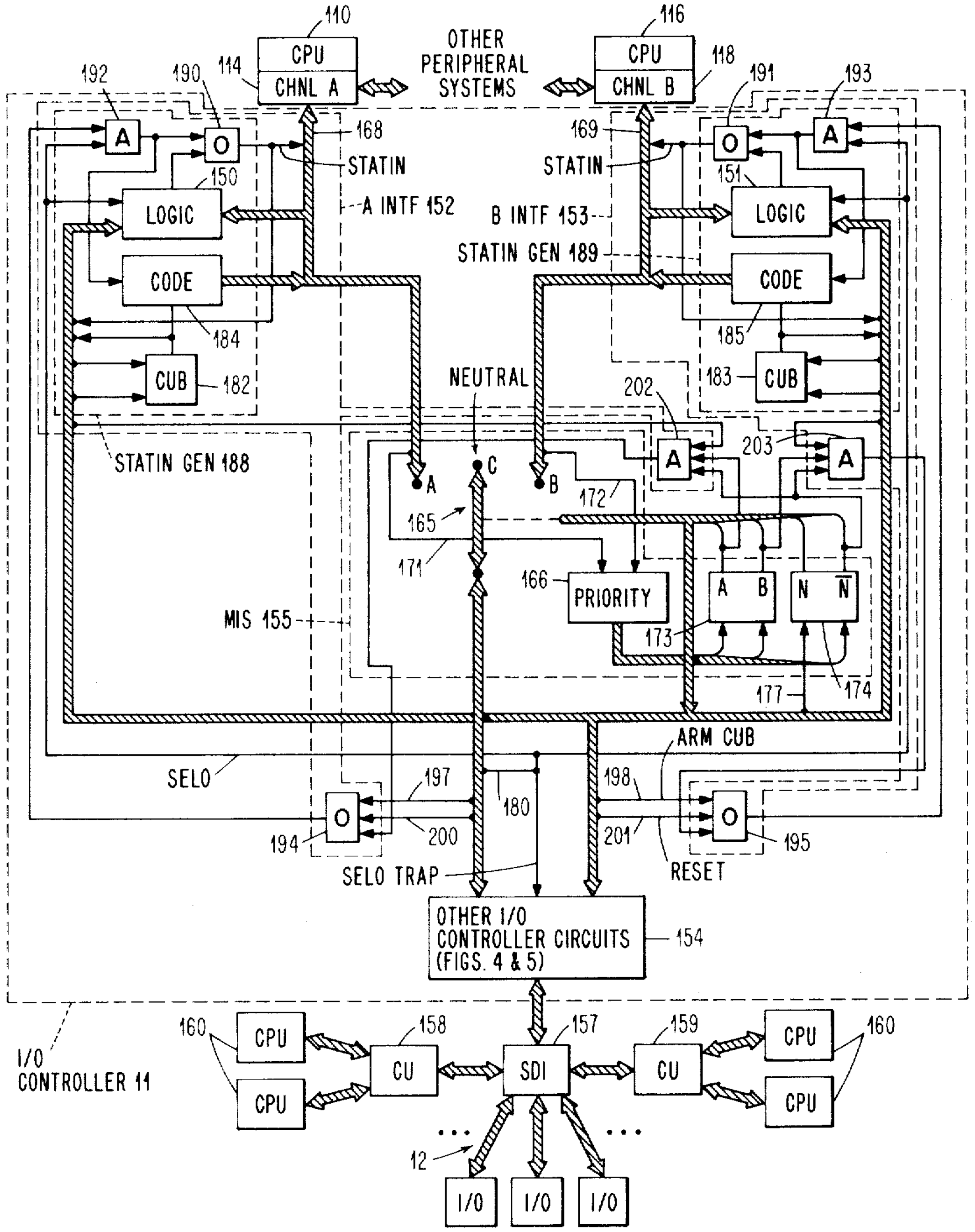
FIG. 3 is a simplified block diagram of a system incorporating the teachings of the present invention.

Referring now to FIG. 3, the interface circuits between CPU's 110 and 116 and the peripheral device subsystem, including I/O controller 11, are shown in simplified logic form. Portions of the interfacing circuits pertinent to the practice of the invention are brought out in some detail, while the other interfacing circuits not pertinent to the practice of the present invention, but necessary for effecting interfacing, are shown as a single block in each section. The circuitry represented by logic blocks 150 and 151, respectively, in interface A and B circuits 152 and 153, has been used before in a similar two-channel connection between I/O controller 11 and a pair of channels 114 and 118. Interface circuits A and B are connected to controller circuits 154 (FIGS. 4 and 5) via "MIS" (multiple interface switch) 155. MIS 155 selectively connects circuits 154 to CPU 10 via interface A circuits 152 and channel (A) 114, or to CPU 116 via interface B circuits 153 and channel (B) 118. Additionally, a neutral position is employed. Channels A and B are connected to other peripheral systems in accordance with known data processing techniques.

I/O controller 11 is connected to a plurality of I/O devices via a set of cables 12 through a subsystem device interface (SDI) 157. SDI 157 may be constructed in accordance with the teachings of the patent to E. W. Devore, U.S. Pat. No. 3,372,378. In accordance with that patent, additional controllers 158 and 159 are selectively connectable to the plurality of I/O devices through SDI 157. In turn, CU's 158 and 159 may have separate MIS's for connecting to a plurality of CPU's 160.

In accordance with known data processing techniques, any of the CPU's 110, 116, or 160 can connect to any of the I/O devices via SDI 157. In practicing the present invention in the illustrated environment, concurrent diagnostics on any of the I/O devices and CU's 11, 158, and 159 may be initiated and supervised by any of the connected CPU's. That is, two of the CPU's 160 may perform diagnostics on CU 158 on a concurrent basis with other tests in the respective CPU's. Additionally, because of SDI 157, such CPU's can perform concurrent diagnostics with respect to any of the I/O devices connected to SDI 157. In a similar manner, CPU's 110 and 116 can, on a concurrent basis, perform diagnostics on I/O controller 11 and any of the I/O devices. The same is applicable to CU 159 and the other CPU's 160.

Before proceeding to the description of the portion of the logic pertaining to practicing the invention in the illustrated environment, the operation of MIS 155 as presently employed in several data processing systems is briefly described. The function of MIS 155 is that of a multiple-pole, triple-throw switch 165. Effectively, all of the buses and cables interconnecting channels 114 and 118 with I/O controller 111 are switched by 165 through electronic means of known design. In a first position at A, switch 165 interconnects channel 114 to I/O controller circuits 154. At position C (the neutral position), circuits 154 are disconnected from channels 114 and 118. At position B, channel 118 is connected to circuits 154. Switch 165 is actuated by request from channels 114 and 118 as initiated by CPU's 110 and 116. Since CPU's 110 and 116 operate asynchronously, two requests can be received by MIS 155 at the same time. MIS has priority circuit 166 for assigning priority to one of the two requests. The requests are manifested in the illustration by a select out (SELO) tag signal supplied by channels 114 and 118, respectively, over cables 168 and 169. SELO is supplied from those cables to priority circuit 166 via lines 171 and 172. Additionally, SELO is also supplied to logic circuits 150 and 151 as will become more apparent. Priority circuit 166 responds to SELO on lines 171 and 172 to selectively set selector latch 173 and reset neutral indicating latch 174. For example, if latch 174 is in the active condition, switch 165 is to terminal C. Upon receiving SELO, priority circuit 166 resets latch 174 to the inactive condition and simultaneously sets latch 173 either to A or B for selectively moving switch 165 to the A or B terminals thereby connecting one of the two interfaces to circuits 154. In the illustrated system, interface A has priority; hence, if two SELO's are received simultaneously, priority circuit 166 sets latch 173 to condition A. As a result of this selection, an initial selection sequence for channel 114 is performed by circuits 154. A control unit busy (CUB) signal is supplied to channel 118 indicating the subsystem is not available. Upon completion of an I/O operation, circuits 154 through microprogram means supply a control signal over cable 176 and thence line 177 setting latch 174 to N, thereby moving switch 165 to terminal C. The condition of latch 173 then is ignored until another SELO is received by priority circuit 166. Under chained operations, circuits 154 are inhibited from setting latch 174 to the active condition, hence, maintaining the operational state of latch 173 in accordance with its setting by circuits 166.

Once MIS 165 has been actuated to terminal A or B, SELO is supplied through switch 165 to cable 179, hence, over line 180 to microprocessor circuits within circuits 154 as later described for trapping same to an initial selecting sequence. SELO also travels to interface A and B circuits 152 and 153, logic 150 and 151.

Circuits 154, which include a microprocessor, in response to SELO trap on line 180 supply an address in (ADDRI) initiating signal over cable 176 to either interface circuits 152 or 153 in accordance with switch 165 setting. The respective logic circuits 150 and 151 generate the ADDRI signal for supplying it to the respective channels. Simultaneously, the CUB latches 182 and 183 in the other interface circuits are set to the active condition. These latches supply an activating signal to the encoding circuits 184 and 185 which supply CUB to the respective channels. Encoders 184 and 185 are actuated by a later-described status in (STATIN) signal generated by activity in circuits 154. STATIN indicates that the set of signals on channel bus in (CBI), later described, indicates the status of the response of the I/O subsystem to a request by the activating channel. In this regard, both interface circuits 152 and 153 include STATIN generators 188 and 189 which generate code permutations for CBI, respectively, for channels A and B in response to instructions received from circuits 154. STATIN is simultaneously supplied with the code permutations for indicating status of the subsystem.

STATIN generators 188 and 189 generate the STATIN signal through OR circuits 190 and 191. In usual data processing operations, logic circuits 150 and 151 respectively generate the STATIN signals. In certain situations, AND circuits 192 and 193 generate a STATIN signal. Switched SELO on line 180 is one input to both AND circuits. This indicates that the STATIN tag is generated in response to the SELO after MIS 155 has assigned priorities and effected operations of switch 165; i.e., STATIN is not generated until circuits 154 can be connected to the selecting channels. The other inputs to AND circuits 192 and 193 are respectively supplied by OR circuits 194 and 195.

One input signal to both OR circuits 194 and 195 is supplied over lines 197 and 198 entitled "ARM CUB." ARM CUB enables a CUB response to a channel to which the subsystem is chained. Under normal operations, CUB can never be issued to a channel to which the subsystem is chained. This is a technique in concurrent diagnostics enabling a CPU, through its channel, to verify operation of the CUB circuits in the subsystem.

STATIN is also activated whenever circuits 154, either upon their own initiation or upon receipt of a channel command (including a CCW), perform a general or selective reset. During such a reset operation, an activating signal supplied respectively over lines 200 or 201 to supply STATIN to the initiating channel such that the status, as a result of the reset, can be supplied over CBI for analysis by the respective CPU's. Additionally, STATIN is generated in response to an SELO for presenting initial status over CBI as detected by AND circuits 202 and 203, respectively, for the two interfaces. These AND circuits are responsive to AB latch 173 being in the appropriate signal state, latch 174 indicating a not neutral connection of switch 165, and a STATIN generating signal received from circuits 154.

I/O CONTROLLER 11 AND ITS RELATIONSHIP TO THE SYSTEM

I/O controller 11 operates with the channel described in the Moyer et al., U.S. Pat. No. 3,303,476. FIGS. 1 and 3 of that patent describe all tag signals used herein except SUPPRESSIBLE REQUEST IN which is defined with respect to MPUX (channel MPU) microprograms. It also assumes that the interface between the controller and the I/O devices follows a similar busout, but-in, tag-line arrangement. In addition to the functions described in the Moyer et al. patent supra, a tachometer input line is provided to I/O controller 11, as later described.

Figure 4:
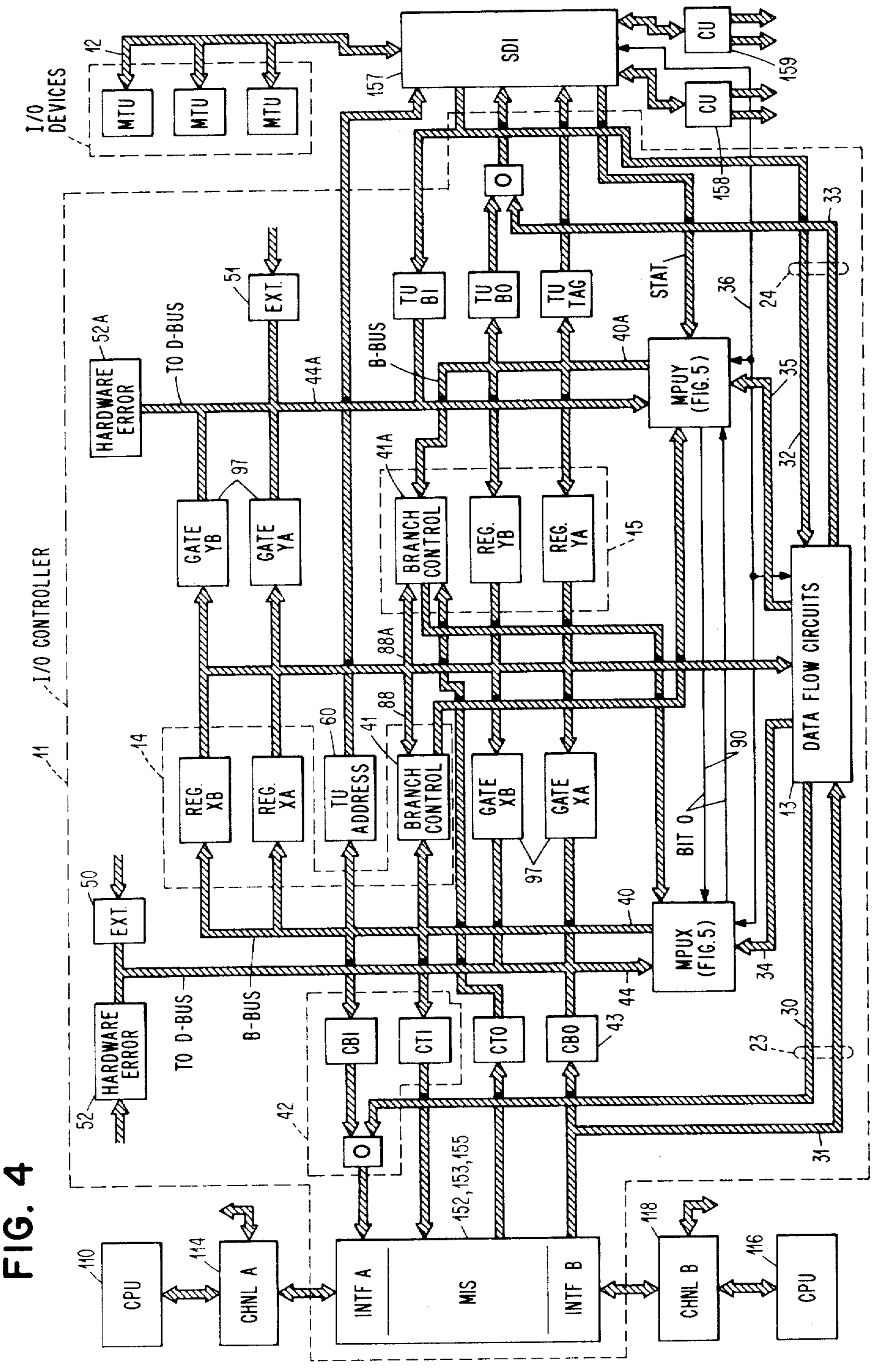
FIG. 4 is a simplified logic block diagram of an I/O controller usable with the FIG. 3 illustrated system.

The term "CPU" is hereafter used to include the channel portions of data processors. I/O controller 11 provides control for exchanging informationbearing signals between CPU's and I/O devices, such as magnetic tape units (MTU's) via cable 12 (FIG. 4).

I/O controller 11 has three main sections. MPUX is a microprogrammable unit (MPU) providing synchronization and control functions between the I/O controller 11 and channels 114 and 118. MPUY performs similar functions with I/O devices via SDI 157. In a magnetic tape subsystem, MPUY provides motion control and other operational related functions uniquely associated with the I/O device. The third section is data flow circuits 13, which actually process the information-bearing signals. Data flow circuits 13 may consist of entirely a hardware set of sequences and circuits for performing information-bearing signal exchange operations. In an I/O controller associated with a magnetic tape recording system, such data flow circuits include writing circuits for both PE and NRZI, readback circuits for both encoding schemes, deskewing operations, certain diagnostic functions, and logging operations associated with operating a magnetic tape subsystem.

Since MPUX and MPUY are independently operable, each having its own programs of microinstructions, program synchronization and coordination are provided. To this end, MPUX has exchange registers 14 while MPUY has exchange registers 15. The signals from the MPU's temporarily stored in these registers are supplied directly to data flow circuits 13 for effecting and supervising data flow and signal processing operations. Additionally, such signals are simultaneously provided to the other MPU. That is, register 15 supplies MPUY output signals to MPUX and register 14 supplies the MPUX output signals to MPUY. The respective MPU's under microprogram control selectively receive such signals for program coordination.

The channels exchange control signals with MPUX over CTO (channel tag out), CTI (channel tag in), CBO (channel bus out), and CBI, plus trap control line 17. When the trap line is actuated, MPUX aborts all present operations and branches to a fixed address for analyzing signals on CBO. These signals force MPUX to perform channel commands or selected functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals with I/O devices, also has trap line 21 for controlling an I/O device in a similar manner. All information-bearing signals are processed through data flow circuits 13 via full-duplex cables 23 and 24.

Data flow circuits 13 have CBI lines 30 and CBO lines 31. Each set of lines has a capability of transferring one byte of data plus parity. Similarly, tape unit bus in (TUBI) lines 32 transfer signals to data flow circuits 13 and MPUY to the I/O devices via SDI 157. Tape unit bus out (TUBO) lines 33 carry information-bearing signals for recording in MTU's plus commands from MPUY and MTU addresses from MPUX. Status signals are supplied both to MPUX and MPUY over status cables 34 and 35. Velocity or tachometer signals supplied by the selected and actuated MTU are received over line 36 by MPUX, MPUY, and data flow circuits 13.

MPUX has output bus 40 (also termed B bus) supplying signals to its exchange registers 14. These include branch control register 41, register XA, and register XB. Output bus 40 is also connected to the channel exchanging registers 42. These registers are CTI and CBI. CBI is channel bus in, while CTI is channel tag in. CTI transfers the tag signals from I/O controller 11 to CPU as described in the Moyer et al. patent and other control signals for interfacing operations.

Additionally, CBO gate 43 receives bytes of data for data flow circuits 13 and for MPUX. Gates XA and XB similarly gate exchange signals from the MPUY exchange registers 15. Gate XA receives the control signals from register YA while gate XB receives exchange signals from register YB. CBI register is shared by MPUX and data flow circuits 13. The CBI lines are multiplexed in accordance with the Moyer et al. patent.

CTI supplies tags indicating what the bus in signals mean.

Signals in TUBO register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a maintenance panel, communication network, and the like. Also, hardware detected errors are lodged in register 52 for sampling by MPUX.

I/O controller 11 has an efficient initial selection process. MPUX responds to a channel SELO request for service of an MTU to provide the MTU address over output line 40 into TU address register 60; from there, the address is sent to all MTU's. The appropriately addressed MTU responds to MPUY that the selection is permissible or not permissible. If permissible, a connection is made; MPUY notifies MPUX via register YA. MPUX then completes the initial selection by responding to the requesting channel via CTI and MIS 155. Data processing operations then ensue.

MICROPROGRAMMABLE UNITS (MPU'S)

The MPU's contain microprograms which determine the logic of operation of I/O controller 11. MPUX contains a set of microprograms in its control memory designed to provide a responsiveness and data transfers with the channels. In a similar manner, MPUY contains a set of microprograms for operation with the various MTU's. Registers 14 and 15 contain signals from the respective microprograms which serve as inputs to the respective programs for coordinating and synchronizing execution of various functions being performed. A better understanding of how the microprograms operate the hardware is attained by first understanding the logic construction of the MPU's which are constructed in an identical manner.

Figure 5:
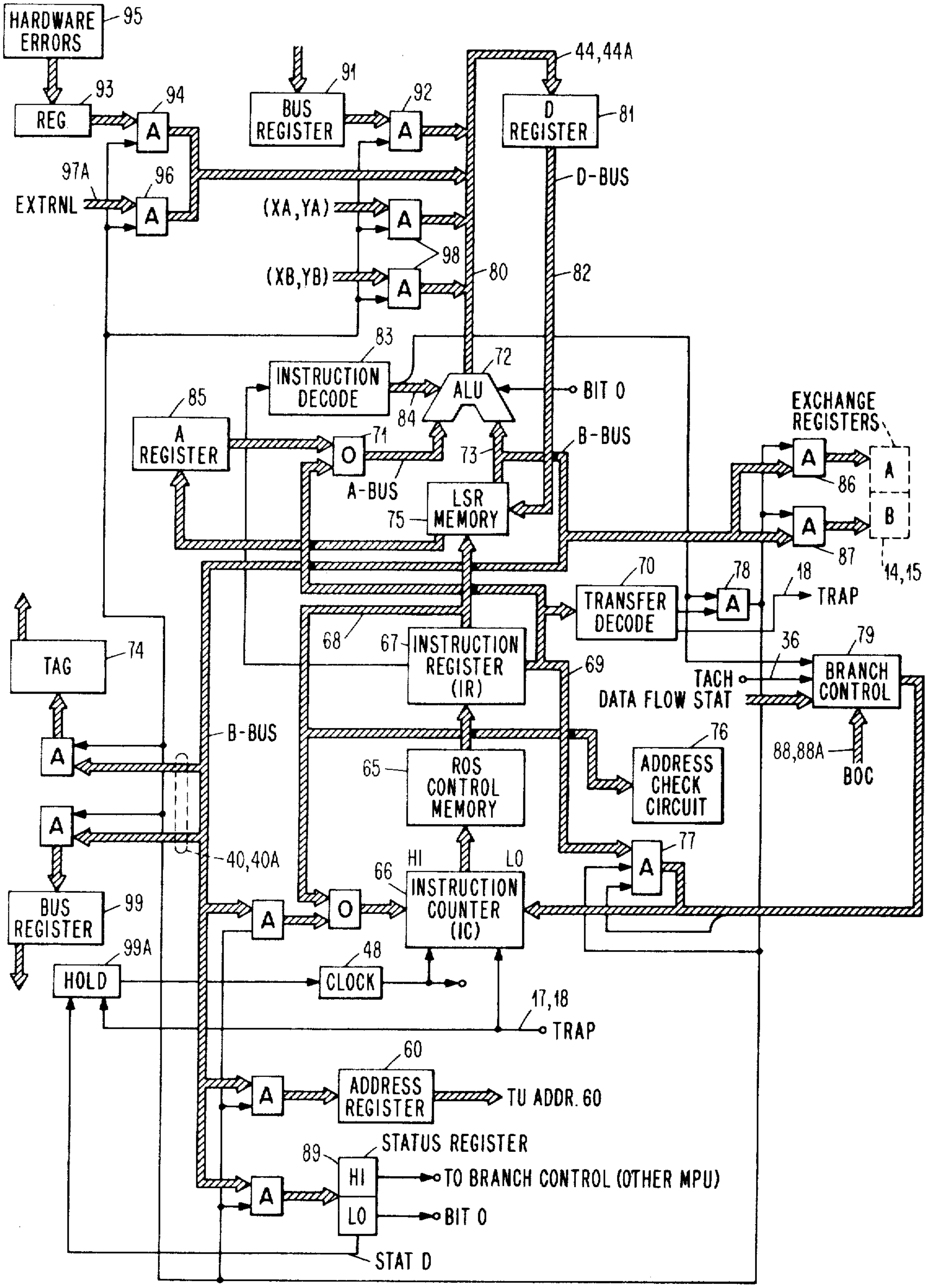
FIG. 5 is a simplified logic block diagram of a microprocessing unit (MPU) usable with the I/O controller illustrated in FIG. 4.

Referring more particularly to FIG. 5, an MPU usable in I/O controller 11 is described in a simplified block diagram form. Data transfers are serially in bytes of eight bits each. The microprograms are contained in read only store (ROS) control memory 65. While a writable store could be used, for cost-reduction purposes, it is desired to use a ROS type of memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of operation. The staticized signals are supplied over cables 68 and 69 to various units in MPU. Cable 68 carries signals representative of control portions of the instruction word, such as the operation code and the like. Signals in cable 68 are supplied to IC 66 for effecting branching and instruction address modifications. Cable 69, on the other hand, carries signals representative of data addresses. These are supplied to transfer decode circuits 70 which respond to the signals for controlling various transfer gates within MPU. The other portions of the signals are supplied through OR circuits 71 to arithmetic logic unit (ALU) 72. In ALU 72, such signals may be merged or arithmetically combined with signals received over B bus 73 for indexing or other data processing operations. MPU has local store register memory (LSR) 75 accessible in accordance with the address signals carried over cable 68. Address check circuit 76 verifies parity in the address. The address signals may also be used in branch operations. AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 79 which selectively open AND circuits 77 in accordance with the conditions supplied thereto, as will become apparent.

The data flow and arithmetic processing properties of the MPU center around ALU 72. ALU 72 has two byte inputs, the A bus from OR circuits 71 and B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuits 78 for selectively transferring signals within MPU.

ALU 72 has a limited repertoire of operations. Instruction decode 83 decodes four bits from the instruction word to provide 16 possible operations. These operations are set forth in the Instruction Word List below:

TABLE I

Instruction Word List

| Op Code | Mnemonic | Function |
|---|---|---|
| 0 | STO | Store constant in LSR A set to 0 |
| 1 | STOH | Store constant in LSR, indexed addressing |
| 2 | BCL | Match with Field 1, branch to Addr in Field 2 |
| 3 | BCH | Match with Field 1, branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | 00 | Not used - illegal code |
| 8 | | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A EXCLUSIVE OR B, result to LSR 75 |
| F | XOM | A EXCLUSIVE OR B, result not stored |

In the above list, the letter "A" means A register 85, "B" is the B bus, and the mnemonics are for programming purposes. The term "selected input" indicates one of the hardware input gates (92, 94, 96, 98) to the ALU output bus 80. The term "selected register" indicates one of the "hardware" registers in MPU. These include the interconnect registers 14 and 15 (FIG. 4), tag register 74, bus register 99, address register 60, and IC 66. Note that the transfers from LSR 75 to these selected registers are via B bus 73. In FIG. 4, the B bus for MPUX corresponds to cable 40, while the MPUY B bus is cable 40A. Registers 14 receive signals via AND circuits 86 and 87. In MPUY, AND circuits 86 and 87 supply signals to exchange registers 15. Branch control 79 in FIG. 5 is the internal branch control. Branch controls 41 and 41A of FIG. 2 supply their signals respectively over cables 88 and 87A to the respective MTU's. These branch controls are separate circuits. Tag register 74 in FIG. 3 for MPUX corresponds to CTI register in the channel exchange registers 42. For MPUY, it corresponds to TUTAG register connected to SDI 157. In a similar manner, bus register 99 for MPUX is register CBI in channel exchanging registers 42, while in MPUY it is register TUBO. Address register 60 of FIG. 5 corresponds to TU address register 60 of FIG. 4. MPUY address register 60 is not used.

Status register 89 has several output connections from the respective MPU's. It is divided into a high- and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to the data flow. Bit 7 additionally is supplied directly to the ALU 72 of MPUY as indicated by lines 90 in FIG. 4. This corresponds to a self-trapping operation which will be later described. Interpretation of the STAT bits is microprogram determined.

The signal-receiving portions of each MPU are in four categories. First, bus register 91 is designed to receive tags and data bytes for MPUY; this corresponds to CBO register 43 of FIG. 4. An MPUY bus register 91 is TUBI register. AND circuit 92 is responsive to the transfer decode signals from circuits 70 to selectively gate bus register 91. From thence, the data bytes are supplied to LSR 75. Secondly, D register 81 also receives inputs from hardware error register 93 via AND circuits 94. Hardware error signals (parity errors, etc.) are generated in circuit 95 in accordance with known techniques. Thirdly, AND circuits 96 receive external data signals over cable 97A for supplying same to D register 81 under microprogram control. Fourthly, interchange registers 14 and 15 respectively supply signals to pairs of AND circuits 98 which selectively gate the interchange signals to D register 81 under microprogram control. The receiving microprogram controls the reception of interchange signals from the other MPU.

Generally, the outgoing signals from each MPU are supplied via B bus 73, also a main input bus to ALU 72. The signal-receiving bus is the D bus, which is the input bus for LSR 75 and the output bus for ALU 72.

Since ALU 72 has a limited repertoire of operations, many of the operations performed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or result of D register 81 are stored in LSR 75. If it is desired to output the results of the arithmetic operation, then another cycle is used to transfer the results from LSR 75 over B bus 73 to a selected output register such as one of the interchange registers or bus register 99.

In FIG. 5, the input to D register 81 is either cable 44 or 44A of FIG. 4. Hardware error circuits 95 and error register 93 of FIG. 5 correspond both to the hardware error circuits 52 and 52A of FIG. 4. External cables 97A receive signals from the external registers 50 and 51 respectively for the two MPU's.

AND circuits 98 of FIG. 5 correspond to the gates XA, XB, YA, and YB of FIG. 4.

Figure 6:
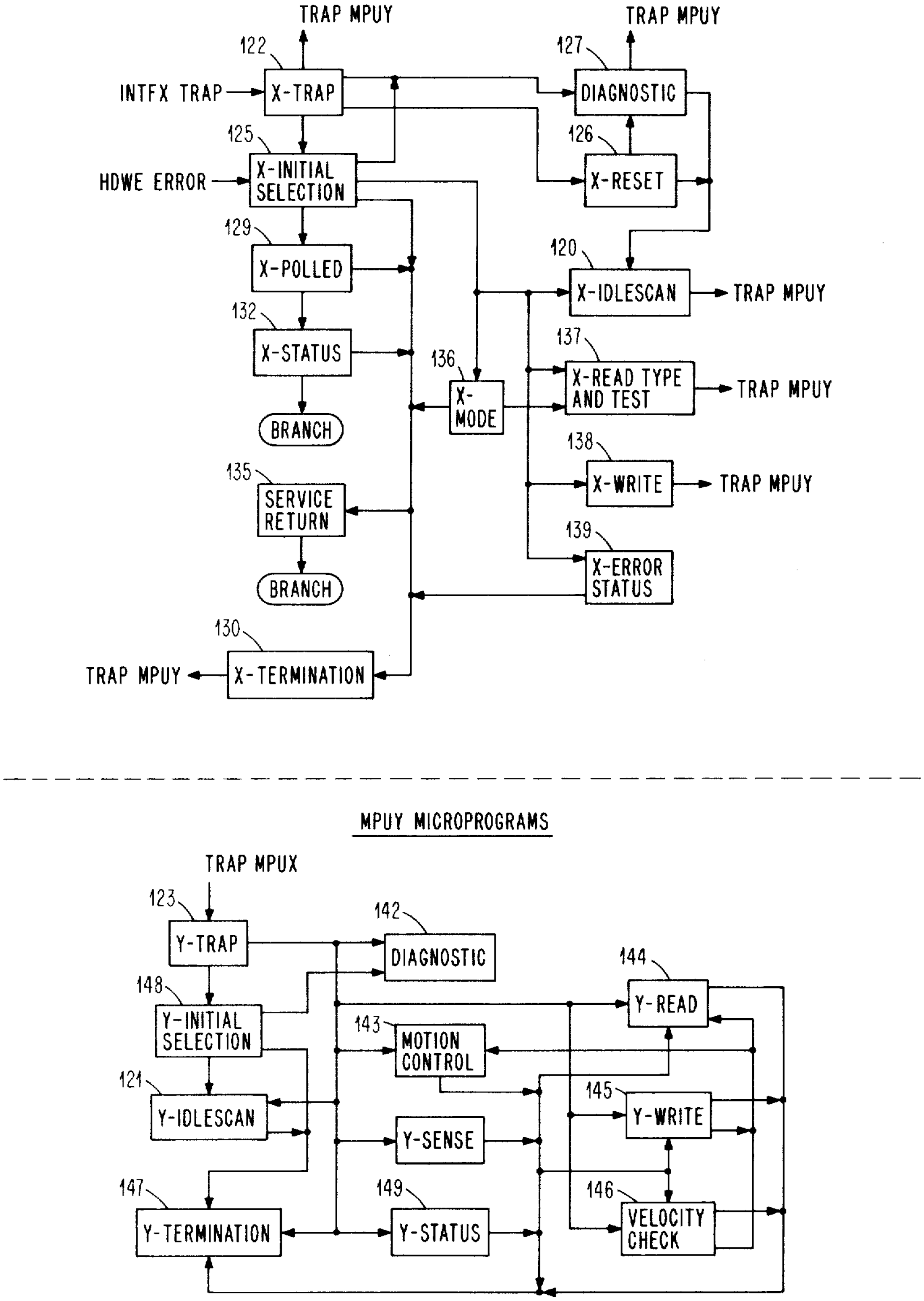
FIG. 6 is a simplified block diagram of microprograms resident in the FIG. 5 illustrated microprocessor used to operate the FIG. 3 illustrated peripheral device subsystem.

Each MPU is trapped to a predetermined routine by a signal on trap line 17 or 18, respectively; the trap signal forces IC 66 to all zeroes. At ROS address 000, the instruction word initiates X-trap routine or Y-trap routine (FIG. 6). For reliability purposes, it is desirable to force MPUY to inactivity. This means that clock or oscillator 48 is gated to an inactive state. During normal operations, clock 48 supplies timing pulses to advance IC 66 and coordinate operations of the various MPU's as is well known. Whenever MPUY has finished its operations, it sets STAT D in register 89. STAT D indicated MPUY has finished its operations as requested by MPUX. The STAT D signal sets hold latch 99A indicating that MPUY is inactive. Hold latch 99A gates clock 48 to the inactive condition. When MPUX traps MPUY, not only is IC 66 preset to all zeroes, but hold latch 99A is reset. Clock 48 is then enabled for operating MPUY.

MICROPROGRAMMING GENERALLY

FIG. 6 shows general relationships between the micro-routines of MPUX and MPUY. This showing is greatly simplified to give a general impression of how the micro-routines cooperate to perform I/O controller functions. Many of the functions performed by these micro-routines have been performed before in other I/O controllers, usually by hardware sequences. Some micro-routines of lesser importance to the present invention have been omitted for clarity. The described routines were selected to illustrate the operating relationships of MPUX, MPUY, data flow circuits 13, MTU's, and CPU in evaluating subsystem performance by concurrent diagnostics as more clearly brought out later.

X-idlescan 120 and Y-idlescan 121 monitor pending status, interrupt status, and provide intercommunication between the two MPU's for ascertaining availability of the I/O devices. X-idlescan 120 includes trapping MPUY via Y-idlescan 121 for polling I/O devices via SDI 157 to determine availability of an addressed MTU. Included in X-idlescan is a wait routine which idles MPUX until trapped by a channel. The channel traps MPUX to ROS 65 address 000. At MPUX ROS address 000, X-trap 122 begins. During the execution of X-trap routine 122, MPUY is trapped to ROS address 000 to later execute Y-trap routine 123. In X-trap 122, CTO is sensed for initial selection. If the initial selection tag is active, X-trap routine branches the microprogram to X-initial selection 125. If there is no initial selection, then either X-RESET 126 or an ALU diagnostic within diagnostic routine 127 is performed. Diagnostic routine is shown in part in flowchart form in FIG. 7. Upon completion of these functions, X-idlescan 120 may be re-entered to complete MTU scanning operations. Initial selection 125 is responsive to certain hardware errors received at 128 (sensed as described with respect to FIG. 3) to stop I/O controller 11 for indicating detected hardware errors.

During an initial selection, X-polled 129 is entered to further identify the channel request. Also, certain branch conditions are set up in LSR for use later by X-termination 130. MTU address verification may be performed. Upon completion of the branch setups, the X-polled 129 initiates X-status 132. X-status 132 activates CTI to send tag signals to the channel interface indicating controller status in response to the previously received requests. Based upon the branching set up in X-polled 129, the microprogram execution may follow several routes. These primarily end up in X-termination 130 which terminates the MPUX operation. MPUX then scans for further interrupts. With all scanning completed, MPUX waits for further instructions from either channel 114 or 118.

Another routine is service return (SERVRTN) 135 used in conjunction with the channel interface circuits 152 and 153 for timing and control purposes during data transfers. The operation of the above-referred-to data channel in Moyer et al. is implemented by SERVRTN 135. Another possible routine entered from initial selection 125 is X-mode 136, which determines the mode of operation in the controller in response to channel CMDO (command out) signals. X-read type and test 137 is entered in the event the initial selection results in a read operation. X-read type and test 137 traps MPUY to predetermined ROS control memory addresses for initializing a read operation, within MPUY. In a similar manner, X-write 138 is entered and also traps MPUY to another subroutine for initializing a write operation. Error status 139 transfers error information to CPU. This routine is closely associated with initializing I/O controller 11 for read and write. Sense 140 is entered in response to a channel sense command. Sensing transfers sense bytes to CPU for analysis. X-termination 130 also traps MPUY in connection with the selecting activated MTU's and for performing other functions in connection with terminating an operation previously initiated through a channel. MPUY micro-routines respond to MPUX microroutines for controlling various MTU's via SDI 157. These micro-routines also transfer information control signals, I/O devices, and SDI 157 to MPUX for retransmittal to channel and CPU. Upon being trapped by MPUX, Y-trap 123 obtains an MPUY ROS address from XB register and then branches to that address. Such ROS addresses are the first instruction address of several MPUY microprograms. For example, one address initiates diagnostic 142. Diagnostic 142 may initiate one of several microprograms for effecting operations in CU 11 or an MTU for diagnostic purposes. Such program connections are not shown.

On the other hand, Y-trap routine 123 may branch to Y-initial selection 148 to initialize MPUY for activity set forth in additional control signals from MPUX in registers 14. This may include an initiation of status 149, termination 147, or Y-idlescan 121. The MTU operating routines 143–146 may also be initiated from initial selection 148. In addition to exchanging control signals via registers 14 and 15, status information is freely exchanged between the two MPU's for microprogram coordination.

MICROPROGRAM SEQUENCE FOR MPUX ENABLING CONCURRENT DIAGNOSTICS

A simplified flowchart later shows microprogram flow for setting and sensing chained and diagnostic flags effecting concurrent diagnostics. MPUY microprograms are subservient to the described microprogram for effecting certain diagnostic functions not necessarily associated with enabling concurrency and, therefore, are not described. LSR 75 in MPUX retains diagnostic and operating flags upon which the microprograms branch to various sequences for effecting the designated concurrent operations. For ease of reference, a partial LSR map for control flags in MPUX LSR 75 is set forth below:

TABLE II

| Register and Bit | Flag |
|---|---|
| **Selected Diagnostic Flags** | |
| 4-0 | DIAG MODE |
| 4-1 | BLK INT |
| 4-2 | FORCE DVE BSY |
| 4-3 | ARM CUB |
| 4-4 | BLK UC |
| 4-5 | |
| 4-6 | |
| 4-7 | |
| **Selected Operation Flags** | |
| 5-0 | CHAIN A |
| 5-1 | CHAIN B |
| 5-2 | REW/DSE |
| 5-3 | OP COMPLETE |
| 5-4 | UNIT CHECK |
| 5-5 | ENABLE |
| 5-6 | |
| 5-7 | |
| 6-0 | OPIN |
| 6-1 | STATIN |
| 6-2 | CUB-A |
| 6-3 | CUB-B |
| 6-4 | ADDRI |
| 6-5 | SVCI |
| 6-6 | CUR |
| 6-7 | DE |
| 7-0 | DEPRIME |
| 8-0 | DEPRIME |

In the flowchart below, each major sequence step is listed, followed by the description. Entry to the various sequence steps is from the immediately preceding step unless otherwise indicated after the word "Enter." Exit from the sequence step is to the immediately following listed sequence step unless otherwise indicated. The function is described in abbreviated form indicating the function performed during the particular step. That is, each step represents several micro-instructions in MPUX, the exact code listing being one of programming design not necessary to practicing the present invention. Following the flowchart, a brief description ties selected steps of the microprogram flowchart into the functions performed for concurrent diagnostics. Reference to particular steps in this flowchart will be by reference to sequence step number.

SEQUENCE STEP M1 - X-IDLESCAN 120

Enter From: M19 when $\overline{\text{DE STS}} \neq$ ; M16 when $\overline{\text{CHAIN}}$ (entry from M16 only when not chained).

Function: Scans to find pending status in subsystem such as interrupts, device ends, etc.

Exit To: M2 at end of scan or detection of interrupt, device end, or status to be reported to CPU, raise REQIN upon exit; M3 when trapped by channel or hardware.

SEQUENCE STEP M2 — X-IDLEPEND (A PART of X-IDLESCAN 120)

Enter From: M1; M20 when $\overline{\text{SUPPRO}}$ (M20 entry only when SUPPRO from channel is inactive which indicates channel has completed its sequence).
Function: Wait for channel SELO.

SEQUENCE STEP M3 — X-TRAP 122

Enter From: By trap only.
Function: On trap by channel, logic 150 or 151 set branch conditions in branch control 41. Microprogram scans these branch conditions to enter a microprogram corresponding to a channel command.

SEQUENCE STEP M4 — INITIAL SELECTION 125

M4A Function: Perform initializing functions as described in patents showing channel operations. Below are particular functions related to concurrent diagnostics as implemented in I/O controller 11.
M4B Function: BOC Not Chained, Go to M4C; BOC Chained, skip M4C, go to M4D (maintain diagnostic mode). (Never chained on first command of a chained sequence).
M4C Function: Reset all LSR diagnostic flags. This is done on first command of any chained sequence initiated by an SIO (start I/O). See remarks of effect on concurrent diagnostics. Since chaining has been broken, CPU is indicating to I/O controller that the diagnostic procedures have been completed. Accordingly, all diagnostic flangs including BLT INT are reset for enabling usual data processing operations.
M4D Function: Initial status bytes from LSR 75 are transferred to CBI with STATIN activated on CTI in accordance with patents describing channel operations. The chained condition in I/O controller 11 is reset if SUPPRO is inactive and continues set if SUPPRO is active. This enables the CPU to either selectively continue the chain or break it after execution of the command in step M5. CUB is activated in the channel interface not chained.

SEQUENCE STEP M5

Function: Detect for a rewind (REW) or data security erase (DSE).
Exit: 0 exit to M10 for executing command. 1 continue on testing chain.

SEQUENCE STEP M6

Function: Test for chained condition in an interface.

Exit: 0 exit to M9. 1 continue testing for forcing unusual conditions on interface.

SEQUENCE STEP M7

Function: Test LSR flag to see if device busy (DVE BSY) is to be sent to CPU. 1 exit to M10 for executing command. 0 perform M8.

SEQUENCE STEP M8

Function: Set LSR hold status. This status indicates a free-standing or time-consuming operation to be performed by an I/O device upon completion of initiation of I/O device function. CU will continue to do other things and will not send ending status to channel for device until a DVE is received.

SEQUENCE STEP M9

Function: Set LSR REW/DSE FLG. This indicates to the microprogram that an REW/DSE is being performed by the addressed MTU. There is one flag for each I/O device or MTU. This flag is used during IDLESCAN 120 for checking whether or not the REW/DSE is still being performed by the addressed MTU.

SEQUENCE STEP M10

Function: Executes channel command. This may be a read, write, sense, or print in accordance with I/O subsystem functions as related to the CPU.

SEQUENCE STEP M11

Function: Sense for REW/DSE. 0 exit to M13 for assembling ending status (do not have to wait for completion of I/O device operation). 1 exit to M12.

SEQUENCE STEP M12

Function: Check for DVE from device doing REW/DSE.
Exit: 0 device has completed free-standing operation. Return to 1 for scanning activity of other devices. 1 wait loop for completion of I/O device operation.

SEQUENCE STEP M14

Function: Assemble ending status. Various indicators in LSR 75, as well as latches in CU, are sensed and assembled into a fixed number of sense bytes for transmittal to the I/O channel simultaneously with STATIN in step M15.
M14A Function: Sense for block interrupt flags, i.e., determine whether or not the unit check (UC) can be sent to channel.
Exit: 1 exit directly to M15 for sending ending status to CBI. 0 block interrupt is off, CU must check for UC condition.
M14B Function: Check LSR 75 for "send UC" flag.

Exit: 0 not UC, exit directly to M15. 1 UC condition is sensed without a block interrupt. Exit to M14C for adding UC to ending status.
M14C Function: UC sense bit in LSR status byte is set in preparation for sending UC status to channel in CPU.

SEQUENCE STEP M15

Enter: Steps M14A, B, or C.
Function: Transfer status information to CPU. Status byte from LSR 75 is supplied to CBI while simultaneously STATIN bit is activated on CTI. If SUPPRO is received from connected channel, the chaining latch in CU is set for continuing the diagnostic or chaining operation.

SEQUENCE STEP M16

Function: Check for chaining condition.
Exit: 0 return to M1 for IDLESCAN operation, i.e., all channel commanded functions have been completed. 1 continue on chained operation.

SEQUENCE STEP M17

Function: Reset all CTI's.

SEQUENCE STEP M18

Function: Check for ARM CUB flag.
Exit: 0 to M20. 1 exit to M19.

SEQUENCE STEP M19

Function: ARM CUB sets flag in LSR 75 for supplying a CUB signal in response to the next received channel command (note that chained condition is maintained).

SEQUENCE STEP M20

Function: Since chain command has been received, SUPPRO is active. Wait loop in M20 until SUPPRO is deactivated, then go to step M2.

With regard to the above flowchart, in step M4B, the CU will never be chained if the command being received is the first command in a set of chained commands or the only command. Accordingly, the block interrupt flag (BLK INT FLG), as well as all other diagnostic flags, is reset in step M4C. To maintain the BLK INT FLG during a chained diagnostic operation for preventing the control unit from interrupting with ending device status, all SIO's must have a SET DIAGNOSE command with a channel control word (CCW) indication BLK INT FLG being set. This set of operations interlocks the diagnostics from other data processing operations which are operating concurrently. Data processing operations, whether or not chained, do not use SET DIAGNOSE; and, therefore, the BLK INT FLG will never be set during normal data processing operations. Also, upon dropping a chained condition by not supplying SUPPRO, the block interrupt and other diagnostic flags are reset enabling the CU to return to data processing operations. Accordingly, the BLK INT FLG will only be activated from the SET DIAGNOSE following an SIO to the beginning of the next SIO.

MPUX (ALU-1) PARTIAL MICROCODE LISTING

```
LOC    OBJECT   STMT   SOURCE STATEMENT
       CODE
                 985+*****************************************************************
                 986+*   ALU2 IS ALWAYS SLAVED TO ALU1. ANY OPERATION EXECUTED BY ALU2   *
                 987+*   MUST ALWAY BE INITIATED BY ALU1 VIA A XOUTB. THE XOUTB BY ALU1  *
                 988+*   TRAPS ALU2 TO LOCATION 000. ALU2,BEGINNING EXECUTION AT 000,    *
                 989+*   FETCHES AN INDEX BYTE FROM ALU1 AND MOVES IT TO THE INSTRUCTION *
                 990+*   COUNTER. THE INDEX BYTE WILL POINT TO ONE OF THE BRANCH INSTRUCT- *
                 991+*   IONS IN THE BRANCH TABLE. THE SELECTED BRANCH INST WILL BE      *
                 992+*   EXECUTED AND THE DESIRED ROUTINE WILL BE ENTERED. WHEN THE      *
                 993+*   SELECTED ROUTINE COMPLETES, STAT D WILL BE SET INDICATING TO    *
                 994+*   ALU1 THAT THE DESIRED FUNCTION HAS BEEN COMPLETED. ALU2 WILL THEN *
                 995+*   BE HELD AT LOCATION 000 UNTIL ACTUATED BY ALU1 VIA XOUTB TRAP   *
                 996+*****************************************************************

000000 5788      999 BYPASS    XFR   WORK2,XINB          FETCH ALU1 INDEX
000001 0800     1002           STO   STATIMG,ZERO        CLEAR STAT IMAGE REG
000002 1800     1005           STOH  STATIMG,0           CLEAR STAT IMAGE REG HIGH
000003 4828     1008           XFR   STATIMG,STAT        CLEAR ANY OUTSTANDING STATS
000004 5722     1011           XFR   WORK2,IC            MOVE INDEX TO INST CTR
000005 6000     1014 NDXTST3   BU    EXECTST3            GO DO ALU 2 CHECKOUT
000006 6000     1017 NDXDES    BU    EXECDES             HIO NOT OPRTING--GO DESELECT TU
000007 6000     1020 NDXPOLL   BU    EXECPOLL            GO POLL DEVICE FOR STATUS
000008 6000     1023 NDXGRST   BU    EXECGRST            GO DO GENERAL RESET
000009 6000     1026 NDXSRST   BU    EXECSRST            GO DO SELECTIVE RESET
00000A 6000     1029 NDXSDE    BU    EXECSDE             GO SET DEVICE END
00000B 6000     1032 NDXABRT   BU    EXECABRT            GO STOP THE DEVICE IF GOING
00000C 6000     1035 NDXDMR    BU    EXECDMR             GO DO DIAG MEASERE
00000D 6000     1038 NDXAXESS  BU    ACCESS              GO GET READ ACCESS TIME
00000E 4990     1041 NDXFLAGS  XFR   FLAGS,XINA          BRING IN FLAG BYTE
00000F          1043+NDXSNSR   EQU   *
00000F 6000     1045 SRETURN7  BU    ZAPIM           USE ON SENSE RESET & SEL RESET RETURN
000010 4090     1048 NDXFLAG2  XFR   WORK5,XINA          GET TUBO MASK (SET FLAGS #3)
000035          1050+NDXFSF    EQU   X'35' .             GO DO FORWARD SPACE FILE
000031          1051+NDXERS    EQU   X'31' .             GO DO ERASE TO END OF TAPE(EOT)
000037          1052+NDXFSR    EQU   X'37' .             GO DO FORWARD SPACE RECORD
000033          1053+NDXRDF    EQU   X'33' .             GO DO READ FORWARD
00003C          1054+NDXBSF    EQU   X'3C' .             GO DO BACKSPACE FILE
00003E          1055+NDXBSR    EQU   X'3E' .             GO DO BACKSPACE RECORD
00003A          1056+NDXRDB    EQU   X'3A' .             GO DO READ BACKWARD
000013          1057+NDXWRT    EQU   X'13' .             GO DO WRITE OPERATION
000020          1058+NDXWTM    EQU   X'20' .             GO DO WRITE TAPE MARK
000022          1059+NDXERG    EQU   X'22' .             GO 40 ERASE RECORD GAP
00002F          1060+NDXRWD    EQU   X'2F' .             GO DO REWIND
000029          1061+NDXRWU    EQU   X'29' .             GO DO REWIND UNLOAD
0000ED          1062+NDXSTS    EQU   X'ED' .             GO DO INITIAL STATUS
0000E1          1063+NDXSNS    EQU   X'E1' .             GO DO SENSE OP
000000          1065 BEGIN     CSECT
                1066 */*   ALU1: BEGIN   */
                1067 *** POWER ON RESET IS CHECKED FIRST TO INSURE THAT LSRS HAVE GOOD
                1068 *** PARITY PRIOR TO THE ENSUING ALU OPS.
000000 2F14     1070 CHKRSTS   BOC   PWRRST,EXECRST      BRANCH IF POWER ON RESET
000001 3C04     1073           BOC   NGENR,NORESETS      BRANCH IF NOT GENERAL RESET
000002 C1F0     1076           AND   CTIMAGE,X'F0'       CLEAR CHANNEL TAGS
000003 4150     1079           XFR   CTIMAGE,CTI         SET TO HARDWARE
```

```
                  1082 ***************************** ALU FAIL CHECK **********************
                  1083 *  EACH TIME ALU1 IS TRAPPED TO LOC 0, THE ALU HARDWARE ERROR.REGS ARE*
                  1084 * TESTED FOR A FAILURE. THE TWO EXCEPTIONS ARE:                      *
                  1085 *           1. POWER ON RESET                                        *
                  1086 *           2. A PRIOR FAILURE THAT HAS NOT BEEN CLEARED BY A SENSE OP *
                  1087 *  ONCE A FAILURE HAS BEEN DETECTED, THE ALU ERROR REGS ARE SAVED IN *
                  1088 * LSRS AND WILL REMAIN UNTIL A SENSE OP IS ISSUED. THE ALUFAIL FLAG  *
                  1089 * PREVENTS OVERLAYING THE LSRS WHEN THEY ARE HOLDING PRIOR ERROR DATA *
                  1090 *  THE FIRST SIO/TIO (OTHER THAN SENSE) SUBSEQUENTLY ISSUED TO THE   *
                  1091 *CONTROLLER AFTER AN ALU FAILURE WILL BE UNIT CHECKED. SUCCEEDING    *
                  1092 * SIO/TIO'S WILL RECEIVE AVAILABE STATUS IF THE ONLINE PROGRAM CHOOSES*
                  1093 * TO IGNORE THE INITIALLY UNIT CHECKED SIO/TIO.                      *
                  1094 ********************************************************************

000004 0200       1097 NORESETS STO  XOUTAIM,0           CLEAR DATA FLOW CROSSOVER
000005 DB40       1100          ANDM FLAGS2,ALUFAIL      MASK FOR PREVIOUS ALU FAILURE
000006 310A       1103          BOC  DREG1,ANYMOR        BRANCH IF THERE WAS
000007 5681       1106          XFR  ALU2ERR,EXT         FETCH ALU2 HARDWARE ERRORS
000008 5584       1109          XFR  ALU1ERR,HDWR        FETCH ALU1 HARDWARE ERRORS
000009 2218       1112          BOC  ALUR,HNDLERR        BRANCH IF ANY ALU ERRORS
00000A 221D       1115 ANYMOR   BOC  ALUR,CLEARIT        BRANCH IF ERROR TO CLEAR
00000B 140B       1118 SETABRT  STO  XOUTBIM,NDXABRT-ALU2BRT  SET XOUTB IMAGE FOR USE LATER
00000C CBC0       1121          AND  FLAGS2,X'C0'        CLEAR FRU REG(EXCEPT FAIL FLAGS)
00000D CAF0       1124          AND  REQTAGS,ONES-15     MASK ALL REQUEST DOWN
00000E 4A48       1127          XFR  REQTAGS,MIST        RESET TO HDWE
00000F 2381       1130          BOC  MIFTR,MIFTR12       BRANCH IF MIS AVAILABLE          ***
000010 B180       1133 SETHOLDA ORI  CTIMAGE,HOLDA       RAISE CHAINING HOLD LINE
000011 3D21       1136 CHKISEL  BOC  ISEL,INSELCHK       BRANCH IF CHANNEL POLL OR SELECT
000012 5441       1139          XFR  XOUTBIM,XOUTB       TRAP ALU2 TO INITIALIZE
000013 3C15       1142          BOC  NGENR,CKSELRST      BRANCH IF NOT GENERAL RESET
000014 635B       1145 EXECRST  BU   GENRESET            GO DO GENERAL RESET

000015 2C17       1149 CKSELRST BOC  SELRST,SELRTNO      DO SELECTIVE RESET ROUTINE.
000016 6513       1152 GODOALU  BU   ALUCHECK            DO ALU CHECKOUT.

000017 6366       1156 SELRTNO  BU   SELRESET            GO DO SELECTIVE RESET

000018 1D00       1160 HNDLERR  STO  FRUREG,0            CLEAR SENS FRU REG
000019 4B21       1163          XFR  FLAGS2,AR           MOVE FAIL INDICATOR TO ALU A REG
00001A 5006       1166          XFRH LSR                 SET HIGH LSR'S
00001B 8D00       1169          ORI  FRUREG,0            MOVE FAIL IND. INTO SENSE FRU REG
00001C 4006       1172          XFR  LSR                 SET LO LSRS
00001D 8BC0       1175 CLEARIT  ORI  FLAGS2,ALUFAIL+FORCEUC OTHERWISE SET FAIL FLAGS
00001E 2C17       1178          BOC  SELRST,SELRTNO      BRANCH IF SELECTIVE RESET
00001F 4012       1181          XFR  CLEAR               CLEAR THE ERROR
000020 600B       1184          BU   SETABRT             RETURN TO MAINLINE

                  1187 ********************************************************************
                  1188 * WHEN INSELCHK IS REACHED WE HAVE BEEN TRAPPED FOR INITIAL SELECTION *
                  1189 * OR A POLL. IF ADDRESS OUT IS UP---INITIAL SELECTION IS INDICATED.  *
                  1190 ********************************************************************

000021 287F       1193 INSELCHK BOC  ADROUT,SIORTN       BRANCH IF SIO.  IF NOT, POLL ACC
000022 D906       1196          ANDM FLAGS,STATPNDG+STACK TEST FOR PENDING ORASTACK
000023 2025       1199          BOC  DBUS,POLLED         BRANCH IF NOT PNDG OR STACK.
000024 6029       1202          BU   INTFCHK             GO HANDLE PENDING STATUS

                  1205 ********************************************************************
                  1206 *  POLL ACCEPTED. IF STATUS IS PENDING OR STACKED THE PENDING ADDRESS *
                  1207 * REG IS USED TO VERIFY THE CORRECT CHANNEL. OTHERWISE THE
                  1208 * CONTROL UNIT ADDRESS FOR THE CHANNEL POLLING IS MOVED FROM CHANNEL  *
                  1209 * BUS OUT TO THE PENDING ADDRESS REG. IF STATUS IS DUE TO A SECURITY  *
                  1210 * DEVICE END OR DEVICE END DUE TO A PRIME, ALU2 WILL BE SPINNING      *
                  1211 * WAITING TO CLEAR THE DEV END CONDITION IF CHANNEL ACCEPTES STATUS.  *
                  1212 ********************************************************************

000025 43A0       1217 POLLED   XFR  CURADDR,CBO         GET CU ADDRESS FROM HARDWARE
000026 C60F       1220          AND  PNDADDR,X'0F'       CLEAR HIGH ORDER
000027 4321       1223          XFR  CURADDR,AR          MOVE CU ADDRESS TO ALU INPUT REG
000028 8600       1226          ORI  PNDADDR,ZERO        MERGE DEV AND CU ADDRESSES

000029 4660       1230 INTFCHK  XFR  PNDADDR,CBI         MOVE ASSEMBLED ADDRESS TO CHAN BUSIN
00002A 8103       1233          ORI  CTIMAGE,ADDIN+OPIN  RAISE OP AND ADDRESS IN
00002B 4150       1236          XFR  CTIMAGE,CTI         SET TO HDWE
00002C C1FD       1239          AND  CTIMAGE,ONES-ADDIN  RESET ADDRESS-IN IN  IMAGE REG
                  1241 *** IF MIS GO CHECK FOR PROPER INTERFACE POLLING
00002D 230A       1243          BOC  MIFTR,MIFTR00       BRANCH IF MIS AVAILABLE          ***

                  1246 *** CHECK TO SEE IF CONTROL UNIT END SHOULD BE ADDED TO STATUS
00002E D940       1248 NOTBINT1 ANDM FLAGS,CUEA          MASK FOR CONTROL UNIT END A
00002F 2031       1251          BOC  DBUS,MOVEOUT        BRANCH IF OFF

000030 8520       1255 DOACUE   ORI  PNDSTS,CUE          SET CUE IN STATUS

000031            1258 MOVEOUT  EQU  *
000031 1048       1260 SETLINK  STO  LINK1,SRETURN0      ACCEPTED STATUS RETURN
000032 1149       1263          STO  LINK2,SRETURN1      STACK STATUS RETURN
000033 12AD       1266          STO  LINK3,PRETURN0      HALTI/O RETURN NOT OPERATING
000034 294E       1269 CMOUP    BOC  CMDOUT,RSTADDIN     WAIT COMMAND OUT RISE
000035 28AD       1272          BOC  ADROUT,PRETURN0     BRANCH IF HIO
000036 6034       1275          BU   CMOUP               WAIT
                  1278 ********************************************************************
                  1279 * ENTRY TO THIS SUBROUTINE IS FROM: CONTINIT AND CLEANIT AND MODELINK *
                  1280 * PRIOR TO PRESENTING INITIAL STATUS TO CHANNEL. IF CHAINING IS NOT IN*
                  1281 * EFFECT THE FIRST TWO DIAGNOSTIC FLAG BYTES WILL BE CLEARED AND BYTE0*
                  1282 * PASSED TO ALU2.                                                    *
                  1283 ********************************************************************
```

```
000037 63D6      1286 GRETURN0 BU    CHEKSNS            RETURN FOR MODE CMDS

000038 134E      1290 GODODIA0 STO   LINK4,STATRTN-BEGIN SET CTL AND BURST CMD RETURNS
000039 D901      1293 GODODIA  ANDM  FLAGS,CHAIN        MASK FOR CHAIN FLAG
00003A 3741      1296          BOC   DREG7,ALU2DIA      BRANCH IF ON
00003B F08B      1299          XOM   CURCOMM,X'8B'      MASK FOR LWR COMMAND
00003C 2041      1302          BOC   DBUS,ALU2DIA       BRANCH IF SO
00003D F00B      1305          XOM   CURCOMM,X'0B'      MASK FOR DIAG WRT
00003E 2041      1308          BOC   DBUS,ALU2DIA       BRANCH IF SO
00003F 0C00      1311          STO   SETDIA1,0          CLEAR FLAG BYTE ONE
000040 0D00      1314          STO   SETDIA2,0          CLEAR FLAG BYTE TWO
000041 4C42      1317 ALU2DIA  XFR   SETDIA1,XOUTA      MOVE FIRST FLAG BYTE TO ALU2
000042 8801      1320          ORI   STATIMG,SETSTATD   SET STATD TO INDICATE SNS RESET
000043 4828      1323          XFR   STATIMG,STAT       SET TO HARDWARE
000044 C8FE      1326          AND   STATIMG,ONES-SETSTATD RESET STAT D IN IMAGE REG
000045 170E      1329          STO   WORK2,NDXFLAGS-ALU2BRT FETCH ALU2 SET DIAGNOSE INDEX
000046 5741      1332          XFR   WORK2,XOUTB        KICK ALU2 OFF TO FETCH BYTE
000047 5322      1335          XFR   LINK4,IC           RETURN TO INITIAL STATUS
                 1341 ****************************** STATUS SUBROUTINE ****************
                 1342 *  THE STATUS ROUTINE HANDLES INTERLOCKING OF INTERFACE LINES AND   *
                 1343 * BRANCHES TO THE APPROPRIATE SUBROUTINE DEPENDING ON THE CHANNEL    *
                 1344 * RESPONSE TO STATUS IN. THE INTERFACE WILL ALSO BE MONITORED FOR A  *
                 1345 * HIO CONDITION AND THE LINK RETURN WILL BE EXECUTED IF HIO SHOULD   *
                 1346 * OCCUR. IF THE CHANNEL ERRONEOUSLY STACKS CLEAN INITIAL STATUS A    *
                 1347 * HANG WILL OCCUR IN THE INTFERR LOOP                                *
                 1348 *********************************************************************

000048 62CD      1351 SRETURN0 BU    TERMACC            RETURN FOR ACCEPTED STATUS
000049 62C7      1354 SRETURN1 BU    TERMSTAK           RETURN FOR STACKED STATUS
00004A 6183      1357 SRETURN2 BU    SENSE0             RETURN TO SENSE ROUTINE
00004B 6237      1360 SRETURN4 BU    CONTSERV           RETURN FOR SERVICE
00004C 6238      1363 SRETURN5 BU    CONTSTAK           RETURN TO STACK
00004D 65A1      1366 SRETURN6 BU    CLEANGO            RETURN FOR ACCEPTED STATUS

00004E           1369 STATRTN  EQU   *                  DEFINE ENTRY POINT
00004E 4150      1371 RSTADDIN XFR   CTIMAGE,CTI        RESET ADDRESS-IN TO HDWE
00004F           1373 STATRTN1 EQU   *                  DEFINE ENTRY POINT
00004F 287A      1375 SVCOUTUP BOC   ADROUT,HIOLINK     HALT I/O LINK
000050 204F      1378 CMDOUTUP BOC   SVCOUT,SVCOUTUP    SVC OUT UP WAIT FOR DROP
000051 294F      1381          BOC   CMDOUT,SVCOUTUP    CMD OUT UP WAIT FOR DROP
000052 4560      1384          XFR   PNDSTS,CBI         MOVE STATUS TO BUS IN
000053 8104      1387          ORI   CTIMAGE,STSIN      MASK STATUS IN TAG UP
000054 4150      1390          XFR   CTIMAGE,CTI        RAISE STATUS IN
000055 C1FB      1393          AND   CTIMAGE,ONES-STSIN MASK STATUS IN DOWN
000056           1395 INTFERR  EQU   *                  RETURN FOR STACKED CLEAN INIT STS
000056 287B      1397 WATESUM  BOC   ADROUT,HIOLINK1    HALT I/O LINK
000057 295B      1400          BOC   CMDOUT,STAKLINK    STACK LINK
000058 2D69      1403          BOC   SVCOUT,TAKELINK    ACCEPT LINK
000059 6056      1406          BU    WATESUM

                 1409 *********************************************************************
                 1410 *THE STAKLINK OCCURS WHENEVER COMMAND OUT ANSWERS STATUS IN. THE STACK*
                 1411 *FLAG IS SET FOR NON-STACKABLE STATUS AND LINK2 RETURN EXECUTED.     *
                 1412 * CHAINING IS RESET FOR ALL STATUS EXCEPT A CHANNEL END ALONE (CONTROL*
                 1413 * CMD INITIAL STATUS)                                                 *
                 1414 *********************************************************************
00005A 4150      1417 STAKDISC XFR   CTIMAGE,CTI        RESET OP IN RAISE CUB

00005B C9FE      1421 STAKLINK AND   FLAGS,ONES-CHAIN   RESET CHAIN BIT
00005C F504      1424          XOM   PNDSTS,DEVEND      MASK FOR DEV END ALONE STATUS
00005D 2066      1427          BOC   DBUS,NOSTACK       BRANCH IF SO
00005E F506      1430          XOM   PNDSTS,DEVEND+UNITCHK  IS STATUS READY DROP ON REW/DSE
00005F 2066      1433          BOC   DBUS,NOSTACK       BRANCH IF YES TO PREVENT STACK
000060 F510      1436          XOM   PNDSTS,BUSY        MASK FOR BUSY ALONE IN STATUS
000061 2066      1439          BOC   DBUS,NOSTACK       BRANCH IF IT IS TO PREVENT STACK
000062 F520      1442          XOM   PNDSTS,CUE         IS IT CUE ALONE
000063 2066      1445          BOC   DBUS,NOSTACK       BR IF SO
000064 8902      1448          ORI   FLAGS,STACK        SET STACK BIT
000065 5122      1451 STOPLINK XFR   LINK2,IC           XFR LINK TO IC
000066 62C9      1454 NOSTACK  BU    TERMSTK1           GO RESET CHAN TAGS
                 1457 *********************************************************************
                 1458 *THE TAKELINK ROUTINE IS ENTERED BY SERVICE OUT RESPONSE TO STATUS IN.*
                 1459 *THE CHAIN, STACK, AND STATUS PENDING FLAGS ARE MANIPULATED AND CUE   *
                 1460 *FOR SELECTED CHANNEL IS RESET. THE ALLOW DATA SECURITY ERASE FLAG   *
                 1461 *IS ALSO MAINTAINED HERE DEPENDENT UPON CHAINING. RETURN IS VIA      *
                 1462 *LINK1                                                               *
                 1463 *********************************************************************

000067 4150      1466 TAKEDISC XFR   CTIMAGE,CTI        RESET OP IN RAISE CUB
000068 606A      1469          BU    SKIPSUPO            SKIP CHAINING CHECK

000069 3971      1473 TAKELINK BOC   SUPO,SETCHAIN      CHAIN INDICATION
00006A C9F0      1476 SKIPSUPO AND   FLAGS,CUEA+CUEB+INTFB+CONCON RESET CHAIN,STATUS PENDING
                                                        AND STACK FLAGS
                 1478 *
00006B CAEF      1480          AND   FLAGS1,ONES-ALLOWDSE RESET ALLOW DAT SEC ERS FLAG

00006C D520      1484 TAKELIN1 ANDM  PNDSTS,CUE         DID WE PRESENT CONTROL UNIT END
00006D 2070      1487          BOC   DBUS,SERVLINK      BRANCH IF NOT

                 1490 *** A CUE WAS PRESENTED--DETERMINE THE SELECTING CHANNEL AND RESET
                 1491 *** THE CORRESPONDING CUE FLAG                                     ***
00006E 2313      1493          BOC   MIFTR,MIFTR01      BRANCH IF MIS AVAILABLE
00006F C9BF      1496 RSTCUEA  AND   FLAGS,ONES-CUEA    RESET CUE A FLAG

000070 5022      1500 SERVLINK XFR   LINK1,IC           XFR LINK TO IC
```

```
000071 8901     1504 SETCHAIN ORI    FLAGS,CHAIN          SET CHAIN FLAG
000072 8120     1507          ORI    CTIMAGE,HOLDINT      RAISE HOLD INTERFACE BIT
000073 F017     1510          XOM    CURCOMM,X'17'        IS LAST COMMAND ERASE
000074 2078     1513          BOC    DBUS,ENABLDSE        BRANCH IF SO
000075 CAEF     1516          AND    FLAGS1,ONES-ALLOWDSE  RESET DSE BIT
000076 C9F1     1519 SKIPIT   AND FLAGS,CHAIN+CUEB+CUEA+INTFB+CONCON RESET OTHER FLAGS
000077 606C      522          BU     TAKELIN1

000078 8A10     1526 ENABLDSE ORI :  FLAGS1,ALLOWDSE      SET THE ALLOW DSE BIT
000079 6076     1529          BU     SKIPIT               RETURN


                1533 ***********************************************************************
                1534 * HIO LINK IS ENTERED IF ADDRESS OUT IS UP OR RISE WHILE THE STATRTN  *
                1535 * ISBEING EXECUTED. RETURN IS VIA LINK 3 WHICH IS SET UP BY THE       *
                1536 * STATRTN CALLER                                                       *
                1537 ***********************************************************************


00007A 5222     1540 HIOLINK  XFR    LINK3,IC             GO HANDLE HIO

00007B E111     1544 HIOLINK1 XO     CTIMAGE,OPIN+CUBUSY  RESET OP IN RAISE CUB
00007C 2D67     1547          BOC     SVCOUT,TAKEDISC     BRANCH IF STATUS ACCEPTED
00007D 295A     1550          BOC    CMDOUT,STAKDISC      BRANCH IF STATUS REJECTED
00007E 607A     1553          BU     HIOLINK               OTHERWISE GO TO HIO NOT OPERATING

                1556 ************************************** SIO ROUTINE *****************
                1557 * THE START IO ROUTINE CHECKS FOR SHORT BUSY CONDITIONS. IF NONE FOUND*
                1558 * IT BRANCHES TO THE NO SHORT ROUTINE TO ANSWER THE SIO.              *
                1559 ***********************************************************************


00007F 43A0     1562 SIORTN   XFR    CURADDR,CBO          FETCH CURRENT ADDRESS
000080 44A0     1565          XFR    WORK1,CBO            ADDRESS TO SCRATCH AREA
000081 12AD     1568          STO    LINK3,PRETURNO       SET HIO LINK FOR NOT OPERATING
000082 5441     1571          XFR    XOUTBIM,XOUTB        TRAP ALU2 TO LOC 0
000083 D986     1574          ANDM   FLAGS,STATPNDG+STACK+CONCON MASK FOR PENDING OR STACKED
                1576 *                                    STATUS AND CONTINGENT CONN. FLAGS
000084 208F     1578          BOC    DBUS,NOSHORT         BRANCH IF ALL ARE OFF
000085 3588     158           BOC    DREG5,NOTCONT        BRANCH IF STACK
000086 3688     1584          BOC    DREG6,NOTCONT        BRANCH IF STATUS PENDING
000087 0500     1587          STO    PNDSTS,0             CONT CONN--CLEAR THE STAUS REG
000088 4621     1590 NOTCONT  XFR    PNDADDR,AR           MOVE PEND ADDRESS TO AREG
000089 E400     1593          XOM    WORK1,0              TEST FOR MATCH
00008A 208F     1596          BOC    DBUS,NOSHORT         BRANCH IF MATCH


                1598 ***********************************************************************
                1599 *THE SHORTBUSY ROUTINE USES THE UPROGRAM TO MANIPULATE  BUS IN AND   *
                1600 *TAGS IN FOR A SHORT BUSY SEQUENCE. CUE IS SET IN THE STATUS.        *
                1601 ***********************************************************************
00008B 8110     1603 SHORTBSY ORI    CTIMAGE,CUBUSY       SET UP CUB BIT IN CTI IMAGE REG
00008C 4150     1606          XFR    CTIMAGE,CTI          MOVE TO CHANNEL TAG IN REG
00008D 8520     1609          ORI    PNDSTS,CUE           POST CUE WITH STATUS
00008E 629E     1612          BU     TERMSTA2             GO RESET CUE LATCH FOR SELECTING
                1614 *                                    INTERFACE

                1616 ***********************************************************************
                1617 *THE NOSHORT RTN ANSWERS ADDRESS OUT AND INITIALIZES ALU 2 TO ASSEMBLE*
                1618 *TU STATUS. VARIOUS FLAGS AND REGISTERS ARE INITIALIZED AND A CHECK  *
                1619 *IS MADE TO SEE IF A HIO WAS RECEIVED BY HARDWARE AFTER OP-IN WAS    *
                1620 *RAISED.                                                              *
                1621 ***********************************************************************


00008F 8101     1624 NOSHORT  ORI    CTIMAGE,OPIN         MASK OP IN UP
000090 4150     1627          XFR    CTIMAGE,CTI          RAISE OP IN
000091 0800     1630          STO    STATIMG,0            CLEAR THE STATIMAGE REG
000092 0600     1633          STO    PNDADDR,0            CLEAR CURRENT ADDRESS REG FOR MASK
000093 4321     1636          XFR    CURADDR,AR           XFR SELECT  ADDRESS TO ALU INPUT REG
000094 8600     1639          ORI    PNDADDR,0            MOVE ADDRESS TO PNDG ADDRESS REG
000095 C40F     1642 STRIPADD AND    WORK1,X'0F'          STRIP HIGH ORDER
000096 4442     1645          XFR    WORK1,XOUTA          GIVE ALU 2 ADDRESS

                1648 *** DETERMINE WHICH CHANNEL IS SELECTING AND INITIALIZE THE STAT REG,
                1649 *** TU ADDRESS REG AND FLAGS REG.                                   ***
000097 231E     1651          BOC    MIFTR,MIFTR03        BRANCH IF MIS AVAILABLE
000098 C9DF     1654 SETSWSEL AND    FLAGS,ONES-INTFB     RESET B FLAG
000099 D946     1657          ANDM   FLAGS,STATPNDG+STACK+CUEA  ANY STATUS BEING HELD
00009A 209D     1660 CHKPNDG  BOC    DBUS,SETADDR         BRANCH IF NONE PENDING
00009B 359E     1663          BOC    DREG5,STRTALU2       BRANCH IF STATUS PENDING
00009C 8802     1666          ORI    STATIMG,SETSTATC     SET SHORT INIT SEL TO ALU2

00009D 14ED     1670 SETADDR  STO    XOUTBIM,NDXSTS           FETCH ALU2'S STATUS RTN INDEX
00009E 4828     1673 STRTALU2 XFR    STATIMG,STAT         SET STATS TO HDWE
00009F 4424     1676          XFR    WORK1,TUADR          SET ADDRESS REG
0000A0 5441     1679          XFR    XOUTBIM,XOUTB        TRAP ALU 2
0000A1 8102     1682          ORI    CTIMAGE,ADDIN        MASKADDRESS IN UP
0000A2 4360     1685          XFR    CURADDR,CBI          RAISE ADDRESS ON BUS IN

0000A3 28AC     1689 ADROUTUP BOC    ADROUT,SELOUTUP      WAIT FOR ADRESS OUT FALL
0000A4 4150     1692 SETADRIN XFR    CTIMAGE,CTI          RAISE ADDR IN
```

```
                  1695 ***********************************************************************
                  1696 *ASSEMBLE DATA FLOW MASK WHILE SYSTEM BRINGS UP CMD OUT.              *
                  1697 ***********************************************************************

0000A5 D901       1700 MASEMBLE ANDM  FLAGS,CHAIN          SET UP FLAGS FOR TEST
0000A6 20AE       1703          BOC   DBUS,RSTDIAG         IS CHAIN FLAG ON?
0000A7 DC80       1706          ANDM  SETDIA1,DIAWRT       MASK TO TEST DIAG WRT BIT
0000A8 20AF       1709          BOC   DBUS,CHKFTR          BRANCH IF DIAG MODE OFF
0000A9 8810       1712          ORI   STATIMG,DIAGMODE     SET DIAG MODE BIT IN STAT REG
0000AA 4828       1715          XFR   STATIMG,STAT         SET STATS TO HDWF
0000AB 60AF       1718          BU    CHKFTR               GO CHECK NRZI

0000AC 26A3       1722 SELOUTUP BOC   SELO,ADROUTUP        BRANCH IF OP IN STILL
0000AD 634B       1725 PRETURNO BU    HIONOP               GO TO HIO NOT OPERATING

0000AE CC00       1729 RSTDIAG  AND   SETDIA1,0            RESET DIAG MODE BITS

0000AF 23C0       1733 CHKFTR   BOC   MIFTR,SETSEV         BRANCH IF SEVEN TK FEAT    ***

0000B0 DA40       1737 CHKNRZ   ANDM  REQTAGS,ANRZI        CHECK FOR NRZI FLAG
0000B1 20B3       1740          BOC   DBUS,CMDWAIT         BRANCH IF NRZI BIT OFF
0000B2 8201       1743          ORI   XOUTAIM,NRZMODE      SET XOUTA IMAGE NRZ BIT

                  1746 ***********************************************************************
                  1747 * WAIT FOR AND PROCESS COMMAND OUT. DETERMINE WHETHER OPERATION      *
                  1748 * CAN PROCEED.                                                        *
                  1749 ***********************************************************************

0000B3 28AD       1753 CMDWAIT  BOC   ADROUT,PRETURNO      HALT IO NOT OPERATING
0000B4 29B6       1756          BOC   CMDOUT,CMDWAIT1      FIRST COMMAND OUT
0000B5 60B3       1759          BU    CMDWAIT              WAIT

0000B6 C1FD       1763 CMDWAIT1 AND   CTIMAGE,ONES-ADDIN   MASK ADDR IN DOWN
0000B7 40A0       1766          XFR   CURCOMM,CBO          MOVE COMMAND TO LSR
0000B8 24C2       1769          BOC   BQPE,CMDPARER        BRANCH IF CMD PAR ERR
                  1772 *** IF MIS AVAILABLE GO CHECK TO SEE IF CONTINGENT CONNECTION FLAG
                  1773 *** IS TO BE RESET
0000B9 2320       1775          BOC   MIFTR,MIFTR04        BRANCH IF MIS AVAILABLE
0000BA 4150       1778 CMDWAIT4 XFR   CTIMAGE,CTI          DROP ADDRESS IN
0000BB D904       1781          ANDM  FLAGS,STATPNDG         STATUS PNDING
0000BC 20C1       1784          BOC   DBUS,CMDPROC         NO, GO TO CMD PROCESS

0000BD 9000       1788 CMDWAIT3 ORM   CURCOMM,ZERO         IS IT TEST IO
0000BE 20C0       1791          BOC   DBUS,PENDLINK        IF YES SEND STATUS
0000BF 8510       1794          ORI   PNDSTS,BUSY          IF NO POST BUSY
0000C0 6299       1797 PENDLINK BU    TERMSTAT             GO TO RAISE STATUS IN

0000C1 6100       1801 CMDPROC  BU    COMDECOD             GO DECODE THE CMD

                  1804 ***********************************************************************
                  1805 *THE COMPARER HANDLES BUS OUT CHECKS DURING COMMAND TRANSFER.        *
                  1806 ***********************************************************************
0000C2 8720       1808 CMDPARER ORI   SNSSTS2,BUSOC        POST BUS OUT CHECK
0000C3 D906       1811 CMDPAR0  ANDM  FLAGS,STATPNDG+STACK TEST FOR STATUS PENDING OR STACK
0000C4 20C7       1814          BOC   DBUS,CMDPAR1         BRANCH IF NO
0000C5 8510       1817          ORI   PNDSTS,BUSY          POST BUSY IN STATUS
0000C6 60BA       1820          BU    CMDWAIT4             GO TO STORE LINKS

0000C7 0502       1824 CMDPAR1  STO   PNDSTS,UNITCHK       POST A UNIT CHECK
0000C8 8904       1827          ORI   FLAGS,STATPNDG       POST STATUS PNDG FLAG
0000C9 CB7F       1830          AND   FLAGS2,ONES-FORCFUC  RESET FORCE UNIT CHECK FLAG
0000CA 140B       1833          STO   XOUTBIM,NDXABRT-ALU2BRT LOAD ALU2 INIT ADDRESS
0000CB 5441       1836          XFR   XOUTBIM,XOUTB        TRAP ALU2 TO PREVENT DE RESET
0000CC 4150       1839          XFR   CTIMAGE,CTI          DROP ADDRESS-IN
0000CD 6299       1842          BU    TERMSTAT             GO TO STORE LINKS
                  1846 ********************************* OPENERS ****************************
                  1847 *  OPENERS WILL RESET THE PING HOLD LATCH IN HARDWARE IF THE COMMAND  *
                  1848 * IS OTHER THAN TIO AND THE STATUS STACKED OR PENDING FLAGS ARE OFF.  *
                  1849 * WHEN ALU2 COMPLETES ASSEMBLING THE DEVICE STATUS, THIS ROUTINE WILL *
                  1850 * CHECK ALU2 STATS TO DETERMINE IF THE DEVICE IS BUSY,NOT READY,OR HAS*
                  1851 *A PENDING DEV END. IF NONE OF THE AFOREMENTIONED ITEMS APPLY THEN THE*
                  1852 *DEVICE IS AVAILABLE AND THE COMMAND WILL BE DECODED. ALU2 STAT COMBOS*
                  1853 *HAVE THE FOLLOWING MEANING:                                          *
                  1854 *          STATC=DEV END,UNT CHK(READY DROP WHEN DEV END WAS PRIMED)  *
                  1855 *          STATB AND STATC=DEV END DUE TO DEV END PRIME(REW OR DSE)   *
                  1856 *          STATB AND STATD=DEVICE IS BUSY                             *
                  1857 *          STATC AND STATD=DEVICE IS NOT READY                        *
                  1858 *                                                                     *
                  1859 ***********************************************************************

0000CE 63E3       1862 RTNCOMR  BU    COMREJC1             RETURN TO COMMAND REJECT
0000CF 617F       1865 RTNSENS  BU    SENSEOK              RETURN TO SENSE
0000D0 621F       1868 RTNPROT  BU    PROTEST1             RETURN TO CHECK FILE LPROTECT
0000D1 622B       1871 RTNTUTST BU    TUTESTIT             RETURN TO CHECK READY
0000D2 622F       1874 RTNTUTS1 BU    TUTEST2              RETURN TO DO SENSE RESET

0000D3 2317       1878 OPENERS  BOC   MIFTR,MIFTR02        BRANCH IF MIS AVAILABLE

0000D4 3BE1       1882 OPENERS1 BOC   STATD,ANYERRS        IF ALU2 FINISHED,GO LOOK FOR ERROR
0000D5 2BEE       1885          BOC   STATB,CHKBUSY        IF ON GO CHECK FOR PENDING DEV END
0000D6 3AD9       1888          BOC   STATC,SEEIFUC        BRANCH IF ON TO CHECK FOR DE, UC STS
0000D7 28AD       1891          BOC   ADROUT,PRETURNO      HALT IO?
0000D8 60D4       1894          BU    OPENERS1             ALU2 STILL BUSY, GO BACK
```

```
                  1898 *** STAT C WAS ON
0000D9 3BE1       1900 SEEIFUC  BOC   STATD,ANYERRS        BRANCH IF INT REQ
0000DA 2BF2       1903          BOC   STATB,CONTCHK1       BRANCH IF DEV END
0000DB D902       1906          ANDM  FLAGS,STACK          MASK FOR STACK LAG
0000DC 20DF       1909          BOC   DBUS,SETDEUC         BRANCH IF OFF
0000DD 8506       1912          ORI   PNDSTS,DEVEND+UNITCHK  OTHERWISE OR IN DE AND UC
0000DE 60BD       1915          BU    CMDWAIT3             GO CHECK FOR TIO
0000DF 0506       1918 SETDEUC  STO   PNDSTS,DEVEND+UNITCHK SET UC,DE--READY DROP ON DEP DEV
0000E0 60BD       1921          BU    CMDWAIT3

                  1924 *** STAT D WAS ON
0000E1 22C3       1926 ANYERRS  BOC   ALUR,CMDPAR0         BRANCH IF ANY ALU ERROR
0000E2 2BFF       1929          BOC   STATB,BUSYSTAT       BRANCH IF BUSY CONDITION
0000E3 D90        1932          ANDM  FLAGS,STACK          MASK FOR STACK FLAG
0000E4 20E6       1935          BOC   DBUS,CONTCHK         BRANCH IF OFF TO CONTINUE
0000E5 60BD       1938          BU    CMDWAIT3             GO PRESENT STACKED STATUS

                  1941 *** STAT B OFF--STATD ON---STATC EITHER
0000E6 0500       1943 CONTCHK  STO   PNDSTS,0             CLEAR PENDING STATUS REG
0000E7 4488       1946          XFR   WORK1,XINB           GET TU SENSE BYTE 0
0000E8 D950       1949          ANDM  FLAGS,CUEA+CUEB      MASK FOR CUE FLAGS
0000E9 2389       1952          BOC   MIFTR,MIFTR14        BRANCH IF MIS AVAILABLE
0000EA 31BD       1955 CUEASTS  BOC   DREG1,CMDWAIT3       BRANCH IF CUE ON A INTF

0000EB C8FD       1958 TUTSTRTN AND   STATIMG,ONES-SETSTATC RESET STAT C IN IMAGE REG
0000EC 4828       1961          XFR   STATIMG,STAT         SET TO HARDWARE
0000ED 5322       1964          XFR   LINK4,IC             RETURN TO TEST TAPE UNIT

                  1967 *** STAT B ON
0000EE 3BE1       1969 CHKBUSY  BOC   STATD,ANYERRS        IF ON MUST HAVE BEEN NORMAL END
0000EF 3AF2       1972 LOOKAGIN BOC   STATC,CONTCHK1       BRANCH IF DEV SELECTED
0000F0 3BF8       1975          BOC   STATD,BUSYSTAT       BRANCH IF DEV SWITCHED
0000F1 60EF       1978          BU    LOOKAGIN             GO LOOK AGAIN

                  1981 *** STATS B AND C ON--STAT D OFF
0000F2 D902       1983 CONTCHK1 ANDM  FLAGS,STACK          MASK FOR STACK FLAG
0000F3 20F6       1986          BOC   DBUS,CONTCHK2        BRANCH IF OFF TO CONTINUE
0000F4 8504       1989          ORI   PNDSTS,DEVEND        OR IN DEV END IN STATUS
0000F5 60BD       1992          BU    CMDWAIT3             GO PRESENT STACKED STATUS

                  1995 *** NO STACKED STATUS
0000F6 0504       1997 CONTCHK2 STO   PNDSTS,DEVEND        SET DEV END IN PENDING STATUS
0000F7 60BD       2000          BU    CMDWAIT3             GO SET LINKS

0000F8 0510       2004 BUSYSTAT STO   PNDSTS,BUSY          BUSY IN SCRATCH REG
0000F9 60C0       2007          BU    PENDLINK             GO TO RAISE STATUS IN
000100            2012          ORG   BEGIN+X'100'
                  2013 ********************************** COMMAND DECODE ****************
                  2014 * THE COMMAND WILL BE DECODED IF THEIR IS NO STATUS PENDING OR     *
                  2015 * STACKED. EACH COMMAND(EXCEPT MODE TYPE) WILL BE CHECKED FOR      *
                  2016 * DISCRETE CODES AND COMMAND REJECTED IF NOT RECOGNIZED.           *
                  2017 ********************************************************************

000100 9000       2020 COMDECOD ORM   CURCOMM,0            MASK COMMAND CODE FOR TESTING
000101 3718       2023          BOC   DREG7,IS6ON          BRANCH IF BIT 7 ON TO CHK BIT 6
000102 3638       2026          BOC   DREG6,READTYPE       BRANCH IF BIT 6 ON (READ CMD)
000103 353A       2029          BOC   DREG5,CHKRDB         BRANCH IF BIT 5 ON
000104 2040       2032          BOC   DBUS,DOTESTIO        CHECK FOR TEST I/O
000105 6108       2035          BU    COMREJCT             GO REJECT COMMAND

                  2039 ********************************************************************
                  2040 *COMMAND MUST BE CONTROL SINCE BITS 5,6,AND 7 ARE PRESENT.         *
                  2041 ********************************************************************

000106 F097       2044 CKDSE    XOM   CURCOMM,X'97'        MASK FOR DATA SECURITY ERASE CMD
000107 2023       2047          BOC   DBUS,DODSE           BRANCH IF IT IS

                  2050 **************************** COMMAND REJECT **********************
                  2051 * COMMAND REJECT WILL BE BRANCHED INTO BY SEVERAL COMMAND DECODE    *
                  2052 * ROUTINES. SENSE DATA WILL BE CLEARED AND COMMAND REJECT WILL BE   *
                  2053 * POSTED IN SENSE BYTE 0                                            *
                  2054 ********************************************************************

000108 13CE       2057 COMREJCT STO   LINK4,RTNCOMR        SET OPENERS RETURN
000109 60D3       2060          BU    OPENERS              GO CHECK DEV STATUS

00010A 3006       2064 CONTCMD  BOC   DREG0,CKDSE          BRANCH IF HI ORDER BIT IS ON
00010B 3108       2067          BOC   DREG1,COMREJCT       COMMAND REJECT IF BIT 1 IS ON

00010C 3414       2071          BOC   DREG4,COMTESTA       BRANCH IF CMD IS 00XX1111
00010D 3320       2074          BOC   DREG3,COMTESTB       BRANCH IF CMD IS 00X10111
00010E 322E       2077          BOC   DREG2,DOBKSPBL       IF 1, MUST BE BACKSPACE BLOCK

                  2080 ********************************************************************
                  2081 *REWIND IS DECODED AT THIS POINT. CAN WE PERFORM IT? MAKE TESTS    *
                  2082 ********************************************************************

00010F 142F       2085 DOREWIND STO   XOUTBIM,NDXRWD          EMIT ALU2 BRANCH ADDRESS ***
000110 8808       2088          ORI   STATIMG,SETSTATA     SET RWD INDICATOR FOR CONTEND
000111 4828       2091          XFR   STATIMG,STAT         SET STATA IN HDWE
000112 1033       2094 DORWD1   STO   LINK1,CONTINIT       LINK TO CONTROL INIT STATUS
000113 6227       2097          BU    TUTEST               GO TO TU STATUS TEST
```

```
000114 3329    2101 COMTESTA BOC   DREG3,COMTESTC      BRANCH IF CMD IS 00X11111
000115 3232    2104          BOC   DREG2,DOBAKFIL      IF=1, MUST BE BACKSPACE FILE

               2107 * COMMAND IS 00001111 OR REWIND UNLOAD
000116 1429    2109 DORUNLOD STO   XOUTBIM,NDXRWU          EMIT ALU2 BRANCH ADDRESS ***
000117 6112    2112          BU    DORWD1

000118 364A    2116 IS6ON    BOC   DREG6,IS5ON
000119 F001    2119 WRTCHECK XOM   CURCOMM,X'01        CHECK FOR DISCRETE CMD
00011A 201C    2122          BOC   DBUS,ITSOK          BRANCH IF IT IS
00011B 6108    2125          BU    COMREJCT            OTHERWISE REJECT COMMAND

00011C 8240    2129 ITSOK    ORI   XOUTAIM,WRITE       ADD WRITE TO DATA FLOW MASK
00011D 1413    2132          STO   XOUTBIM,NDXWRT       EMIT ALU2 BRANCH ADDRESS ***
00011E 1070    2135          STO   LINK1,CLEANIT       LINK TO CLEAN INITIAL STAUTS RTN
00011F 621D    2138          BU    PROTEST
               2142 COMTESTB BOC   DREG2,DOFORBLK      IF 1 MUST BE FORWARD SPACE BLOCK
000120 3234    2144 * COMMAND IS 00010111 OR ERASE GAP
000121 1422    2146 DOERG    STO   XOUTBIM,NDXERG          EMIT ALU2 BRANCH ADDRESS ***
000122 612B    2149          BU    DOWTM1

000123 DA10    2153 DODSE    ANDM  FLAGS1,ALLOWDSE     MASK TO TEST ALLOW DSE FLAG BIT
000124 2008    2156          BOC   DBUS,COMREJCT       BRANCH IF OFF TO CMD REJECT
000125 1431    2159          STO   XOUTBIM,NDXERS        EMIT ALU2 BRANCH ADDRESS ***
000126 8808    2162          ORI   STATIMG,SETSTATA    SET DSE INDICATOR FOR CONTEND
000127 4828    2165          XFR   STATIMG,STAT        SET TO HDWE
000128 612B    2168          BU    DOWTM1              GO SET DF MASK

000129 3236    2172 COMTESTC BOC   DREG2,DOFORFIL      IF 1,  MUST BE FSF

               2175 * COMMAND IS 00011111 OR WRITE TAPE MARK
00012A 1420    2177 DOWTM    STO   XOUTBIM,NDXWTM          EMIT ALU2 BRANCH ADDRESS ***
00012B 82C0    2180 DOWTM1   ORI   XOUTAIM,WRITE+CONTROL ADD WRITE AND CONTROL TO DF MASK
00012C 1033    2183          STO   LINK1,CONTINIT      LINK TO CONTROL INITIAL STATUS
00012D 621D    2186          BU    PROTEST             GO TO TEST FILE PROTECT

               2189 * COMMAND IS 00100111 OR BACKSPACE RECORD
00012E 143E    2191 DOBKSPBL STO   XOUTBIM,NDXBSR          EMIT ALU2 BRANCH ADDRESS ***
00012F 8280    2194 DOCONTRL ORI   XOUTAIM,CONTROL     SET CONTROL BIT IN DATA FLOW MASK
000130 1033    2197          STO   LINK1,CONTINIT      SET RETURN TO CONTROL COMMANDS
000131 6144    2200          BU    DOREAD2             GO SET READ BACK MASK BIT

               2203 * COMMAND IS 00101111 OR BACKSPACE FILE
000132 143C    2205 DOBAKFIL STO   XOUTBIM,NDXBSF          EMIT ALU2 BRANCH ADDRESS ***
000133 612F    2208          BU    DOCONTRL            GO SET DF MASK BITS

               2211 * COMMAND IS 00110111 OR FORWARD SPACE RECORD
000134 1437    2213 DOFORBLK STO   XOUTBIM,NDXFSR          EMIT ALU2 BRANCH ADDRESS ***
000135 612F    2216          BU    DOCONTRL            GO SET DF CONTROL BIT

               2219 * COMMAND IS 00111111 OR FORWARD SPACE FILE
000136 1435    2221 DOFORFIL STO   XOUTBIM,NDXFSF          EMIT ALU2 BRANCH ADDRESS ***
000137 612F    2224          BU    DOCONTRL            GO SET DF CONTROL BIT

               2227 ***********************************************************************
               2228 *SEPARATE READ TYPE COMMANDS BY FURTHER DECODING                         *
               2229 ***********************************************************************
000138 F002    2231 READTYPE XOM   CURCOMM,X'02'       TEST FOR READ CODE
000139 2042    2234          BOC   DBUS,DOREAD         BRANCH IF READ
00013A F00C    2237 CHKRDB   XOM   CURCOMM,X'0C'       TEST FOR READ BACKWARD
00013B 2046    2240          BOC   DBUS,DORDBACK       BRANCH IF READ BACKWARD
00013C F004    2243          XOM   CURCOMM,X'04'       TEST FOR SENSE CODE
00013D 207D    2246          BOC   DBUS,DOSENSE        BRANCH IF SENSE
00013E 232C    2249          BOC   MIFTR,CHKRSRV       BRANCH IF MIS AVAILABLE          ***
               2251 * IF COMMAND OP CODE WAS NONE OF THE ABOVE, IT IS INVALID AND WILL
               2252 * BE REJECTED
00013F 6108    2254          BU    COMREJCT            GO REJECT COMMAND

000140 1099    2258 DOTESTIO STO   LINK1,TERMSTAT      EMIT LINK TO TERMINAL STATUS RTN
000141 6229    2261          BU    TUTEST1             TEST TU STATUS

000142 1433    2265 DOREAD   STO   XOUTBIM,NDXRDF          EMIT ALU2 BRANCH ADDRESS ***
000143 1070    2268 DOREAD1  STO   LINK1,CLEANIT       LINK TO CLEAN INITIAL ROUTINE
000144 8208    2271 DOREAD2  ORI   XOUTAIM,RDRDB       ADD RD OR RDB BIT TO DF MASK
000145 6227    2274          BU    TUTEST              GO TO TEST TU STATUS

000146 143A    2278 DORDBACK STO   XOUTBIM,NDXRDB          EMIT ALU2 BRANCH ADDRESS ***
000147 C2DF    2281          AND   XOUTAIM,ONES-DATCON RESET DATA CONVERT IF SEV TRK
000148 6143    2284          BU    DOREAD1             GO TO READ INITIALIZE
               2287 ******************************** MODE COMMAND DECODE ****************
               2288 * DECODE MODETYPE COMMANDS FURTHER AND PERFORM FUNCTION REQUIRED.       *
               2289 * SET CHANNEL END-DEVICE END IN INITIAL STATUS. REQ TIE AND SET        *
               2290 * DIAGNOSE COMMANDS WILL LINK TO THE WRITE ROUTINE TO FETCH THE FIRST *
               2291 * BYTE OF DATA. THE 7 TRK FEATURE WILL BE CHECKED TO SEE IF IT IS     *
               2292 * PRESENT. ALL MODE TYPE COMMAND ARE VALID. ANY NOT SPECIFICALLY      *
               2293 * RECOGNIZED TO PERFORM A FUNCTION WILL BE TREATED AS SENSE RESET     *
               2294 * NO-OPS.                                                              *
               2295 ***********************************************************************
               2296 ***********************************************************************
```

```
000149 6578    2299 GOSETDIA BU    DOSETDIA            GO EXECUTE SET DIAGNOSE CMD

00014A 350A    2303 IS50N    BOC   DREG5,CONTCMD
00014B 3155    2306 MODETYPE BOC   DREG1,CKHIMODE      BRANCH TO CHECK HI MODES(X1XXX011)
00014C F00B    2309          XOM   CURCOMM,X'0B'       MASK FOR DIAGNOSTIC MODE SET
00014D 2066    2312          BOC   DBUS,DODIAMS        BRANCH IF YES
00014E F01B    2315          XOM   CURCOMM,X'1B'       MASK FOR TRACK IN ERROR MODE SET
00014F 206A    2318          BOC   DBUS,DOTIEMS        BRANCH IF IT IS
000150 F003    2321          XOM   CURCOMM,X'03'       MASK FOR NO-OP COMMAND
000151 205D    2324          BOC   DBUS,ISNOOP         BRANCH IF IT IS
000152 F08B    2327          XOM   CURCOMM,X'8B'       MASK FOR LWR COMMAND
000153 2068    2330          BOC   DBUS,DOLWR          BRANCH IF IT IS
000154 615B    2333          BU    ANY7TK              BRANCH TO CHECK 7 TRACK
000155 F0CB    2337 CKHIMODE XOM   CURCOMM,X'CB'       MASK FOR NRZI MODE SET
000156 2063    2340          BOC   DBUS,DONRZMS        BRANCH IF IT IS
000157 F0C3    2343          XOM   CURCOMM,X'C3'       MASK FOR PE MODE SET
000158 205F    2346          BOC   DBUS,DOPEMS         BRANCH IF IT IS
000159 F04B    2349          XOM   CURCOMM,X'4B'       MASK FOR SET DIAGNOSE CMD
00015A 206A    2352          BOC   DBUS,DOTIEMS        BRANCH IF IT IS
00015B 2395    2355 ANY7TK   BOC   MIFTR,CHK7TK        BRANCH IF SEVEN TRACK AVAILABLE
00015C 6161    2358          BU    MODELINK            GO SET TUTEST RETURN

00015D 101B    2362 ISNOOP   STO   LINK1,TRETURN3      SET NO-OP RETURN
00015E 6229    2365          BU    TUTEST1             GO CHECK TU STATUS

00015F 238D    2369 DOPEMS   BOC   MIFTR,MIFTR15       BRANCH IF MIS AVAILABLE
000160 CABF    2372 DOPEA    AND   FLAGS1,ONES-ANRZI   RESET THE NRZI FLAG FOR INTF A
000161 1019    2375 MODELINK STO   LINK1,TRETURN2      SET TU TEST ROUTINE RETURN
000162 6227    2378          BU    TUTEST              GO TO TEST THE DEV

000163 2391    2382 DONRZMS  BOC   MIFTR,MIFTR16       BRANCH IF MIS AVAILABLE
000164 8A40    2385 DONRZA   ORI   FLAGS1,ANRZI        SET NRZI MODE FLAG  FOR INTF A
000165 6161    2388          BU    MODELINK            GO SET RETURN

000166 8C80    2392 DODIAMS  ORI   SETDIA1,DIAWRT      SET THE DIAG MODE FLAG
000167 6161    2395          BU    MODELINK            GO SET RETURN

000168 8C04    2399 DOLWR    ORI   SETDIA1,LWROP       SET LOOP WRITE TO READ FLAG
000169 611C    2402          BU    ITSOK               RETURN TO WRITE ROUTINE

00016A 1070    2406 DOTIEMS  STO   LINK1,CLEANIT       SET TU TEST ROUTINE RETURN
00016B 6227    2409          BU    TUTEST              GO TEST DRIVE STATUS

00016C F04B    2413 DOTIEMS1 XOM   CURCOMM,X'4B'       MASK FORSET DIAGNOSE CMD
00016D 2049    2416          BOC   DBUS,GOSETDIA       BRANCH IF IT IS
00016E 42A0    2419          XFR   XOUTAIM,CBO         FETCH TIE BYTE
00016F 4150    2422          XFR   CTIMAGE,CTI      RESET SERVICE IN
               2424 *** SCREEN TIE BYTE FOR SINGLE TRACK ERROR. MOVE BYTE TO DATA FLOW
               2425 *** DEAD TRACK REG ONLY IF IT WAS SINGLE TRACK.
000170 9200    2427          ORM   XOUTAIM,0           MASK FOR TESTING
000171 207A    2430          BOC   DBUS,DOTIEMS2       BRANCH IF 0--CORRECT FOR TRK P
000172 0401    2433          STO   WORK1,1             INITIALIZE WORK1 TO RIPPLE SINGLEBIT

000173 4421    2437 NOTLAST  XFR   WORK1,AR            SET GENERATED SINGLE BIT IN A REG
000174 F200    2440          XOM   XOUTAIM,0           MASK FOR MATCHING BYTES
000175 207A    2443          BOC   DBUS,DOTIEMS2       BRANCH IF MATCH TIE BYTE ONLY HAS
               2445 *                                  A SINGLE BIT ON
000176 4421    2447 DOAGAIN  XFR   WORK1,AR            XFR PATTERN BIT TO ALU INPUT REG
000177 A400    2450          ADD   WORK1,0             SHIFT PATTERN BIT RIGHT ONE TIME
000178 2173    2453          BOC   NALCO,NOTLAST       BRANCH IF NOT LAST PATTERN
000179 63D6    2456          BU    CHEKSNS             OTHERWISE, NO MATCH FOUND GET OUT

00017A 4242    2460 DOTIEMS2 XFR   XOUTAIM,XOUTA       SET TIE BYTE IN DATA FLOW REG
00017B 4014    2463          XFR   TIP                 TRANSFER TO DEAD TRACK REG
00017C 63D6    2466          BU    CHEKSNS             GO SET UP ENDING STATUS

               2470 **************************** SENSE OP **********************************
               2471 *THIS ROUTINE CONTROLS THE SENSE OPERATION.                               *
               2472 *THE SENSE BYTES WHICH ARE ASSEMBLED BY ALU2 ARE PASSED VIA THE XOVER    *
               2473 *REGISTERS . WHEN A BYTE OF SENSE INFO DOES NOT APPLY THEN THE XOVER     *
               2474 *WILL CONTAIN ZEROS. SENSE BYTES 2, 3, 4 13, 14, AND 17 ARE GATED BY    *
               2475 *BITS SET IN ALU1 XOVER REG XOUTA AND THE SENSE STAT TURNED ON.         *
               2476 ************************************************************************

00017D 13CF    2479 DOSENSE  STO LINK4,RTNSENS     SET OPENERS RETURN
00017E 60D3    2482          BU    OPENERS             GO CHECK DEVICE STATUS

00017F 0500    2486 SENSEOK  STO   PNDSTS,ZERO         CLEAR REG OF OLD STATUS
000180 104A    2489          STO   LINK1,SRETURN2      RETURN TO SENSE0
000181 1156    2492          STO   LINK2,WATESUM       SET UP IN CASE OF INTERFACE ERR
000182 604E    2495          BU    STATRTN             GO PRESENT STATUS

000183 4150    2499 SENSE0   XFR   CTIMAGE,CTI         DROP STATUS IN
000184 14E1    2502          STO   XOUTBIM,NDXSNS          LOAD INDEX FOR ALU2  ***
000185 5441    2505          XFR   XOUTBIM,XOUTB       START ALU2 OFF
000186 1388    2508          STO   LINK4,SENSE1        RETURN TO SENSE1
000187 61E2    2511          BU    PULL2               GO GET 1ST 2 BYTES

               2514 *  SENSE BYTES 0 AND 1

000188 04FE    2517 SENSE1   STO   WORK1,X'FE'         TRANSFER
000189 4721    2520          XFR   SNSSTS2,AR          SENSE STATUS 2 TO
00018A C400    2523          AND   WORK1,0               WORK1 WITHOUT
00018B 4F90    2526          XFR   SETCNT2,XINA            THE NOISE
00018C 4F21    2529          XFR   SETCNT2,AR                BIT IF
00018D 8400    2532          ORI   WORK1,0                     ON
```

```
00018E 2095    2535          BOC    DBUS,TSTERRS
00018F D701    2538 CHKNOIS  ANDM   SNSSTS2,RDNOISE        SET NOISE
000190 2092    2541          BOC    DBUS,SENSE2             IN BYTE 1
000191 8E80    2544          ORI    SETCNT1,NOISE            IF ON
000192 1399    2547 SENSE2   STO    LINK4,SENSE3           RETURN TO SENSE3
000193 0F00    2550          STO    SETCNT2,0              CLEAR THIS REG (HOLDS FLAGS FOR SNS)
000194 61C9    2553          BU     SNSEVEN                GO SHIP 2 BYTES
000195 DB40    2557 TSTERRS  ANDM   FLAGS2,ALUFAIL         MASK ALU FAIL FLAG
000196 208F    2560          BOC    DBUS,CHKNOIS           BRANCH IF OFF
000197 8420    2563          ORI    WORK1,BUSOC            OTHERWISE SET BUS OUT CHK
000198 618F    2566          BU     CHKNOIS                RETURN

               2569 *   SENSE BYTES 2 AND 3

000199 8840    2572 SENSE3   ORI    STATIMG,SENSE          RESET SENSE TO DF
00019A 0200    2575          STO    XOUTAIM,0              CLEAR XOUTAIM (HOLDS CNT TO
00019B 8F40    2578          ORI    SETCNT2,SNSON           GATE BYTES FROM DF
00019C 139E    2581          STO    LINK4,SENSE4           RETURN TO SENSE 4
00019D 61C8    2584          BU     SNSEVEN1               GO BUMP ONE THEN SHIP EM

               2587 *   SENSE BYTES 4 AND 5
00019E 0F00    2590 SENSE4   STO    SETCNT2,0              CLEAR REG FOR TEST
00019F 5521    2593          XFR    ALU1ERR,AR             DO WE
0001A0 5621    2596          XFR    ALU2ERR,AR              HAVE AN
0001A1 9F00    2599          ORM    SETCNT2,0                 ERROR
0001A2 20A5    2602          BOC    DBUS,SENSE5            BR IF NOT
0001A3 8480    2605          ORI    WORK1,ALUERR           SET ON IF SO
0001A4 CB3F    2608          AND    FLAGS2,ONES-ALUFAIL-FORCEUC  RESET ALU FAIL FLAGS
0001A5 0F20    2611 SENSE5   STO    SETCNT2,SNSOFF         SET FLAG TO TURN SNS OFF
0001A6 8E40    2614          ORI    SETCNT1,NSUBSYS        SET BIT TO INDICATE 3803
0001A7 13A9    2617          STO    LINK4,SENSE6           RETURN TO SENSE 6
0001A8 61C8    2620          BU     SNSEVEN1               GO BUMP ON THEN SHIP 2 MORE

               2623 *   SENSE BYTES 6 AND 7

0001A9 13AB    2626 SENSE6   STO    LINK4,SENSE7           RETURN TO SENSE 7
0001AA 61C8    2629          BU     SNSEVEN1               GO TO BUMP XOUTAIM TO CLEAR BITS 6-7

               2632 *   SENSE BYTES 8 AND 9

0001AB DA20    2635 SENSE7   ANDM   FLAGS1,CURFLAG         ARE WE RESERVED
0001AC 20AE    2638          BOC    DBUS,SENSE8            BR IF NOT
0001AD 8E01    2641          ORI    SETCNT1,CURSVD         TELL THE WORLD IF SO
0001AE 13B0    2644 SENSE8   STO    LINK4,SENSE9           RETURN TO SENSE 9
0001AF 61C9    2647          BU     SNSEVEN                 GO SHIP 'EM

               2650 *   SENSE BYTES 10 AND 11

0001B0 5521    2653 SENSE9   XFR    ALU1ERR,AR             GET ALU1 ERRORS
0001B1 8E00    2656          ORI    SETCNT1,0                IF SO
0001B2 13B4    2659          STO    LINK4,SENSEA           RETURN TO SENSEA
0001B3 61C9    2662          BU     SNSEVEN                GO SHIP 'EM

               2665 *   SENSE BYTES 12 AND 13

0001B4 0FC0    2668 SENSEA   STO    SETCNT2,SNSON+CNT40    DO SENSE AND ADD 40 WHEN APPLIES
0001B5 5660    2671          XFR    ALU2ERR,CBI            SEND ALU 2 ERRORS
0001B6 13B8    2674          STO    LINK4,SENSEB           RETURN TO SENSE B
0001B7 61CA    2677          BU     SNSEVEN2               GO SHIP 'EM

               2680 *   SENSE BYTES 14 AND 15

0001B8 0F20    2683 SENSEB   STO    SETCNT2,SNSOFF         TURN SENSE OFF WHEN APPLIES
0001B9 13BC    2686          STO    LINK4,SENSEC           RETURN TO SENSEC
0001BA A240    2689          ADD    XOUTAIM,X'40'          BUMP GATES FOR HARDWARE
0001BB 61C9    2692          BU     SNSEVEN                GO SHIP 'EM

               2695 *   SENSE BYTES 16 AND 17

0001BC 0FC0    2698 SENSEC   STO    SETCNT2,SNSON+CNT40     TURN SENSE ON AND ADD 40
0001BD 13BF    2701          STO    LINK4,SENSED           RETURN TO SENSE D
0001BE 61C9    2704          BU     SNSEVEN                GO SHIP 'EM

               2707 *   SENSE BYTES 18 AND 19
0001BF C8BF    2710 SENSED   AND    STATIMG,ONES-SENSE     RESET SENSE IN REG
0001C0 0F00    2713          STO    SETCNT2,0              CLEAR FLAGS OUT
0001C1 13C3    2716          STO    LINK4,SENSEE           RETURN TO SENSEE
0001C2 61C9    2719          BU     SNSEVEN                GO SHIP 'EM

               2722 *   SENSE BYTES 20 AND 21

0001C3 13C5    2725 SENSEE   STO    LINK4,SENSEF           RETURN TO SENSE F
0001C4 61C9    2728          BU     SNSEVEN                GO SHIP 'EM SOME MORE

               2731 *   SENSE BYTES 22 AND 23
0001C5 5D21    2733 SENSEF   XFR    FRUREG,AR              GET ALU 1 FRU REG
0001C6 8400    2736          ORI    WORK1,0                  IN REG TO SEND
0001C7 13EF    2739          STO    LINK4,CANCEL1          THATS ALL - RETURN TO CANCEL

               2742 *************************************************************
               2743 *  ENTRY TO SEND WORK1 AND SETCNT1 TO CHANNEL
0001C8 A201    2745 SNSEVEN1 ADD    XOUTAIM,1              BUMP GATES
0001C9 4460    2748 SNSEVEN  XFR    WORK1,CBI              SET ON CHANNEL BUS IN
0001CA 8808    2751 SNSEVEN2 ORI    STATIMG,SETSTATA       SET STAT A ON
0001CB 4242    2754 EXIT     XFR    XOUTAIM,XOUTA          THIS WILL SET CONTROLS
```

```
0001CC 4828        2757          XFR   'STATIMG,STAT          TO HARDWARE
0001CD 1001        2760          STO    LINK1,BRETURN2       SET UP
0001CE 1193        2763          STO    LINK2,CANCEL          RETURN
0001CF 1293        2766          STO    LINK3,CANCEL           LINKAGE
0001D0 620A        2769          BU     SERVRTN              GO DO SERVICE
                   2771 ******************************************************************
                   2773 ******************************************************************
                   2774 *   RETURN AFTER SENDING THE EVEN SENSE BYTE
                   2775 ******************************************************************

0001D1 DF40        2778 SNSODD   ANDM   SETCNT2,SNSON        SET SENSE ON
0001D2 20DA        2781          BOC    DBUS,SNSODD2         BR IF NOT
0001D3 8840        2784          ORI    STATIMG,SENSE        SET SENSE GATE FOR HDWE
0001D4 9F00        2787          ORM    SETCNT2,0            ADD ONE OR 40
0001D5 30DE        2790          BOC    CNT40,SNSODD3        BR IF ADD 40
0001D6 A201        2793          ADD    XOUTAIM,1            BUMP ONE
0001D7 CBF7        2796 SNSODD1  AND    STATIMG,ONES-SETSTATA  RESET STAT A
0001D8 4E60        2799          XFR    SETCNT1,CBI          SET ODD SENSE BYTE ON CBI
0001D9 61CB        2802          BU     EXIT                 RETURN TO PULL 2

0001DA DF20        2806 SNSODD2  ANDM   SETCNT2,SNSOFF       TURN OFF SENSE
0001DB 20D7        2809          BOC    DBUS,SNSODD1         BR IF NOT
0001DC C8BF        2812          AND    STATIMG,ONES-SENSE   DO IT IF OS
0001DD 61D7        2815          BU     SNSODD1              CONTINUE ON

0001DE A240        2819 SNSODD3  ADD    XOUTAIM,X'40'        BUMP GATE
0001DF 61D7        2822          BU     SNSODD1              CONTINUE SOME MORE

0001E0 4150        2826 SNSLINK  XFR    CTIMAGE,CTI          RESET SERVICE IN
0001E1 2AD1        2829          BOC    STATA,SNSODD         IF A ON GO TO SNS ODD
0001E2 3AE6        2832 PULL2    BOC    STATC,PULLAB         BR IF ALU2 DONE WITH
0001E3 3BF0        2835          BOC    STATD,CLEARAB         1ST 2 SENSE BYTES
0001E4 28EF        2838          BOC    ADROUT,CANCEL1       BR IF HIO
0001E5 61E2        2841          BU     PULL2                WAIT SOME MORE

0001E6 4490        2845 PULLAB   XFR    WORK1,XINA           GET EVEN SENSE BYTE FROM ALU2
0001E7 4E88        2848          XFR    SETCNT1,XINB         GET EVEN SENSE BYTE FROM ALU2
0001E8 8801        2851 NOTPULL  ORI    STATIMG,SETSTATD     SET D TO IND
0001E9 4828        2854          XFR    STATIMG,STAT          GOT 'EM
0001EA 28EF        2857 PULLAB1  BOC    ADROUT,CANCEL1       WAIT TO ASSURE
0001EB 3BED        2860          BOC    STATD,PULLAB2         ALU2 HAS SEEN D.
0001EC 3AEA        2863          BOC    STATC,PULLAB1          ON
0001ED C8FE        2866 PULLAB2  AND    STATIMG,ONES-SETSTATD   THEN RESET IT
0001EE 5322        2869          XFR    LINK4,IC             RETURN WITH 2 BYTES FROM ALU2

0001EF 6293        2873 CANCEL1  BU     CANCEL                         POINT SO EXIT

0001F0 0400        2877 CLEARAB  STO    WORK1,0              CLEAR WORK1
0001F1 0E00        2880          STO    SETCNT1,0            CLEAR COUNT REG 2
0001F2 61E8        2883          BU     NOTPULL              RETURN TO DO ONLY ALU1

000200             2887          ORG    BEGIN+X'200'
                   2888 ****************************** SERVICE ROUTINE ************************
                   2889 *SERVICE IN SBR TESTS FOR ALL OUT TAGS DOWN, RAISES SERVICE IN AND     *
                   2890 *LINKS TO ADDRESSES STORED IN LNK 1 2 AND 3 WHEN A TAG IS RECEIVED IN *
                   2891 *REPLY                                                                 *
                   2892 ******************************************************************

000200 65DB        2895 DMRRTN1  BU     DMRLNK               RETURN TO DMR ROUTINE
000201 61E0        2898 BRETURN2 BU     SNSLINK              RETURN TO SENSE OP
000202 6582        2901 BRETURN4 BU     DIALINK              RETURN TO SET DIAGNOSE

000203 1079        2905 WRTBGN   STO    LINK1,WRTFST         SET SERVICE SUBRTN RETURN
000204 1175        2908          STO    LINK2,WCOSTOP        SET STOP LINK
000205 1276        2911          STO    LINK3,WCOHIO         SET HIO LINK
000206 CCFB        2914          AND    SETDIA1,ONES-LWROP   RESET BIT FOR NEXT OPERATION
000207 8702        2917          ORI    SNSSTS2,WDCNTO       SET WORD COUNT ZERO ON
000208 4560        2920          XFR    PNDSTS,CBI           CLEAR BUS IN
000209 C400        2923          AND    WORK1,ZERO           CLEAR WORK REG 1

00020A 380C        2927 SERVRTN  BOC    OPRIN,SERVRTNO       BRANCH IF OP IN STILL UP(NO HIO)
00020B 5222        2930 HIOLK    XFR    LINK3,IC             RETURN TO HIO ENTRY

00020C 8108        2934 SERVRTNO ORI    CTIMAGE,SVCIN        MASK SERVICE IN UP
00020D 280B        2937 SERVRTN1 BOC    ADROUT,HIOLK         TEST FOR  HALT I/O
00020E 2D0D        2940          BOC    SVCOUT,SERVRTN1      WAIT FOR TAG TO FALL
00020F 290D        2943          BOC    CMDOUT,SERVRTN1      WAIT FOR TAG TO FALL
000210 390D        2946          BOC    SUPO,SERVRTN1        BRANCH TO SUPPRESS DATA
000211 4150        2949          XFR    CTIMAGE,CTI          RAISE SERVICE IN
000212 C1F7        2952          AND    CTIMAGE,ONES-SVCIN   MASK SERVICE IN DOWN

000213 280B        2956 SERVRTN2 BOC    ADROUT,HIOLK         TEST FOR HALT I/O
000214 2917        2959          BOC    CMDOUT,WHOA          STOPLINK TO PROGRAM
000215 2D32        2962          BOC    SVCOUT,TUTRTN        SERVICE OUT RESPONSE TO SERVICE IN
000216 6213        2965          BU     SERVRTN2             WAIT

                   2968 *** COMMAND OUT RESPONSE TO SERVICE IN SAYS STOP
000217 4150        2970 WHOA     XFR    CTIMAGE,CTI          DROP SERVICE IN
000218 5122        2973          XFR    LINK2,IC             LINK TO PROGRAM

                   2977 ****************************** TEST TAPE UNIT ***********************
                   2978 *THIS ROUTINE DETERMINES WHETHER THE TU STATUS PERMITS THE INITIATION *
                   2979 *OF THE COMMAND. IT THEN LINKS TO THE PROPER INITIAL STATUS ROUTINE   *
                   2980 ******************************************************************
```

```
000219 1337        2983 TRETURN2 STO   LINK4,GRETURNO       SET MODE RETURN
00021A 6039        2986          BU    GODODIA1             RETURN TO PRESENT MODE STATUS
00021B 63D9        2989 TRETURN3 BU    BSTWAIT2             NO-OP RETURN
00021C 60C7        2992 TRETURNO BU    CMDPAR1              GO TO TERM UCK RTN
                   2995 *** PROTEST IS ENTERED ONLY BY WRITE TYPE COMMANDS TO CHECK FOR
                   2996 *** FILE PROTECT
00021D 13D0        2998 PROTEST  STO   LINK4,RTNPROT        SET OPENERS RETURN
00021E 60D3        3001          BU    OPENERS              GO CHECK DEVICE STATUS

00021F 3A2B        3005 PROTEST1 BOC   STATC,TUTESTIT       BRANCH IF NOT READY

000220 DC04        3009 CHKLWR   ANDM  SETDIA1,LWROP        MASK FOR LOOP WRITE TO READ OP
000221 2024        3012          BOC   DBUS,CHKNFP          BRANCH IF OFF
000222 8802        3015          ORI   STATIMG,SETSTATC     OTHERWISE SET STAT FOR ALU2
000223 4828        3018          XFR   STATIMG,STAT         SET TO HARDWARE

000224 D440        3022 CHKNFP   ANDM  WORK1,NFP            TEST FOR NOT FILE PROTECT
000225 312B        3025          BOC   DREG1,TUTESTIT       BRANCH IF NOT FP
000226 63F3        3028          BU    COMREJC1             GO TO COMMAND REJECT ROUTINE

000227 13D1        3032 TUTEST   STO   LINK4,RTNTUTST       SET OPENERS RETURN
000228 60D3        3035          BU    OPENERS              GO CHECK DEVICE STATUS

000229 13D2        3039 TUTEST1  STO   LINK4,RTNTUTS1       SET OPENERS RETURN
00022A 60D3        3042          BU    OPENERS              GO CHECK DEVICE STATUS

00022B DB80        3046 TUTESTIT ANDM  FLAGS2,FORCEUC       MASK FOR ALU FAILURE
00022C 301C        3049          BOC   DREGO,TRETURNO       BRANCH IF SO TO SET UNIT CHECK
00022D 0700        3052          STO   SNSSTS2,ZERO         RESET SENSE
00022E 4012        3055          XFR   CLEAR                RESET DATA FLOW SENSE

00022F 3A1C        3059 TUTEST2  BOC   STATC,TRETURNO       GO TO TERMINAL UNIT CHECK ROUTINE.
000230 DB80        3062          ANDM  FLAGS2,FORCEUC       IS FORCE UNIT CHK FLAG ON
000231 301C        3065          BOC   DREGO,TRETURNO       BR IF SO

000232 5022        3069 TUTRTN   XFR   LINK1,IC             LINK TO STATUS HANDLING ROUTINE

                   3073 ********************************** CONTROL COMMANDS ******************
                   3074 **********************************************************************
                   3075 *CONTINIT ROUTINE HANDLES THE PRESENTATION OF INITIAL STATUS FOR ALL  *
                   3076 *ACCEPTED CONTROL IMMEDIATE COMMANDS.                                  *
                   3077 **********************************************************************

000233 0508        3080 CONTINIT STO   PNDSTS,CHANEND       EMIT CHANNEL END STATUS
000234 104B        3083          STO   LINK1,SRETURN4       EMIT ACCEPT RETURN
000235 114C        3086          STO   LINK2,SRETURN5       EMIT STACK RETURN
000236 6038        3089          BU    GODODIA0             GO TO PRESENT STATUS

                   3092 *** CHANNEL RESPONDED WITH SERVICE OUT TO STATUS IN OR STATUS WAS
                   3093 *** ACCEPTED
000237 0500        3095 CONTSERV STO   PNDSTS,ZERO          RESET STATUS REGISTER
                   3097 *** ENTRY AT CONTSTAK SAYS THE CHANNEL RESPONDED TO STATUS IN WITH
                   3098 *** COMMAND OUT AND THE CHANNEL END IS STILL PENDING
000238 4242        3100 CONTSTAK XFR   XOUTAIM,XOUTA        SET DATA FLOW MASK
000239 4828        3103          XFR   STATIMG,STAT         RESET STAT D IF ON
00023A CCFB        3106          AND   SETDIA1,ONES-LWROP   RESET LWR BIT FOR NEXT OPERATION
00023B 2A43        3109          BOC   STATA,CKCHAIN        BRANCH IF REWIND OR DSE

00023C 4828        3113 GODOIT   XFR   STATIMG,STAT         SET STATS TO HDWE
00023D 5441        3116          XFR   XOUTBIM,XOUTB        TRAP ALU 2 TO PERFORM OP
00023E C1FE        3119 SKIPALU2 AND    CTIMAGE,ONES-OPIN   DROP OP IN
00023F 8110        3122          ORI   CTIMAGE,CUBUSY       RAISE CTI UNIT BUSY
000240 4150        3125          XFR   CTIMAGE,CTI          CHANGE TAGS

000241 3B54        3129 CTLWAIT  BOC   STATD,CHKERRS        IS ALU 2 FINISHED?
000242 6241        3132          BU    CTLWAIT              WAIT

000243 D901        3136 CKCHAIN  ANDM  FLAGS,CHAIN          MASK TO CHECK CHAIN BIT
000244 2049        3139          BOC   DBUS,CKEOTBOT        BRANCH IF NOT CHAINED
000245 DD40        3142          ANDM  SETDIA2,DEVBSY       TEST FOR DEV BSY FLG
000246 3148        3145          BOC   DREG1,RESETA         BRANCH IF ON TO RESET A STAT
000247 8801        3148          ORI   STATIMG,SETSTATD     SET STAT D TO INDICATE CHAING
000248 C8F7        3151 RESETA   AND   STATIMG,ONES-SETSTATA     RESET STAT A

000249 CDBF        3155 CKEOTBOT AND   SETDIA2,ONES-DEVBSY RST THE DEV BSY DIAG FLAG
00024A F007        3158          XOM   CURCOMM,X'07'        MASK FOR REWIND COMMAND
00024B 204F        3161          BOC   DBUS,CHKBOT          BRANCH IF IT IS TO CHECK BOT
00024C D420        3164          ANDM  WORK1,EOT            CMD IS DSE--CHECK EOT
00024D 203C        3167          BOC   DBUS,GODOIT          BRANCH IF NOT EOT
00024E 6251        3170          BU    RSTSTATA             GO RESET STAT A EOT IS ON

00024F D410        3174 CHKBOT   ANDM  WORK1,BOT            MASK TO CHECK BOT
000250 203C        3177          BOC   DBUS,GODOIT          BRANCH IF NOT ON
000251 C8F6        3180 RSTSTATA AND   STATIMG,ONES-SETSTATA-SETSTATD OT ON--RESET STATA
000252 4828        3183          XFR   STATIMG,STAT         RESET TO HDWE
000253 623E        3186          BU    SKIPALU2             GO TO SKIP ALU2 AND HANDLE INTRPT
000254 225E        3190 CHKERRS  BOC   ALUR,BIGPROB         WAS EXECUTION ERROR FREE?

                   3193 ****************************** CONTROL CMD END ***********************
                   3194 * DETERMINE CONTROL CMD ENDING STATUS---ALU2 IS FINISHED. IF CHANNEL  *
                   3195 * END IS NOT PENDING AND NO OTHER STATUS IS TO BE PRESENTED, HAVE ALU2*
                   3196 * ARM THE DEVICE END PRIME. OTHERWISE SET STATUS PENDING FLAG. CHECK  *
                   3197 * FOR CATASTROPHIC ERROR IN ALU2 AND SET EQUIPMENT CHECK IF SO. GO TO *
                   3198 * TERMSTAT ROUTINE TO PRESENT STATUS IF THERE IS ANY.                 *
                   3199 **********************************************************************
```

```
000255 3A5F   3203 CONTEND   BOC   STATC,SIGUC          BRANCH IF ALU2 SIGNALLED UNIT CHECK
000256 2765   3206           BOC   DFLER,WRTPROB        BRANCH IF DATA FLOW HAD AN ERROR
000257 2B63   3209 CONTEND1  BOC   STATB,SIGUX          BRANCH IF ALU2 SIGNALLED UNIT EXCP
000258 8504   3212 CONTEND2  ORI   PNDSTS,DEVEND        SET DEVICE END IN STATUS
000259 F504   3215 CONTEND3  XOM   PNDSTS,DEVEND        IS STATUS DEV END ALONE
00025A 2069   3218           BOC   DBUS,ONLYDE          BRANCH IF YES
00025B 2A69   3221           BOC   STATA,ONLYDE         BRANCH IF UNCHAINED RWD OR DSE
00025C 8904   3224           ORI   FLAGS,STATPNDG       SET STATUS PENDING FLAG
00025D 6299   3227           BU    TERMSTAT             GO TO TERMINAL STATUS

00025E 8710   3231 BIGPROB   ORI   SNSSTS2,EQUIPCK      SET EQUIPMENT CHECK IN SENSE DATA
00025F 8526   3234 SIGUC     ORI   PNDSTS,DEVEND+UNITCHK+CUE SET DE,CUE,UC IN STATUS
000260 C8F7   3237           AND   STATIMG,ONES-SETSTATA   RESET STAT IN REG
000261 4828   3240           XFR   STATIMG,STAT            FOR LATER
000262 6257   3243           BU    CONTEND1             GO BACK

000263 8525   3247 SIGUX     ORI   PNDSTS,DEVEND+UNITEXC+CUE SET DE,CUE,UX IN STATUS
000264 6258   3250           BU    CONTEND2             GO BACK

000265 8708   3254 WRTPROB   ORI   SNSSTS2,DATACK       SET DAT CHECK IN SENSE
000266 625F   3257           BU    SIGUC                 GO SET NIT CHECK

000267 C508   3261 NOTNOW    AND   PNDSTS,CHANEND       CLEAR PENDING STATUS REG
000268 629E   3264           BU    TERMSTA2             GO TO TERMINAL STATUS

000269 140A   3268 ONLYDE    STO   XOUTBIM,NDXSDE-ALU2BRT EMIT ALU2 BRANCH ADDRESS     ***
00026A 5441   3271           XFR   XOUTBIM,XOUTB        TRAP ALU2 TO SET DE PRIME
00026B C8FC   3274           AND   STATIMG,ONES-SETSTATC-SETSTATD RESET STATS C AND D
00026C 4828   3277           XFR   STATIMG,STAT         SET TO HDWE
00026D 3B97   3280 DEDUN     BOC   STATD,CKDEER         BRANCH IF DONE
00026E 3A97   3283           BOC   STATC,CKDEER         BRANCH IF ALU2 HAS PRIMED
00026F 626D   3286           BU    DEDUN                GO BACK IF NOT DONE

              3289 ********************************************************************
              3290 *CLEANIT  ROUTINE HANDLES THE PRESENTATION OF INITIAL STATUS FOR ALL  *
              3291 *ACCEPTED NON IMMEDIATE COMMANDS EXCEPT SENSE.                        *
              3292 ********************************************************************

000270 0500   3295 CLEANIT   STO   PNDSTS,ZERO          EMIT CLEAN STATUS
000271 104D   3298           STO   LINK1,SRETURN6       EMIT ACCEPT RETURN
000272 1156   3301           STO   LINK2,WATESUM        EMIT STACK RETURN
000273 6038   3304           BU    GODODIA0             GO SET DIAGNOSTIC FLAGS

              3307 *
              3308 **************************** WRITE ROUTINE ***************************
              3309 ********************************************************************
              3310 * WRITINIT FETCHES THE FIRST BYTE OF WRITE DATA, CHECKS FOR WORD COUNT*
              3311 * ZERO AND TRAPS ALU2 TO EXECUTE THE WRITE OP. IN ADDITION, A RIPPLE  *
              3312 * PATTERN IS GENERATED FOR OFF LINE MODE. THE PATTERN IS UPDATED AT   *
              3313 * EACH SERVICE OUT AND XFERRED TO CHAN BUS IN REG. IN OFF LINE MODE   *
              3314 * THE CHAN BUS IN REG IS WRAPPED AROUND TO CHAN BUS OUT TO PROVIDE    *
              3315 * RIPPLE WRITE DATA. REQ TIE AND SET DIAGNOSE COMMANDS WILL ALSO USE  *
              3316 * THIS ROUTINE TO FETCH THE FIRST BYTE OF DATA.                      *
              3317 ********************************************************************

000274 616C   3320 BRETURN1  BU    DOTIEMS1             RETURN TO TIE MODE SET ROUTINE

000275 63DC   3324 WCOSTOP   BU    SETUNTCK             GE SET DATA CHECK DEV NOT STARTED

000276 050E   3328 WCOHIO    STO   PNDSTS,CHANEND+DEVEND+UNITCHK SET DE,CE,AND UC IN STATUS
000277 8904   3331           ORI   FLAGS,STATPNDG       SET STATUS PENDING FLAG
000278 634B   3334           BU    HIONOP               GO TO HIO NOT OPERATING

000279 C7FD   3338 WRTFST    AND   SNSSTS2,ONES-WDCNT0  RESET WORD COUNT ZERO IN SENSE
00027A D0C8   3341           ANDM  CURCOMM,X'C8'        MASK FOR MODE SET TYPE CMD
00027B 307D   3344           BOC   DREG0,BUMPRIP        BRANCH IF LWR CMD
00027C 3474   3347           BOC   DREG4,BRETURN1       BRANCH IF SO

00027D 5441   3351 BUMPRIP   XFR   XOUTBIM,XOUTB        TRAP ALU2 TO DO WRITE
00027E 8880   3354           ORI   STATIMG,STOP         SET STOP STAT IN IMAGE REG

00027F 2883   3358 WRTSTART  BOC   ADROUT,WRTHIO        BRANCH IF HIO
000280 2B84   3361           BOC   STATB,WRTMOVE1       BRANCH IF DEVICE STARTED       ****
000281 3B95   3364           BOC   STATD,SETSTOP1       BRANCH IF ALU2 STOPPED
000282 627F   3367           BU    WRTSTART             GO BACK UNTIL SOMETHING HAPPENS
000283 6354   3371 WRTHIO    BU    HIOPERG                 GO TO HIO OPERATING ROUTINE

000284 4150   3375 WRTMOVE1  XFR   CTIMAGE,CTI          DROP SERVICE IN TO HDWR         ***
000285 2883   3378 WRTMOVE2  BOC   ADROUT,WRTHIO        BRANCH IF HIO
000286 3F94   3381 CKOVRN    BOC   OVERRUN,SETSTOP      BRANCH IF OVERRUN
000287 2D85   3384           BOC   SVCOUT,WRTMOVE2      WAIT FOR SVC OUT TO FALL      *****
000288 4460   3387           XFR   WORK1,CBI            MOVE PATTERN TO CHAN BUS IN
000289 2883   3390 WRTMOVE   BOC   ADROUT,WRTHIO        BRANCH IF HIO ISSUED
00028A 2D8E   3393           BOC   SVCOUT,BUMPGEN       BRANCH IF NEXT DATA BYTE READY
00028B 2992   3396           BOC   CMDOUT,CHKBSO        BRANCH IF STOP ISSUED
00028C 3B92   3399 CHKSTOP   BOC   STATD,CHKBSO         BRANCH IF ALU2 TERMINATES EARLY
00028D 6289   3402           BU    WRTMOVE              GO BACK AND REITERATE TEST LOOP

00028E A401   3406 BUMPGEN   ADD   WORK1,BUMP1          BUMP OFF-LINE PATTERN GENERATOR
00028F 6285   3409           BU    WRTMOVE2             RETURN                        *****

000290 8720   3413 WRTBOCK   ORI   SNSSTS2,BUSOC        SET BUS OUT CHK IN SENSE DATA
000291 6294   3416           BU    SETSTOP              RETURN TOSET STOP
```

```
000292 2490     3420 CHKBSO    BOC   BOPE,WRTBOCK          BRANCH IF CHAN BUS OUT PARITY EVEN
000293 C8B7     3423 CANCEL    AND   STATIMG,ONES-SENSE-SETSTATA   RESET SENSE STATS
000294 8880     3426 SETSTOP   ORI   STATIMG,STOP          SET STOP IN STAT IMAGE REG
000295 4828     3429 SETSTOP1  XFR   STATIMG,STAT          XFR IMAGE REG TO HDWE STAT REG
000296 63B7     3432           BU    BSTWAIT               GO WAIT FOR ALU2 COMPLETION

000297 225F     3436 CKDEER    BOC   ALUR,SIGUC            BRANCH IF ALU ERROR
000298 2A67     3439           BOC   STATA,NOTNOW          BRANCH IF REWIND OR DSE
                3442 ************************** TERMINAL STATUS ************************
                3443 * TERMINAL STATUS IS USED BY ALL FUNCTIONAL COMMANDS TO PRESENT        *
                3444 * ENDING STATUS.  THE CALLING ROUTINE, UP ON ENTRY, MUST HAVE SET THE  *
                3445 * PENDING DEVICE ADDRESS REG AND THE PENDING STATUS REG.  TERM STAT    *
                3446 * WILL DETERMINE IF CONTROL UNIT END MUST BE ADDED TO THE STATUS AND   *
                3447 * THEN WILL PRESENT THE STATUS IN THE APPROPRIATE MANNER. IF THE CHAN-*
                3448 * NEL REMAINED CONNECTED STATUS IN WILL BE RAISED IMMEDIATELY. IF NOT *
                3449 * AN INTERRUPT CYCLE WILL BE INITIATED WITH THE APPROPRIATE REQUEST-   *
                3450 * IN DEPENDING ON CHAINING. CONTROL UNIT BUSY WILL BE RESET IF APPLI- *
                3451 * CABLE AND HOLD INTERFACE WILL BE SET IF STATUS PENDING OR STACK FLAG*
                3452 * IS SET. IF PENDING STATUS IS CLEAN (RWD OR DSE) STATUS WILL NOT BE  *
                3454 * ROUTINE UNDER THE CONTROL OF STATA. A GENERAL RESET WILL BE TERM-    *
                3455 * INATED BY THIS ROUTINE VIA IDLESCAN.                                 *
                3456 ***********************************************************************

000299 38A8     3459 TERMSTAT  BOC   OPRIN,TERMSTA1        IS OP-IN UP

00029A 2344     3463 BHERE     BOC   MIFTR,CHKCONT         BRANCH IF MIS AVAILABLE          ***

00029B D986     3467 TERMSTA0  ANDM  FLAGS,STATPNDG+STACK+CONCON NEED TO HOLD INTF
00029C 209E     3470           BOC   DBUS,TERMSTA2         NO, SKIP TO RESET CUB
00029D 8120     3473           ORI   CTIMAGE,HOLDINT       RAISE HOLD INTERFACE

00029E          3476 TERMSTA2  EQU   *
00029E C8F5     3478           AND   STATIMG,ONES-SETSTATA-SETSTATC   (DSE OR RWD SWITCH)
00029F 4828     3481           XFR   STATIMG,STAT          SET STATS TO HDWE
0002A0 C1EF     3484           AND   CTIMAGE,ONES-CUBUSY   RESET CONTROL UNIT BUSY
0002A1 4150     3487           XFR   CTIMAGE,CTI           XFR CHANNEL TAG IMAGE TO HDWE

0002A2 2339     3491 TERMSTA3  BOC   MIFTR,MIFTR05         BRANCH IF MIS AVAILABLE          ***
0002A3 25AE     3494 ANYCUEA   BOC   NCUEA,CHKAFLG         BRANCH IF NOT CUE ON A
0002A4 8520     3497           ORI   PNDSTS,CUE            SET CONTROL UNIT END IN STATUS
0002A5 8940     3500           ORI   FLAGS,CUEA            SET CONTROL UNIT END IN FLAGS
0002A6 4009     3503           XFR   CUREA                 ATTEMPT TO RESET CUEA
0002A7 62A3     3506           BU    ANYCUEA               GO CHECK RESET

0002A8 8101     3510 TERMSTA1  ORI   CTIMAGE,OPIN          RAISE MICROPGM OP IN
0002A9 28AC     3513           BOC   ADROUT,HADHIO         BRANCH IF HIO
0002AA 4150     3516           XFR   CTIMAGE,CTI           SET TO HARDWARE
0002AB 389A     3519           BOC   OPRIN,BHERE           OP IN STILL UP?
0002AC C1FE     3522 HADHIO    AND   CTIMAGE,ONES-OPIN     RESET UPGM OP IN
0002AD 629A     3525           BU    BHERE                 NO, CHANNEL DISCONNECTED

0002AE 4009     3529 CHKAFLG   XFR   CUREA                 RESET GEN RESET LATCH IF ON
0002AF D940     3532           ANDM  FLAGS,CUEA            MASK FOR CUE A FLAG
0002B0 20B2     3535           BOC   DBUS,CHKCHAIN         BRANCH IF OFF
0002B1 8520     3538 CUEPNDG   ORI   PNDSTS,CUE            SET CUE IN STATUS

0002B2 9500     3542 CHKCHAIN  ORM   PNDSTS,0              STATUS IS CLEAN IF RWD OR DSE
0002B3 20BA     3545           BOC   DBUS,CHEKTIO          BRANCH IF SO TO PREVENT INTERRUPT
0002B4 38C3     3548 TERMSTA4  BOC   OPRIN,STSIMME         BRANCH IF CHANNEL STILL CONNECTED
0002B5 D901     3551           ANDM  FLAGS,CHAIN           MASK TO TEST CHAINING

0002B6 20BD     3554           BOC   DBUS,NOTCHAIN         BRANCH IF CHAIN BIT OFF
0002B7 234A     3557           BOC   MIFTR,MIFTR06         BRANCH IF MIS AVAILABE           $$$
0002B8 8A04     3560 SETREQA   ORI   REQTAGS,REQINA        RAISE NON SUPPRESSIBLE REQ-IN A
0002B9 62C1     3563           BU    GOTOIDLE              GO WAIT FOR POLL

0002BA 9000     3567 CHEKTIO   ORM   CURCOMM,0             MASK FOR TIO CMD
0002BB 20B4     3570           BOC   DBUS,TERMSTA4         BRANCH IF IT IS
0002BC 6304     3573           BU    IDLESCAN              OTHERWISE GO LOOK FOR STATUS
0002BD DD20     3577 NOTCHAIN  ANDM  SETDIA2,BLKINTS       MASK FOR DIAGNOSTIC BLOCK INTERRUPT
0002BE 32C2     3580           BOC   DREG2,GODOIDLE        BRANCH IF ON TO BYPASS REQUEST-IN
0002BF 234E     3583           BOC   MIFTR,MIFTR07         BRANCH IF MIS AVAILABLE          ***
0002C0 8A08     3586 DOREQA    ORI   REQTAGS,SUPREQA       RAISE SUPPRESSIBLE REQUEST IN A
0002C1 4A48     3589 GOTOIDLE  XFR   REQTAGS,MIST          RAISE REQ-IN TO HARDWARE
0002C2 6302     3592 GODOIDLE  BU    IDLEPEND              WAIT FOR POLL

0002C3 1048     3596 STSIMME   STO   LINK1,SRETURN0        LOAD STS SUBRTN ACCEPT RETURN
0002C4 1149     3599           STO   LINK2,SRETURN1        LOAD STS SUBRTN STACK RETURN
0002C5 1249     3602           STO   LINK3,SRETURN1        LOAD STS SUBRTN HALT RETURN
0002C6 604E     3605           BU    STATRTN               GO TO STATUS SUBROUTINE

                3608 ***********************************************************************
                3609 * TERMSTAK IS ENTERED WHEN ENDING STATUS IN RECEIVES A COMMAND OUT   *
                3610 * RESPONSE (STACK). INBOUND TAGS WILL BE RESET,BUSY WILL BE REMOVED. *
                3611 * FROM THE STATUS (IF APPLICABLE), THE OPPOSITE INTERFACE WILL BE    *
                3612 * RELEASED FROM PING HOLD (IF APPLICABLE), AND A NORMAL ENDUP EXIT   *
                3613 ***********************************************************************
0002C7 8120     3615 TERMSTAK  ORI   CTIMAGE,HOLDINT       RAISE HOLD INTERFACE
0002C8 4044     3618           XFR   PING                  RELEASE THE OTHER INTERFACE

0002C9 C1FC     3622 TERMSTK1  AND   CTIMAGE,ONES-OPIN-ADDIN  RESET OPIN AND ADRESS IN
0002CA C5EF     3625           AND   PNDSTS,ONES-BUSY      RESET BUSY BIT IN STATUS
0002CB C400     3628 GETOFF    AND   WORK1,ZERO            CLEAR WORK1
0002CC 62E5     3631           BU    CLEANUP               GO TO RAISE REQ-IN
```

```
****************************************************************************
* TERMACC IS ENTERED WHEN ENDING STATUS IN RECEIVES A SERVICE OUT          *
* RESPONSE (STATUS ACCEPTED). IF CHAINING OR CONTINGENT CONNECTION IS      *
* INDICATED, THE DEVICE WILL REMAIN COMMITTED. STAT D WILL BE SET TO       *
* NOTIFY ALU2 TO CLEAR A DEVICE END PRIME IF APPLICABLE. THE HOLD          *
* INTERFACE LINE WILL BE RAISED IF THE RESERVE FLAG,CHAIN FLAG,OR          *
* CONTINGENT CONNECTION FLAG IS ON. INBOUND TAGS WILL BE RESET AND         *
* CHAN BUS IN WILL BE CLEARED. IF NOT CHAINING EXIT WILL BE TO IDLE        *
* TO SCAN FOR STATUS. IF CHAINING, A LOOP HANGING ON SUPPRESS OUT WILL*
* BE EFFECTED. IF CHANNEL CALLS CHAIN OFF SUPPRESS OUT WILL DROP           *
****************************************************************************

0002CD C1FE   TERMACC  AND   CTIMAGE,ONES-OPIN     RESET OP IN
0002CE 0400            STO   WORK1,0               CLEAR A WORK REG
0002CF D981            ANDM  FLAGS,CHAIN+CONCON    MASK TO CHECK CHAIN AND CONT CONN
0002D0 20D2            BOC   DBUS,CKRESRV          BRANCH IF BOTH OFF
0002D1 62D4            BU    DROPTAGS              OTHERWISE GET OUT

0002D2 2352   CKRESRV  BOC   MIFTR,MIFTR08         BRANCH IF MIS AVAILABLE           ***

0002D3 C1DF   RSTHLDIN AND   CTIMAGE,ONES-HOLDINT  RESET HOLD INTERFACE

0002D4 D504   DROPTAGS ANDM  PNDSTS,DEVEND         MASK FOR DEVICE END
0002D5 20E9            BOC   DBUS,MOVEON           BRANCH IF NOT
0002D6 8801            ORI   STATIMG,SETSTATD      NOTIFY ALU2 TO CLEAR DEP
0002D7 4828            XFR   STATIMG,STAT          XFR STATIMG TO HDWE STAT REG

0002D8 3BE9   RSTNTDUN BOC   STATD,MOVEON          ALU2 DONE
0002D9 62D8            BU    RSTNTDUN              NO, GO BACK

0002DA 9500   DODES    ORM   PNDSTS,0               MASK FOR CLEAN STATUS
0002DB 62F7            BU    BLOUT20               BLOW OUT TO CHECK UC          EC 734124
0002DC D5C7   FROM20   ANDM  PNDSTS,ONES-CUE-CUBUSY-CHANEND MASK FOR DES STAECS734124
0002DD 20E2            BOC   DBUS,ALLCLEAR         BRANCH IF NONE
0002DE 1406   DODES1   STO   XOUTBIM,NDXDES-ALU2BRT FETCH ALU2'S DESELECT DEVICE RTN
0002DF 5441            XFR   XOUTBIM,XOUTB         TRAP ALU2 TO RESET DEV COMMITTED LCH

0002E0 3BE2   DOITAGN  BOC   STATD,ALLCLEAR        BRANCH IF ALU2 COMPLETED
0002E1 62E0   RSTCMTD  BU    DOITAGN               GO BACK IF NOT

0002E2 22E5   ALLCLEAR BOC   ALUR,CLEANUP          TRAP HERE IF ALU2 HDWE ERROR
0002E3 C400            AND   WORK1,ZERO            CLEAR A WORK REG
0002E4 4424            XFR   WORK1,TUADR           RESET DEV ADDRESS REG
0002E5 4460   CLEANUP  XFR   WORK1,CBI             CLEAR BUS IN
0002E6 4150            XFR   CTIMAGE,CTI           RESET CHANNEL TAGS
0002E7 38E7   OPINDROP BOC   OPRIN,OPINDROP        WAIT FOR OP IN TO FALL
0002E8 6304            BU    IDLESCAN              GO TO IDLESCAN TO LOOK FOR INTS

0002E9 22EC   MOVEON   BOC   ALUR,CLRBUSIN         ALU2 ERROR TRAP HERE
0002EA D981            ANDM  FLAGS,CHAIN+CONCON    MASK TO CHECK CHAIN AND CONT CONN
0002EB 20DA            BOC   DBUS,DODES            DESELECT DEVICE IF BOTH OFF
0002EC D901   CLRBUSIN ANDM  FLAGS,CHAIN           MASK FOR CHAIN
0002ED 20E5            BOC   DBUS,CLEANUP          BRANCH IF NOT (CONT CONN)
0002EE 4460            XFR   WORK1,CBI             CLEAR CHAN BUS IN
0002EF DD10            ANDM  SETDIA2,CUBUSY        MASK FOR DIAGNOSTIC CU BUSY FLAG
0002F0 20F3            BOC   DBUS,RLSCHANN         BRANCH IF OFF TO LEAVE CU NOT BUSY
0002F1 8110            ORI   CTIMAGE,CUBUSY        SET CU BUSY
0002F2 CDEF            AND   SETDIA2,ONES-CUBUSY   RESET THE FLAG
0002F3 4150   RLSCHANN XFR   CTIMAGE,CTI           DROP OP IN
0002F4 39F4   YESCHAIN BOC   SUPO,YESCHAIN         WAIT HERE UNTIL TRAPPED FOR
              *                                    ANOTHER SELECTION OR RESET CHAIN
              *                                    IF SUPPRESS OUT DROPS
0002F5 C9FE            AND   FLAGS,ONES-CHAIN      RESET CHAIN BIT WE FELL THRU
0002F6 62DE            BU    DODES1                GO TO SCAN FOR STATUS OR SOECT734124
0002F7 20DE   BLOUT20  BOC   DBUS,DODES1           BRANCH IF CLEAN STS TO DES EC 734124
0002F8 36E5            BOC   DREG6,CLEANUP         BRANCH IF UNIT CHECK          EC 734124
0002F9 62DC            BU    FROM20                RETURN TO DESELECT            EC 734124
                       ORG   BEGIN+X'300'
******************************* IDLESCAN ***********************************
* IDLESCAN SERVES PRIMARILY THREE FUNCTIONS:                               *
*         1.SCAN FOR CONTROL UNIT ENDS ON BOTH A AND B INTERFACES          *
*         2.SCAN FOR DEVICE ENDS OWED DUE TO DE PRIME BITS BEING SET       *
*         3.MAINTAIN INTERFACE ENABLE/DISABLE SWITCHES                     *
*                                                                          *
* THE PRIOR SEQUENCE DEPICTS THE ACTUAL SCANNING SEQUENCE. THE CONTROL*
* UNIT END LATCH FOR THE LAST SELECTING CHANNEL WILL BE SCANNED FIRST *
* AND THE DEVICE ENDS DUE TO DE PRIMES WILL BE PRESENTED TO INTERFACE *
* A FIRST.                                        IN ALL THE CASES PREV-   *
* IOUSLY MENTIONED, A CONTROL UNIT RESERVED WILL RESULT IN ONLY THE        *
* RESERVING INTERFACE BEING INTERRUPTED FOR THE DURATION OF THE RESERV*
* ALL STATUS WILL BE HELD FOR THE OPPOSITE INTERFACE AND WILL BE PRES-*
* ENTED UPON THE CONTROLLERS RELEASE.                                      *
*   WHEN A DEVICE END HAS BEEN FOUND BY ALU2, ALU1 WILL REQUEST TO         *
* PRESENT STATUS TO THE PROPER INTERFACE. IN THE MEANTIME,ALU2 WILL BE*
* SPINNING ON ALU1'S STAT D WHICH INDICATES ALU2 IS TO RELEASE THE         *
* DEV END PRIME. STAT D WILL BE SET BY ALU1 ONLY WHEN THE CHANNEL          *
* HAS ACCEPTED THE STATUS. SHOULD ALU1 RECEIVE A NON-POLLING INITIAL       *
* SELECTION DURING THE INTERIM, ALU2 WILL BE TRAPPED TO LOCATION 0 AND*
* THE INTERRUPTING DE PRIME WILL NOT BE RESET.                             *
*   AFTER A COMPLETE SCAN HAS BEEN EXECUTED AND NO INTERRUPTABLE STS       *
* FOUND, AN ALU CHECKOUT ROUTINE WILL BE ENTERED. UPON COMPLETION OF       *
* THE ALU CHECKOUT IDLESCAN WILL BE RE-INVOKED. ANY ERROR IN THE ALU       *
* CHECKOUT WILL RESULT IN A MICROCODE FORCED ALU ERROR TRAP                *
*  BOTH INTERFACE CHAIN HOLD LINES WILL ALSO BE MAINTAINED IN IDLE.        *
*  IF ANY STATUS IS FOUND(OUTSTANDING OK COMPLETED) THE CHAIN HOLD         *
*  LINE FOR THE RESPECTIVE INTERFACE WILL REMAIN ON. THE CHAIN HOLD        *
*  LINES BLOCK DISABLING AN INTERFACE IF THE CONTROLLER IS HOLDING ANY*
*  STATUS FOR THAT INTERFACE.                                              *
****************************************************************************
```

```
000300 4011      3829 TROUBLE   XFR   HDWERR               FORCE A HARD ERROR
000301 6301      3832 HANGHERE  BU    HANGHERE             WAIT FOR SIO TIO OR SUMPIN
000302 6302      3835 IDLEPEND  BU    IDLEPEND             WAIT FOR SOMETHING TO HAPPEN
000303 62C0      3838 DRETURNO  BU    DOREQA               GO DEVICE RESERVED TO A.

000304 631F      3842 IDLESCAN  BU    CHKOPIN              BRANCH TO WAIT FOR OPIN FALEC 732423
000305 4150      3845 IDLE      XFR   CTIMAGE,CTI          XFR TO HARDWARE          EC 732423
000306 D906      3848           ANDM  FLAGS,STACK+STATPNDG MASK FOR STACKED AND STS PNDNG
000307 2009      3851           BOC   DBUS,IDLE0           BRANCH IF NOT
000308 62BD      3854           BU    NOTCHAIN             GO RAISE REQ-IN

000309 CBC0      3858 IDLE0     AND   FLAGS2,X'C0'         RESET FRU REG            EC 732421
00030A AB01      3861           ADD   FLAGS2,1             BUMP FRU REG
00030B 23CB      3864           BOC   MIFTR,MIFTR17        BRANCH IF MIS            EC 732421
00030C F506      3867 IDLE1     XOM   PNDSTS,UNITCHK+DEVEND MASK FOR DEP STATUS     EC 732421
00030D 2010      3870           BOC   DBUS,SETSPIN         BRANCH IF IT IS
00030E 8500      3873           ORI   PNDSTS,0             MASK LAST STATUS PRESENTED
00030F 3601      3876           BOC   DREG6,HANGHERE       BRANCH IF UNIT CHECK IS ON

000310 2200      3880 SETSPIN   BOC   ALUR,TROUBLE         BRANCH IF ALU2 HAD AN ERR EC 732421
000311 140B      3884           STO   XOUTBIM,NDXABRT-ALU2BRT SET ALU2 TO INIT      EC 732421
000312 5441      3887 SETSPIN1  XFR   XOUTBIM,XOUTB            TRAP ALU2

000313 3B15      3891 SETSPIN2  BOC   STATD,CLRSTS         WAIT UNTIL
000314 6313      3894           BU    SETSPIN2                 ALU2 FINISHES

000315 0500      3898 CLRSTS    STO   PNDSTS,ZERO          CLEAR PENDING STATUS REG
000316 003F      3901           STO   CURCOMM,ONES-192     INSURE LST CMD IS NOT TIO FOR CUE
                 3903 *                                    SEARCH IN TERMSTAT
000317 2355      3905           BOC   MIFTR,MIFTR09        BRANCH IF MIS AVAILABLE        ***

000318 2A24      3909 ITSRSVD   BOC   STATA,RSTRESET       GO LOOK FOR DEP IF STAT A EC 732421
000319 8808      3912           ORI   STATIMG,SETSTATA     SET 1ST SWITCH ON
00031A 4828      3915           XFR   STATIMG,STAT         SET TO HARDWARE
00031B 62A2      3918           BU    TERMSTA3             GO CHECK FOR CUE ON RESERVED INTF

00031C 1D00      3922 REGINIT   STO   FRUREG,0             CLEAR FRU REG            EC 732423
00031D 0000      3925           STO   CURCOMM,0            CLEAR REG 0 PER XFR5     EC 732423
00031E 6363      3928           BU    CHKONB               RETURN TO RESET          EC 732423
00031F C1EF      3931 CHKOPIN   AND   CTIMAGE,ONES-CUBUSY  RESET CONTROL UNIT BUSY  EC 732423
000320 3820      3934 OPINUP    BOC   OPRIN,OPINUP         WAIT FOR OP IN FALL      EC 732423
000321 6305      3937           BU    IDLE                 RETURN TO IDLE           EC 732423
000322 23DD      3940 CHKONA    BOC   MIFTR,MIFTR18        BRANCH IF MIS AVAILABLE  EC 732423
000323 62BD      3943           BU    NOTCHAIN             GO RAISE REQ-IN          EC 732423

000324 C9F7      3947 RSTRESET  AND   FLAGS,ONES-RESETOK   RESET THE ALL RESET FLAG EC 732421
                 3950 *****************************************************************
                 3951 * DEPRIMES WILL SEARCH ALL DEVICES FOR ANY OUTSTANDING PRIMES AND  *
                 3952 * CHECK THE DEVICE TO SEE IF IT IS STILL BUSY. WHEN A DEVICE IS FOUND *
                 3953 * NOT BUSY,A CHECK WILL BE MADE TO SEE IF IT IS READY. IF READY,THE *
                 3954 * CONTROLLER WILL RAISE REQ-IN TO THE APPROPRIATE PATH AND WAIT FOR *
                 3955 * SELECTION TO PRESENT DEVICE END ALONE. IF NOT READY, DEVICE END,  *
                 3956 * UNIT CHECK WILL BE PRESENTED.                                     *
                 3957 *  DEVICE END PRIMES ARE SET ON ANY CONTROL CMD THAT COMPLETES WITHOUT*
                 3958 * EXCEPTIONAL STATUS, A TIO TO A BUSY DEVICE(DUE TO SWITCHED), AND *
                 3959 * REWIND AND DATA SECURITY ERASE COMMANDS AT CHANNEL END TIME.      *
                 3960 *  ON INITIAL KICKOFF ALU2'S STATS ACTIVE HAVE THE FOLLOWING MEANING: *
                 3961 *             ALU2 STAT B = ALU2 FOUND A DEVICE END PRIME           *
                 3962 *                           FOR THE DESIRED INTERFACE(A OR B)       *
                 3963 *             ALU2 STAT D = ALU2 DID NOT FIND ANY DEP'S FOR THE     *
                 3964 *                           DESIRE INTERFACE.                       *
                 3965 *                                                                   *
                 3966 *  IF ALU2 FOUND A PRIME,THEN THE STATS WILL MEAN:                  *
                 3967 *             ALU1 STAT C = ALU1 HAS SET THE DEVICE ADDRESS PROVIDED *
                 3968 *                           BY ALU2 IN THE TU ADDRESS REG ALONG WITH *
                 3969 *                           SWITCH SELECT.                          *
                 3970 *             ALU2 STAT B = ALU2 FOUND DEVICE WAS STILL BUSY BUT HAS *
                 3971 *                           ANOTHER DEP FOR ANOTHER DEVICE          *
                 3972 *             ALU2 STAT C = ALU2 FOUND DEVICE WAS NOT BUSY BUT READY *
                 3973 *                           WAS DROPPED.                            *
                 3974 *             ALU2 STAT B AND STAT C = ALU2 FOUND DEVICE NOT BUSY   *
                 3975 *                                      AND READY                   *
                 3976 *             ALU2 STAT D = ALU2 HAS NO MORE DEP'S TO CHECK         *
                 3977 *                                                                   *
                 3978 *             ALU2 STAT B AND STAT D = ALU2 FOUND LAST DEVICE BUSY  *
                 3979 *                                      AND NO MORE DEP'S           *
                 3980 *                                                                   *
                 3981 * IF CONTROLLER IS RESERVED ONLY THE DEP'S FOR THE RESERVED INTERFACE *
                 3982 * WILL BE SCANNED.                                                  *
                 3983 *****************************************************************
000325 0800      3985 DEPRIMES  STO   STATIMG,ZERO         CLEAR ALL STATS
000326 0504      3988           STO   PNDSTS,DEVEND        SET DEV END IN PNDING STATUS REG
000327 AB01      3991           ADD   FLAGS2,1             BUMP FRU REG
000328 2362      3994           BOC   MIFTR,MIFTR0C        BRANCH IF MIS AVAILABLE        ***

000329 C9DF      3998 DEPRIM1   AND   FLAGS,ONES-INTFB     RESET INTF B FLAG

00032A 4828      4002 DEPRIM2   XFR   STATIMG,STAT         XFR STATS TO HDWE
00032B 1407      4005           STO   XOUTBIM,NDXPOLL-ALU2BRT  EMIT ALU2 BRANCH ADDRESS ***
00032C 5441      4008           XFR   XOUTBIM,XOUTB        TRAP ALU2

00032D 2B30      4012 DEPRIM3   BOC   STATB,DEPRIM4        BRANCH IF ALU2 FOUND DEP
00032E 3B41      4015           BOC   STATD,DEPRIM7        BRANCH IF ALU2 FINISHED
00032F 632D      4018           BU    DEPRIM3              GO BACK AND LOOK SOME MORE
```

```
000330 4828    4022 DEPRIM4  XFR   STATIMG,STAT        SET STATS TO HDWE
000331 3B41    4025          BOC   STATD,DEPRIM7       BRANCH IF DONE AND BSY DEV

000332 3A40    4029          BOC   STATC,DEPRIMA       BRANCH IF ALU2 FOUND DEV NOT BUSY
000333 4688    4032          XFR   PNDADDR,XINB        FETCH DEP ADDRESS FROM ALU2
000334 4624    4035          XFR   PNDADDR,TUADR       SWITCH SELECT THE DEVICE
000335 8802    4038          ORI   STATIMG,SETSTATC    SET STEP ALU2 STAT
000336 4828    4041          XFR   STATIMG,STAT        XFR IMAGE TO HDWE
000337 C8FD    4044          AND   STATIMG,ONES-SETSTATC RESET STAT C
000338 633C    4047          BU    INSDELAY            BRANCH TO INSERT DELAY

000339 3A3D    4051 DEPRIM5  BOC   STATC,DEPRIM6       BRANCH IF ALU2 FOUND DEV NOT BSY
00033A 2B30    4054          BOC   STATB,DEPRIM4       BRANCH IF ALU2 FOUND DEV BUSY
00033B 3B41    4057          BOC   STATD,DEPRIM7       BRANCH IF ALU2 HAD NO MORE DEP'S
00033C 6339    4060 INSDELAY BU    DEPRIM5             GO BACK AND LOOK FOR ONE OF THE ABOV

00033D 4828    4064 DEPRIM6  XFR   STATIMG,STAT        SET STATS TO HDWE
00033E 2B40    4067          BOC   STATB,DEPRIMA       BRANCH IF ALU2 FOUND DEV NOT BUSY
00033F 8502    4070          ORI   PNDSTS,UNITCHK      SET UNIT CHECK IN STATUS
000340 6322    4073 DEPRIMA  BU    CHKONA              GO RAISE REQ-IN          EC 732423

000341 2200    4077 DEPRIM7  BOC   ALUR,TROUBLE        BRANCH IF ALU2 ERROR
000342 2B48    4080          BOC   STATB,DOHOLDS       BRANCH IF A DEV BSY TO SET HOLD
000343 2368    4083 BMASKED  BOC   MIFTR,MIFTROD       BRANCH IF MIS AVAILABLE          ***
000344 4021    4086 SETHOLDS XFR   CURCOMM,AR          MOVE CHAIN HOLD MASK TO ALU REG
000345 C100    4089          AND   CTIMAGE,0           AND OUT CHAIN HOLD BITS
000346 4150    4092          XFR   CTIMAGE,CTI         SET NEW CHAIN HOLD STATUS TO HDWE
000347 6513    4095 RUNALU   BU    ALUCHECK            GO DO ALU CHECK BEFORE RESCANNING

000348 2385    4099 DOHOLDS  BOC   MIFTR,MIFTR13       BRANCH IF MIS AVAILABLE
000349 8080    4102 MASKFORA ORI   CURCOMM,HOLDA       SET INTF A HOLD
00034A 6343    4105          BU    BMASKED             RETURN

               4110 ************************** HIO NOT OPERATING ***********************
               4111 *THE HIONOP ROUTINE RETURNS THE CU TO IDLE STATUS IF HALT IO OCCURS   *
               4112 *WITH NO OPERATION IN PROGRESS. THE TU IS RELEASED IF NO STS PNDC.    *
               4113 **********************************************************************

00034B C804    4116 HIONOP   AND   STATIMG,SETSTATB    CLEAR STAT IMAGE REG
00034C C1E0    4119 HIONOP2  AND   CTIMAGE,HOLDINT+HOLDA+HOLDB CLEAR TAGS EXCEPT HOLDS
00034D C9FE    4122          AND   FLAGS,ONES-CHAIN    RESET CHAIN FLAG
00034E D986    4125          ANDM  FLAGS,STATPNDG+STACK+CONCON  MASK FOR PENDING STATUS
00034F 2053    4128          BOC   DBUS,HIONOP1        BRANCH IF NO STATUS TO DESELECT
000350 8120    4131          ORI   CTIMAGE,HOLDINT     RAISE HOLD INTF
000351 C400    4134          AND   WORK1,0             CLEAR WORK1
000352 62E5    4137          BU    CLEANUP             S*TP DESELECTING THE DEVICE

000353 62DE    4141 HIONOP1  BU    DODES1              GO DESELECT THE DEVICE

               4144 **********************************************************************
               4145 **************************** HIO OPERATING ***************************
               4146 *THE HIOPERG ROUTINE DROPS THE CU OFF LINE, FIRST RAISING CU BUSY TO  *
               4147 *PROTECT ALU 1 FROM CHANNEL TRAP.                                     *
               4148 **********************************************************************

000354 C9FE    4151 HIOPERG  AND   FLAGS,ONES-CHAIN    RESET THE CHAIN FLAG
000355 4828    4154          XFR   STATIMG,STAT        SET STOP IF APPLICABLE
000356 C1C0    4157          AND   CTIMAGE,HOLDA+HOLDB RESET ALL TAGS EXCEPT CHAIN HOLDS
000357 8130    416C          ORI   CTIMAGE,CUBUSY+HOLDINT MSET BUSY AND INTF HOLD
000358 4150    4163          XFR   CTIMAGE,CTI         DROP CHANNEL TAGS

000359 2859    4167 NOTYET   BOC   ADROUT,NOTYET       WAIT FOR ADDRESS OUT TO FALL
00035A 6294    4170          BU    SETSTOP             GO TO AWAIT ALU 2 COMPLETION
```

(Omitted Nonpertinent Coding)

```
               4487 ***************************** BURST WAIT ******************************
               4488 * BURST WAIT IS USED BY READ, WRITE, AND SENSE OPS TO WAIT FOR ALU2    *
               4489 * FINISH.                                                              *
               4490 * ADDRESS OUT WILL BE MONITORED FOR A HIO CONDITION AND IF HIO IS      *
               4491 * GIVEN OP-IN WILL BE RESET AND THE OPERATION TERMINATED NORMALLY      *
               4492 * DATA FLOW ERRORS,ALU2 ERRORS AND UNIT EXCEPTION CONDITION WILL BE    *
               4493 * SET AS REQUIRED IN ENDING STATUS.                                    *
               4494 ***********************************************************************

0003B0 6294    4497 GOSTOP   BU    SETSTOP             GO SET STOP STAT
0003B1 5441    4500 LETSREAD XFR   XOUTBIM,XOUTB       KICK OFF READ OP
0003B2 8880    4503          ORI   STATIMG,STOP        SET STOP FOR LATER
0003B3 2854    4506 SVCWATE  BOC   ADROUT,HIOPERG      BRANCH IF HIO
0003B4 2DB7    4509          BOC   SVCOUT,BSTWAIT      BRANCH IF SERVICE IN OR OUT
0003B5 3BBB    4512          BOC   STATD,NOSVC         BRANCH IF NO SERVICE
0003B6 63B3    4515          BU    SVCWATE             GO BACK AND DO IT AGAIN

0003B7 2854    4519 BSTWAIT  BOC   ADROUT,HIOPERG      BRANCH IF HIO ISSUED
0003B8 29B0    4522          BOC   CMDOUT,GOSTOP       BRANCH IF CMD OUT IS UP
0003B9 3BBF    4525 BSTWAIT1 BOC   STATD,BSTDONE       BRANCH IF ALU2 COMPLETED
0003BA 63B7    4528          BU    BSTWAIT             GO BACK AND CHECK FOR FINISH
```

```
0003BB 3ABF   NOSVC     BOC    STATC,BSTDONE        BRANCH IF ALU HAD ERROR
0003BC 22DB             BOC    ALUR,ALU2HDER        BRANCH IF ALU ERROR
0003BD 2BBF             BOC    STATB,BSTDONE        BRANCH IF UNIT EXCP
0003BE 8709             ORI    SNSSTS2,RDNOISE+DATACK  NOISE IN SENSE
0003BF 4828   BSTDONE   XFR    STATIMG,STAT         SET STOP TO DATA FLOW
0003C0 22DB             BOC    ALUR,ALU2HDER        BRANCH IF ALU2 HAD HDWE ERROR
0003C1 D00B             ANDM   CURCOMM,X'0B'        MASK FOR SENSE TYPE COMMAND
0003C2 20D9             BOC    DBUS,BSTWAIT2        BRANCH IF SO
0003C3 D001             ANDM   CURCOMM,1            MASK FOR WRITE TYPE COMMAND
0003C4 37CF             BOC    DREG7,CHEKB          BRANCH IF SO

0003C5 DC6C             ANDM   SETDIA1,DMR+IBGMSR+RDACC+RDSTOP CHK DIAGNOSTIC BITS
0003C6 20CF             BOC    DBUS,CHEKB           BRANCH IF OFF
0003C7 31D6             BOC    DREG1,CHEKSNS        BRANCH IF IBG MSR
0003C8 32D6             BOC    DREG2,CHEKSNS        BRANCH IF READ ACCESS

0003C9 4E88             XFR    SETCNT1,XINB         OTHERWISE FETCH MODULO CNT FROM ALU2
0003CA 4421             XFR    WORK1,AR             MOVE ALU1 MODULO TO ALU INPUT REG
0003CB EE00             XO     SETCNT1,0            COMPARE BOTH MODULO COUNT
0003CC 20D6             BOC    DBUS,CHEKSNS         BRANCH IF SAME
0003CD 8704   HADOVERN  ORI    SNSSTS2,OVERUN       SET OVERUN BIT IN SENSE DATA
0003CE 63DC             BU     SETUNTCK             GO SET EQUIP CHK

0003CF 2BDF   CHEKB     BOC    STATB,ALU2UNEX       BRANCH IF ALU2 SIGNALLED UX

0003D0 DD80   CHKUNCHK  ANDM   SETDIA2,BLKDC        MASK TO CHEK BLOCK DATA CHEK FLAG
0003D1 30D9             BOC    DREG0,BSTWAIT2       BRANCH IF ON TO BYPESS
0003D2 28F0             BOC    ADROUT,ENDHIO        BRANCH IF HIO
0003D3 3AE1   CHKALU2   BOC    STATC,DATCHECK       BRANCH IF ALU2 SIGNALLED UC
0003D4 27E1             BOC    DFLER,DATCHECK       BRANCH IF ANY DATA FLOW ERRORS

0003D5 3FCD   CHKOVRN   BOC    OVERRUN,HADOVERN     GO SET EQUIP CHK IF OVERRUN
0003D6 9700   CHEKSNS   ORM    SNSSTS2,0            MASK SENSE DATA FOR ERRORS
0003D7 20D9             BOC    DBUS,BSTWAIT2        BRANCH IF NO ERRORS
0003D8 63DC             BU     SETUNTCK             SENSE ERRORS--SET UNIT CHECK

0003D9 850C   BSTWAIT2  ORI    PNDSTS,CHANEND+DEVEND POST CE AND DE IN STATUS
0003DA 63DD             BU     SETPNDG              GO SET STS PENDING

0003DB 8710   ALU2HDER  ORI    SNSSTS2,EQUIPCK      SET EQUIPMENT CHECK IN SENSE
0003DC 850E   SETUNTCK  ORI    PNDSTS,CHANEND+DEVEND+UNITCHK SET CE,DE,AND UC IN STATUS
0003DD 8904   SETPNDG   ORI    FLAGS,STATPNDG       SET STATUS PENDING FLAG
0003DE 6299             BU     TERMSTAT             GO TO TERMINAL STATUS

0003DF 8501   ALU2UNEX  ORI    PNDSTS,UNITEXC       SET UNIT EXEPTION IN STATUS
0003E0 63D0             BU     CHKUNCHK             GO LOOK FOR UNIT CHECK

0003E1 D288   DATCHECK  ANDM   XOUTAIM,RDRDB+CONTROL
0003E2 20E8             BOC    DBUS,SKIPNOIS        BRANCH IF NOT A READ OP
0003E3 30E8             BOC    DREG0,SKIPNOIS       BRANCH IF READ CONTROL CMD
0003E4 F00C             XOM    CURCOMM,X'0C'        IS THIS A RDB OP
0003E5 20ED             BOC    DBUS,ISLDPT          BR IF SO

0003E6 4490   FTCHNOIS  XFR    WORK1,XINA           FETCH NOISE BIT IF APPLICABLE
0003E7 4421             XFR    WORK1,AR             MOVE TO ALU INPUT REG

0003E8 27EB   SKIPNOIS  BOC    DFLER,DODATCK        BRANCH IF DATA FLOW ERROR   EC 732423
0003E9 8700             ORI    SNSSTS2,0            OTHERWISE SET NOISE ONLY    EC 732423
0003EA 63DC             BU     SETUNTCK             GO SET UNIT CHECK           EC 732423
0003EB 8708   DODATCK   ORI    SNSSTS2,DATACK       SET NOISE AND DATA CHECK    EC 732423
0003EC 63DC             BU     SETUNTCK             GO SET UNIT CHECK           EC 732423
0003ED D410   ISLDPT    ANDM   WORK1,BOT            IS LOAD POINT ON
0003EE 20E6             BOC    DBUS,FTCHNOIS        BR IF NOT
0003EF 63E8             BU     SKIPNOIS             SKIP NOISE THIS TIME

0003F0 E111   ENDHIO    XO     CTIMAGE,OPIN+CUBUSY  RESET OP IN RAZE CUB
0003F1 4150             XFR    CTIMAGE,CTI          SET TO HARDWARE
0003F2 63D3             BU     CHKALU2              RETURN TO CHECK UNIT CHK COND

                ***************************** COMMAND REJECT ****************************
                *  COMMAND REJECT IS ENTERED AFTER OPENERS AND IF AN INVALID OP CODE   *
                * WAS RECEIVED AT CMD OUT TIME. SENSE DATA WILL BE RESET AND CMD RJCT  *
                * SENSE SET UP. THIS ROUTINE WILL NOT BE ENTERED IF OPENERS FINDS ANY  *
                * PENDING STATUS.
                ************************************************************************

0003F3 140F   COMREJC1  STO    XOUTBIM,NDXSNSR-ALU2BRT FETCH ALU2 SENSE RESET INDEX
0003F4 5441             XFR    XOUTBIM,XOUTB        KICK OFF ALU2
0003F5 8801             ORI    STATIMG,SETSTATD     SET STATD TO INDICATE SNS RESET
0003F6 4828             XFR    STATIMG,STAT         SET TO HARDWARE
0003F7 0700             STO    SNSSTS2,0            CLEAR SENSE REG 2
0003F8 4012             XFR    CLEAR                RESET DATA FLOW ERRORS
0003F9 8780             ORI    SNSSTS2,CMDREJ       POST CMD REJECT
0003FA 0502             STO    PNDSTS,UNITCHK       POST UNIT CHECK
0003FB 8904             ORI    FLAGS,STATPNDG       POST STATUS PENDING
0003FC 60C0             BU     PENDLINK
0003FD 2298   BLOWOUT1  BOC    ALUR,HRDRST          BRANCH IF ALU ERROR         EC 732421
0003FE 0700             STO    SNSSTS2,0            OTHERWISE CLEAR SENSE       EC 732421
0003FF 6398             BU     HRDRST               RETURN                      EC 732421
```

(Omitted Nonpertinent Coding)

```
                 6060 ***************************** SET DIAGNOSE CMD ************************
                 6061 * DOSETDIA WILL FETCH FOUR BYTES FROM THE CHANNELAND SAVE THEM FOR     *
                 6062 * USE LATER. THE FIRST BYTE WILL BE PASSED TO ALU2 AND IF THE FORCE   *
                 6063 * ALU ERRORS FLAG IS ON. IF THE GDT FLAG IS ON ALU1 WILL TIME OUT THE *
                 6064 * TIME SPECIFED IN THE LAST TWO BYTES. THIS ROUTINE IS ENTERED WHEN  *
                 6065 * THW CHANNEL ISSUES A SET DIAGNOSE COMMAND                          *
                 6066 *********************************************************************

000578 4CA0      6069 DOSETDIA XFR  SETDIA1,CBO         FETCH FIRST BYTE
000579 140E      6072          STO  XOUTBIM,NDXFLAGS-ALU2BRT LOAD ALU2 INDEX
00057A 4C42      6075          XFR  SETDIA1,XOUTA       PASS 1ST BYTE TO ALU2
00057B 5441      6078          XFR  XOUTBIM,XOUTB       TRAP ALU2 TO FETCH BYTE
00057C 1002      6081          STO  LINK1,BRETURN4      SET BYTE RECEIVED RETURN
00057D 1194      6084          STO  LINK2,SETSTOP       SET STOP RETURN
00057E 1283      6087          STO  LINK3,WRTHIO        SET HIO RETURN
00057F 1386      6090          STO  LINK4,SAV1FCH2      SET ROUTINE LINK
                 6092 *********************************************************************
                 6093 *GOFETCH RESETS SERVICE IN FROM THE LAST BYTE FETCH AND LINKS TO    *
                 6094 *THE SERVICE SUBROUTINE                                             *
                 6095 *********************************************************************
000580 4150      6097 GOFETCH  XFR  CTIMAGE,CTI         DROP SERVICE IN
000581 620A      6100          BU   SERVRTN             GO GET NEXT BYTE
                 6103 *********************************************************************
                 6104 *DIALINK IS THE COMMON RETURN FROM THE SERVICE ROUTINE. LINK REG 4  *
                 6105 *WILL BE LOADED TO RETURN TO THE APPROPRIATE BYTE FETCH             *
                 6106 *********************************************************************

000582 2484      6109 DIALINK  BOC  BOPE,SETBOPE        BRANCH IF BUS OUT PARITY BAD
000583 5322      6112          XFR  LINK4,IC            RETURN TO BYTE FETCH
000584 8720      6115 SETBOPE  ORI  SNSSTS2,BUSOC       SET BUS OUT CHECK
000585 5322      6118          XFR  LINK4,IC

                 6121 *** SAVE BYTE 1--FETCH BYTE 2
000586 4DA0      6123 SAV1FCH2 XFR  SETDIA2,CBO         GO GET BYTE 1
000587 1389      6126          STO  LINK4,SAV2FCH3      POINT TO NEXT FETCH
000588 6580      6129          BU   GOFETCH             GO GET EM

                 6132 *** SAVE BYTE2--FETCH BYTE 3
000589 4EA0      6134 SAV2FCH3 XFR  SETCNT1,CBO         GO GET BYTE 2
00058A 1410      6137          STO  XOUTBIM,NDXFLAG2-ALU2BRT
00058B 4E42      6140          XFR  SETCNT1,XOUTA       MOVE FLAGS TO XOUTA
00058C 5441      6143          XFR  XOUTBIM,XOUTB       KICK OFF ALU2 TO FETCH FLAGS
00058D 138F      6146          STO  LINK4,SAV3NOFC      POINT TO NEXT SAVE--NOFETCH
00058E 6580      6149          BU   GOFETCH             GO GET EM

                 6152 *** SAVE BYTE 3 DROP SERVICE IN
00058F 4FA0      6154 SAV3NOFC XFR  SETCNT2,CBO         GO GET BYTE 3
000590 4150      6157          XFR  CTIMAGE,CTI         DROP SERVICE IN

                 6160 ***LOOK FOR GDT FLAG AND, IF ON, TIME OUT PRIOR TO PRESENTING STATUS
000591 DC10      6162          ANDM SETDIA1,GDT         MASK TO CHECK GO DOWN TIME FLAG
000592 209D      6165 PRSNTSTS BOC  DBUS,GIVSTS         BRANCH IF OFF
000593 0400      6168          STO  WORK1,0             CLEAR WORK REG(LOWEST CNTR)
000594 A401      6171 INCAGN   ADD  WORK1,1             BUMP LOWEST COUNTER (400 NANOSECS)
000595 289E      6174          BOC  ADROUT,GDTHIO       HIO IF UP
000596 2194      6177          BOC  NALCO,INCAGN        BRANCH IF NO CARRY TO BUMP AGAIN
000597 AFFF      6180          ADD  SETCNT2,ONES        DECREMENT LO CNTR (103.150 USECS)
000598 219A      6183          BOC  NALCO,DECHICNT      BRANCH IF NO CARRY TO DECR HI CNTR
000599 6594      6186          BU   INCAGN              OTHERWISE, GO BUMP LOWEST AGAIN
00059A AEFF      6189 DECHICNT ADD  SETCNT1,ONES        DECREMENT HI CNTR (27 MSECS)
00059B 219D      6192          BOC  NALCO,GIVSTS        GET OUT IF NO CARRY (PRESENT STATUS)
00059C 6594      6195          BU   INCAGN              OTHERWISE GO DO IT ALL AGAIN
00059D 63D6      6198 GIVSTS   BU   CHEKSNS             GO ASSEMBLE ENDING STATUS
00059E 6354      6201 GDTHIO   BU   HIOPERG             GET OUT HIO ISSUED

00059F 6203      6205 WRTINIT  BU   WRTBGN              RETURN TO WRITE ROUTINE
0005A0 63B1      6208 DOAREAD  BU   LETSREAD            GO START READ OP

                 6211 *********************************************************************
                 6212 * CLEANGO OCCURS WHEN CLEAN INITIAL STATUS IS ACCEPTED
                 6213 *********************************************************************

0005A1 4150      6216 CLEANGO  XFR  CTIMAGE,CTI         DROP STATUS IN
0005A2 4242      6219          XFR  XOUTAIM,XOUTA       SET DATA FLOW MASK TO HDWE
0005A3 4828      6222          XFR  STATIMG,STAT        RESET STAT D IF ON
0005A4 289F      6225 SVCOUP   BOC  ADROUT,WRTINIT      BRANCH IF HIO
0005A5 2DA4      6228          BOC  SVCOUT,SVCOUP       WAIT FOR SERVICE OUT TO DROP
0005A6 9000      6231          ORM  CURCOMM,0           MASK FOR BRANCHING
0005A7 379F      6234          BOC  DREG7,WRTINIT       BRANCH IF WRITE OR TIE REQUEST
```

(Omitted Nonpertinent Coding)

MPUY (ALU-2) PARTIAL MICROCODE LISTING

```
 LOC    OBJECT      STMT   SOURCE STATEMENT
000000  CODE         837+BEGIN    CSECT
```

```
                   839 ALU2TBLE VECT1
                   840+*****************************************************************
                   841+********************** ALU2 ROS ENTRY BRANCH TABLE ****************
                   842+*****************************************************************
                   843+*    ALU2 IS ALWAYS SLAVED TO ALU1. ANY OPERATION EXECUTED BY ALU2  *
                   844+*    MUST ALWAY BE INITIATED BY ALU1 VIA A XOUTB. THE XOUTB BY ALU1 *
                   845+*    TRAPS ALU2 TO LOCATION 000. ALU2,BEGINNING EXECUTION AT 000,   *
                   846+*    FETCHES AN INDEX BYTE FROM ALU1 AND MOVES IT TO THE INSTRUCTION *
                   847+*    COUNTER. THE INDEX BYTE WILL POINT TO ONE OF THE BRANCH INSTRUCT- *
                   848+*    IONS IN THE BRANCH TABLE. THE SELECTED BRANCH INST WILL BE      *
                   849+*    EXECUTED AND THE DESIRED ROUTINE WILL BE ENTERED. WHEN THE      *
                   850+*    SELECTED ROUTINE COMPLETES, STAT D WILL BE SET INDICATING TO    *
                   851+*    ALU1 THAT THE DESIRED FUNCTION HAS BEEN COMPLETED. ALU2 WILL THEN *
                   852+*    BE HELD AT LOCATION 000 UNTIL ACTUATED BY ALU1 VIA XOUTB TRAP   *
                   853+*****************************************************************

000000 4188        856 BYPASS     XFR   WORK2,XINB          FETCH ALU1 INDEX
000001 0400        859            STO   STATIMG,ZERO        CLEAR STAT IMAGE REG
000002 1400        862            STOH  STATIMG,0           CLEAR STAT IMAGE REG HIGH
000003 4428        865            XFR   STATIMG,STAT        CLEAR ANY OUTSTANDING STATS
000004 4122        868            XFR   WORK2,IC            MOVE INDEX TO INST CTR
000005 655B        871 NDXTST3    BU    EXECTST3            GO DO ALU 2 CHECKOUT
000006 61AC        874 NDXDES     BU    EXECDES             HIO NOT OPRTING--GO DESELECT TU
000007 634D        877 NDXPOLL    BU    EXECPOLL            GO POLL DEVICE FOR STATUS
000008 6193        880 NDXGRST    BU    EXECGRST            GO DO GENERAL RESET
000009 6199        883 NDXSRST    BU    EXECSRST            GO DO SELECTIVE RESET
00000A 61EC        886 NDXSDE     BU    EXECSDE             GO SET DEVICE END
00000B 61BC        889 NDXABRT    BU    EXECABRT            GO STOP THE DEVICE IF GOING
00000C 6529        892 NDXDMR     BU    EXECDMR             GO DO DIAG MEASERE
00000D 6553        895 NDXAXESS   BU    ACCESS              GO GET READ ACCESS TIME
00000E 4590        898 NDXFLAGS   XFR   FLAGS,XINA          BRING IN FLAG BYTE
00000F             900+NDXSNSR    EQU   *
00000F 619B        902 SRETURN7   BU    ZAPIM          USE ON SENSE RESET & SEL RESET RETURN
000010 5590        905 NDXFLAG2   XFR   WORK5,XINA          GET TUBO MASK (SET FLAGS #3)
000035             907+NDXFSF     EQU   X'35' .             GO DO FORWARD SPACE FILE
000031             908+NDXERS     EQU   X'31' .             GO DO ERASE TO END OF TAPE(EOT)
000037             909+NDXFSR     EQU   X'37' .             GO DO FORWARD SPACE RECORD
000033             910+NDXRDF     EQU   X'33' .             GO DO READ FORWARD
00003C             911+NDXBSF     EQU   X'3C' .             GO DO BACKSPACE FILE
00003E             912+NDXBSR     EQU   X'3E' .             GO DO BACKSPACE RECORD
00003A             913+NDXRDB     EQU   X'3A' .             GO DO READ BACKWARD
000013             914+NDXWRT     EQU   X'13' .             GO DO WRITE OPERATION
000020             915+NDXWTM     EQU   X'20' .             GO DO WRITE TAPE MARK
000022             916+NDXERG     EQU   X'22' .             GO 40 ERASE RECORD GAP
00002F             917+NDXRWD     EQU   X'2F' .             GO DO REWIND
000029             918+NDXRWU     EQU   X'29' .             GO DO REWIND UNLOAD
0000ED             919+NDXSTS     EQU   X'ED' .             GO DO INITIAL STATUS
0000E1             920+NDXSNS     EQU   X'E1' .             GO DO SENSE OP
000011 0401        923 SETDLONE   STO   STATIMG,SETSTATD    TURN ON STATD
000012 4428        926            XFR   STATIMG,STAT        AND STOP

                   929 ************************* WRITE ROUTINE ***************************
                   930 *  INITIAL ENTRY ON WRITE COMMANDS EITHER PE, NRZI OR LWR EITHER   *
                   931 *  DENSITY. THE COMMAND IS SET IN REGISTER WORK4 AND REGISTER LINK1 *
                   932 *  CONTAINS THE ADDRESS OF THE ENTRY TO THE WRITE ROUTINE IN 'PAGE 2' *
                   933 *  PART OF THIS ROUTINE IS SHARED BY WTM AND ERG ROUTINES          *
                   934 *****************************************************************

000013 0800        937 EXECWRT    STO   TRACER,ZERO         SET IDENTITY
000014 0308        940 SETUP      STO   WORK4,WRITE         SET WRITE COMMAND
000015 1C01        943            STO   LINK1,WRTSTR        SET RETURN ENTRY
000016 3A18        946 TESTLWR    BOC   STATC,SETLPCMD      BR IF LWR OR LWTM
000017 613C        949            BU    TRNARND             BR TO TURNAROUND

                   952 *****************************************************************
                   953 *  STATC ON FROM ALU1 INDICATES A LWR OR LWTM.                    *
                   954 *  THE COMMAND IS SET TO ALLOW TURN-AROUND ROUTINE TO PROCESS THE  *
                   955 *  COMMAND AND SET DATA FLOW MASKS. THERE WILL NOT BE ANY TURNAROUND *
                   956 *  DELAYS TAKEN.
                   957 *****************************************************************

000018             959 SETLPCMD   EQU   *
000018 0328        961 WRSTALP    STO   WORK4,WRITE+SETDIAG   SET WRITE AND DIAG CMD
000019 C6EF        964            AND   SENSE1,ONES-BOT      TURN OFF BOT IF ON
00001A 341D        967            BOC   WRTSTAT,GOTURN       BR WRITE STATUS
00001B 301E        970            BOC   BACKWD,RDBKLP        BR BACKWARD STATUS
00001C 0360        973            STO   WORK4,RDFWDD+SETDIAG   SET READ FWD AND DIAG CMD
00001D 613C        976 GOTURN     BU    TRNARND             GO TO TURNAROUND
00001E 03A0        979 RDBKLP     STO   WORK4,RDBKWD+SETDIAG   SET READ BKWD AND DIAG CMD
00001F 613C        982            BU    TRNARND             GO TO TURNAROUND

                   985 ********************** WRITE TAPE MARK ROUTINE ********************
                   986 *  INITIAL ENTRY ON WRITE TAPE MARK COMMAND EITHER PE, NRZI        *
                   987 *  OR LOOP WRITE TAPE MARK.                                        *
                   988 *  THE WTM TRACE BIT IS SET ON IN TRACER REGISTER AND THEN         *
                   989 *  A BRANCH IS MADE TO SHARE THE REST OF THE SET UP WITH           *
                   990 *  THE WRITE ROUTINE.                                              *
                   991 *****************************************************************
000020 0802        993 EXECWTM    STO   TRACER,WTMOP        SET ROUTINE IDENTITY
000021 6014        996            BU    SETUP               GO GET GOING
```

```
                   999 ************************* ERASE RECORD GAP ****************************
                  1000 *  INITIAL ENTRY FOR ERASE GAP OP. THE REG TRACE BIT IS SET                *
                  1001 *  IN THE TRACER REGISTER AND A BRANCH MADE TO SHARE THE REST OF THE        *
                  1002 *  SETUP WITH THE WRITE ROUTINE.                                            *
                  1003 *  AFTER VELOCITY IS ATTAINED A RETURN WILL BE MADE TO 'ERGSIR'             *
                  1004 *  (PE) OR 'SETERGF' (NRZI) AT WHICH TIME THE COUNT AND FLAGS               *
                  1005 *  WILL BE SET TO COMPLETE THE ERASE OP. THE TAPE WILL BE ERASED FOR        *
                  1006 *  APPROX. 4.2 IN.                                                          *
                  1007 *  THE TAK ROUTINE WILL DO THE COUNTING OF TACH PULSES AND ALSO             *
                  1008 *  MONITER THE TU BUS IN TO ASSURE NO DATA IS PRESENT. IF ANY DATA          *
                  1009 *  IS DETECTED THEN NOISE ERROR WILL BE SET.                                *
                  1010 *                                                                           *
                  1011 *  THERE ARE 106 TACH PULSES PER IN.                                        *
                  1012 ***************************************************************************
000022 0804       1015 EXECERG  STO   TRACER,ERGOP          SET ERASE GAP OPERATION FLAG
000023 6014       1018          BU    SETUP                  GO CONTINUE SET UP

000024 19ED       1022 ERGSIR   STO   LINK2,GOENDUP         SET UP RETURN TO ENDUP
000025 01B4       1025 ERGCTR   STO   WORK2,ONES-75         SET COUNT FOR 336
000026 00FE       1028          STO   WORK1,ONES-1          TAC COUNTS
000027 8810       1031 SETERGF  ORI   TRACER,ERGFLAG        SET FLAG TO CHECK FOR ERROR
000028 62CA       1034          BU    TAKS                  GO TO TAK RTN

                  1037 ******************* REWIND OR REWIND UNLOAD ***************************

                  1039 *  REWIND, REWIND UNLOAD AND DATA SECURITY ERASE SHARE A                    *
                  1040 *  COMMON ROUTINE. THE ENTRY POINTS VARY SO THE COMMAND                     *
                  1041 *  CAN BE SET IN WORK4. REWIND UNLOAD WILL SET STAT C ON                    *
                  1042 *  THEN STAT A IS SET TO IDENTIFY THESE THREE COMMANDS TO                   *
                  1043 *  TURNAROUND ROUTINE AND TO ENDUP ROUTINE.                                 *
                  1044 ***************************************************************************
000029 0380       1046 EXECRWU  STO   WORK4,RUN             LOAD REWIND UNLOAD CMD
00002A 8402       1049          ORI   STATIMG,SETSTATC       FLAG UNIT CHK
00002B 1CC1       1052 LKREWRUN STO   LINK1,ENDUP           SET RETURN ADDRESS AFTER CMD EXEC
00002C 8408       1055 CTRLSETA ORI   STATIMG,SETSTATA      SET STATA ON TO
00002D 4428       1058          XFR   STATIMG,STAT           INDICATE REW, RUN OR DSE
00002E 613C       1061 SCOOT    BU    TRNARND               GO TO TURNA ROUND


00002F 0301       1065 EXECRWD  STO   WORK4,REWIND          LOAD REW CMD
000030 602B       1068          BU    LKREWRUN              GO SET LINKAGE REG & STAT A

                  1071 *********************** DATA SECURITY ERASE **************************
                  1072 *  INITIAL ENTRY FOR DATA SECURITY ERASE OP.                                *
                  1073 *  THE COMMAND IS SET IN WORK 4 REGISTER AND A BRANCH IS                    *
                  1074 *  MADE TO SHARE THE SETUP WITH REWIND AND REWIND                           *
                  1075 *  IF ALL TESTS ARE OK. THE DRIVE WILL THEN CONTINUE TO ERASE               *
                  1076 *  TO END OF TAPE.                                                          *
                  1077 ***************************************************************************

000031 0304       1080 EXECDSE  STO   WORK4,ERGTOTI         PUT CMD IN LSR
000032 602B       1083          BU    LKREWRUN              GO SET STATA ON
                  1092 *               *** ***  **** *  *      *  * ***                          *
                  1093 *               * *  *   . *  * *  *    *  * *                            *
                  1094 *               *  * **** *  * ***       **  *                            *
                  1095 ***********READ OPERATION  INPUT BRANCH TABLE*****************************
                  1096 *                                                                         *
                  1097 * DEPENDING ON THE TYPE OF OPERATION- ONE OF THE SIX INPUT LEGS WILL      *
                  1098 * BE SELECTED. EACH LEG  STORES AN APPROPRIATE TRACER ( NOT CE TRACE )*
                  1099 * TO ENABLE THE MICROPROGRAM TO KEEP TABS ON WHAT IT IS DOING..THE SIX*
                  1100 * INPUT LEGS AND THE TRACERS THEY SET ARE;                                *
                  1101 *          1.     READ BACKWARD        TRACER 6                          *
                  1102 *          2.     READ FORWARD         TRACER 6                          *
                  1103 *          3.     BACKSPACE FILE       TRACER 5                          *
                  1104 *          4.     FORWARD SPACE FILE   TRACER 5                          *
                  1105 *          5.     BACKSPACE RECORD     TRACER 7                          *
                  1106 *          6.     FORWARDSPACE RECORD  TRACER 7                          *
                  1107 *                                                                         *
                  1108 *           TRACE REG                                                     *
                  1109 *           0 CREASER                                                     *
                  1110 *            1 BOR TRACE                                                  *
                  1111 *             2 REW OP                                                    *
                  1112 *              3 IBGTRACE                                                 *
                  1113 *               4 TACH TRACE                                              *
                  1114 *                5 FILE OP                                                *
                  1115 *                 6 READ OP                                               *
                  1116 *                  7 SPACE OP                                             *
                  1117 ***************************************************************************


000033 0802       1120 EXECRDF  STO   TRACER,READOP         TURN ON THE READ TRACER
000034 6038       1123          BU    SETFWD
000035 0804       1127 EXECFSF  STO   TRACER,X'04'           TURN ON FILE TRACER
000036 6038       1130          BU    SETFWD
000037 0801       1134 EXECFSR  STO   TRACER,SPACEOP        TURN ON SPACE TRACER
                  1137 ***************************************************************************
                  1138 * NOW THAT THE OP TRACERS ARE STORED, PUT THE PROPER READ  COMMAND      *
                  1139 * IN WORK4 AND BRANCH TO START TAPE MOTION.                              *
                  1140 ***************************************************************************

000038 0340       1143 SETFWD   STO   WORK4,RDFWDD           SET RD FWD TO LSR
000039 6040       1146          BU    CHGDIREC              ALL SET,GO AHEAD

00003A 0802       1150 EXECRDB  STO   TRACER,READOP          TRN ON READ TRACER
00003B 603F       1153          BU    SETBKWD
00003C 0804       1156 EXECBSF  STO   TRACER,FILEOP          TRN ON THE FILE TRACER
```

```
00003D 603F               BU    SETBKWD
00003E 0801     EXECBSR   STO   TRACER,SPACEOP        TRN ON THE SPACE TRACER
00003F 0380     SETBKWD   STO   WORK4,RDBKWD          SET RD BKWD TO LSR
000040 1CC4     CHGDIREC  STO   LINK1,TRETRD          SET UP RETURN REG
000041 613C               BU    TRNARND               AND BR TO TURNAOUND
                ***********************************************************************
                * THIS IS THE RETURN POINT FROM TURNAROUND ROUTINE.  AT THIS POINT   *
                * THE TAPE UNIT HAS ACCEPTED THE READ COMMAND AND IS UP TO SPEED.    *
                *
                ***********************************************************************

                STARTAPE  ORM   SENSE1,0              SEE IF BOT IS ON
000042 9600               BOC   DREG3,LPBURST       - BR IF IT IS
000043 334A               ORM   SENSE2,0              GET SNS TO DBUS FOR TEST
000044 9700               BOC   NOTPE,ISNRZI2         BR IF NRZI UNIT
000045 3347               BU    READTAPE              NO BOT, LOOK FOR DATA
000046 605E     ISNRZI2   BOC   NRZFEAT,ISNRZI        BR IF NRZI FEATURE IS INSTALLED
000047 2303
                *                ***** SET NOT CAPABLE *****

000048 1801     NOTCOMP   STO   MPGMERR,NOTCAP        SET NOT CAPABLE
000049 61C0     GOEND     BU    CLRXOUTA              STOP
                ***********************************************************************
                *          READ  FROM  LOAD  POINT                                   *
                ***********************************************************************
                * TAPE MOTION STARTED AT LOAD POINT--SO LOOK FOR LOAD POINT BURST. IF *
                * NONE,OR NOT LONG ENOUGH, SET NRZI MODE TO DATA FLOW.  IF NO NRZI  *
                * FEATURE,SET NOT CAPABLE.
                ***********************************************************************

00004A 00FE     LPBURST   STO   WORK1,X'FE'           SET UP TO MOVE TAPE
00004B 01D4               STO   WORK2,X'D4'             THREE INCHES
00004C 19F1               STO   LINK2,TRETURN1        SET UP RETURN REG  (READLP)
00004D 62CA     CRETEST   BU    ZEROCTR               GO CT 300 TACH PULSES

                ***********************************************************************
                * ON RETURN FROM TACH ROUTNE,WE WILL INTERROGATE THE PTE BRANCH      *
                * CONDITION FOR 1792 BIT CELLS. OF THIS 512 BIT CELLS MUST BE PTE TO *
                * ALLOW THE READ TO PROCEED IN PE MODE.  MORE THAN 1280 BIT CELLS OF *
                * NO PTE WILL DROP US OUT OF OUR COUNT LOOP AND ATTEMPT SET OF 800   *
                * BPI.  BASICALLY,THIS ROUTINE CONSISTS OF TWO COUNTERS (EACH SPANS 2 *
                * LSR) WHICH VIE FOR INCREMENTATION.  THE FIRST TO OVERFLOW DETER-   *
                * MINES  THE OPERATING MODE.                                         *
                ***********************************************************************

00004E 09FE     READLP    STO   FRU,ONES-1            CNT IS 512 BIT CELLS
00004F 03FB               STO   WORK4,ONES-4          CNT IS 1280 BIT CELLS

000050 2450     OKALREDY  BOC   RDTIME,OKALREDY       WAIT FOR READ TIME TO FALL
000051 2C5A               BOC   PTE,COUNTLPB          BR IF PTE IS ON
000052 A001               ADD   WORK1,1               BUMP CTR BY ONE
000053 2158               BOC   NALCO,WAITACEL
000054 A301               ADD   WORK4,1               BUMP CTR BY ONE
000055 2158               BOC   NALCO,WAITACEL        BR IF NO OVERFLOW
000056 23BA               BOC   NRZFEAT,SET800        GO SET NRZI
000057 6048               BU    NOTCOMP               NRZI NOT INSTALLED- SET NOT CAPABLE
000058 2450     WAITACEL  BOC   RDTIME,OKALREDY       WAIT FOR READTIME
000059 6058               BU    WAITACEL                TO BECOME ACTIVE

00005A A101     COUNTLPB  ADD   WORK2,1               BUMP CTR BY ONE
00005B 2158               BOC   NALCO,WAITACEL        BR IF NO OVERFLOW
00005C A901               ADD   FRU,1                 BUMP CTR BY ONE
00005D 2158               BOC   NALCO,WAITACEL        BR IF NO OVERFLOW
                ***********************************************************************
                *          PE  READ  --  NOT LOAD POINT                              *
                ***********************************************************************
                * THIS IS THE ENTRY POINT IF BOT IS NOT ON IN TU SENSE      BYTE 0.  *
                * HERE WE CYCLE  UNTIL A BOR,TU INTERRUPT,TAPE MARK OR IBG DROPS US  *
                * OUT OF THE LOOP. A TM WILL NOT DROP US OUT  OF THE LOOP UNTIL WE   *
                * ARE SATISFIED THAT IT IT A TRUE TAPE MARK (20 CELLS OF TM BOC).
                ***********************************************************************

00005E 8440     READTAPE  ORI   STATIMG,PERMRDWT      SET READ CONDITION
00005F 4428               XFR   STATIMG,STAT            TO DATA FLOW
000060 10C0               STOH  WORK1,X'C0'           SET GATES FOR READ DET 10 PER CT
000061 5060               XFRH  WORK1,TUBO              ON RECORD SPACE OR FILE OP
000062 0101               STO   WORK2,1               SET NOISE BIT FOR ALU1
000063 00EC     SETUXCNT  STO   WORK1,ONES-19         SET CNT FOR 20 BIT CELLS
000064 09FA               STO   FRU,ONES-5            SET  NOISE RECORD BYPASS
000065 2467     CHKCLOCK  BOC   RDTIME,CHKBOR         WAIT FOR READTIME
000066 6065               BU    CHKCLOCK                TO RISE
000067 2E72     CHKBOR    BOC   BOR,TRACEBOR          BR ON BOR
000068 3FB4     CHKINTPT  BOC   DEVATTN,ABORTRD       BR ON TU INTERRUPT
000069 3D8D               BOC   TM,TMCONFIG           BR IF TAPE MARK DET
00006A 2F93     CHKIBG    BOC   IBG,IBGYES1           BR IF IBG IS ON
00006B 3C6E               BOC   BLOCK,BLOCKCHK          BR ON DATA DETECTED
00006C 246C     CLOKWAIT  BOC   RDTIME,CLOKWAIT       WAIT FOR READTIME
00006D 6065               BU    CHKCLOCK                TO FALL

00006E A901     BLOCKCHK  ADD   FRU,1                 BUMP BYPASS CNT BY 1
00006F 216C               BOC   NALCO,CLOKWAIT        RETURN ON NO CARRY
000070 8810               ORI   TRACER,IBGMARK        TURN ON IBGTRACE
000071 606C               BU    CLOKWAIT              RETURN
```

```
                  1365 ***************************************************************
                  1366 * A BOR DETECTED WILL GET US HERE , BUT IF WE  ARE  NOT A READ OP    *
                  1367 * WE WILL RETURN TO THE ORIGINAL LOOP.                               *
                  1368 ***************************************************************
000072 8840       1370 TRACEBOR ORI   TRACER,BORMARK      TURN ON BOR TRACE BIT
000073 3679       1373          BOC   READOP,READYES      BR IF A READ OP
000074 6068       1376          BU    CHKINTPT            GO BACK TO STARTING LOOP
                  1381 ***************************************************************
                  1382 * WE ARE NOW A READ OP SO COUNT 16 BIT CELLS- THEN DROP FORCE AND    *
                  1383 * NOT ALLOW ENVELOPE LOSS TO THE DATA FLOW,ALSO SET READ CONDITION.  *
                  1384 ***************************************************************

000075 2FB0       1387 TRYAGAIN BOC   IBG,SETRDCHK        ABEND IF IBG
000076 3FB3       1390          BOC   DEVATTN,SETNOISE    ABEND IF TU DEV END
000077 2475       1393          BOC   RDTIME,TRYAGAIN     WAIT FOR RD TIME TO FALL
000078 607B       1396          BU    CNTABIT             GO COUNT AGAIN   IT

000079            1399 READYES  EQU   *                   RESET LINES
000079 4460       1401          XFR   STATIMG,TUBO         FOR DETECTION CONTROL
00007A 09F0       1404          STO   FRU,ONES-15         SET CNT FOR 16 BIT CELLS

00007B 247D       1408 CNTABIT  BOC   RDTIME,CNTABIT2     WAIT FOR READTIME TO RISE
00007C 607B       1411          BU    CNTABIT
00007D A901       1414 CNTABIT2 ADD   FRU,1               BUMP CTR BY 1
00007E 2175       1417          BOC   NALCO,TRYAGAIN      TEST FOR CTR 16

00007F            1420 COUNT16  EQU   *
00007F 8D28       1422          ORI   XOUTAIM,FORCE+NOLOSS TRN ON FORCE & NOT ALLOW
000080 4D42       1425          XFR   XOUTAIM,XOUTA       SET FORCE TO XOUTA

                  1428 *        ONE BIT CELL FOR 200/IN/SEC = 3125 NANO SECS

                  1430 ***************************************************************
                  1431 * WE HAVE NOW UNBLOCKED THE DATA FLOW READ CIRCUITS,SO     WE WILL   *
                  1432 * CYCLE LOOKING FOR IBG,DATA READY OR INTERRUPT      . DATA READY IS *
                  1433 * IS THE PROPER EXIT. ALL OTHERS WILL SET UNIT CHECK.               *
                  1434 ***************************************************************
000081 2484       1437 FORCEON  BOC   RDTIME,COUNTPRE     WAIT
000082 2D9A       1440          BOC   DATARDY,PREAMBOK      FOR ERADTIME
000083 6081       1443          BU    FORCEON                TO RISE
000084 A906       1447 COUNTPRE ADD   FRU,6               BUMP TIME OUT COUNT
000085 2188       1450          BOC   NALCO,CKDTARDY        WHILE WAITING FOR BEG ONES
                  1452 * TIME OUT EQUALS 40 BIT CELLS WITHOUT SEEING BEGINNING ONES
000086 5060       1454          XFRH  WORK1,TUBO          RAISE READ DET LEV TO 10 PER CENT
000087 60B0       1457          BU    SETRDCHK            GO SET START READ CHK
000088 2FB0       1460 CKDTARDY BOC   IBG,SETRDCHK        BR IF IBG IS ON
000089 3FB3       1463          BOC   DEVATTN,SETNOISE    BR IF TU INTERRUPT IS ON
00008A 2D9A       1466          BOC   DATARDY,PREAMBOK    WE WANT TO BR HERE ON DATA RDY
00008B 2488       1469          BOC   RDTIME,CKDTARDY     WAIT FOR READ TIME TI FALL
00008C 6081       1472          BU    FORCEON

                  1475 ***************************************************************
                  1476 * POSSIBLE TM CONFIGURATION.BUMP A COUNTER AMD RETURN.WHEN COUNT    *
                  1477 * GETS LARGE ENOUGH, CALL IT A TM AND GO WAIT FOR IBG               *
                  1478 * 20 BIT CELLS OF TM BOC NEEDED TO RECOGNIZE A TAPE MARK.          *
                  1479 * THESE 20 BIT CELLS DO NOT HAVE TO BE CONTIGUOUS.                 *
                  1480 ***************************************************************
00008D A001       1482 TMCONFIG ADD   WORK1,1             BUMP UEX CNT BY ONR
00008E 216A       1485          BOC   NALCO,CHKIBG        MIGHT NOT BE TRUE TM,GO CHK AGAIN
00008F 9800       1489          ORM   TRACER,0            GET TRACE REG TO DBUS FOR BRANCHING
000090 35B1       1492          BOC   DREG5,WAITEND       SKIP IF FILE SEARCH IS ON
                  1494 * SET UNIT EXCEPTION
000091 8404       1496          ORI   STATIMG,SETSTATB    TRN ON STAT B FOR ENDUP
000092 60B1       1499          BU    WAITEND               FLAGS UNIT EXCEPTION TO ALU1
                  1504 ***************************************************************
                  1505 * WE WILL END UP HERE WHEN AN IBG IS DETECTED, IN TWO INSTANCES.    *
                  1506 * THE FIRST IS WHILE WE ARE WAITING FOR IBG TO FALL AFTER WE START  *
                  1507 * TAPE MOVING. IN THIS CASE WE WILL GO RIGHT BACK TO THE MAIN LOOP. *
                  1508 * THE SECOND IS ON A SPACE OP WHEN THE ENDING IBG IS DETECTED.      *
                  1509 ***************************************************************
000093 9800       1511 IBGYES1  ORM   TRACER,0            GET TRACE REG TO DBUS FOR TESTING
000094 3197       1514          BOC   BORMARK,IBGYES2     BR IF BOR TRACE IS ON
000095 3397       1517          BOC   IBGMARK,IBGYES2     BR IF IBG TRACE IS ON
000096 606C       1520          BU    CLOKWAIT            GO BACK TO START LOOP
000097 37B1       1523 IBGYES2  BOC   SPACEOP,WAITEND     BR IF SPACE OP IS ON
000098 C8AF       1526          AND   TRACER,ONES-BORMARK-IBGMARK  RESET TRACERS
000099 6063       1529          BU    SETUXCNT            GO BACK TO START LOOP + RESET UEX CT


                  1533 ***************************************************************
                  1534 * TO GET HERE WE MUST BE DOING A READ OP AND HAVE SEEN DATA READY.  *
                  1535 * THE MAIN JOB NOE  IS TO ASSURE END DATA IS FLAGGED NEXT. IBG OR   *
                  1536 * DRIVE INTERRUPT SIGNAL AN ERROR CONDITION                         *
                  1537 ***************************************************************
00009A 289E       1539 PREAMBOK BOC   ENDATA,READEND      BR IF END DATA COMES ON
00009B 2FAE       1542          BOC   IBG,SETPARTL        BO IF IBG COMES ON
00009C 3FB3       1545          BOC   DEVATTN,SETNOISE    BR IF TU INTERRUPT COMES ON
00009D 609A       1548          BU    PREAMBOK            HANG TILL RECORD ENDS
                  1552 ***************************************************************
                  1553 * NORMAL READ END- WE HAVE NOW SEEN END DATA. NOW WE MUST COUNT     *
                  1554 * THE POSTAMBLE DATA READYS TO ASSSURE NO MORE THAN 42. AN EXCESS WILL*
                  1555 * FORCE END DATA CHK.                  AND EXCESSIVE POSTAMBLE.     *
                  1556 * A COUNT OF 50 IS USED TO ALLOW FOR WORST CASE AMP SENSOR DROP OUT *
                  1557 * TIME.  A SECOND CHECK IS MADE TO ASSURE AT LEAST SIX CELLS OF BURST *
                  1558 * OCCUR AFTER ENDDATA. IF NOT,END DATA CHK IS SET ALONE.            *
                  1559 ***************************************************************
```

```
00009E 09CD   READEND  STO   FRU,ONES-50          LOAD THE COMP OF DEC 50
00009F 2DA9   RDYWAIT1 BOC   DATARDY,CNTRDY1      BR TO CT ONE DATA RDY
0000A0 2FA6            BOC   IBG,CHKPOST          BR TO EXIT
0000A1 609F            BU    RDYWAIT1             WAIT FOR DATA RDY TO RISE
0000A2 2FA6   IBGLOOK1 BOC   IBG,CHKPOST          NORMAL EXIT
0000A3 3FB3            BOC   DEVATTN,SETNOISE     ABEND ON TU DEV END
0000A4 2DA2            BOC   DATARDY,IBGLOOK1     HANG IN LOOP TILL DATA RDY FALLS
0000A5 609F            BU    RDYWAIT1             NOW GO WAIT FOR NEXT DATA RDY

0000A6 B929   CHKPOST  ADDM  FRU,41               ASSURE AT LEAST
0000A7 21AC            BOC   NALCO,SETENDCK         6 BIT CELLS OCCUR
0000A8 60B6            BU    STOPREAD                 AFTER ENDING ONES

0000A9 A901   CNTRDY1  ADD   FRU,1                ADD ONE TO CNT
0000AA 21A2            BOC   NALCO,IBGLOOK1       ABORT IF 43 ZEROS DETECTED

              *              ***** SET EXCESSIVE POSTAMBLE *****

0000AB 8A02            ORI   DTACHK2,EXCPOST        EXCESSIVE POST AMBLE
              *              ***** SET END DATA CHECK *****

0000AC 1810   SETENDCK STO   MPGMERR,ENDATAER     SET END DATA CHK
0000AD 60B1            BU    WAITEND              RETURN TO WAIT SOME MORE

              *              ***** SET PARTIAL RECORD *****

0000AE 8A04   SETPARTL ORI   DTACHK2,PARTREC        SET PARTIAL RECORD
0000AF 60AC            BU    SETENDCK

              *              ***** SET START READ CHECK *****

0000B0 8A08   SETRDCHK ORI   DTACHK2,STREADCK     SET START READ CHECK
0000B1 2FB6   WAITEND  BOC   IBG,STOPREAD         BR IF IBG IS ON
0000B2 60B1            BU    WAITEND              WAIT FOR IBG

              *              ***** SET NOISE ERROR *****

0000B3 1880   SETNOISE STO   MPGMERR,NOISE        SET NOISE ERROR
0000B4 8402   ABORTRD  ORI   STATIMG,SETSTATC     FLAG UNIT CHECK
0000B5 0100            STO   WORK2,0              CLEAR NOISE BIT

0000B6        STOPREAD EQU   *
0000CB6 3ABF           BOC   STATC,DIAGHOOK       TOUCHE
0000B7 D801            ANDM  TRACER,SPACEOP       IS THIS A RECORD SPACE OP
0000B8 37D9            BOC   SPACEOP,CRESENS      BR IF SO
0000B9 CDD7   READSTOP AND   XOUTAIM,ONES-FORCE-NOLOSS
0000BA 4D42            XFR   XOUTAIM,XOUTA        DEACTIVATE FORCE AND NOT ALLOW
0000BB 00CD            STO   WORK1,ONES-50        SET 20 MICRO SEC. DELAY
0000BC A001   DELAY    ADD   WORK1,ONE            DO THE DELAY
0000BD 21BC            BOC   NALCO,DELAY           FOR SERVICE TO STOP
0000BE 61C1   TOENDUP  BU    ENDUP
0000BF 6513   DIAGHOOK BU    MEASIBG              GO MEASURE IBG
              ***************************** FETCH STATUS SUBROUTINE ***************
              * THIS SUBROUTINE IS USED BY ANY ROUTINE REQUIRING SENSE DATA FROM   *
              * THE DEVICE. TWO BYTES OF SENSE DATA WILL BE RETURNED AND CONTROL   *
              * RELINQUISHED TO THE CALLING ROUTINE VIA LINK REG 1.                *
              *                                                                    *
              **********************************************************************

0000C0 0000   FCHSTS   STO   WORK1,0               CLEAR THE TU
0000C1 4060            XFR   WORK1,TUBO              BUS OUT
0000C2 0008            STO   WORK1,DEVSEL         SET SELECT & RESET ALL OTHER TAGS
0000C3 4024            XFR   WORK1,TUTAG           IF THEY ARE ON
0000C4 0001            STO   WORK1,1              SET FOR SENSE BYTE ZERO *****
0000C5 4060   FCHSNS   XFR   WORK1,TUBO           XFER TO THE TAPE UNIT BUS OUT REG
0000C6 06FD            STO   SENSE1,ONES-2        LOAD WAIT COUNT
0000C7 A601   HUP1     ADD   SENSE1,1              AND
0000C8 21C7            BOC   NALCO,HUP1              WAIT
0000C9 4681            XFR   SENSE1,TUBI          FETCH 1ST SENSE BYTE
0000CA 5681            XFRH  SENSE1,TUBI           AND PUT IT IN HIGH REG ALSO
0000CB 4021   FCHLAST  XFR   WORK1,AR             SHIFT BIT LEFT IF
0000CC A000            ADD   WORK1,ZERO            NOT
0000CD 4060   FCHNEXT  XFR   WORK1,TUBO           MOVE TO TAPE BUS OUT
0000CE 07FE            STO   SENSE2,ONES-1        LOAD WAIT COUNT
0000CF A701   HUP2     ADD SENSE2,1                AND
0000D0 21CF            BOC   NALCO,HUP2              WAIT
0000D1 4781            XFR   SENSE2,TUBI          FETCH 2ND SENSE BYTE
0000D2 4021            XFR   WORK1,AR              SET UP FOR
0000D3 A000            ADD   WORK1,0                SENSE OP
0000D4 5C22            XFR   LINK1,IC             RETURN TO CALLLER
              ********************* STATUS FETCH BRANCH TABLE *********************
0000D5 6107   SRETURN1 BU    STATUS1              INIT STATUS RETURN                *
0000D6 61C6   SRETURN2 BU    SNSRTN               ENDVP RETURN                      *
0000D7 6364   SRETURN3 BU    POLL6                DEV END RETURN
0000D8 63F6   SRETURN4 BU    SNSLINK              RETURN TO SENSE ROUTINE
              * SRETURN7 IS IN FRONT OF PAGE 0 AT BRANCH TABLE
              *********************************************************************
              *********************************************************************
              * NORMAL ENDING OF ANY SPACE OP IS THROUGH THIS ROUTINE.  AFTER MOVE *
              * IS DROPPED WE WILL MONITOR THE READ BUS UNTIL THE TACH PULSE SPREAD *
              * SHOWS THE DRIVE TO BE STOPPED.       IF ANY READ DATA IS DETECTED, *
              * DURING THIS TIME, MOVE IS RAISED UNTIL IBG IS AGAIN DETECTED.      *
              *********************************************************************
```

```
0000D9 C4BF        1779 CRESENS  AND   STATIMG,ONES-PERMRDWT   RESET
0000DA 4428        1782          XFR   STATIMG,STAT             READ CONDITION
0000DB 8880        1785          ORI   TRACER,CREASER          SET FLAG FOR TAK RTN
0000DC 0008        1788          STO   WORK1,DEVSEL            DROP MOVE
0000DD 4024        1791          XFR   WORK1,TUTAG              TAG
0000DE 0040        1794          STO   WORK1,DVESNS6           SET SENSE BIT ON
0000DF 1C4D        1797          STO   LINK1,CRETEST           SET RETURN ADDRESS
0000E0 60CD        1800          BU    FCHNEXT                 GO SET SENSE BIT TO DRIVE.

                   1803 *   SENSE BYTES 0 AND 1

0000E1 0281        1806 EXECSNS  STO   WORK3,X'81'             PATTERN FOR MASK
0000E2 5821        1809          XFR   MPGMERR,AR              MASK AGAINST NOT CAP + NOISE
0000E3 C200        1812          AND   WORK3,ZERO              SET IN REG IF ON
0000E4 0100        1815          STO   WORK2,0                 CLEAR REG FOR LATER
0000E5 9600        1818 SNS0     ORM   SENSE1,ZERO             IS A DRIVE PRESENT
0000E6 20F9        1821          BOC   DBUS,SNS1               BR IF NOT
0000E7 35FB        1824          BOC   START,SNS2              BR IF START IS ON
0000E8 8228        1827          ORI   WORK3,TUSTB             SET TU STATUS B IF NOT
0000E9 8140        1830 SNS1     ORI   WORK2,INTREQ            SET INTERVENTION REQUIRED
0000EA 63BA        1833          BU    SNS3                    GO DO NEXT TEST

0000EB 8240        1837 SNS2     ORI   WORK3,TUSTA             SET TU STATUS A ON
0000EC 63BA        1840          BU    SNS3                    GO FINISH SENSE OP

                   1843 ***********************************************************************
                   1844 *                                                                     *
                   1845 *                 INITIAL SELECTION OF TAPE UNIT                      *
                   1846 *                                                                     *
                   1847 ***********************************************************************
                   1848 ***********************************************************************
                   1849 * THIS ROUTINE WILL GET THE TAPE UNIT ADDRESS FROM THE EXTERNAL       *
                   1850 * ADDRESS REGISTER IN THE PROPER BIT POSITION AND PUT IT IN THE       *
                   1851 * PROPER REGISTER.                                                    *
                   1852 *                                                                     *
                   1853 *        TUADDR LSR LAYOUT (LOW)     TUADDR LSR LAYOUT (HIGH)         *
                   1854 *        0 SELECT TU7                0 SELECT TU15                    *
                   1855 *         1 SELECT TU6                1 SELECT TU14                   *
                   1856 *          2 SELECT TU5                2 SELECT TU13                  *
                   1857 *           3 SELECT TU4                3 SELECT TU12                 *
                   1858 *            4 SELECT TU3                4 SELECT TU11                *
                   1859 *             5 SELECT TU2                5 SELECT TU10               *
                   1860 *              6 SELECT TU1                6 SELECT TU9               *
                   1861 *               7 SELECT TU0                7 SELECT TU8              *
                   1862 *                                                                     *
                   1863 ***********************************************************************
                   1864 * THERE ARE TWO TUADDR LSRS,ONE HIGH & THE OTHER LOW.WHICH ONE IS USED*
                   1865 * DEPENDS ON THE ADDRESS PASSED BY ALU1. THIS ALLOWS THE MPGM WITH    *
                   1866 * THE MEANS TO KNOW WHICH DEVICE HE IS WORKING.                       *

0000ED 4B84        1869 EXECSTS  XFR   TUADDR,XADDR            SET DEVICE ADDR
0000EE 5B84        1872          XFRH  TUADDR,XADDR             IN BOTH REGS
0000EF 4190        1875          XFR   WORK2,XINA              GET TU ADDR FROM ALU1
0000F0 34F5        1878          BOC   SELHIGH,CLEARLO         BR IF OPERATING HI DRIVES
0000F1 1B00        1881          STOH  TUADDR,0                CLEAR HIGH ADDR REG
0000F2 0408        1884          STO   STATIMG,SETSTATA        SET STAT A TO
0000F3 4428        1887          XFR   STATIMG,STAT             DENOTE LOW ORDER
0000F4 6100        1890          BU    ADDREXIT                GO DO INITIAL SELECTION
0000F5 0B00        1893 CLEARLO  STO   TUADDR,0                CLEAR LOW ADDR REG
0000F6 6100        1896          BU    ADDREXIT                GO FINISH INITIAL SELECTION
                   1899          ORG   BEGIN+X'100'
                   1900 ********************* INITIAL STATUS ROUTINE ***********************
                   1901 * THIS ROUTINE,UPON REQUEST BY ALU1,GETS TWO SENSE BYTES FROM THE     *
                   1902 * SELECTED DRIVE AND PASSES THEM TO ALU1. A CHECK IS MADE TO SEE IF  *
                   1903 * THE DRIVE IS AVAILABLE AND NOT BUSY. STATS ARE USED TO COMMUNICATE *
                   1904 * FINDINGS TO ALU1. VARIOUS REGISTERS ARE SET TO RESET STATUS.       *
                   1905 *                                                                    *
                   1906 * CLEAN STATUS   STATD ALONE                                         *
                   1907 * BUSY STATUS    STATB AND STATD  -DRIVE IS REWINDING,SWITCHED OR DSE *
                   1908 * UNIT CHECK STATUS  STATC AND STATD-DRIVE IS NOT THERE OR NOT READY *
                   1909 * DEVICE END PENDING STATB AND STATC                                 *
                   1910 * UNIT CHK AND DEV END PENDING -STAT C                               *
                   1911 * IF DEVICE IS FOUND BUSY,A DEVICE END WILL BE PRIMED.               *
                   1912 **********************************************************************
000100             1914 ADDREXIT EQU   *                       ENTRY FROM ADDR ROUTINE
000100 3E05        1916 CHKSWTCH BOC   BSYTACH,GOPRIME         BR IF SWITCHED
000101 1CD5        1919 EXECSTSZ STO   LINK1,SRETURN1          SET UP RETURN
000102 60C0        1922          BU    FCHSTS                  RETURN TO STATUS1
000103             1924 ISBUSY1  EQU   *
000103 0000        1926 PRIMESET STO   WORK1,ZERO              CLEAR DEVICE SEL IF ON
000104 4024        1929          XFR   WORK1,TUTAG             TO ASSURE NOT LEFT OUTSTANDING
000105 3A36        1932 GOPRIME  BOC   STATC,TOSETD            BR TO GET OUT
000106 61EA        1935          BU    SETPRIME                GO PRIME DEVICE END

                   1938 **********************************************************************
                   1939 * RETURN FROM FETCH STATUS ROUTINE  -  INTERROGATE SENSE DATA         *
                   1940 **********************************************************************

000107 4641        1943 STATUS1  XFR   SENSE1,XOUTB            SEND TU SNS
000108 3E03        1946          BOC   BSYTACH,ISBUSY1         BR IF BUSY(REW,RUN OR DSE)

                   1949 **********************************************************************
                   1950 *  INITIALIZE XOUTA IMAGE REG
                   1951 **********************************************************************
```

```
000109 0D47   STATUSOK STO   XOUTAIM,X'47'        SET UP TO LOAD MODEL NO.
00010A 4721            XFR   SENSE2,AR            GET MOD NO TO A REG
00010B CD40            AND   XOUTAIM,X'40'         AND PUT IT IN XOUTA

              ***************************************************************
              * LOOK FOR DEVICE END PRIME ROUTINE.                          *
              ***************************************************************

00010C 2A0E   HAVPRIME BOC   STATA,LOWYES         STAT A ON SAYS LOW ADDR
00010D 5006   MUSTBEHI XFRH  LSR                  SET HIGH                         16
00010E 4F21   LOWYES   XFR   LODEPB,AR            MOVE PRIME LSR TO AREG,(INTRF B)
00010F 2B12            BOC   STATB,SOCKEM         TEST FOR INTERFACE B
000110 9000            NOP1                       CLEAR A REG IF NOT
000111 4E21            XFR   LODEPA,AR            MOVE PRIME LSR TO AREG,(INTF A)
000112 DB00   SOCKEM   ANDM  TUADDR,0             LOOK FOR PRIME
000113 2017            BOC   DBUS,NOPRIME         BR IF NOT
```

(Omitted Nonpertinent Coding)

```
              ********************** GENERAL AND SELECTIVE RESETS ******************
              *                                                                    *
              * DEPENDING ON ENTRY POINT, A SELECTIVE OR GENERAL RESET WILL BE     *
              * PERFORMED.  SELECTIVE BYPASSES RESET OF DEVICE END PRIMES AND      *
              * COMMITTED LATCH. OTHERWISE THE TWO RESETS ARE THE SAME.            *
              **********************************************************************

000193 2B97   EXECGRST BOC   STATB,RESTDEB        BRANCH IF RESET IS FOR INTERFACEB *M
000194 0E00            STO   LODEPA,0             CLEAR DE PRIME REGISTER A
000195 1E00            STOH  LODEPA,0             CLEAR DE PRIME REGISTER A HIGH   *16
000196 6199            BU    EXECSRST
000197 0F00   RESTDEB  STO   LODEPB,0             CLEAR DE PRIME REGISTER B    *MIS**
000198 1F00            STOH  LODEPB,0             CLEAR DE PRIME REGISTER B HIGH   *16

000199 1C0F   EXECSRST STO   LINK1,SRETURN7-BEGIN  SET UP FOR RETURN
00019A 60C0            BU    FCHSTS                AND GO SELECT DEVICE
00019B 100A   CAPIM    STOH  WORK1,DEVSEL+COMMAND S UP COMMAND FOR RESETG
00019C 1102            STOH  WORK2,RESET          GET DRIVE RESET READY
00019D 5024            XFRH  WORK1,TUTAG          RAISE COMMAND TAG TO DRIVE
00019E 1008            STOH  WORK1,DEVSEL         CLEAR OUT COMMAND TAG
00019F 5160            XFRH  WORK2,TUBO           AND RESET IT
0001A0 3BA2            BOC   STATD,CLEEREM        DON'T CHECK STAT C
0001A1 3AB2            BOC   STATC,RESET1         BR IF THIS IS AN ALU ERR RESET
0001A2 0C00   CLEEREM  STO   DTACHK1,0             CLEAR
0001A3 0A00            STO   DTACHK2,0            ERROR
0001A4 1D00            STO   EQUIPCK,0             REGS
0001A5 1800            STO   MPGMERR,0
0001A6 0900            STO   FRU,0
0001A7 0800            STO   TRACER,0             CLEAR TRACE REGISTER
0001A8 3BBD            BOC   STATD,CLEARCMD       BR IF THIS IS A SENSE RESET
0001A9 0500            STO   FLAGS,0              CLEAR FLAGS REG
0001AA F109            XOM   WORK2,NDXSRST-BEGIN    IS THIS A SELECTIVE RESET
0001AB 20B2            BOC   DBUS,RESET1          BR IF SO

              **************** DESELECT TAPE UNIT **********************************
              * THIS ROUTINE IS USED AFTER EACH OPERATION TO ASSURE DE-SELECT OF THE*
              * TAPE UNIT. THE COMMITTED LATCH WILL ALSO BE RESET.                 *
              **********************************************************************
0001AC 0000   EXECDES  STO   WORK1,ZERO           CLEAR TAGS
0001AD 4024            XFR   WORK1,TUTAG           TO THE DRIVE
0001AE A024   DESWAIT  ADD   WORK1,36             ALLOW X POINTS
0001AF 21AE            BOC   HALCO,DESWAIT          TO SETTLE 3.2 USEC DELAY
0001B0 4050            XFR   COMITD               RESET THE DEVICE COMMITTED LATCH
0001B1 6011            BU    SETDLONE             GO SET STAT D AND TERMINATE

              * CHECK FOR DEV END PRIME. IF ONE IS FOUND BYPASS RESET TO COMMITTED.

0001B2 4E21   RESET1   XFR   LODEPA,AR            SET DEV END PRIMES TO TEST A
0001B3 4F21   RESET2   XFR   LODEPB,AR            SET DEV END PRIMES TO TEST B
0001B4 DB00   RESET3   ANDM  TUADDR,ZERO          DO ADDR AND DEV PRIME COMPARE
0001B5 20B7            BOC   DBUS,CHKHI           BR IF NOT
0001B6 61BC            BU    EXECABRT                                              *16
0001B7 5006   CHKHI    XFRH  LSR                  SET HI                           *16
0001B8 4E21            XFR   LODEPA,AR             LOOK FOR                        *16
0001B9 4F21            XFR   LODEPB,AR               HIGH PRIMES                   *16
0001BA DB00            ANDM  TUADDR,0             BR OUT                           *16
0001BB 20AC            BOC   DBUS,EXECDES           IF NONE                        *16
              *************************** ABORT ROUTINE ****************************
              *                                                                    *
              *  USED BY ALU1 TO INSURE TAPE MOTION IS STOPPED.                    *
              *                                                                    *
              *  THIS ROUTINE MUST FOLLOW RESETS ROUTINE                           *
              **********************************************************************

0001BC 1000   EXECABRT STOH  WORK1,ZERO           CLEAR REG

0001BD 5024   CLEARCMD XFRH  WORK1,TUTAG           DROP ALL DRIVE TAGS
0001BE 6011            BU    SETDLONE             ALL DONE
              *                ***** SET CONTROL STATUS REJECT *****
```

```
0001BF 1D20    2677 CTRLREJ  STO   EQUIPCK,REJCTRL       SET CONTROL STATUS REJECT
0001C0 0100    2680 CLRXOUTA STO   WORK2,0               ASSURE NOISE BIT OFF - READ OP -
               2684 ************************* ENDUP ROUTINE *****************************
               2685 *                                                                    *
               2686 * THE ENDUP ROUTINE IS ENTERED BY ALL CMD ROUTINES.                  *
               2687 *          ENDUP SETS THE STATUS INTO THE STAT REG AND SETS STAT D TO *
               2688 * INDICATE TO ALU1, ALU2 IS FINISHED. ALU2 WILL BE TRAPPED TO ADDRESS *
               2689 * ZERO WHEN STAT D IS SET AND WILL REMAIN DORMANT UNTIL CALLED BY     *
               2690 * ALU1 AGAIN,(VIA ALU1 XOUTB)                                         *
               2691 *     THE DEVICE STATUS IS ALWYS RETRIEVED AND CHECKED FOR UNIT CHECK *
               2692 * AND UNIT EXCEPTION CONDITIONS(EOT ON WRITE). THE MPGM ERROR REG IS  *
               2693 * CHECKED AND IF ANY BITS ARE ON, THE UNIT CHECK STAT IS SET.         *
               2694 *                                                                    *
               2695 **********************************************************************

0001C1 C43F    2699 ENDUP    AND   STATIMG,ONES-TAPEOP-PERMRDWT    OP
0001C2 1CD6    2702          STO   LINK1,SRETURN2        LOAD SENSE RETURN  (SNSRTN)
0001C3 4428    2705          XFR   STATIMG,STAT          RESET TAPE IP AND CONTROLS
0001C4 4142    2708          XFR   WORK2,XOUTA           SET BYTE FOR ALU1-READ NOISE
0001C5 60C0    2711          BU    FCHSTS                GO FETCH DEVICE SENSE DATA
0001C6 2ADB    2714 SNSRTN   BOC   STATA,BUSYYET         BR IF A REW,RUN,ORDSE
0001C7 9600    2717          ORM   SENSE1,0               GET SENSE BYTE FIR TEST
0001C8 34CA    2720          BOC   WRTSTAT,CHKEOT         BR IF EOT IS ON
0001C9 61CD    2723          BU    ENDCHK
0001CA 32CC    2726 CHKEOT   BOC   EOT,SETUX             IS END OF TAPE BIT ON
0001CB 61CD    2729          BU    ENDCHK   HK            OR IF NOT
0001CC 8404    2732 SETUX    ORI   STATIMG,SETSTATB      SET UNIT EXCEPTION IF SO
0001CD         2734 ENDCHK   EQU   *
0001CD         2735 CKSTART  EQU   *
0001CD 9600    2737          ORM   SENSE1,0              IS DRIVE READY
0001CE 35D0    2740          BOC   START,TSTFOERR        BR IF START IS ON
0001CF 1D40    2743          STO   EQUIPCK,REJTU         OTHERWISE SET ERROR ON
0001D0 DCFE    2746 TSTFOERR ANDM  DTACHK1,ONES-VELTRY   BR IF NO ERRORS IN THESE
0001D1 20D3    2749          BOC   DBUS,TSTFOMOR          REGS
0001D2 61D7    2752          BU    SETUCK                OTHERWISE GO SET UNIT CHECK
0001D3 5821    2755 TSTFOMOR XFR   MPGMERR,AR            SET UP ERRORS
0001D4 5D21    2758          XFR   EQUIPCK,AR             FOR TEST
0001D5 9A00    2761          ORM   DTACHK2,0              ANY M-PGM ERRORS
0001D6 20D9    2764          BOC   DBUS,DUNAGN            BR IF NOT
0001D7 8402    2767 SETUCK   ORI   STATIMG,SETSTATC      SET UNIT CHECK STAT ON

0001D8 4014    2771          XFR   REDLIGHT FLAG ALU DETECTED DATA ERROR
0001D9         2773 DUNAGN   EQU   *
0001D9 8401    2775 SETD     ORI   STATIMG,SETSTATD      TURN ON STATD
0001DA 4428    2778          XFR   STATIMG,STAT          XFER STAT IMAGE TO STAT REG
               2780 *************** ALU2 IS NOW TRAPPED UNTIL CALLED BY ALU1
               2783 **********************************************************************
               2784 * REWIND,REWIND UNLOAD AND DATA SECURITY ERASE USE THIS ROUTINE       *
               2785 * TO ASSURE THE DEVICE WENT BUSY. IF IT DIDNT, A CHECK IS MADE        *
               2786 * TO SEE IF THE OPERATION HAS BEEN COMPLETED.   CHAINING OF THESE     *
               2787 * COMMANDS IS SIGNALED BY ALU1 STATD BEING ON, AND ALU2 WILL          *
               2788 * REMAIN HERE IN ENDUP UNTIL THE TAPE UNIT IS FINISHED.               *
               2789 **********************************************************************
0001DB         2790 BUSYYET  EQU   *
0001DB 4088    2792          XFR   WORK1,XINB            GET THE CURRENT CMD INDEX
0001DC F029    2795          XOM   WORK1,EXECRWU         IS IT A REWIND UNLOAD
0001DD 2020    2798          BOC   DBUS,SETPULSE         BR IF SO
0001DE D6FF    2801          ANDM  SENSE1,ONES           GET SENSE BYTE FOR TEST
0001DF 37E2    2804          BOC   NOTBUSY,LPLOOK        BR IF NOT BUSY
0001E0 3BC1    2807          BOC   STATD,ENDUP           IF CHAINED-STATD WILL BE ON-
0001E1 61CD    2810          BU    CKSTART               IF NOT CHAINED-TAKE NORMAL EXIT
0001E2 33E6    2813 LPLOOK   BOC   BOT,ISITREW           BR IF BOT IS ON
0001E3 32E8    2816          BOC   EOT,ISITDSE           BR IF EOT IS ON
0001E4 8402    2819          ORI   STATIMG,SETSTATC      SET UNIT CHECK ON
0001E5 61CD    2822          BU    CKSTART               NOT BUSY AND NOT AT LP OR TI
0001E6 34D7    2825 ISITREW  BOC   WRTSTAT,SETUCK        BR IF NOT-MUST BE REW/RUN
0001E7 61CD    2828          BU    CKSTART               SET U.C.-WE HIT LP ON A DSE
0001E8 34CD    2831 ISITDSE  BOC   WRTSTAT,ENDCHK        SET U.C. IF NOT-WE HIT T1 ON A REW
0001E9 61CD    2834          BU    CKSTART               DSE COMPLETE-GO FINISH UP
               2838 ***************SET DEVICE END PRIME ROUTINE***************************
               2839 * THIS ROUTINE IS USED BY ALU1 TO PRIME THE DEVICE END STILL HELD     *
               2840 * BY ALU2 IN TUADDR LES. UPON PRIMING, A BRANCH WILL BE TAKEN TO      *
               2841 * POLLMTI WHERE A WAIT WILL BE INITIATED IN CASE ALU1 WANTS IT TURNED *
               2842 * OFF AGAIN.                                                          *
               2843 * NOTE  INITIAL STATUS DOES NOT TAKE THIS BRANCH.                     *
               2844 **********************************************************************

0001EA 0405    2847 SETPRIME STO   STATIMG,SETSTATB+SETSTATD  SET FOR USE LATER
0001EB 1405    2850          STOH  STATIMG,SETSTATB+SETSTATD  SET FOR USE LATER IF HI
0001EC 9B00    2853 EXECSDE  ORM   TUADDR,0              SEE IF LOW LSR HOLDS ADDRESS     16
0001ED 20EF    2856          BOC   DBUS,ISHIGH           BR IF NOT TO SET HI              16
0001EE 61F0    2859          BU    ISLOW                 SKIP SET HIGH                    16
0001EF 5006    2862 ISHIGH   XFRH  LSR                   SET HIGH                         16
0001F0 4B21    2865 ISLOW    XFR   TUADDR,AR             GET PRIME BIT TO A BUS
0001F1 2BF3    2868          BOC   STATB,DOIT            BR IF INTERFACE B
0001F2 8E00    2871          ORI   LODEPA,0              PRIME PROPER
0001F3 8F00    2874 DOIT     ORI   LODEPB,0               DEVICE END
0001F4 4428    2877          XFR   STATIMG,STAT          SET STAT D IF NECESSARY
0001F5 8402    2880          ORI   STATIMG,SETSTATC      SET STAT C FOR
0001F6 4428    2883          XFR   STATIMG,STAT            ALU14
0001F7 636A    2886          BU    POLLMTIX              GO WAIT TO RESET THE DEVICE END
               2888 *                                    IF STAT D DIDN'T COME ON IN THE
               2889 *                                    PREVIOUS INSTRUCTION
```

```
0001F8 0403   GOPRIME2 STO   STATIMG,SETSTATD+SETSTATC  SET UP FOR LATER
0001F9 1403            STOH  STATIMG,SETSTATD+SETSTATC  SET UP FOR LATER
0001FA 61EC            BU    EXECSDE              GO SET A PRIME ON
000200                 ORG   BEGIN+X'200'
*************************** WRITE ROUTINE ******************************
*        PARTS OF THE FOLLOWING RTN ARE SHARED BY WRITE,WTM AND ERG.   *
*   THESE COMMENTS ARE ARRANGED IN THE FOLLOWING SEQUENCE.             *
*        A.  PE WRITE                                                  *
*        B.  DIAGNOSTICS- 1. LWR                                       *
*                         2. LWTM                                      *
*                         3. INHIBIT PREAMBLE                          *
*                         4. IMHIBIT POSTAMBLE                         *
*                         5. DIAGNOSTIC WRITE (DEAD TRACK)             *
*                                                                      *
*   NOTE:                                                              
*   ANY OR ALL OF THE DIAGNOSTIC CONTROLS MAY BE USED EITHER           *
*   SINGLY OR IN ANY COMBINATION EITHER NORMAL WRITE OR LWR.           *
************************************************************************

*   ENTRY TO THIS ROUTINE IS 'WRTSTR' AFTER GAP CONTROL RESPONSE       *
*   FROM THE DRIVE.                                                    *
*   AN EXIT IS TAKEN TO CHECK THE DRIVE VELOCITY AND COUNT             *
*   8 TACH PULSES TO INSURE FORWARD CREEP.  RETURN IS TO               *
*   'WRTST'.  WHERE A BRANCH WILL BE TAKEN IF FEATURE IS               *
*   PRESENT TO 'WRTSINR2' WHERE A CHECK IS MADE TO DETERMINE MODE FOR  *
*   THIS OPERATION AND RETURN TO 'WRTST1' IF PE.                       *
*                                                                      *
*   IF BOT IS ON IN THE DEVICE SENSE BYTE 0 THEN A P BURST             *
*   WILL BE WRITTEN.  RETURN ADDRESS IS 'RETURN' WHERE AN EXIT         *
*   MAY BE TAKEN IF NECESSARY FOR OTHER THAN A WRITE OP.               *
*   THEN 39 ZEROS ARE WRITTEN AND AT THE FALL OF WRITE TIME THE        *
*   FORMAT COUNTER IS STEPPED TO 2 AND DATA FLOW WILL STEP ON TO FC-3  *
*   AND ALSO TO FC-4.                                                  *
*                                                                      *
*   A COUNTER IS MAINTAINED LOOKING FOR EITHER 'BLOCK' TO RISE OR      *
*   IBG TO FALL AT WHICH TIME THE COUNTER WILL BE STOPPED              *
*   IF THE COUNT IS EXHAUSTED THEN 'SLOWBEGN' ERROR WILL BE SET        *
*   WHILE A TEST IS MADE FOR THE BLOCK TO BE PRESENT AND IF SO THEN SET*
*   'BORFLAG' A COUNT IS MADE UNTIL 16 BIT CELLS HAVE BEEN COUNTEDTHEN *
*   FORCE AND NO LOSS WILL BE SET IN XOUTA REGISTER                    *
*                                                                      *
*   AT THIS POINT STOP IS CHECKED AND IF NOT ON THEN AN EXIT           *
*   IS TAKEN TO CHECK VELOCITY VIA THE TACH VELOCITY ROUTINE UNTIL     *
*   'STOP' COMES ON AT WHICH TIME RETURN IS MADE TO 'WRTCK10'          *
*   IF STOP IS ON THEN THE ENDING FORMAT WILL BE WRITTEN AT THIS       *
*   TIME. INSTEAD OF EXIT  TO CHECK VELOCITY                           *
*                                                                      *
*   THE WRITING OF THE ENDING 1'S MARKER AND 40 ZEROS WILL BEGIN WHEN  *
*   THE FORMAT COUNTER STEPS OUT OF FC-3. A COUNT WILL BE MAINTAINED   *
*   OF THE ENDING 40 BURST. 'PERMRDWT' WILL BE RESET IN THE STAT       *
*   REGISTER WHEN THE FORMAT IS COMPLETED                              *
*   WHILE STILL WRITING DATA (IN FC-3) IF IBG COMES UP THEN MOVE       *
*   TAG WILL BE DROPPED TO THE DRIVE-SIGNALS A CREASE-IBG DROP ERROR   *
*   WILL BE SET.                                                       *
*                                                                      *
*   NOTE - MOVE WILL NOT DROP IF IN DIAGNOSTIC WRITE (DEAD TRK MODE)   *
*                                                                      *
*   A COUNTER IS MAINTAINED WHILE WAITING FOR 'IBG' OR 'ENDATA'        *
*   WITH THE NORMAL EXIT BEING ENDATA - HOWEVER IF THE COUNT           *
*   IS EXHAUSTED THEN 'END DATA CK' WILL BE SET.                       *
*                                                                      *
*   A COUNTER IS USED TO MEASURE THE LENGTH OF THE ENDING              *
*   40 ZEROS AND WHEN THE COUNT EXPIRES THEN 'FORCE AND NO LOSS'       *
*   WILL BE RESET                                                      *
*                                                                      *
*   WHEN IBG COMES UP THEN COUNTS WILL BE CHECKED FOR                  *
*   EARLY BEGIN READ BACK CHECK AND EARLY ENDING READ BACK             *
*   CHECK. THE 'BORFLAG' WILL BE CHECKED AND IF OFF THEN               *
*   EQUIP CK - 'NO BLOCK ON RECORD READ BACK CHECK' WILL BE SET.       *
*   THEN EXIT TO 'READSTOP' WHICH GOES TO ENDUP                        *
*                                                                      *
************************************************************************
*                                                                      *
*   PE LOOP WRITE TO READ.                                             *
*                                                                      *
*   THE COMMAND WAS SET UP ON INITIAL ENTRY AT 'EXECWRT'               *
*   AND ISSUED TO THE TAPE UNIT IN 'TURN - AROUND' THE                 *
*   EXIT FROM TURN-AROUND DROPPED THE COMMAND TAG AND DID              *
*   NOT GO TO TACH COUNTER. THE MOVE TAG IS STILL ACTIVE TO            *
*   THE DRIVE BUT WILL BE DEGATED IN THE DRIVE TO INHIBIT MOVING TAPE  *
*   THE FORMAT WILL BE WRITTEN AND ALL CONTROL LINES WILL              *
*   BE EFFECTIVE AT THE SAME POINTS IN THE RECORD IE: PERMRDWT,        *
*   FORCE, NOLOSS, AND SFC.                                            *
*                                                                      *
*   ALU1 STATC AND BIT 5 (LWROP) IN THE FLAGS REGISTER ARE CONTROL     *
*   FOR LWR.                                                           *
*                                                                      *
*   WHEN THE OPERATION IS COMPLETE EXCESS POSTAMBLE AND E, AND         *
*   SLOW BEGIN AND END CHECKS ARE MADE ALSO ANY EQUIP CHKS ARE RESET   *
*   IF ON. ANY OTHER ERRORS IF SET ARE VALID.                          *
*                                                                      *
************************************************************************
*                                                                      *
*   PE INHIBIT PREAMBLE AND POSTAMBLE                                  *
*
```

```
                2995 *  THE FLAGS REGISTER MAY OR MAY NOT CONTAIN THE 'INHPRE' OR          *
                2996 *  'INHPOST' FLAG BITS.  IF ON THE BEGINNING                           *
                2997 *  40 ZEROS WILL NOT BE WRITTEN - UNDER CONTROL OF 'INHPRE' FLAG       *
                2998 *  OR ENDING 40 ZEROS WILL NOT BE WRITTEN UNDER CONTROL OF             *
                2999 *  'INHPOST' FLAG.                                                     *
                3000 *                                                                      *
                3001 *  THE DATA WRITTEN UNDER ABOVE CONDITIONS WILL BE FOR 'INHPRE' A 0'S *
                3002 *  BYTE AND 1'S MARKER THEN THE DATA DURING FC-3 AND THE ENDING 1'S    *
                3003 *  MARKER AND A 0 BYTE.                                                *
                3004 *  ALL ERROR CHECKS ARE MADE AND ERRORS SET WHICH APPLY.               *
                3005 *                                                                      *
                3006 *  DIAGNOSTIC OR INHIBIT WRITE TRIGGERS WILL FUNCTION THE SAME AS A    *
                3007 *  NORMAL WRITE WITH THE EXCEPTION IN PE MODE MOVE WILL NOT BE         *
                3008 *  DROPPED IF AN IBG COMES UP DURING FC-3.                             *
                3009 ************************************************************************
000200 6024     3011 ERETURN1 BU    ERGSTR               RETURN TO ERASE GAP ROUTINE

                3014 ************************************************************************
                3015 *  RETURN HERE AFTER GAP CONTROL IS RECEIVED FROM DRIVE AND EXIT       *
                3016 *  TO ASSURE DRIVE IS AT THE CORRECT VELOCITY-NORMAL RETURN TO 'WRTST'*
                3017 *  IF LIMITS ARE NOT MET THEN EXIT TO ENDUP.                           *
                3018 ************************************************************************

000201 1600     3021 WRTSTR   STOH  SENSE1,0             CLEAR THE REG FOR VELOCITY
000202 13E8     3024 VELSTR   STOH  WORK4,ONES-23        SET MAX CNT TO 24
000203 6300     3027          BU    CHKVEL               GO ASSURE VELOCITY IS CORRECT

000204 D610     3031 WRTST1   ANDM  SENSE1,BOT           ARE WE AT BOT
000205 2007     3034          BOC   DBUS,RETURN           BR IF NOT
000206 65F4     3037          BU    WRTP                 BR TO SET UP FOR P TRACK WRITE
                3039 *                                   RETURN IS TO 'RETURN'

000207 8D28     3042 RETURN   ORI   XOUTAIM,NOLOSS+FORCE  SET NO ENVELOP LOSS AND FORCE
000208 03F9     3045          STO   WORK4,ONES-6         SET TO COMPLE OF 7
000209 9800     3048          ORM   TRACER,ZERO          MASK FOR OP
00020A 3699     3051          BOC   WTMOP WTMSTR           AND RETURN TO THE
00020B 3500     3054          BOC   ERGOP,ERETURN1           PROPER ROUTINE
                3057 ************************************************************************
                3058 *  THIS IS PE WRITE OPERATION NOT AT LOAD POINT.  READY TO START       *
                3059 *  THE FORMATED WRITE.                                                 *
                3060 ************************************************************************

00020C 00D9     3064 WRT40Z   STO   WORK1,ONES-38        GET COUNT TO 39
00020D 1C0F     3067          STO   LINK1,WRT1ST         RETURN TO WRITE 1'S MARKER
00020E 62A7     3070          BU    CNTLSETA             GO SET WR COND & COUNT 39 ZEROS
                3072 *                                   RETURN TO 'WRTST1'

00020F 3811     3075 WRT1ST   BOC   WRTIME,WRT1ST1       BR IF WRITE TIME
000210 620F     3078          BU    WRT1ST               BACK UNTIL GET WRTIME
000211 3811     3081 WRT1ST1  BOC   WRTIME,WRT1ST1       WAIT UNTIL GONE
000212 4012     3084          XFR   SFC                  STEP FORMAT COUNTER TO TWO
000213 0123     3087 WRTDATA  STO   WORK2,ONES-220       SET MAX WAIT COUNT
000214 1C15     3090          STO   LINK1,WRTCK          SET RETURN FROM 'CHECKBOR'

                3093 *  THE FORMAT COUNTER WILL STEP FROM 2 TO 3 (DATA TIME)
                3094 ************************************************************************
                3095 *  THE EXITS FROM 'WRTCK' SUBROUTINE ARE:                              *
                3096 *       1.  NFC3 TO 'WRTEND' WHICH COUNTS THE ENDING 40 ZEROS          *
                3097 *       2.  TO CHECK VELOCITY DURING DATA TIME IN WHICH CASE           *
                3098 *           RETURN ON 'STOP' FOR EXIT VIA 1. ABOVE.                    *
                3099 ************************************************************************

000215 3817     3102 WRTCK    BOC   WRTIME,WRTCK1        BR ON WRITE TIME PULSE
000216 6215     3105          BU    WRTCK                 BACK IF NOT
000217 3817     3108 WRTCK1   BOC   WRTIME,WRTCK1        WAIT FOR WRT TIME TO FALL

                3111 ************************************************************************

                3112 *  NORMAL RETURN FROM VELOCITY CHECK DURING DATA                       *
                3113 ************************************************************************

000218 223B     3116 WRTCK10  BOC   NFC3,WRTEND          BR IF FORMAT COUNT 4 OR
000219 3C28     3119 WRTCK2   BOC   BLOCK,CHECKBOR       BR IF STARTING RECORD.
00021A 2F1C     3122          BOC   IBG,WRTCK4           STILL IN IBG
00021B 6215     3125          BU    WRTCK                GET NEXT WRITE TIME
00021C D840     3128 WRTCK4   ANDM  TRACER,BORFLAG       HAS BOR BEEN UP YET
00021D 2024     3131          BOC   DBUS,WRTCK7          BR IF NOT
00021E 9500     3134          ORM   FLAGS,ZERO           IS THIS DIAG MODE
00021F 3015     3137          BOC   DIAGWRT,WRTCK         BR IF SO
000220 1008     3140          STOH  WORK1,DEVSEL         DROP MOVE BECAUSE
000221 5024     3143          XFRH  WORK1,TUTAG          THIS IS A CREASE

                3146 *              ***** SET IBG DROP WHILE WRITING *****

000222 8C80     3149          ORI   DTACHK1,IBGDROP      SET ERROR AND
000223 6215     3152          BU    WRTCK                 HANG IN THERE
000224 A101     3155 WRTCK7   ADD   WORK2,ONE            IS THE WAIT COUNT EXHAUSTED
000225 2115     3158          BOC   NALCO,WRTCK          BR IF NOT

                3161 *              ***** SET SLOW BEGIN READ BACK CHECK *****              *

000226 8C04     3164          ORI   DTACHK1,SLOWBGN      SET SLOW BEGIN RD BACK CHK. (DRIVE
000227 6215     3167          BU    WRTCK                RETURN TO GET WRITE TIME
```

```
              *************************************************************
              *  THIS SUBROUTINE IS USED IF BLOCK IS ACTIVE                 *
              *   NORMAL EXIT IS VIA WRTEND  AFTER WRITING ENDING 40 ZEROS.
              *   IF THE RECORD IS LONG ENOUGH (MORE THAN 240 CHAR) THEN AN
              *   EXIT IS TAKEN TO CHECK THE TACH VELOCITY
              *   THE NORMAL RETURN FROM TACH VELOCITY ROUTINE IS WRTCK 10
              *************************************************************

000228 9800   CHECKBOR ORM   TRACER,ZERO        IS THE 'BORFLAG' NON
000229 3131            BOC   BORFLAG,CHKBOR1    BR IF SO
00022A A301            ADD   WORK4,ONE          OTHERWISE COUNT ONE
00022B 21B9            BOC   NALCO,CHKBOR2      BR IF NOT DONE YET
00022C 03F5            STO   WORK4,ONES-10      SET NEW COUNT FOR 11
00022D 8840            ORI   TRACER,BORFLAG     SET 'BORFLAG' - BLOCK LOOKS GOOD.
00022E 3631   CHKBOR0  BOC   WTMOP,CHKBOR1      BR IF WTM OP
00022F 2E31            BOC   BOR,CHKBOR1        BR IF BOR OK

              *                 ***** SET IBG DROP WHILE WRITING *****

000230 8C80   DROPERR  ORI   DTACHK1,IBGDROP    SET ERROR IF NOT
000231 35B9   CHKBOR1  BOC   FORFLAG,CHKBOR2    HAS FORCE BEEN SET-BR IF SO
000232 A301            ADD   WORK4,ONE          OTHERWISE COUNT ONE
000233 21B9            BOC   NALCO,CHKBOR2      BR IF NOT DONE YET
000234 8800            ORI   TRACER,ZERO        IS THIS A WRITE TM OP
000235 3688            BOC   WTMOP,TMADJCT      BR IF SO.
000236 4D42   LPSETFOR XFR   XOUTAIM,XOUTA      SET FORCE AND NOLOSS TO DF
000237 8804            ORI   TRACER,FORFLAG     SET FORCE DONE FLAG
000238 27B9            BOC   STOP,CHKBOR2       DON'T GO CHECK VELOCITY IF STOP ON
000239 3AC3            BOC   STATC,WRETURN5     GO TEST BLK, BOR, IBG---LWR OP

              *************************************************************
              *  EXIT TO CHECK VELOCITY DURING REST OF THE RECORD           *
              *************************************************************

00023A 6202            BU    VELSTR             GO CHECK VELOCITY
00023B 9500   WRTEND   ORM   FLAGS ZERO         IS THE INHIBIT POST AMBLE FLAG ON
00023C 3240            BOC   INHPOST,MAXEND     BR IF SO
00023D 3A58            BOC   STATC,RDCHK5       LWR--SKIP END CNT HERE
00023E A001            ADD   WORK1,ONE          BUMP COUNTER FOR ENDING 40 ZEROS
00023F 2119            BOC   NALCO,WRTCK2       BR IF NOT DONE
000240 0018   MAXEND   STO   WORK1,ONES-228     SET MAX COUNT FOR ENDING

              *************************************************************
              *   ENTRY POINT AFTER POSTAMBLE HAS BEEN WRITTEN TO RESET WRT COND  *
              *   NORMAL EXIT IS ENDATA ON WRITE OP OR AFTER FORCE COUNT
              *   HAS BEEN EXHAUSTED                                        *
              *
              *  ENTRY FOR WTM AFTER 64 CHAR WRITTEN TO RESET WRITE CONDITION *
              *  AND WAIT FOR FORCE COUNT TO EXPIRE OR IF NOT WRITTEN PROPERLY *
              *  EXHAUST COUNTER IN WORK1 AND EXIT.
              *************************************************************

000241 C4BF   WRTCKA   AND   STATIMG,ONES-PERMRDWT  STOP WRITING POSTAMBLE AND
000242 4428            XFR   STATIMG,STAT       ALLOW WRITE CONDITION RESET
000243 3A71            BOC   STATC,CHKCNT       LWR--BR ALL DONE TO CHECK ENDING
000244 1C45            STO   LINK1,WRTCKB       SET RETURN FROM 'CHECKBOR'
000245 3847   WRTCKB   BOC   WRTIME,WRTCKC      WAIT FOR NEXT
000246 6245            BU    WRTCKB              WRITE TIME
000247 3847   WRTCKC   BOC   WRTIME,WRTCKC      WAIT FOR WRT TIME TO FALL
000248 A001            ADD   WORK1,ONE          COUNTER LOOKING FOR END DATA, IBG
              *                                 OR END OF TM (NOT SEEN AS BLOCK)
000249 214E            BOC   NALCO,RDCHK1       BR IF OK
00024A 9800            ORM   TRACER,ZERO        IS THIS WTM CMD
00024B 3692            BOC   WTMOP,RDCHK3       BR IF SO

              *                 ***** SET END DATA CHECK *****

00024C 1810            STO   MPGMERR,ENDATAER   OTHERWISE SET END DATA CHK
00024D 6258            BU    RDCHK5             GO TO END CHECKING
00024E 2859   RDCHK1   BOC   ENDATA,RDCHK6      BR ON END DATA TO END CHECKING
00024F 3C28            BOC   BLOCK,CHECKBOR     BR IF BLOCK DETECTED
000250 9800            ORM   TRACER,ZERO        HAS THE BOR FLAG BEEN SET
000251 3145            BOC   BORFLAG,WRTCKB     BR IF SO
000252 2F54            BOC   IBG,RDCHK2         BR IF IBG DETECTED
000253 6245            BU    WRTCKB             OTHERWISE TO GET NEXT WRITE TIME.
000254 A101   RDCHK2   ADD   WORK2,ONE          COUNTER FOR TIME OUT LOOKING FOR 1ST
              *                                  OF BLOCK
000255 2145            BOC   NALCO,WRTCKB       BR IF OK

              *                 ***** SET SLOW BEGIN READ BACK CHECK *****

000256 8C04            ORI   DTACHK1,SLOWBGN    SET SLOW BEGIN READ BACK (DRIVE)
000257 6245            BU    WRTCKB             RETURN FOR NEXT CYCLE
000258 0000   RDCHK5   STO   WORK1,0               --CLEAR REG SO ONLY GET 40

              *************************************************************
              *   ENTRY ON WRITE OP TO SET END COUNTS.                      *
              *  MUST HAVE SEEN 'ENDATA' OR EXHAUSTED COUNTER FOR 'ENDATA'-WORK1-
              *************************************************************

000259 02DD   RDCHK6   STO   WORK3,ONES-34      SET TO COUNT ENDING 40
00025A CDD7            AND   XOUTAIM,ONES-FORCE-NOLOSS  TURN OFF FOR LATER
00025B A0D8            ADD   WORK1,ONES-39      BUMP COUNT FOR ENDING TOTAL
              *************************************************************
```

```
                3370 ***************************************************************
                3371 *  THE FOLLOWING SUBROUTINE:
                3372 *   1.  ON WRITE COUNTS 35 BIT CELLS INTO ENDING 40 BURST AND      *
                3373 *       RESETS FORCE AND NO LOSS. THEN WAIT UNTIL IBG COMES UP     *
                3374 *   2.  WTM SHARES PART OF THE ROUTINE ALSO EXITS TO CHECK THE     *
                3375 *       TM CONFIGURATION FOR 35 BIT CELLS AND THEN WAITS FOR IBG   *
                3376 *   3.  LWR AND LWTM DO EITHER 1. OR 2. ABOVE AS APPLIES AND EXIT  *
                3377 *       TO 'WRTCKA' TO RESET WRITE COND.                           *
                3378 ***************************************************************

00025C 385C     3381 WRTRD     BOC   WRTIME,WRTRD        WAIT FOR WRT TIME TO FALL
00025D 1C6B     3384           STO   LINK1,RTRNBOR       SET RETURN FROM 'CHECKBOR'
00025E A001     3387 WRTRD10   ADD   WORK1,ONE           BUMP COUNTER LOOKING FOR IBG
00025F 2165     3390           BOC   NALCO,TESTBOR       BR IF NOT DONE
000260 2862     3393           BOC   ENDATA,WRTRD3       BR OUT ON ENDATA

                3396 *               ***** SET END DATA CHECK *****

000261 1810     3399           STO   MPGMERR,ENDATAER    NO END DATA ON LWR
000262 3A41     3402 WRTRD3    BOC   STATC,WRTCKA        LWR--ALL DONE NOW GO SHUT OFF WR TGR
000263 8C02     3405           ORI   DTACHK1,SLOWEND     SET ERROR RECORD WAS TOO SLOW

                3408 *               ***** SET SLOW END READ BACK CHECK *****

000264 6271     3411           BU    CHKCNT              ERROR EXIT TO CHECK COUNTS
000265 D840     3415 TESTBOR   ANDM  TRACER,BORFLAG      HAS A GOOD BLOCK BEEN SEEN
000266 2068     3418           BOC   DBUS,WRTRD1         BR IF NOT
000267 2F71     3421           BOC   IBG,CHKCNT          NORMAL EXIT
000268 9800     3424 WRTRD1    ORM   TRACER,ZERO         IS THIS A WTM CMD
000269 3689     3427           BOC   WTMOP,WRTRDTM       BR IF SO
00026A 3C28     3430           BOC   BLOCK,CHECKBOR      BR TO CHECK FOR GOOD RECORD
00026B A201     3433 RTRNBOR   ADD   WORK3,ONE           BUMP COUNTER TO RESET FORCE AND NO L
00026C 216F     3436           BOC   NALCO,WRTRD2        BR IF NOT
00026D A207     3439           ADD   WORK3,7             ADJUST COUNT TO EQUAL THE WRITE CNT
00026E 4D42     3442           XFR   XOUTAIM,XOUTA       SET IN REGISTER
00026F 385C     3445 WRTRD2    BOC   WRTIME,WRTRD        BR IF ON BACK TO COUNT ONE
000270 626F     3448           BU    WRTRD2              HANG IN LOOP

                3451 ***************************************************************
                3452 *  ENTRY USED ON NORMAL END OF WRITE OR WRITE TM OP TO
                3453 *   CHECK THE RESIDUAL COUNTS AND ASSURE NORMAL COMPLETION
                3454 ***************************************************************

000271 B030     3457 CHKCNT    ADDM  WORK1,48            COUNTER FROM STOP WRT TO ENDING IBG
000272 2180     3460           BOC   NALCO,FASTIBG       SHOULD NOT BR IF OK
000273 B128     3463 CHKSTR    ADDM  WORK2,40            COUNTER FROM START WRT TO IBG DROP
000274 2182     3466           BOC   NALCO,FASTSTR       SHOULD NOT BR IF OK
000275 B2FB     3469 CHKENDNG  ADDM  WORK3,ONES-4        COUNTER OF ENDING EITHER WTM OR WRT
000276 2179     3472           BOC   NALCO,CHKCNT2       SHOULD NOT BR IF OK
000277 B2E6     3475           ADDM  WORK3,ONES-25       COUNT SHOULD BE LESS THAN 26
000278 217A     3478           BOC   NALCO,ENDWREX       BR IF OK

                3481 *               ***** SET EXCESSIVE OR INCORRECT POSTAMBLE *****

000279 8A02     3484 CHKCNT2   ORI   DTACHK2,EXCPOST     SET EXCESSIVE END CNT ON END 40 WRT
00027A 9800     3487 ENDWREX   ORM   TRACER,ZERO         HAS A BLOCK BEEN SEEN
00027B 317D     3490           BOC   BORFLAG,ENDWREX1    BR IF SO

                3493 *               ***** SET NO BLOCK ON RECORD READ BACK CHECK *****

00027C 1D10     3496           STO   EQUIPCK,NBLOCK      SET NO BLOCK EQUIP CHK IF NOT
00027D 3A84     3499 ENDWREX1  BOC   STATC,LPRESET       BR IF LWR OR LWTM TO RESET INCORRECT
00027E 2FD0     3502 ENDWREX2  BOC   IBG,KRETURN1        WAIT UNTIL WE GET IBG
00027F 627D     3505           BU    ENDWREX1            THEN EXIT

                3508 *               ***** SET EARLY END READ BACK CHECK *****

000280 8C08     3511 FASTIBG   ORI   DTACHK1,FASTEND     SET EARLY END RECORD RD CHK
000281 6273     3514           BU    CHKSTR              GO BACK

                3517 *               ***** SET EARLY BEGIN READ BACK CHECK *****

000282 8C10     3520 FASTSTR   ORI   DTACHK1,FASTBGN     SET EARLY BEGIN RD CHK
000283 6275     3523           BU    CHKENDNG            GO BACK

                3526 ***************************************************************
                3527 *  THE ERRORS ARE RESET WHETHER OR NOT THEY WERE SET-ONLY LWR,LWTM-  *
                3528 *  THEY ARE 'EARLY BEGIN AND END CHECK' AND 'SLOW BEGIN AND END      *
                3529 *  CHECK, AND EXCESSIVE POSTAMBLE.                                    *
                3530 ***************************************************************

000284 CCE1     3533 LPRESET   AND   DTACHK1,ONES-X'1E'  RESET-- EARLY AND SLOW CHECKS
000285 CAFD     3536           AND   DTACHK2,ONES-X'02'  RESET--EXCESSIVE POSTAMBLE
000286 1D00     3539           STO   EQUIPCK,0           CLEAR EQUIP CHKS
000287 627E     3542           BU    ENDWREX2

                3545 ***************************************************************
                3546 *   USED ON READ CHECK OF WTM TO TEST FOR CORRECT CONDITIONS
                3547 *   OF TAPE MARK
                3548 ***************************************************************

000288 A0F5     3551 TMADJCT   ADD   WORK1,ONES-10       ADJUST COUNT TO EQUAL THE WRITE CNT
000289 A201     3554 WRTRDTM   ADD   WORK3,ONE           INCREMENT COUNTER
00028A 218D     3557           BOC   NALCO,WRTRDTM1      GO CHECK TAPE MARK
00028B 3A96     3560           BOC   STATC,SETMRTN       LWTM--BR IF LOOP WTM
00028C 8808     3563           ORI   TRACER,NTMTEST      SET FLAG ALL DONE TESTING FOR TM
```

```
00028D 9800    3566 WRTRDTM1 ORM   TRACER,ZERO         SET FOR TEST
00028E 346F    3569          BOC   NTMTEST,WRTRD2      BR IF 'DON'T TEST FLAG ON'

00028F 306F    3573          BOC   TM,WRTRD2           BR IF TAPE MARK DET

               3576 *              ***** SET WRITE TM ERROR *****

000290 8A20    3579 SETMERR  ORI   DTACHK2,WTMERR      SET WRITE TAPE MARK CHECK ON
000291 626F    3582          BU    WRTRD2              GO BACK GET NEXT ONE

               3585 ******************************************************************
               3586 *  USED FOR ERROR DETECTION - EITHER SET 'WTMERR' WHICH IS DATA   *
               3587 *  CHECK OR 'TMNBLK' EQUIPMENT CHECK.                              *
               3588 ******************************************************************

000292 9800    3591 RDCHK3   ORM   TRACER,0            HAS BLOCK BEEN DETECTED
000293 3190    3594          BOC   BORFLAG,SETMERR     BR IF SO TO SET ERROR

               3597 *              ***** SET WTM NOT DETECTED BLOCK *****

000294 1D08    3600 RDCHK4   STO   EQUIPCK,TMNBLK      SET EQUIP CHECK NO BLOCK DETECTED
000295 627D    3603          BU    ENDWREX1            SO TO EXIT

               3606 ******************************************************************
               3607 *  USE TO SET ENDING COUNT ON LWTM CWD.
               3608 ******************************************************************

000296 00F3    3611 SETMRTN  STO   WORK1,ONES-12       THIS THE END COUNT BEFORE DROP WR
000297 1C41    3614          STO   LINK1,WRTCKA        RETURN TO RESET PERMRDWT
000298 62A9    3617          BU    CNTL                AFTER COUNT END
```

(Omitted Nonpertinent Coding)

```
               4288 ************************ SCAN FOR DEVICE ENDS ********************
               4289 * SEARCH FOR DEV ENDS REQUIRES MAXIMUM COMMUNICATION BETWEEN THE TWO  *
               4290 * ALUS.  ALU2 SEARCHS HIS DEPRIME REGS FOR BITS. WHEN HE FINDS ONE,  *
               4291 * THE ADDRESS IS PASSED TO ALU1 VIA XOUTB AND A WAIT IS INITIATED    *
               4292 * WHILE ALU1 SELECTS THE DEVICE. WHEN ALU1 HAS THE DEVICE SELECTED,  *
               4293 * ALU2 IS KICKED OFF TO DETERMINE THE DEVICE  STATUS. IF A LIVE DEV  *
               4294 * END IS FOUND,ALU2 AGAIN RETURNS TO ALU1 WITH STAT C ON            *
               4295 *         IF NO DEV END IS FOUND FOR THAT DEVICE, A DIFFERENT ADDRESS *
               4296 * WILL BE PLACED IN XOUTB (NEXT POSSIBLE DE).WHEN ALU2 RETURNS TO ALU1*
               4297 * AFTER RUNNING  OUT OF DE PRIMES,STATD WILL BE SET.                 *
               4298 *                                                                    *
               4299 *          ALU1 STATS                         ALU2 STATS             *
               4300 *          A                                  A                      *
               4301 *           B INTERFACE B                      B DE PRIME FOUND - WAIT*
               4302 *            C STEP ALU2                        C DEVICE FREE         *
               4303 *             D                                  D FINISHED           *
               4304 *                                                                    *
               4305 *                                                                    *
               4306 **********************************************************************

00034D 0100    4309 EXECPOLL STO   WORK2,0             CLEAR LSR TO HOLD TU ADDR
00034E 1200    4312          STOH  WORK3,0             CLEAR FLAG
00034F 0B01    4315 EXECPULL STO   TUADDR,1            SET UP TUADDR LSR
000350         4317 POLL1    EQU   *
000350 4F21    4319          XFR   LODEPB,AR           DO WE HAVE A DEV END B          MIS*
000351 2B54    4322          BOC   STATB,POLL3         SKIP                            MIS*
000352 9000    4325          NOP1                      RESET AR                        MIS*
000353 4E21    4328 POLL2    XFR   LODEPA,AR           DO WE HAVE A DEV END A
000354 DBC0    4331 POLL3    ANDM  TUADDR,0            DREG NOT ZERO SAYS DEV END
000355 2080    4334          BOC   DBUS,POLLNEXT       BR IF NOT
000356 4141    4337 POLL10   XFR   WORK2,XOUTB         SEND DEV ADDRESS RO ALU1
000357 8404    4340          ORI   STATIMG,SETSTATB    TELL ALU1
000358 442B    4343          XFR   STATIMG,STAT        SET STAT B

               4346 **********************************************************************
               4347 *  WARNING  DO NOT SINGLE STEP THROUGH NEXT INSTRUCTIONS IF MORE THAN *
               4348 *  ONE PRIME
               4349 **********************************************************************
000359 3A59    4351 WTEONC   BOC   STATC,WTEONC        WAIT FOR STATC TO GO OFF
00035A 3A5C    4354 POLL4    BOC   STATC,POLL5         WAIT FOR ALU1
00035B 635A    4357          BU    POLL4                 STAT C TO COME ON
00035C C4FB    4360 POLL5    AND   STATIMG,ONES-SETSTATB
00035D 442B    4363          XFR   STATIMG,STAT        TRN OFF STAT B
00035E 3E7D    4366          BOC   BSYTACH,POLLSTEP    BR IF SWITCHED

               4369 **********************************************************************
               4370 * GO SEE IF DEVICE IS PULSING - IF SO DO NOT PRESENT DEV END          *
               4371 **********************************************************************

00035F 1C3A    4374          STO   LINK1,PRETURN2      SET FOR PULSE RET-POLLSTEP
000360 193B    4377          STO   LINK2,PRETURN4      SET FOR NO PULSE RET-GOGETIM
000361 612B    4380          BU    CHKPULSE
000362 1CD7    4383 GOGETIM  STO   LINK1,SRETURN3      RETURN TO POLL6
000363 60C0    4386          BU    FCHSTS              GO GET SNS BYTES
000364 3E7D    4389 POLL6    BOC   BSYTACH,POLLSTEP
000365 D604    4393 POLLALT  ANDM  SENSE1,START        IS TR RDY
000366 2068    4396          BOC   DBUS,DRVUNICK       BR IF NOT
```

```
000367 8404      4399 DEVDONE  ORI    STATIMG,SETSTATB        WE HAVE A LIVE DEV END
000368 8402      4402 DRVUNICK ORI    STATIMG,SETSTATC      SET STATC ON NOT READY COND.
000369 4428      4405 XERSTAT  XFR    STATIMG,STAT          TELL ALU1
00036A           4407 POLLMTIX EQU    *                     GO WAIT TO RESET THE DEV END
00036A 3B6C      4409          BOC    STATD,DOINDE          IS STATD ON
00036B 636A      4412          BU     POLLMTIX              WAIT FOR IT

                 4415 ***********************************************************************
                 4416 * IF THE TAPE UNIT INTERRUPT IS ON - TAPE WILL BE ISSUED A RESET      *
                 4417 * ON GO AHEAD FROM ALU1,THE DEVICE END PRIME WILL BE RESET           *
                 4418 ***********************************************************************

00036C 00FF      4421 DOINDE   STO    WORK1,ONES            SET MASK TO GET
00036D 4B21      4424          XFR    TUADDR,AR              ONES COMPLEMENT
00036E E000      4427          XO     WORK1,0                 OF THE ADDR
00036F 4021      4430          XFR    WORK1,AR                 TO RESET THE PRIME
000370 2B73      4433          BOC    STATB,FINDTU7         BR IF INTERFACE B            MIS*
000371 CE00      4436          AND    LODEPA,0              TRN OFF DEV END A
000372 6374      4439          BU     FINDTU77              ALL DONE AND RESET ALL STATS
000373 CF00      4442 FINDTU7  AND    LODEPB,0              TRN OFF DEV END B            MIS*
000374 3F78      4445 FINDTU77 BOC    DEVATTN,RESETTU       BR IF MTI ON
000375 5221      4448 POLLSTOP XFRH   WORK3,AR              PUT FLAG
000376 8400      4451          ORI    STATIMG,0              INTO
000377 61D9      4454 SNSTOP   BU     SETD                    STAT REG
000378 100A      4458 RESETTU  STOH   WORK1,DEVSEL+COMMAND  RESET
000379 1102      4461          STOH   WORK2,RESET               OUTSTANDING
00037A 5024      4464          XFRH   WORK1,TUTAG              TAPE UNIT
00037B 5160      4467          XFRH   WORK2,TUBO               INTERRUPT
00037C 63BC      4470          BU     EXECABRT
00037D 1204      4473 POLLSTEP STOH   WORK3,SETSTATB        SET FLAG (HOLD INTERFACE)
00037E 1900      4476 SKIPB    STO    LINK2,0               CLEAR DEVICE
00037F 5924      4479          XFR    LINK2,TUTAG            SELECT
000380 A101      4483 POLLNEXT ADD    WORK2,1               BUMP TU ADDR BY 1
000381 4B21      4486          XFR    TUADDR,AR             BUMP TU ADR BY 1
000382 AB00      4489          ADD    TUADDR,0                BY PROPAGATION
000383 2150      4492          BOC    NALCO,POLL1           BR TO DO NEXT DEV
000384 2A75      4495          BOC    STATA,POLLSTOP        BR OUT ON 2ND PASS
000385 8408      4498          ORI    STATIMG,SETSTATA      TRN ON STAT A ON FIRST PASS
000386 4428      4501          XFR    STATIMG,STAT            TO ALLOW BR ON SECOND PASS
000387 5006      4504          XFRH   LSR                   SET HI
000388 0108      4507          STO    WORK2,8               TRN ON HIGH ORDER SEL BIT
000389 634F      4510          BU     EXECPULL              GO RUN 2ND PASS
                 4514 ************************** SENSE ROUTINE **************************
                 4515 *                                                                     *
                 4516 *  THIS ROUTINE WILL ASSEMBLE AND PRESENT TO ALU1 THE SENSE BITS FROM *
                 4517 *  ALU2 AND/OR THE DRIVE.                                             *
                 4518 *  THE SENSE BITS WILL BE PRESENTED IN XOUTA OR XOUTB IN THE PROPER   *
                 4519 *  POSITION TO BE OR'ED INTO THE CONTROL UNIT SENSE BYTE.             *
                 4520 ***********************************************************************
00038A C504      4522 SNS3     AND    FLAGS,LWROP           RESET ALL BITS EXCEPT LWR
00038B 5D21      4525          XFR    EQUIPCK,AR              EQUIPMENT CHECKS
00038C 9400      4528          ORM    STATIMG,0             ARE ANY EQUIPMENT ERR SET
00038D 2090      4531          BOC    DBUS,SNS4             BR IF NOT
00038E [illegible] 4534        ORI    WORK2,EQCHK           SET EQUIP CHECK ON
00038F 8508      4537          ORI    FLAGS,UDETERR         SAVE IN FLAGS REG IF SO.
000390 DAFF      4540 SNS4     ANDM   DTACHK2,ONES-FORMATCK  DO NOT DET DC ON FORMATCK
000391 2093      4543          BOC    DBUS,SNS41            BR IF NO DATA CKS IN REG
000392 6398      4546          BU     SNS42                 GO SET DATA CK ON

000393 4021      4550 SNS41    XFR    DTACHK1,AR            LOOK FOR
000394 5821      4553          XFR    MPGMERR,AR              ANY
000395 8400      4556          ORI    STATIMG,ZERO              DATA
000396 D4FE      4559          ANDM   STATIMG,X'FE'               CHECKS
000397 209A      4562          BOC    DBUS,SNS5             BR IF NO DATA CHECKS
000398 8108      4565 SNS42    ORI    WORK2,DATACK          SET DATA CHECK ON
000399 8508      4568          ORI    FLAGS,UDETERR         SAVE IN FLAGS REG IF SO.
00039A 299C      4571 SNS5     BOC    NCONVCK,SNS6          BR IF NOT DATA CONVERTER CHECK
00039B 8101      4574          ORI    WORK2,CONVCK          SET THE ERROR

00039C D780      4578 SNS6     ANDM   SENSE2,SEVTRK         IS THIS 7 TRK DR.
00039D 209F      4581          BOC    DBUS,SNS7             BR IF NOT
00039E 8210      4584          ORI    WORK3,SEVENTRK        SET ON IF SOCU
00039F D610      4587 SNS7     ANDM   SENSE1,BOT            IS THIS BEGIN OF TAPE DR
0003A0 20A2      4590          BOC    DBUS,SNS8             BR IF NOT
0003A1 8208      4593          ORI    WORK3,LDPT            SET LOAD POINT ON CU
0003A2 D608      4596 SNS8     ANDM   SENSE1,WRSTAT         IS WRITE STATUS ON DR
0003A3 20A5      4599          BOC    DBUS,SNS9             BR IF NOT
0003A4 8204      4602          ORI    WORK3,WRSTA           SET ON IF SO.  CU
0003A5 9600      4605 SNS9     ORM    SENSE1,ZERO           IS DRIVE FILE PROTECTED
0003A6 31A8      4608          BOC    NFP,SNSB               BR IF NOT
0003A7 8202      4611          ORI    WORK3,FP              SET FILE PROTECT ON
0003A8 19AA      4614 SNSB     STO    LINK2,SNSC            RETURN TO SNSC
0003A9 63EC      4617          BU     SNSWAIT               GO SEND BYTES 0 AND 1
                 4620 *  SENSE BYTE 2 AND 3

0003AA 0210      4623 SNSC     STO    WORK3,ENDATAER        SET UP MASK FOR END DATA CHK
0003AB 5821      4626          XFR    MPGMERR,AR            SET REG TO AR TO TEST AND
0003AC C200      4629          AND    WORK3,ZERO            IF ON WILL REMAIN ON
0003AD 9700      4632          ORM    SENSE2,ZERO           IS UNIT NOT PHASE ENCODED DR
0003AE 33B0      4635          BOC    NOTPE,SNSD            BR IF SO (NRZI)
0003AF 8204      4638          ORI    WORK3,PE              SET PE ON CU
0003B0 D680      4641 SNSD     ANDM   SENSE1,BACKWD         IS UNIT BACKWARD DR
0003B1 20B3      4644          BOC    DBUS,SNSE             BR IF NOT
0003B2 8202      4647          ORI    WORK3,BKWD            SET ON IF SO CU
0003B3 19B5      4650 SNSE     STO    LINK2,SNSF            RETURN TO SNSF
0003B4 63EC      4653          BU     SNSWAIT               GO SEND BYTES 2 AND 3
```

```
                    4656 *   SENSE BYTE 4 AND 5

0003B5 C622         4659 SNSF      AND    SENSE1,EOT+DEVCHK     CLEAR ALL BITS BUT THESE TWO
0003B6 0140         4662           STO    WORK2,REJTU           SET MASK IN REG
0003B7 5D21         4665           XFR    EQUIPCK,AR            PUT EQUIPMENT CHK ON AR
0003B8 C100         4668           AND    WORK2,ZERO            AND MASK AND AR
0003B9 4621         4671           XFR    SENSE1,AR             PUT BITS
0003BA 4521         4674           XFR    FLAGS,AR               ON AR TO
0003BB 8100         4677           ORI    WORK2,ZERO              PASS TO REG
0003BC 19BF         4680           STO    LINK2,SNSG            RETURN TO SNSG
0003BD 4A21         4683           XFR    DTACHK2,AR            PUT REG IN AR
0003BE 63EB         4686           BU     POSBYTE                GO SET IN WORK3

                    4689 *   SENSE BYTES 6 AND 7

0003BF 4742         4692 SNSG      XFR    SENSE2,XOUTA          PASS REG TO XOVER
0003C0 19C3         4695           STO    LINK2,SNSH            RETURN TO SNSH
0003C1 1CD8         4698           STO    LINK1,SRETURN4        RETURN TO SNSLINK
0003C2 60C5         4701           BU     FCHSNS                GO PULL 2 BYTES OF SENSE
0003C3 19C6         4704 SNSH      STO    LINK2,SNSJ            SET RETURN TO SNSJ
0003C4 4641         4707 SNSI      XFR    SENSE1,XOUTB          PASS SENSE 1 TO XOVER
0003C5 63EE         4710           BU     WAITO                 GO FINISH

                    4713 *   SENSE BYTES 8 AND 9

0003C6 4C42         4716 SNSJ      XFR    DTACHK1,XOUTA         PASS ERROR REG TO XOVER
0003C7 8240         4719           ORI    WORK3,EXVCHG          SET MASK IN REG
0003C8 5821         4722           XFR    MPGMERR,AR            PUT ERROR REG ON AR
0003C9 C200         4725           AND    WORK3,ZERO            AND MASK AND AR
0003CA 19CC         4728           STO    LINK2,SNSK            SET RETURN TO SNSK
0003CB 63ED         4731           BU     WAIT4                 GO FINISH

                    4734 *   SENSE BYTES 10 AND 11

0003CC 01BF         4737 SNSK      STO    WORK2,ONES-REJTU      SET MASK IN REG
0003CD 5D21         4740           XFR    EQUIPCK,AR            PUT ERROR REG ON AR
0003CE C100         4743           AND    WORK2,ZERO            AND MASK AND AR
0003CF 19D1         4746           STO    LINK2,SNSL            RETURN TO SNSL
0003D0 63FC         4749           BU     SNSWAIT               GO PASS TO X OVERS

                    4752 *   SENSE BYTES 12 AND 13

0003D1 19D3         4755 SNSL      STO    LINK2,SNSM            RETURN AFTER SENDING
0003D2 63FC         4758           BU     SNSWAIT                 2 BLANK BYTES

                    4761 *   SENSE BYTES 14 AND 15

0003D3 19D6         4764 SNSM      STO    LINK2,SNSO            RETURN TO SNSO
0003D4 4721         4767 SNSN      XFR    SENSE2,AR             GET TU SERIAL NO-HIGH
0003D5 63EB         4770           BU     POSBYTE               GO FINISH

                    4774 *   SENSE BYTES 16 AND 17

0003D6 19D8         4777 SNSO      STO    LINK2,SNSP            RETURN TO SNSP
0003D7 60C5         4780           BU     FCHSNS                PULL 2 BYTES FROM DRIVE
0003D8 4642         4783 SNSP      XFR    SENSE1,XOUTA          PASS TU SERIAL NO.-LOW
0003D9 19DB         4786           STO    LINK2,SNSQ            RETURN TO SNSQ
0003DA 63ED         4789           BU     WAIT4                 GO FINISH

                    4792 *   SENSE BYTES 18 AND 19

0003DB 19E1         4795 SNSQ      STO    LINK2,SNSR            RETURN TO SNSS
0003DC 4742         4798           XFR    SENSE2,XOUTA          PASS SENSE2 TO X OVER
0003DD 4F41         4801           XFR    LODEPB,XOUTB           PASS DEV END PRIMES LOW INTF B
0003DE 2BFF         4804           BOC    STATB,WAITO           BE IF B INTERFACE
0003DF 4E41         4807           XFR    LODEPA,XOUTB          PASS DEV END PRIMES LOW INTF A
0003E0 63EE         4810           BU     WAITO                 GO FINISH

                    4813 *   SENSE BYTES 20 AND 21

0003E1 19E3         4816 SNSR      STO    LINK2,SNSS            RETURN TO SNSS
0003E2 60C5         4819           BU     FCHSNS                GO GET THE LOAD AND THREAD BYTE
0003E3 19E9         4822 SNSS      STO    LINK2,SNSV            RETURN TO SNSV
0003E4 4741         4825 SNST      XFR    SENSE2,XOUTB          PASS DRIVE LOAD BYTE TO XOVER
0003E5 5F42         4828           XFRH   LODEPB,XOUTA          PASS DEV END PRIMES HI INTF B
0003E6 2BEE         4831           BOC    STATB,WAITO           BR IF B INFT
0003E7 5E42         4834           XFRH   LODEPA,XOUTA          PASS DEV END PRIMES 8-15 INTF A
0003E8 63EE         4837           BU     WAITO                 GO FINISH

                    4840 *   SENSE BYTES 22 AND 23

0003E9 19F9         4843 SNSV      STO    LINK2,DALONE          WHEN RETURN MADE SET STAT D
0003EA 4921         4846           XFR    FRU,AR                SET UP TO PASS EM

0003EB 8200         4850 POSBYTE   ORI    WORK3,ZERO            PUT THE AR INTO WORK3
                    4852 ***********************************************************************
                    4853 *  USE THIS SUBROUTINE TO SEND 2 BYTES TO ALU1                        *
                    4854 ***********************************************************************

0003FC 4142         4857 SNSWAIT   XFR    WORK2,XOUTA           PASS BYTE TO ALU1
0003ED 4241         4860 WAIT4     XFR    WORK3,XOUTB           PASS BYTE TO ALU1
0003EE 0402         4863 WAITO     STO    STATIMG,SETSTATC      TURN ON STATC
0003EF 4428         4866           XFR    STATIMG,STAT           FOR ALU2
0003F0 3BF3         4869 WAIT1     BOC    STATD,WAIT5           WHEN D COMES ON GO
0003F1 27F9         4872           BOC    STOP,DALONE           BR IF STOP IS ON
0003F2 63F0         4875           BU     WAIT1                  GET NEXT SENSE BYTES
```

```
0003F3 5428      4878 WAIT5     XFRH   STATIMG,STAT     CLEAR STATS
0003F4 27F9      4881 WAIT2     BOC    STOP,DALONE      BR IF STOP IS ON
0003F5 3BF4      4884           BOC    STATD,WAIT2      WAIT UNTIL STATD GOES OFF.
0003F6 0100      4887 SNSLINK   STO    WORK2,ZERO       CLEAR XOUTB INPUT REG
0003F7 0200      4890           STO    WORK3,ZERO       CLEAR XOUTA INPUT REG
0003F8 5922      4893           XFR    LINK2,IC         RETURN VIA LINK
0003F9 6011      4896 DALONE    BU     SETDLONE         GO SET STAT D
```

(Omitted Nonpertinent Coding)--.

TESTING STACKABLE DEVICE STATUS

This section describes three tests in simplified flowchart form using the BLK INT FLG set forth in the microprogram flowchart. The first portions D1 and D2 set up the various tests. Test 1, steps D3–D10, concurrently tests stackable DVE STS for all devices attached to a given CU. Test 2, steps D11 through D16, tests the ability of a CU to maintain stackable status while performing other commands. Test 3, steps D17–D24, concurrently tests pending DVE STS on an SIO.

The below flowchart represents a program within a CPU connected to the CU having the microprogram flowcharted above.

Setup Tests

PROGRAM STEP D1

Function: Set DX to SIO. The address X of the first device to be tested for stackable status is set in an SIO instruction to be sent to a channel processor.

PROGRAM STEP D2

Function: SET DIAGNOSE and its CCW. The BLK INT FLG is set, together with the chaining flag. The chaining flag causes the channel processor to supply SUPPRO upon each STATIN from CU.

Test 1 — Check Stackable DE's

This concurrent test verifies CU's ability to stack DEVICE END indications.

PROGRAM STEP D3

Function: Issue SIO instruction including issuing SET DIAGNOSE and its CCW.

PROGRAM STEP D4

Function: Cause I/O OP to be executed.

PROGRAM STEP D5

Function: Increment X to next address.

PROGRAM STEP D6

Function: Determine whether X=K, where K is a number of devices. If not, return to D3; if yes, continue to D7.

PROGRAM STEP D7

Function: SET DIAGNOSE instruction with CCW resetting BLK INT and resetting chain flag. This operation is preparing to complete the diagnostic operation enabling the CU to return to data processing functions.

PROGRAM STEP D8

Function: Issue SIO with SET DIAGNOSE set up in D7. Issue a command to the I/O program "wait."

THE WAIT MACRO

This is a macroinstruction used in OS 360 and OS 370 with regard to supervising a task, in this case, an OLT function having a subtask performed by IOS. The control program has a task control buffer (TCB) for each task in the system including the diagnostic task. The TCB has identification of the location of core storage areas allocated to such tasks. Once control has passed from the control program to the task, i.e., OLTEP or OLT, the task management programs in OLTEP keep track of the task current state. Such current state depends upon the readiness of the task program (OLT, in this case) to use the CPU. If such OLT can make immediate use of a CPU, it is READY. While it is actually using the CPU, the task is ACTIVE. The other state is WAIT. During the WAIT state, the task is inactive because more information is required from the I/O subsystem, for example. In this particular instance, the task must wait until all DE's are received from the I/O subsystem being diagnosed. The completed use of a resource, i.e., all DE's have been received, the appropriate resource manager takes control. The OLT will get control of the CPU only if higher priority tasks have been performed. Tasks controlled by initiator/terminator programs are well understood with respect to OS 360 and are not further described.

PROGRAM STEP D9

Function: This step is entered after the WAIT macro has been satisfied. The step checks to see whether or not DE's were received from all activated devices. If yes, the OLT is completed. If no, step D10 is performed.

PROGRAM STEP D10

Function: This step causes a printout of the error in that not all DE's were received. Additionally, errors may be logged in outboard data recorder (ODR) for later analysis. ODR is a programmed data log keeping operational status.

Test 2 - Concurrent Testing of Maintaining Stackable Status While Subsystem Performs Another Command This test initiates operation to the CU in the first device. It then initiates a second operation in a second device having an extended time duration such as read/-write in the burst mode. It then checks for a DE upon completion of the BURST command from the first device to see whether or not the CU stacked the DE. If it was not stacked, an error is logged.

Program steps D1 and D2 are the same except that chained instructions are different. A BURST command such as read or write, plus a control command (rewind, space OP, etc.), is performed while maintaining the BLK INT flag. This test also exercises the subsystem in an intermix situation, i.e., two devices are doing two different functions at the same time.

PROGRAM STEP D11

Function: An SIO channel command is issued followed by a SET DIAGNOSE set up in accordance with D2. Chaining is initiated.

PROGRAM STEP D12

Function: A BURST (another) command is sent to the subsystem chained to a control command on a different device.

PROGRAM STEP D13

Function: A second SIO channel command followed by a SET DIAGNOSE which resets the BLK INT FLG.

PROGRAM STEP D14

Function: In response to D13, was a CUB signal received? If yes, exit test; if no, proceed to D15.

PROGRAM STEP D15

Function: Test for DE from addressed MTU or I/O device. If DE was received, exit test. Note: A DE should be received when CUB is no. If no DE or no CUB, proceed to D16.

PROGRAM STEP D16

Function: Print detected error condition and log same within CPU for further analysis. Exit OLT.

Test 3 — Concurrent Test on Maintaining Stackable Status While Performing a Second Command This test, by sensing for either a BUSY or DE in an SIO following a previous SIO initiating a command, concurrently tests pending DE status in the addressed CU. The test can be performed for each device; however, it is primarily a test directed toward response of a CU. BLK INT blocks SUPPRI when CU responds to a second SIO from the channel. The status resulting from the first SIO should be stored (stacked) in CU during the performance of the second SIO. This concurrent test verifies that ability.

PROGRAM STEP D17

Function: Issue SIO SET DIAGNOSE with BLK INT active as set up in D2.

PROGRAM STEP D18

Function: Initiate a command function in CU with regard to device having address X.

PROGRAM STEP D19

Function: Increment address X by 1.

PROGRAM STEP D20

Function: Issue (READ from or RECORD on tape) command to device X+1.

PROGRAM STEP D21

Function: Issue SIO to CU with SET DIAGNOSE resetting BLK INT.

PROGRAM STEP D22

Function: Issue WAIT macro to IOS for receiving DE from device X.

PROGRAM STEP D23

Function: Check for received DE using a timeout in accordance with the length of the issued BURST command to device X+1. Go to step D24 if no DE is received; otherwise, exit Test 3 returning CPU to OS.

PROGRAM STEP D24

Function: The error is printed and logged for further error analysis by other programs.

Test 4 — Concurrent Testing Ending Control Unit End (CUE) Status on SIO (c1–C8)

This tests the capability of a CU to send a CUE upon receipt of an SIO channel command.

PROGRAM STEP C1

Function: Set a device address into an SIO instruction. SET DIAGNOSE instruction with a CCW having a BLK INT and chain a FILE OP to SET DIAGNOSE.

PROGRAM STEP C2

Function: Send SIO to CU for device DX.

PROGRAM STEP C3

Function: Send SIO FILE OP for device X.

PROGRAM STEP C4

Function: Test for CUB. If no CUB (FILE OP was not executed), print an error. If CUB is received, proceed to step C5.

PROGRAM STEP C5

Function: Time out FILE OP. At end of time out, proceed to C6.

PROGRAM STEP C6

Function: Send a second SIO to CU for device X+K, where X is the device doing the FILE OP and K is a constant for addressing a second I/O device. Then, check for responses in steps C7 and C8.

PROGRAM STEP C7

Function: Check for CUB. If CUB is received, exit test as everything is operating O.K. If no CUB, proceed to step C8.

PROGRAM STEP C8

Function: Test for CUE. If CUE has been received, exit normally. If it has not been received and CU is not busy (CUB = 0), an error should be logged since a CUE should be sent upon completion of FILE OP. Note: BLK INT being blocked permits the second and third SIO's to be performed by the CU and enables sending CUB and CUE to initiating channel for diagnostic purposes.

In a variation of the above flowcharted test, a CUB test can be performed before the FILE OP is timed out in C5. This would be an independent test of CUB.

Then, after timing out the FILE OP, the test will include a CUE test; hence, testing both CUB and CUE. Additionally, a test for DE can be provided after receiving a CUE. If the DE is not received from device X, then an error is logged.

Test 5 - Concurrent Checking Nonstackable Status (C10–C21)

In an I/O subsystem using MTU's, there are two types of status—stackable and nonstackable. Stackable status is status that can be held by the control unit while performing operations on other devices. Nonstackable status is that status that must be accepted by the CPU before another operation is initiated on the CU. Accordingly, it is important for CU to maintain nonstackable status until it is accepted by the CPU. This concurrent test tests such ability.

PROGRAM STEP C10

Function: Set device address X into an SIO instruction. Chain it to a SET DIAGNOSE with a CCW having its BLK INT FLG active. Set chaining.

PROGRAM STEP C11

Function: Issue SIO instruction with chained SET DIAGNOSE. Rewind an MTU to beginning of tape (BOT). Write one record on the tape by issuing a burst write to stop the tape. With BLK INT on, issue a backspace record (BSR). This moves tape between the first record and load point. Issue a second BSR. As a result of second BSR, CU should issue a CUE, DE, UC. With BLK INT active, UC will not be supplied to channel with the pending nonstackable status (tape is at load point and should not receive a BSR). If another MTU is addressed and was an SIO, a CUB should be received since the CU cannot complete its operation.

PROGRAM STEP C12

Function: Issue SIO to device address X+K, where K is a constant.

PROGRAM STEP C13

Function: Was a CUB received from the CU? If yes, a response has been received; proceed to C15. If no, log an error in C14.

PROGRAM STEP C14

Function: Log error detected in step C13.

PROGRAM STEP C15

Function: Issue a second SET DIAGNOSE channel command with a CCW resetting BLK INT.

PROGRAM STEP C16

Function: Issue a WAIT macro for device X in order to receive the status generated in step C11.

PROGRAM STEP C17

Function: Was appropriate status received, i.e., CUE, DE, and UC? Note: BLK INT is now erased and UC will be transferred to channel. If yes, proceed to step C19; if no, proceed to C18.

PROGRAM STEP C18

Function: Log an error based upon improper response. Note: All three responses should be received; otherwise, an error will be logged. The absence of one of the three will indicate the location of the error in the CU.

PROGRAM STEP C19

Function: Issue SIO's to device X and device X+K. At this time, both devices should be available to the CPU.

PROGRAM STEPS C20 and C21

Function: Check whether devices X and X+K are busy. If either or both are busy, log an appropriate error. If neither are busy, exit the test.

Test 6 — Concurrent Testing of Enable/Disable With and Without Pending Device Status (C30–C37)

On some I/O subsystems, there is a manually actuable enable/disable switch. When the switch is in the enable position, operations with the connected data processing system are enabled. When the switch is in the disabled position, only off-line operations are permitted with all signal transfers to and from the data processing system being inhibited. The present test provides for concurrent testing of the enable/disable switch and its effect on pending status. An operator must intervene for actuating the enable/disable switch in accordance with instructions printed out at the operator's console.

PROGRAM STEP C30

Function: Perform steps D1–D6 of the above flowchart. This stacks DE status within the CU being diagnosed. Note: BLK INT is active.

PROGRAM STEP C31

Function: Print "drop enable" in the operator's console for an operator to switch the enable/disable switch to the disable position.

PROGRAM STEP C32

Function: Send SIO to the CU just disabled along with SET DIAGNOSE with a CCW BLK INT. This program step will not be initiated until after the operator has verified the enable/disable switch has been set to the disable position. The OLT will be keyed to a console input interrupt.

PROGRAM STEP C33

Function: Verify that the I/O subsystem appeared to be off-line. If it went off-line, an error condition occurs. The I/O subsystem must remain on-line until all stacked status has been reported to CPU. If the I/O subsystem is still enabled, as it should be, step C34 is entered without logging an error.

PROGRAM STEP C34

Function: Send SIO with a SET DIAGNOSE with the CCW resetting BLK INT.

PROGRAM STEP C35

Function: Reset all DE's in CU. This is cleared by the channel receiving all of the DE's.

PROGRAM STEP C36

Function: Supply another SIO to the I/O subsystem. The response should be from the channel processor that the I/O subsystem is now off-line. If it is not off-line, an error should be logged. In either event, proceed to step C37.

PROGRAM STEP C37

Function: Print out "set enable" to the operator's console and exit the test. The above flowchart verifies operation of the enable/disable switch, both with pending status when the I/O subsystem is not allowed to go off-line and when there is no pending status such that the I/O subsystem should go off-line upon setting the switch to the disable position.

Test 7 — Concurrent Test of all DVE BSY's on a Simultaneous Basis

This test actuates all devices on a free-standing operation such as rewind, after all the MTU's are in a rewind condition. An SIO is issued to all devices, with a busy signal being received from all of them if the operation is proper. BLK INT is necessary in order to obtain the DVE BSY signal.

PROGRAM STEP C40

Function: The test is set up in accordance with steps D1–D6 with the chained operation being rewind for all devices, plus in the SET DIAGNOSE CCW the BLK INT is activated as well as the force DVE BSY bit.

PROGRAM STEP C41

Function: An SIO is given for each and every device connected to the CU such that a rewind is initiated.

PROGRAM STEP C42

Function: A second SIO with a SET DIAGNOSE maintaining the BLK INT and force DVE BSY sent for each and every device in accordance with steps D3–D6. A DVE BSY should be received for each and every device. If not, an error is logged. If it is received, the OLT is exited with the subsystem being reset to normal conditions by a second SET DIAGNOSE resetting the BLK INT and DVE BSY flags and breaking the chain.

Test 8 — Establishing Concurrent Scope Loops Using BLK UC FLG

The subject flag is effective only for ending status, i.e., blocks interrupts for ending status only—not for intermediate status. It enables maintenance personnel, via an OLT or utility program, to enter a failing chain of CCW's that will continuously loop in the channel independent of the CPU. That is, a channel processor has a transfer in channel (TIC) which enables a set of chained CCW's, i.e., commands, to be repeated thereby establishing a repetitive loop suitable for presenting signals on an oscilloscope. This can be done on a concurrent basis as set forth below. Repeating program loops is so well known it is not described.

Such TIC is usually broken based upon a UC interrupt and requires a second SIO to restart the commands. By suppressing the UC by setting the BLK UC FLG, the channel processor which is intermediate to the CPU and the I/O subsystem never sees the interruption condition and therefore will continuously execute the command loop at channel speeds, which are much higher than CPU channel processor I/O subsystem speeds. The I/O controller assembles ending status in a normal manner. The microprogram then proceeds to the branch operation which checks for BLK UC. Since the flag has been set by the SET DIAGNOSE CCW, normal ending status is supplied to the channel processor. The CU then returns to IDLESCAN routine awaiting the next channel processor command. With a TIC in the channel processor, the command comes almost immediately such that the command is repeated and ending status is again assembled with the process being repeated until the operator supplies a command through the operator's console to supply an SIO resetting BLK INT to the channel processor. The programs in the CPU are a utility that sets a selected command sequence that would fail with CCW BLK INT inhibiting ending status. The utility can run concurrently with data processing operations with the command being erased through the operator's console. Additionally, by manually dropping the ready condition on the device associated with the TIC loop, a UC initial status is given which is not blocked by the BLK UC FLG. This initial UC breaks the command chain and the diagnostic BLK UC stops CU from sending status at the end of a burst operation (read, write). Compare with BLK INT which inhibits sending SUPPRI.

A modification to such a utility is an automatic restart. Upon the resetting of ready by the operator, the utility could restart the device and continue on with the loop. By dropping the loop, which releases the channel processor for other operations, the concurrency reaches to the channel level, i.e., the channel can be used for diagnostic purposes during scoping; then, releasing for data processing operations by dropping ready on the addressed MTU. By raising ready, the automatic restart within the utility restarts the TIC loop for more diagnostics.

The CPU program flowcharts are encoded in MACROS, such as shown below. Such macros invoke OLTEP as described in IBM Systems Reference Library, "IBM System/360 Operating System On-Line Test Executive Program," File S360-37, Form C28-6650-2, Copyright 1967, 1968, 1969, International Business Machines Corporation for program 360S-DN-533. OLTEP in turn drives 360 BAL (Basic Assembler Language) to generate machine coding. The subject flowcharts can also be implemented on a standalone basis, i.e., not concurrently and still use the block flag concepts.

Exemplary source statements for concurrent tests generated based upon the flowcharting including test numbers 1, 2, and 3 are:

```
          DC     AL1(0+L'QRTN1)
 QRTN1    DC     CL13'DEV BUSY TEST'
 RTN01    DS     0H .                   ENTRY POINT TO THIS ROUTINE.

          BAL    LINK,SNSALL            GO SENSE ALL DRIVES
 PRIMDEA  TM     RUNFLGS(WK1),RAN       CK IF NOT USING DEVICE
          BO     PRIMDEN
          ZEXPE CCW=(CCWSTAK,2),EXDES='BLOCK INTRPTS',
                 CSW1CT=1,
                 SNSLTH=NO,
                 TIME=1,
                 INTCT=1,TIMEOUT=YES,CSW1STA=08,SNSOFF=NO,
                 REFNUM=1

***************************
***** EXIO INITIATION *****
***************************
          BAL    LINK1,QEXIO3 .         GO EXIO,WAIT,CHECK,PRINT ERRORS.
          DC     B'00001111' .          FLAG BYTE.
          DC     B'00000000' .          2ND FLAG BYTE.
          DC     AL1(2) .             COUNT OF CCWS IN CHAIN.
 QEXW0006 DC     AL4(CCWSTAK) .           ADDRESS OF CCW CHAIN.
          DC     AL1(L'QEXD0006)
 QEXD0006 DC     CL13'BLOCK INTRPTS'
 QEXT0006 DC     AL2(1) .           'WAIT' TIME.
 *                                      EXPECT CC OF 0 (AVAILABLE).
 *                                      EXPECT ONE INTERRUPT.
          DC     B'10000010' .          1ST I/O CHECK FLAG BYTE.
          DC     B'01010000' .          2ND I/O CHECK FLAG BYTE.
          DC     B'00010000' .          3RD I/O CHECK FLAG BYTE.
 QCKI0007 DC     X'08' .              CSW1 STATUS MASK.
 QCKC0007 DC     AL1(1)                     CSW1 COUNT MASK.

          DC     AL1(128+0) .             NUMBER OF MSG LINES
 Q0008RF  DC     AL1(1) .             REFERENCE NUMBER IN BINARY



          DS     0H

          TM     QDRIVER,X'FF'          CK IF OLTSEP DRIVER
          BZ     PRIMOS                 BR IF NOT
          TM     QDRIVER,X'80'
          BO     PRIMOS                 BR IF NOT
          ZEXPF CCW=(CCWFREE,2),EXDES='CK DEV BUSY',
                 CC=1,INTCT=0,INITSTA=14,SNSLTH=NO,SNSOFF=NO,
                 TIME=1,
                 REFNUM=2

***************************
***** EXIO INITIATION *****
***************************
          BAL    LINK1,QEXIO3 .         GO EXIO,WAIT,CHECK,PRINT ERRORS.
          DC     B'00001111' .          FLAG BYTE.
          DC     B'00000000' .          2ND FLAG BYTE.
          DC     AL1(2) .             COUNT OF CCWS IN CHAIN.
 QEXW0010 DC     AL4(CCWFREE) .           ADDRESS OF CCW CHAIN.
          DC     AL1(L'QEXD0010)
 QEXD0010 DC     CL11'CK DEV BUSY'
 QEXT0010 DC     AL2(1) .           'WAIT' TIME.
```

```
*  .                                     EXPECT CC OF 1 (STATUS STORED).
*                                        EXPECT NO INTERRUPTS.
         DC      B'00011000' .           1ST I/O CHECK FLAG BYTE.
         DC      B'00000000' .           2ND I/O CHECK FLAG BYTE.
QCKI0011 DC      X'14' .             INITIAL STATUS MASK.

         DC      AL1(128+0) .            NUMBER OF MSG LINES
Q0012RF  DC      AL1(2) .            REFERENCE NUMBER IN BINARY
         DS      0H

PRIMOS   ZEXPE  CCW=(CCWFREE,2),EXDES='CK NOT BUSY',
                CSW1ADR=16,SNSON=QN3,SNSOFF=QF3,
                TIME=2,VARYCDS=QCDSADR,
                REFNUM=3

****************************
***** EXIO INITIATION *****
****************************
PRIMOS   BAL     LINK1,QEXIO3 .          GO EXIO,WAIT,CHECK,PRINT ERRORS
         DC      B'01111111' .           FLAG BYTE.
         DC      B'00000000' .           2ND FLAG BYTE.
         DC      AL1(2) .            COUNT OF CCWS IN CHAIN.
QEXWPRIM DC      AL4(CCWFREE) .          ADDRESS OF CCW CHAIN.
QEXVPRIM DC      AL2(QCDSADR-SECTIO) OFFSET TO ADDRESS OF EXIO'S CDS
         DC      AL1(L'QEXDPRIM)
QEXDPRIM DC      CL11'CK NOT BUSY'
QEXTPRIM DC      AL2(2) .          'WAIT' TIME.
*  .                                     EXPECT CC OF 0 (AVAILABLE).
*                                        EXPECT ONE INTERRUPT.
*                                        EXPECT CSW1 STATUS TO = '0C00'.
*                                        EXPECT CSW1 COUNT TO = 0.
         DC      B'10000011' .           1ST I/O CHECK FLAG BYTE.
         DC      B'11110011' .           2ND I/O CHECK FLAG BYTE.


         DC      B'01000000' .           3RD I/O CHECK FLAG BYTE.
QCKAPRIM DC      AL1((16)/8) 8-BYTE OFFSET TO CHAIN END.
QCKNPRIM DC      AL1(QN3) .              'ON' SENSE MASK NUMBER.
QCKFPRIM DC      AL1(QF3) .              'OFF' SENSE MASK NUMBER.

         DC      AL1(128+0) .            NUMBER OF MSG LINES
PRIMOSRF DC      AL1(3) .            REFERENCE NUMBER IN BINARY
         DS      0H !
PRIMDEN  ZNCDS
PRIMDEN  BAL     LINK1,QNCDS STEP CDS POINTER
*                                        SET TO NEXT DEVICE
         BNZ     PRIMDEA                 BR IF ANOTHER DEVICE
         ZRTND  *
         B       QSUEND .                BRANCH TO END THIS ROUTINE PASS
***************************************************************
         ZRTNI 'STACKED STATUS TEST'
***************************************************************
**
**                                    ROUTINE
**                                       2
**
***************************************************************
```

```
         DC       AL1(0+L'QRTN2)
QRTN2    DC       CL19'STACKED STATUS TEST'
RTN02    DS       0H .                    ENTRY POINT TO THIS ROUTINE.

*****************************************************************
*
*
*****************************************************************

         TM       QDRIVER,X'FF'           CK IF STANDALONE DRIVER
         BZ       NODRVR
         TM       QDRIVER,X'80'
         BZ       PRIMDEM                 BR IF YES
NODRVR   ZPRNT    HEADER=NO,
                  MSG='AE0264 OLTSEP DRIVER REQD, PGM ABORT'
NODRVR   BAL      LINK1,QPRMG .        PRINT THE MESSAGE
NODRVRFG DC       AL1(0+1) .              NUMBER OF MSG LINES
NODRVRRF DC       AL1(100) .                REFERENCE NUMBER IN BINARY
         DC       AL1(128+(36)) .      BYTE COUNT & IN-LINE FLAG
NODRVR1  DC       CL36'AE0264 OLTSEP DRIVER REQD, PGM ABORT'
         DS       0H
         B        QSUEND

         XC       QSNM4+19(2),QSNM4+19 CLEAR PRIMED SENSE MASK
         OI       QSFM4+19,X'FF'
         OI       QSFM4+20,X'FF'

PRIMDEM  BAL      LINK,SNSALL             GO SENSE ALL DRIVES
         MVI      QTECSD01+6,0
         BAL      LINK,MATCHCU            GO MATCH TCU ADDRESSES
PRIMDE0A ST       WK7,DRIVECT             SAVE THE DRIVE COUNT

PRIMDE0  TM       RUNFLGS(WK1),GOT        CK IF RUNNING DEV
         BO       PRIMDE01                YES, BR
         ZNCDS
         BAL      LINK1,QNCDS STEP CDS POINTER
*                                         SET TO NEXT DEVICE
         B        PRIMDE0                 CK NEXT DEVICE

PRIMDE01 LR       WK6,WK1                 ACTIVE DRIVE POINTER
         L        WK3,0(WK1)
         ST       WK1,FIRSTDR             SAVE THE CDS ADDRESS OF FIRST
         B        PRIMDE22
PRIMDE2  L        WK3,0(WK1)              UNIT ADRS
PRIMDE22 SLL      WK3,28                  CLEAR ALL BUT DRIVE ADRS
         SRL      WK3,28
         LA       WK4,8
         CR       WK3,WK4                 IN BYTE 19 OR BYTE 20
         BL       PRIMDE3                 BR IF IN BYTE 19

         SR       WK3,WK4
         LA       WK4,20                  BYTE TO CHECK
         B        PRIMDE4

PRIMDE3  LA       WK4,19                  BYTE TO CK
PRIMDE4  LA       WK5,1                   ESTABLISH THE ON SNS MASK BITS
         SLL      WK5,0(WK3)
         IC       WK6,QSNM4(WK4)          FETCH OLD MASK
```

```
         OR      WK5,WK6                OR IN THE NEW BITS
         STC     WK5,QSNM4(WK4)         SAVE IT

         ZEXIO CCW=(CCWSTAK,2),EXDES='BLOCK INTRPTS',
               SNSLTH=NO

*****************************
***** EXIO INITIATION *****
*****************************
         BAL     LINK1,QEXIO1 .         GO ISSUE EXIO.
         DC      B'00001110' .          FLAG BYTE.
         DC      B'00000000' .          2ND FLAG BYTE.
         DC      AL1(2) .             COUNT OF CCWS IN CHAIN.
QEXW0022 DC      AL4(CCWSTAK) .           ADDRESS OF CCW CHAIN.
         DC      AL1(L'QEXD0022)
QEXD0022 DC      CL13'BLOCK INTRPTS'
         DS      0H
         ZWAIT TIME=1
         BAL     LINK1,QDELAY .         GO DELAY FOR
QDLY0023 DC      AL2(1)               THIS NUMBER OF SECONDS.

PRIMDE6  ZNCDS
PRIMDE6  BAL     LINK1,QNCDS STEP CDS POINTER
*                                       SET TO NEXT DEVICE

         TM      RUNFLGS(WK1),GOT       CK IF RUNNING DEVICE
         BZ      PRIMDE6                NO,BR

         ZEXCK CCW=(CCWSNSB,2),EXDES='SNS FOR DE PRIMED',
               TIME=1,
               CSW1ADR=16,CSW1CT=0,SNSON=QN4,
               CSW1STA=0C

*****************************
***** EXIO INITIATION *****
*****************************
         BAL     LINK1,QEXIO2 .         GO EXIO, WAIT, AND CHECK RESULTS
         DC      B'00111111' .          FLAG BYTE.
         DC      B'00000000' .          2ND FLAG BYTE.
         DC      AL1(2) .             COUNT OF CCWS IN CHAIN.
QEXW0026 DC      AL4(CCWSNSB) .           ADDRESS OF CCW CHAIN.
         DC      AL1(L'QEXD0026)
QEXD0026 DC      CL17'SNS FOR DE PRIMED'
QEXT0026 DC      AL2(1) .             'WAIT' TIME.
*                                       EXPECT CC OF 0 (AVAILABLE).
*                                       EXPECT ONE INTERRUPT.
*                                       EXPECT CSW1 STATUS TO = '0C00'.


*                                       EXPECT CSW1 COUNT TO = 0.
*                                       EXPECT NO SENSE ERROR BITS.
         DC      B'01000011' .          1ST I/O CHECK FLAG BYTE.
         DC      B'11110001' .          2ND I/O CHECK FLAG BYTE.
QCKA0027 DC      AL1((16)/8) 8-BYTE OFFSET TO CHAIN END.
QCKN0027 DC      AL1(QN4) .             'ON' SENSE MASK NUMBER.
         DS      0H
```

```
         ZPROE  REFNUM=1
         BAL    LINK1,QPRERR .       PRINT THE ERROR MESSAGE
         DC     AL1(128+0) .           NUMBER OF MSG LINES
Q0028RF  DC     AL1(1) .             REFERENCE NUMBER IN BINARY
         DS     0H
         BCT    WK7,PRIMDE2           BR IF ANOTHER DRIVE AVAILABLE


         ZEXPE  CCW=(CCWREW,1),EXDES='CLEAR DEV ENDS',SNSLTH=NO,
                CC=1,INITSTA=08,CSW1STA=04,
                REFNUM=2,VARYCDS=QCDSADR

****************************
***** EXIO INITIATION *****
****************************
         BAL    LINK1,QEXIO3 .        GO EXIO,WAIT,CHECK,PRINT ERRORS.
         DC     B'01001110' .         FLAG BYTE.
         DC     B'00000000' .         2ND FLAG BYTE.
         DC     AL1(1) .            COUNT OF CCWS IN CHAIN.
QEXW0030 DC     AL4(CCWREW) .          ADDRESS OF CCW CHAIN.
QEXV0030 DC     AL2(QCDSADR-SECTID) OFFSET TO ADDRESS OF EXIO'S CDS.
         DC     AL1(L'QEXD0030)
QEXD0030 DC     CL14'CLEAR DEV ENDS'
* .                                   EXPECT CC OF 1 (STATUS STORED).
*                                     EXPECT ONE INTERRUPT.
*                                     EXPECT CSW1 STATUS TO = '0400'.
*                                     EXPECT CSW1 COUNT TO = 0.
*                                     EXPECT NO SENSE ERROR BITS.
         DC     B'11011010' .         1ST I/O CHECK FLAG BYTE.
         DC     B'11110000' .         2ND I/O CHECK FLAG BYTE.
         DC     B'01000000' .         3RD I/O CHECK FLAG BYTE.
QCKI0031 DC     X'08' .             INITIAL STATUS MASK.

         DC     AL1(128+0) .           NUMBER OF MSG LINES
Q0032RF  DC     AL1(2) .            REFERENCE NUMBER IN BINARY
         DS     0H
         L      WK7,DRIVECT           FETCH THE DRIVE COUNT AGAIN
         L      WK1,FIRSTDR           FETCH FIRST CDS ADDRESS
         ST     WK1,QCDSADR
         B      PRIMDN4

         ZNCDS  FIRST=YES
         BAL    LINK1,QNCDS2 RESET CDS POINTER
*                                     RESET TO FIRST DEVICE

PRIMDNO  TM     RUNFLGS(WK1),GOT      CK IF RUNNING DRIVE
         BO     PRIMDN4               BR IF YES
PRIMDE70 ZNCDS
PRIMDE70 BAL    LINK1,QNCDS STEP CDS POINTER
*                                     SET TO NEXT DEVICE
         B      PRIMDNO

PRIMDN4  ST     WK1,QWIOCDS           SET TO WAIT FOR DE INTRPT
         ZWAIT  WAIT=YES,TIME=1
         BAL    LINK1,QWAIT2 .        GO WAIT.
         DC     B'00100000'
         DC     AL2(1) .           MAXIMUM WAIT TIME IN SECONDS.
```

```
         DS     0H
         XC     QPRCTLO(5),QPRCTLO
         ZGOCK  CSW1STA=04,CSW1CT=0,INTCT=1,SELCDS=QCDSADR
         BAL    LINK1,QIOCK .         GO CHECK RESULTS OF THE EXIO.
* .                                   EXPECT CC OF 0 (AVAILABLE).
*                                     EXPECT ONE INTERRUPT.
*                                     EXPECT CSW1 COUNT TO = 0.
*                                     EXPECT NO SENSE ERROR BITS.
         DC     B'11000010' .         1ST I/O CHECK FLAG BYTE.
         DC     B'01110000' .         2ND I/O CHECK FLAG BYTE.
         DC     B'01000000' .         3RD I/O CHECK FLAG BYTE.
QCKD0037 DC     AL2(QCDSADR-SECTID) .    OFFSET TO SELECT CDS ADDRESS
QCK10037 DC     X'04' .           CSW1 STATUS MASK.
         DS     0H

         ZPROE  REFNUM=3
         BAL    LINK1,QPRERR .      PRINT THE ERROR MESSAGE
         DC     AL1(128+0) .          NUMBER OF MSG LINES
Q0038RF  DC     AL1(3) .          REFERENCE NUMBER IN BINARY
         DS     0H
         BCT    WK7,PRIMDE70          RETURN FOR NEXT DRIVE

PRIMNCK  MVC    QSFM4+19(2),QSNM4+19
         ZEXPE  CCW=(CCWSNS,1),EXDES='SNS FOR DE PRIMED CLEARED',
                CSW1ADR=08,CSW1CT=0,SNSOFF=QF4,
                REFNUM=4

****************************
***** EXIO INITIATION *****
****************************
         BAL    LINK1,QEXIO3 .        GO EXIO,WAIT,CHECK,PRINT ERRORS.
         DC     B'00111110' .         FLAG BYTE.
         DC     B'00000000' .         2ND FLAG BYTE.
         DC     AL1(1) .            COUNT OF CCWS IN CHAIN.
QEXW0040 DC     AL4(CCWSNS) .         ADDRESS OF CCW CHAIN.
         DC     AL1(L'QEXD0040)
QEXD0040 DC     CL25'SNS FOR DE PRIMED CLEARED'
* .                                   EXPECT CC OF 0 (AVAILABLE).
*                                     EXPECT ONE INTERRUPT.
*                                     EXPECT CSW1 STATUS TO = '0C00'.
*                                     EXPECT CSW1 COUNT TO = 0.
         DC     B'00000011' .         1ST I/O CHECK FLAG BYTE.
         DC     B'11110010' .         2ND I/O CHECK FLAG BYTE.

QCKA0041 DC     AL1((08)/8) 8-BYTE OFFSET TO CHAIN END.
QCKF0041 DC     AL1(QF4) .              'OFF' SENSE MASK NUMBER.

         DC     AL1(128+0)              NUMBER OF MSG LINES
Q0042RF  DC     AL1(4) .          REFERENCE NUMBER IN BINARY
         DS     0H


         BAL    LINK,MATCHCU          GO FETCH NEXT CONTROL UNIT
         B      PRIMDEOA
         ZRTND  **
*****************************************************************
```

```
CCWDMR    CCW    PE,*,X'40',1
          CCW    SET,DMRST,X'40',4
          CCW    RDF,INPUT,X'50',80
          CCW    SNS,QTECSD01,0,24

DMRST     DC     AL1(DMR,0,0,0)
INPUT     DC     XL80'0'

CCWSTAK   CCW    SET,STAKD,X'40',4    STACK STATUS CCW
          CCW    ERG,*,0,1            ERASE GAP

CCWSTKS   CCW    SET,STAKD,X'40',4    BLOCK INTERRUPTS
          CCW    SNS,QTECSD01,0,24      SENSE

CCWFREE   CCW    ERG,*,X'40',1
          CCW    SNS,QTECSD01,0,24    SENSE

STAKD     DC     AL1(0,INT,0,0)       STACK STATUS MODIFIER
***************************************** MATCH CDS SUBROUTINE ******
*
*********************************************************************

********************************************************************
*
* ALL CDS ENTRIES ARE COMPARED AGAINST THE PRIMARY CDS.DEVICE ADDRESS
* THOSE WHICH HAVE MATCHING CONTROL UNIT SERIAL NUMBERS WILL HAVE
* 'RUN' FLAG SET IN BYTE 'RUNFLGS' OF THEIR CDS.  'RUN' WILL NOT BE
* SET FOR ANY MULTIPLY DEFINED DRIVES AFTER THE FIRST. UPON REENTRY
* 'RAN' WILL BE SET FOR DRIVES WHOSE CDS HAS 'RAN' OR 'RUN' FLAGS ON
* NEW DRIVES WILL THEN BE SELECTED FROM THOSE FOR WHICH 'RAN'=0.  IF
* WHEN NO MORE 'RAN'=0 DRIVES EXIST THE RTN WILL BE TERMINATED
* (ZRTND).  NOTE: IF DRIVES ARE MULTIPLY DEFINED IN CDS THE MULTIPLE
* ENTRIES WILL BE OMITTED FROM TESTING.
*
* WK7 WILL EQUAL THE NUMBER OF DRIVES ON THE CU MINUS ONE ON EXIT
*
********************************************************************

MATCHCU   ZNCDS  FIRST=YES
MATCHCU   BAL    LINK1,QNCDS2 RESET CDS POINTER
*                                    RESET TO FIRST DEVICE
          TM     QTECSD01+6,X'FF'    CK IF SNS DATA EXISTS FOR DEV

          BZ     MATCHCU0            BR IF NOT
          LH     WK3,QTECSD01+13     FETCH CU SERIAL
          SLL    WK3,18
          SRL    WK3,18
          AH     WK3,=AL2(10000)
          CVD    WK3,QWKTEMP+16      CONVERT IT TO DECIMAL
          UNPK   QWKTEMP(16),QWKTEMP+16
          OI     QWKTEMP+15,X'F0'
          MVC    MATMSG1+10(5),QWKTEMP+11
          MVI    QTECSD01+6,0        CLEAR SNS DATA
MATMSG    ZPRNT  HEADER=NO,MSG='AE0260 CU XXXXX TESTED'
MATMSG    BAL    LINK1,QPRMG .      PRINT THE MESSAGE
MATMSGFG  DC     AL1(0+1) .          NUMBER OF MSG LINES
MATMSGRF  DC     AL1(100) .              REFERENCE NUMBER IN BINARY
          DC     AL1(128+(22)) .    BYTE COUNT & IN-LINE FLAG
MATMSG1   DC     CL22'ÅE0260 CU XXXXX TESTED'
```

```
          DS    0H
MATCHCU0  TM    RUNFLGS(WK1),GOT+RAN CK RAN AND RUN FLAGS
          BZ    MATCHCU1             NONE, BR
          NI    RUNFLGS(WK1),255-GOT CLEAR RUN
          OI    RUNFLGS(WK1),RAN     SET RAN
MATCHCU1  ZNCDS
MATCHCU1  BAL   LINK1,QNCDS STEP CDS POINTER
*                                    SET TO NEXT DEVICE
          BNZ   MATCHCU0             RETURN FOR NEXT DRIVE

MATCHCU2  TM    RUNFLGS(WK1),RAN     CK IF DEVICE RAN
          BZ    MATCHCU3             NO, BR
          ZNCDS
          BAL   LINK1,QNCDS STEP CDS POINTER
*                                    SET TO NEXT DEVICE
          BNZ   MATCHCU2             RETURN FOR NEXT ENTRY
          TM    FLAGR,GONE           CK IF TEST RAN
          BO    QSUEND               YES, BR
          ZPRNT REFNUM=61,
                MSG=(' NOT ENOUGH DRIVES FOR TEST',' PGM ABORT')
          BAL   LINK1,QPRMG .      PRINT THE MESSAGE
Q0048FG   DC    AL1(128+2) .         NUMBER OF MSG LINES
Q0048RF   DC    AL1(61) .            REFERENCE NUMBER IN BINARY
          DC    AL1(128+(27)) .    BYTE COUNT & IN-LINE FLAG
Q00481    DC    CL27' NOT ENOUGH DRIVES FOR TEST'
          DC    AL1(128+(10)) .    BYTE COUNT & IN-LINE FLAG
Q00482    DC    CL10' PGM ABORT'
          DS    0H
          ZRTND
          B     QSUEND .             BRANCH TO END THIS ROUTINE PASS


MATCHCU3  LR    WK2,WK1              SAVE DEVICE CDS ADRS
          SR    WK7,WK7              INIT DRIVE CT
          OI    RUNFLGS(WK1),GOT     SET TO RUN

MATCHCU4  ZNCDS
MATCHCU4  BAL   LINK1,QNCDS STEP CDS POINTER
*                                    SET TO NEXT DEVICE

          BNZ   MATCHCU7
          LTR   WK7,WK7              CK DRIVE COUNT
          BZ    MATCHCU              BR IF ONLY DRIVE ON CU
          OI    FLAGR,GONE           SET TEST RAN FLAG
          BR    LINK                 EXIT TO RTN FOR TEST
MATCHCU7  CLC   CUSER(2,WK1),CUSER(WK2) CK IF SAME CU
          BNE   MATCHCU4             NO, BR
          MVC   QWKTEMP(2),2(WK1)
          NI    QWKTEMP+1,X'F0'
          MVC   QWKTEMP+2(2),2(WK2)
          NI    QWKTEMP+3,X'F0'
          CLC   QWKTEMP(1),QWKTEMP+2  CK CHANNEL ADDRS
          BNE   MATCHCU4             BR IF NOT SAME
          CLC   QWKTEMP+1(1),QWKTEMP+3  CK CU ADDRS
          BNE   MATCHCU4

          OI    RUNFLGS(WK1),RAN     SET RAN
          LR    WK3,WK2
MATCHCU5  TM    RUNFLGS(WK3),GOT     CK IF SELECTED
```

```
         BZ      MATCHCU4            BR IF NOT
         CLC     TUSER(3,WK1),TUSER(WK3) CK IF SAME TU SERIAL
         BE      MATCHCU4            BR IF YES
         LA      WK7,1(WK7)          BUMP DRIVE COUNT
         OI      RUNFLGS(WK1),GOT    SET TO RUN
         B       MATCHCU4            RETURN FOR NEXT MATCHING CU SER
***********************************************************************

FLAGR    DC      XL1'0'              FLAGS
GONE     EQU     X'80'               ROUTINE RAN FLAG

CCWERG   CCW     ERG,*,0,1           ERASE GAP

CCWSNSB  CCW     SET,STAKD,X'40',4
CCWSNS   CCW     SNS,QTECSD01,0,24

CCWREW   CCW     REW,*,0,1

DRIVECT  DC      AL4(0)              CU DRIVES-1
FIRSTDR  DC      AL4(0)              FIRST CU DRIVE CDS ADRS


************************************** CDS EQUATES *****************
CUSER    EQU     4                   CONTROL UNIT SERIAL BYTES (2)
CUFEAT   EQU     10                  CONTROL UNIT FEATURES BYTE
RUNFLGS  EQU     11                  PROGRAM CONTROL FLAGS
GOT      EQU     X'80'                 RUNNING THIS DEVICE
RAN      EQU     X'40'                 RAN THIS DEVICE
*        BYTE    12                  ZERO BYTE
TUFEAT   EQU     13                  TAPE UNIT FEATURES/MODEL BYTE
TUSER    EQU     14                  TAPE UNIT SERIAL BYTES (2)


**************************************** SENSE ALL DEVICES SUBROUTINE
*
* A SENSE COMMAND IS ISSUED TO EACH DEVICE IN THE CDS TABLE AND ITS
* CU SERIAL, TU SERIAL, AND FEATURES BYTES ARE SAVED IN ITS CDS AREA
* FOR FUTURE PROGRAM REFERENCE.
***********************************************************************

SNSALL   DS      0H
         ZNCDS FIRST=YES
         BAL     LINK1,QNCDS2 RESET CDS POINTER
*                                    RESET TO FIRST DEVICE

SNSALLD  MVI     RUNFLGS(WK1),0      CLEAR THE RUN FLAGS
         LA      WK7,2
SNSALLTU ZEXCK CCW=(CCWINIT,2),EXDES='SNS-REW CMD',
               CSW1ADR=16,SNSON=QN3,SNSOFF=QF3,INTCT=2,CSWICT=1

****************************
***** EXIO INITIATION *****
****************************
SNSALLTU BAL     LINK1,QEXIO2 .      GO EXIO, WAIT, AND CHECK RESULTS
         DC      B'00111110' .       FLAG BYTE.
         DC      B'00000000' .       2ND FLAG BYTE.
         DC      AL1(2) .          COUNT OF CCWS IN CHAIN.
QEXWSNSA DC      AL4(CCWINIT) .        ADDRESS OF CCW CHAIN.
         DC      AL1(L'QEXDSNSA)
QEXDSNSA DC      CL11'SNS-REW CMD'
```

```
*  .                                        EXPECT CC OF 0 (AVAILABLE).
*                                           EXPECT TWO INTERRUPTS.
*                                           EXPECT CSW1 STATUS TO = '0800'.
*                                           EXPECT CSW2 STATUS TO = '0400'.
         DC    B'00000101' .                1ST I/O CHECK FLAG BYTE.

         DC    B'11011111' .                2ND I/O CHECK FLAG BYTE.
QCKASNSA DC    AL1((16)/8) 8-BYTE OFFSET TO CHAIN END.
QCKCSNSA DC    AL1(1) .                          CSW1 COUNT MASK.
QCKNSNSA DC    AL1(QN3) .                   'ON' SENSE MASK NUMBER.
QCKFSNSA DC    AL1(QF3) .                   'OFF' SENSE MASK NUMBER.
         DS    0H


         BZ    SNSALLC                      BR IF NO ERROR
         BCT   WK7,SNSALLTU                 RETRY ONE TIME
SNSALLC  TM    QTECSD01,X'40'               CK INT REQ BIT
         BZ    SNSNRDY                      BR IF YES
         ZEMSG '*INT REQD',2
         BAL   LINK1,QZEMSG .               GO SET-UP THE MESSAGE FOR ZPROF.
         DC    AL1(9) .                    BYTE COUNT
         DC    CL9'*INT REQD'
         DS    0H
SNSNRDY  TM    QTECSD01+1,X'02'             CK FILE PROT'D BIT
         BZ    SNSERMG                      BR IF NOT
         ZEMSG '*DEV FP'
         BAL   LINK1,QZEMSG .               GO SET-UP THE MESSAGE FOR ZPROF.
         DC    AL1(7) .                    BYTE COUNT
         DC    CL7'*DEV FP'
         DS    0H
         OI    QFLGA,QQERR
SNSERMG  ZPROF REFNUM=73,MSG=' RTN BYPASSED FOR DEV'
SNSERMG  BAL   LINK1,QPRERR .              PRINT THE ERROR MESSAGE
         DC    AL1(128+1) .                  NUMBER OF MSG LINES
SNSERMRF DC    AL1(73) .                  REFERENCE NUMBER IN BINARY
         DC    AL1(128+(21)) .            BYTE COUNT & IN-LINE FLAG
SNSERM1  DC    CL21' RTN BYPASSED FOR DEV'
         DS    0H
         BZ    SNSNER                       BR IF NO ERROR
         OI    RUNFLGS(WK1),RAN             SET THE RAN FLAG
SNSNER   MVC   CUSER(2,WK1),QTECSD01+13 MOVE CU SERIAL BYTES
         MVC   TUSER(2,WK1),QTECSD01+15 MOVE TU SERIAL BYTES
         MVC   TUFEAT(1,WK1),QTECSD01+6 MOVE TU FEATURE BYTE
         NI    TUFEAT(WK1),X'AF'            REMOVE NON-FEATURE BITS
         MVC   CUFEAT(1,WK1),QTECSD01+17 MOVE CU FEATURE BYTE

         ZNCDS
         BAL   LINK1,QNCDS STEP CDS POINTER
*                                           SET TO NEXT DEVICE
         BNZ   SNSALLD                      BR IF ANOTHER DRIVE AVAILABLE

         BR    LINK                         RETURN

***************************************** CLEANUP ROUTINE ************
*
**********************************************************************
```

```
CLEANIT  DS     0H
         LA     BBASE,2048           LOAD SECOND                $$   TEMP
         AR     BBASE,BBASE            BASE                     $$   TEMP
         AR     BBASE,ABASE              REG                    $$   TEMP
         OI     QFLGB,QQCLNUP        SET CLEANUP BIT
         ZNCDS  FIRST=YES
         BAL    LINK1,QNCDS2 RESET CDS POINTER
*                                    RESET TO FIRST DEVICE
CLEANS   ST     WK1,QWIOCDS
         ZWAIT  WAIT=YES,TIME=1
         BAL    LINK1,QWAIT2 .       GO WAIT.
         DC     B'00100000'
         DC     AL2(1) .         MAXIMUM WAIT TIME IN SECONDS.
         DS     0H
         ZEXCK  CCW=(CCWREW,1),SNSLTH=NO,TIME=1,
                CC=1,INITSTA=08,CSW1STA=04

***************************
***** EXIO INITIATION *****
***************************
         BAL    LINK1,QEXIO2 .       GO EXIO, WAIT, AND CHECK RESULTS
         DC     B'00001101' .        FLAG BYTE.
         DC     B'00000000' .        2ND FLAG BYTE.
         DC     AL1(1) .           COUNT OF CCWS IN CHAIN.
QEXW0062 DC     AL4(CCWREW) .          ADDRESS OF CCW CHAIN.
QEXT0062 DC     AL2(1) .         'WAIT' TIME.
* .                                  EXPECT CC OF 1 (STATUS STORED).
*                                    EXPECT ONE INTERRUPT.
*                                    EXPECT CSW1 STATUS TO = '0400'.
*                                    EXPECT CSW1 COUNT TO = 0.
*                                    EXPECT NO SENSE ERROR BITS.
         DC     B'01011010' .        1ST I/O CHECK FLAG BYTE.
         DC     B'11110000' .        2ND I/O CHECK FLAG BYTE.
QCKI0063 DC     X'08' .            INITIAL STATUS MASK.
         DS     0H

         ZEXPE  CCW=(CCWREW,1),SNSLTH=NO,
                CC=1,INITSTA=08,CSW1STA=04,
                CSW1ADR=00,SNSON=QN3,SNSOFF=QF3,
                REFNUM=73

***************************
***** EXIO INITIATION *****
***************************
         BAL    LINK1,QEXIO3 .       GO EXIO,WAIT,CHECK,PRINT ERRORS.
         DC     B'00001100' .        FLAG BYTE.
         DC     B'00000000' .        2ND FLAG BYTE.
         DC     AL1(1) .           COUNT OF CCWS IN CHAIN.
QEXW0065 DC     AL4(CCWREW) .          ADDRESS OF CCW CHAIN.
* .                                  EXPECT CC OF 1 (STATUS STORED).
*                                    EXPECT ONE INTERRUPT.

*                                    EXPECT CSW1 STATUS TO = '0400'.
*                                    EXPECT CSW1 COUNT TO = 0.
         DC     B'00011011' .        1ST I/O CHECK FLAG BYTE.
         DC     B'11110011' .        2ND I/O CHECK FLAG BYTE.
QCKI0066 DC     X'08' .            INITIAL STATUS MASK.
QCKA0066 DC     AL1((00)/8) 8-BYTE OFFSET TO CHAIN END.
```

```
QCKN0066 DC     AL1(QN3) .             'ON' SENSE MASK NUMBER.
QCKF0066 DC     AL1(QF3) .             'OFF' SENSE MASK NUMBER.

         DC     AL1(128+0) .            NUMBER OF MSG LINES
Q0067RF  DC     AL1(73) .             REFERENCE NUMBER IN BINARY
         DS     0H
         ZNCDS
         BAL    LINK1,QNCDS STEP CDS POINTER
*                                      SET TO NEXT DEVICE
         BNZ    CLEANS                 RETURN TO CLEANUP NEXT DEV
         B      QDTERM                 TERMINATE THE SECTION


         ZSNON ('00',
                1,'08',                QN2 - LOAD POINT
                1,'4000000040',        QN3 - TU STAT A
                '0000000000000000000000000000000000000000000000')


*********************** 'ON' BIT SENSE MASKS ********************
*
*****************************************************************

QN1      EQU    1 .                    ON-BIT MASK NUMBER.
QSNP1    DC     AL1(0) .              SENSE BYTE POSITION.
         DC     AL1(L'QSNM1) .         MASK LENGTH.
QSNM1    DC     X'00'
QN2      EQU    2 .                    ON-BIT MASK NUMBER.
QSNP2    DC     AL1(1) .              SENSE BYTE POSITION.
         DC     AL1(L'QSNM2) .         MASK LENGTH.
QSNM2    DC     X'08'
QN3      EQU    3 .                    ON-BIT MASK NUMBER.
QSNP3    DC     AL1(1) .              SENSE BYTE POSITION.
         DC     AL1(L'QSNM3) .         MASK LENGTH.
QSNM3    DC     X'4000000040'
QN4      EQU    4 .                    ON-BIT MASK NUMBER.
QSNP4    DC     AL1(0) .              SENSE BYTE POSITION.
         DC     AL1(L'QSNM4) .         MASK LENGTH.
QSNM4    DC     X'0000000000000000000000000000000000000000000000
QSTCN5   EQU    *
         DS     0H
         ZSNOF ('40',                  QF1
                '00',                  QF2 - UNUSED
                1,'2000000080',        QF3 -
                'FFA100F9FCBE40EFDF41BDFDFD0000000000000000000000')
                'FFA100FDFCBE40EFDF41BDFDFD',
                'FFA100F9FABE50EFDF41BDFDFD',
                'FFA100FDFABE40EFDF41BDFDFD',
                '7FA1',

                '0000000000000000000000000000000000000000000000')


*********************** 'OFF' BIT SENSE MASKS *******************
*
*****************************************************************

QF1      EQU    1 .                    OFF-BIT MASK NUMBER.
QSFP1    DC     AL1(0) .              SENSE BYTE POSITION.
```

```
         DC      AL1(L'QSFM1) .        MASK LENGTH.
QSFM1    DC      X'40'
QF2      EQU     2 .                   OFF-BIT MASK NUMBER.
QSFP2    DC      AL1(0) .             SENSE BYTE POSITION.
         DC      AL1(L'QSFM2) .        MASK LENGTH.
QSFM2    DC      X'00'
QF3      EQU     3 .                   OFF-BIT MASK NUMBER.
QSFP3    DC      AL1(1) .             SENSE BYTE POSITION.
         DC      AL1(L'QSFM3) .        MASK LENGTH.
QSFM3    DC      X'2000000080'
QF4      EQU     4 .                   OFF-BIT MASK NUMBER.
QSFP4    DC      AL1(0) .             SENSE BYTE POSITION.
         DC      AL1(L'QSFM4) .        MASK LENGTH.
QSFM4    DC      X'FFA100F9FCBE40EFDF41BDFDF000000000000000000000000
QSTCF5   EQU     *     0 1 2 3 4 5 6 7 8 9 A B C D E F 0 1
         DS      0H

CCWINIT  CCW     SNS,QTECSD01,X'40',24
         CCW     REW,*,0,1             REWIND
         ZTEND EVENTS=18

************************* BASIC EXIO SUBROUTINE ******************
*
*   ENTRY LINKAGE:
*
*        BAL    LINK1,QEXI01          (IF INITIATED BY ZEXIO)
*        BAL    LINK1,QEXI02 .        (IF INITIATED BY ZEXCK)
*        DC     XL1'XX'   FLAG BYTE.
*               BIT 1 = 1,OFFSET TO EXIO CDS ADDRESS IS PRESENT.
*               BITS 2-3 =00, NO SENSE IN CCW CHAIN.
*                        =01, CCW-CHAIN SENSE BYTE-COUNT PRESENT.
*                        =11, CCW-CHAIN SENSE BYTE-COUNT DEFAULT.
*               BITS 4-5 =00, NO SENSE ON UNIT-CHECK.
*                        =01, UNIT-CHECK SENSE BYTE-COUNT PRESENT.
*                        =11, UNIT-CHECK SENSE BYTE-COUNT DEFAULT.
*               BIT 6 =1, EXIO DESCRIPTION PRESENT.
*               BIT 7 =1, 'TIME' SPECIFIED IN ZEXCK OR ZEXPE.
*        DC     XL1'XX'   FLAG BYTE 2.
*               BIT 0 = 1, THIS COMMAND IS FOR A LIBRARY UNIT.
*               BIT 1 = 1, DO NOT CLEAR TECB SENSE AREA.
*               BIT 2 = 1, BYPASS OS SENSE ON UNIT-CHECK.
*               BIT 3 = 1, DO NOT CLEAR TECB (MASK LABEL=QFXNTCLR).
*        DC     AL1(X)    COUNT OF CCWS IN CCW-CHAIN.
*        DC     AL4(ADDR) ADDRESS OF CCW-CHAIN (CAW).
*       *DC     AL2(X)    BYTE-COUNT OF SENSE IN CCW CHAIN.
*       *DC     AL2(X)    BYTE-COUNT OF SENSE IF UNIT-CHECK OCCURS.
*       *DS     AL2(X)    OFFSET TO EXIO CDS ADDRESS.
*       *DC     AL1(X)       BYTE COUNT OF FOLLOWING DC, IF PRESENT.
*       *DC     C'DESCRIP'   EXIO DESCRIPTION IN EBCDIC IF FLAG BIT 6=1
*       *DC     AL2(X)    'WAIT' TIME SPECIFIED IN ZEXCK OR ZEXPE.
*
*             *THE ASTERISKED DC STATEMENTS WILL NOT BE PRESENT IF
*              INDICATED FLAG BITS ARE NOT ONE.
*
*******************************************************************
QEXI01   DS     0H .                   ZEXIO ENTRY POINT.
         NI     QFLGB,255-QQXCK-QQXPE
         B      QEXI00
QEXI02   DS     0H .                   ZEXCK ENTRY POINT.
```

```
         OI    QFLGB,QQXCK
         B     QEXIOO
QEXIO3   DS    OH .                 ZEXPE ENTRY POINT.
         OI    QFLGB,QQXPE
         NI    QFLGB,255-QQXCK

QEXIOO   DS    OH

         STM   WKO,LINK,QOLTREGS .  SAVE OLT'S REGS.
         MVC   QEXFLAG(2),O(LINK1)  SAVE FLAG BYTE.
         LA    LINK1,2(LINK1) .     STEP OVER THE FLAG BYTES.

*                                   STORE EXIO PARAMETERS PROVIDED.
         MVC   QXIOCCWC(1),O(LINK1)  STORE CCW COUNT IN EXIO LIST.
         MVC   QXIOCCWA(4),1(LINK1)  STORE CCW ADDRESS IN EXIO LIST.
         LA    LINK1,5(LINK1) .     STEP OVER THE CCW COUNT & ADDRESS.

         MVC   QCHSNS,O(LINK1) .    SET-UP CHAIN'S SENSE-LENGTH.
         LA    WK2,24
         LA    LINK1,2(LINK1)
         TM    QEXFLAG,QEXFCHSN
         BM    QEXSNCH
         BO    QEXSNCHD
         SR    WK2,WK2
QEXSNCHD STH   WK2,QCHSNS
         SH    LINK1,=AL2(2)
QEXSNCH  DS    OH

         TM    QEXFLAG+1,QEXNTCLR .IF TECB NOT TO BE CLEARED,
         BO    QEXSKPCL             BRANCH.
         XC    QTECSNOC(QTECBEND-QTECSNOC),QTECSNOC CLEAR TECB FIELDS
QEXSKPCL DS    OH

         MVC   QUCSNS,O(LINK1) .    SET-UP UNIT-CHECK SENSE-LENGTH.
         LA    WK2,24 .
         LA    LINK1,2(LINK1)
         TM    QEXFLAG,QEXFUCSN
         BM    QEXSNUC
         BO    QEXSNUCD
         SR    WK2,WK2
QEXSNUCD SH    LINK1,=AL2(2)
         STH   WK2,QUCSNS
QEXSNUC  DS    OH
QEXNOTSU EQU   *
         L     WK3,QCDSADR .        GET CURRENT DRIV'S CDS ADDRESS.
         TM    QEXFLAG,QVARY .      IF CDS VARY NOT REQUESTED,
         BZ    QNOVARY .            BRANCH.
         MVC   QWKTEMP(2),O(LINK1)
         LA    LINK1,2(LINK1)
         LR    WK3,ABASE .
         AH    WK3,QWKTEMP
         L     WK3,O(WK3) .         GET 'VARIED' CDS ADDRESS.
         MVC   QCUU(4),CDSUNIT(WK3)  STORE CUU FOR ZEXPF OR ZEXCK.
QNOVARY  DS    OH
         ST    WK3,QXIOCDSA
         ST    WK3,QWIOCDS .        STORE CDS ADDRESS IN WAIT MACRO TOO.
```

```
         SR       WK2,WK2
         TM       QEXFLAG,QEXFDESC .  IF AN EXIO DESCRIPTION (EXDES=).IS
         BZ       QEXNDESN .          PRESENT, STORE IT FOR ERROR
         IC       WK2,0(LINK1) .      PRINTING.
         LA       LINK1,1(LINK1)

         MVC      QDISEXIB(L'QDISEXIB),0(LINK1)
         AR       LINK1,WK2
QEXNDESN DS       0H
         LA       WK2,QDISREFL+L'QDISBFRB(WK2)
         STC      WK2,QDISEXIL

         ST       LINK1,QEXTEMP1
         BAL      LINK1,QEXCEXIO .    GO EXECUTE THE EXIO.
         L        LINK1,QEXTEMP1 .    GET LINKAGE ADDRESS.
         TM       QFLGB,QQXCK+QQXPE . IF WAIT AND CHECK AREN'T TO BE
         BZ       QRESREGS .          INCLUDED IN EXIO SUBROUTINE,RETURN

*  PROCEED WITH THE WAIT AND THE I/O CHECK.
QEXWAIT  DS       0H
         MVC      QWIOTIME(2),QTMEDFLT STORE DEFAULT TIME.
         MVI      QWIOFLAG,X'80' .    SET FOR WAIT=YES.
         TM       QEXFLAG,QEXFTIME .  IF NO TIME PARAMETER PRESENT,
         BZ       QEXNTMEP .          BRANCH.
         MVC      QWIOTIME(2),0(LINK1) STORE 'TIME' PROVIDED.
         LA       LINK1,2(LINK1)
QEXNTMEP DS       0H

         ST       LINK1,QEXTEMP1
         BAL      LINK1,QWAIT .       GO WAIT.
         L        LINK1,QEXTEMP1
         B        QIOCK0 .            GO CHECK RESULTS.

         B        QRESREGS .          GO RESTORE REGS AND RETURN.

*  QEXIO1 STORAGE,CONSTANTS,FLAGS.
         DS       0F
QEXTEMP1 DC       XL4'00' .           TEMPORARY STORAGE.
QCHSNS   DC       AL2(24) .         STORAGE. SENSE-LENGTH IN CHAIN.
QUCSNS   DC       AL2(24) .       STORAGE. SNS-LTH IF UNIT-CHECK.

QEXFLAG  DC       XL2'00' LINKAGE FLAG BYTES.
QVARY    EQU      X'40' .                    -CDS ADDR OFFSET PRESENT.
QEXFCHSN EQU      X'30' .                    -CHAIN SENSE-LENGTH FLAGS.
QEXFUCSN EQU      X'0C' .                    -UNIT-CHK SENSE-LENGTH FLAGS
QEXFDESC EQU      X'02' .                    -EXIO DESCRIPTION PRESENT.
QEXFTIME EQU      X'01' .                    -'TIME' PRESENT.

QEXLIB   EQU      X'80' .       BYTE 2 FLAGS -LIBRARY UNIT COMMAND.
QEXNOCLR EQU      X'40' .                   -DO NOT CLEAR TECB SENSE AREA
QEXSNSNO EQU      X'20' .                    -BYPASS DS UNIT-CHK SENSE
QEXNTCLR EQU      X'10' .                    -DON'T CLEAR TECB.


**************************** WAIT SUBROUTINE **********************
*
```

```
*   LINKAGE WITH NO PARAMETERS:
*
*           BAL    LINK1,QWAIT1
*
*                        DEFAULTS TO:
*                                       'CDSADR=CDS ADDR FROM LAST EXIO'
*                                       'WAIT=YES'
*                                       'TIME=99'
*
*   LINKAGE WITH PARAMETERS:
*
*           BAL    LINK1,QWAIT2
*           DC     XL1'00'          FLAG BYTE.
*                  BIT 0 = 1, WAIT=ANY.
*                  BIT 1 = 1, WAIT=DE.
*                  BIT 2 = 1, TIME= PARAMETER FURNISHED.
*                  BIT 3 = 1, POLL=YES PARAMETER FURNISHED.
*                  BIT 4 = 1, PURGE=YES.
*          *DC     AL2(INTEGER)     MAXIMUM WAIT TIME IN SECONDS.
*           DS     OH
*
*                 *ASTERISKED DC'S PRESENT ONLY IF CORRESPONDING FLAG BIT
*                  IS EQUAL TO ONE.
*
*****************************************************************
QWAIT1      DS     OH .                  ZWAIT WITH NO PARAMETERS ENTRY.
            STM    WKO,LINK,QOLTREGS .   SAVE TEST'S REGS.
            MVI    QWAFLAGS,X'00' .      ZERO FLAG BYTE
            B      QWACMN

QWAIT2      DS     OH
            STM    WKO,LINK,QOLTREGS .   SAVE TEST'S REGS.
            MVC    QWAFLAGS(1),0(LINK1)  SAVE FLAG BYTE PARAMETER.
QWACMN      DS     OH


            MVC    QWIOCDS(4),QCDSADR .STORE WAITIO DEFAULT PARAMETERS
            MVI    QWIOFLAG,X'80'
            MVC    QWIOTIME(2),=AL2(99) .

            TM     QWAFLAGS,X'FF'
            BZ     QWANTIME
            LA     LINK1,1(LINK1) .      STORE PROVIDED PARAMETERS IN THE
            TM     QWAFLAGS,QWAFTIME .   THE WAITIO MACRO.
            BZ     QWANOTME
            MVC    QWIOTIME(2),0(LINK1)  STORE TIME.
            LA     LINK1,2(LINK1)
QWANOTME    DS     OH
QWANTIME    DS     OH

            ST     LINK1,QEXTEMP1 .      GO WAIT
            BAL    RLINK1,QWAIT
            L      LINK1,QEXTEMP1 .      GET LINKAGE ADDRESS.
            TM     QFLGB,QQXCK+QQXPE .   IF IO CHECK NOT TO BE INCLUDED
            BZ     QRESREGS .            GO RETURN.

            B      QIOCKO .              GO CHECK RESULTS.

*   QWAIT 1 & 2 SUBROUTINES' CONSTANTS AND STORAGE.
```

```
QWAFLAGS DC     XL1'00' .                PARAMETER'S FLAG BYTE.
QWAFANY  EQU    X'80' .                  IF 1,WAIT=ANY.
QWAFDE   EQU    X'40' .                  IF 1,WAIT=DE.
QWAFTIME EQU    X'20' .                  IF 1, TIME PARAMETER PRESENT.
QWAFPOLL EQU    X'10' .                  IF 1, POLLING TO TAKE PLACE.
QWAFPRGE EQU    X'08' .                  IF 1,PURGE=YES.

*********************** I/O CHECK SUBROUTINE ********************
*
*  LINKAGE:
*
*        BAL    LINK1,QIOCK
*        DC     XL2'00'                  FLAG BYTES (SEE EQU'S AT END OF
*                                                   ROUTINE).
*       *DC     XL1'00'                  3RD FLAG BYTE.
*       *DC     AL2                      OFFSET TO ADDRESS OF SELECTIVE CDS
*                                        (NEVER PRESENT WITH ZEXPE OR ZEXCK)
*       *DC     XL1 OR XL2               INITIAL STATUS MASK.
*       *DC     AL1                      OFFSET FROM START OF CCW CHAIN TO
*                                        XPTD ENDING ADDR IN DOUBLE-WORD
*                                        COUNT.
*       *DC     XL1 OR XL2               CSW1 STATUS MASK.
*       *DC     AL1 OR AL2               CSW1 COUNT MASK.
*       *DC     XL1 OR XL2               CSW2 STATUS MASK.
*       *DC     AL2                      OFFSET TO CONTINGENT CONNECT RTN.
*       *DC     AL1                      # OF SENSE-MASK OF XPTD 'ON' BITS
*       *DC     AL1                      # OF SENSE-MASK OF XPTD 'OFF' BITS
*
*              *ASTERISKED DC'S WILL NOT BE PRESENT UNLESS INDICATED BY
*               THE BITS IN THE FLAG BYTES.
*
*****************************************************************
*  SUBROUTINE'S REGISTER USAGE:
*        WK0,WK1,WK2,WK3,WK4-WORK REGS.
*        WK5  -TECB EVENT FIELD POINTER.
*****************************************************************

QIOCK    DS     0H .                     ZIOCK (ZGOCK) ENTRY POINT.
         STM    WK0,LINK,QOLTREGS .      SAVE OLT'S REGS.
QIOCK0   DS     0H .                     ZEXCK, ZEXPE ENTRY POINT.

*  PRELIMINARY HOUSEKEEPING.
         MVI    QMRCC,C' ' .             BLANK 'RCVD' MESSAGES' COLUMN 1.
         MVI    QMRTS,C' '
         MVI    QMRC1,C' '
         MVI    QMRC2,C' '

         MVC    QMXISX(4),QMXISX-1 .BLANK 'XPTD' MESSAGES' DATA AREAS
         MVC    QMXC1X(16),QMXC1X-1 .
         MVC    QMXC2X(4),QMXC2X-1 .

         MVI    QPRMSGCT,X'00' .         ZERO MESSAGE-COUNT ACCUMULATOR.
         SR     WK2,WK2
         STH    WK2,QFLGA .              CLEAR ERROR FLAG BYTES.
         STC    WK2,QPRFCCWS .           ZERO FAILING CCW NUMBER.
         XC     QMACUM,QMACUM .          CLEAR CSW ADDR,STATUS,COUNT ACCUMS
         XC     QCKCLADR(QCKCLBYT),QCKCLADR CLEAR DPRINT PRINT FLAGS.
         XC     QEXPGLRS(QEXPCLR),QEXPCLRS .  CLEAR 'EXPECTED' STORAGE
```

```
         MVC   QMFLGA(3),O(LINK1) .STORE PARAMETER'S FLAG BYTES.
         LA    LINK1,2(LINK1)
         TM    QMFLGA,QMFA .        IF ONLY TWO FLAG BYTES,
         BZ    QTWOBF BRANCH.
         LA    LINK1,1(LINK1)
         B     QTHREEBF
QTWOBF   DS    OH
         MVI   QMFLGA+2,X'00' .     ZERO 3RD BYTE.
QTHREEBF DS    OH
         TM    QMFLGC,QMR .         IF NO SELECTIVE CDS ADDR OFFSET
         BZ    QSKPCDSP .           PRESENT, SKIP PROCESSING OF ONE.
         TM    QFLGB,QQXCK+QQXPE .  IF ZEXCK OR ZEXPE BEING OPERATED,
         BNZ   QSKPCDSP .           SKIP CUU STORE. (ZEXIO STORED IT.)
         MVC   QWKTEMP(2),O(LINK1)
         LA    WK1,SECTID
         AH    WK1,QWKTEMP .        CALCULATE THE SELECTIVE CDS ADDRESS
         L     WK1,O(WK1) .         GET 'SELECTED' CDS ADDRESS.
         MVC   QCUU(4),CDSUNIT(WK1) FIND AND STORE THE DEVICE ADDRESS.
         LA    LINK1,2(LINK1)
QSKPCDSP DS    OH

         DS    OH
         LA    WK5,QTECFD01-QTECFLTH GO SET POINTER TO RECB CONDITION
         BAL   WK3,QZTFNEXT .       CODE FIELD & CONVERT FIELD TO EBCDI
         BNE   QMCCNRML .           IF NO DATA FOR SELECTED DEVICE, GO.
         CLI   O(WK5),X'FF'
         BNE   QMCCRCVD .           IF OLT(S)EP DID NOT RETURN THE CC
         LA    WK1,QTECELST-QTECFLTH ASSUME IT WAS C,
         LA    WK2,QTECELST .       AND MANIPULATE THE TECB ACCORDINGLY
QZTFLDNX MVC   O(QTECFLTH,WK2),O(WK1)
         SH    WK2,=AL2(QTECFLTH)
         SH    WK1,=AL2(QTECFLTH)
         CLR   WK2,WK5
         BH    QZTFLDNX
         MVI   O(WK5),C'O'
         SR    WK2,WK2
         IC    WK2,QTECEVOC INCREMENT COUNT OF EVENT FIELDS USED
         LA    WK2,1(WK2)
         STC   WK2,QTECEVOC
QMCCRCVD DS    OH .
         SR    WK2,WK2 .            SET CC TO EQUAL.
QMCCNRML DS    OH
         MVI   QMRCCR,C'?' .        IF NO TECB ENTRIES RETURNED BY
         BNE   QMCCFBAD OLT(S)EP, LEAVE ? STORED.
         MVC   QMRCCR(1),O(WK5) .   STORE RCVD CONDITION-CODE.
QMCCFBAD DS    OH
         MVI   QMXCCX,X'F0' .       STORE XPTD CONDITION-CODE.
         TM    QMFLGA,QMFCDE
         BZ    QMCCSTRD .           XPTD CC=0.
         MVI   QMXCCX,X'F1'
         TM    QMFLGA,QMFE
         BO    QMCC1EXP .           XPTD CC=1.
         MVI   QMXCCX,X'F2'
         TM    QMFLGA,QMFD
         BO    QMCCSTRD .           XPTD CC=2.
         MVI   QMXCCX,X'F3'
                                    XPTD CC=3.
         B     QMCCSTRD
```

```
QMCC1EXP DS     0H
         IC     WK0,QMFLGA
         SRL    WK0,4 .              SINCE CC=1 IS EXPECTED,
         BAL    WK2,QMSUPL1B .       GO GET AND SAVE ANY INITIAL STATUS
         MVC    QEXPISTA,QMSUPSAV .  MASK PRESENT.
         TM     QMFLGA,QMFC+QMFD IF  NO INITIAL STATUS DEFAULT MASK,
         BC     12,QMCCSTRD .        BRANCH. (00,01,10)
         MVC    QEXPISTA,=XL2'0800' STORE DEFAULT INITIAL STATUS MASK
QMCCSTRD DS     0H

         CLC    QMRCCR(1),QMXCCX .   IF XPTD CC EQUALS RCVD CC,
         BE     QMCCOK .             BRANCH.
         OI     QFLGA,QQERR+QQCCER
         BAL    LINK,QMSERM .        SET-UP CC XPTD MESSAGE PARAMETERS
         DC     AL2(QMXCC-SECTID)
         MVI    QMRCC,C'*' .         FLAG CC RCVD AS AN ERROR LINE.
         BAL    LINK,QMSERM .        SET-UP CC RCVD MESSAGE PARAMETERS
         DC     AL2(QMRCC-SECTID)
QMCC1NEX DS     0H

         CLI    QMRCCR,X'F1' .       IF RECEIVED CC IS NOT 1,
         BNE    QMNOTCC1 .           BRANCH.
QMRCVDIS DS     0H
         MVC    QMRISR(4),QWKTEMP+16 STORE RCVD INITIAL STATUS AND
         BAL    LINK,QMSERM
         DC     AL2(QMRIS-SECTID) . SET-UP RCVD INIT STATUS MESSAGE
         OC     QMSTATUS(2),8(WK5) .ACCUMULATE STATUS BITS.
QMNOTCC1 DS     0H
         DS     0H
         BAL    WK3,QZTFNEXT .       GO STEP TO NEXT TECB EVENT FIELD
*                                    AND CONVERT IT TO EBCDIC.
         BE     QMCSWSRC .           IF NO CSWS WERE RECEIVED,
         IC     WK0,QMFLGA .         STEP LINK1 AROUND MASKS IF THEY ARE
         N      WK0,=AL4(1) .        PRESENT.
         AR     LINK1,WK0 .          1.CSW1 ADDRESS MASK.
         IC     WK0,QMFLGB
         SRL    WK0,6
         BAL    WK2,QMSUPL1B .       2.CSW1 STATUS MASK.
         IC     WK0,QMFLGB
         SRL    WK0,4
         BAL    WK2,QMSUPL1B .       3.CSW1 COUNT MASK.
         IC     WK0,QMFLGB
         SRL    WK0,2
         BAL    WK2,QMSUPL1B .       4.CSW2 STATUS MASK.
         B      QMCKERSN

QMCSWSRC DS     0H

         LA     WK2,QWKTEMP+8 .      GET ADDR OF RCVD (EBCDIC) CSW1.
         LA     WK3,QMRC1R .         GET ADDR OF RCVD CSW1 MESSAGE AREA
         BAL    LINK,QMSTRCSW GO STORE RCVD EBCDIC CSW1.
         OC     QMACUM+1(7),5(WK5) .ACCUMULATE CSW1 ADDR,STAT,COUNT

         TM     QMFLGA,QMFH .        IF ADDRESS PART OF RCVD CSW1 NOT TO
         BZ     QMC1ADNO .           BE CHECKED, BRANCH.

         SR     WK2,WK2
         IC     WK2,0(LINK1) .       GET 'B-BYTE' OFFSET AND CONVERT IT
         SLL    WK2,3
```

```
         SR     WK3,WK3
         LTR    WK2,WK2 .             IF OFFSET IS ZERO,
         BZ     QADROO .              GO CHECK FOR AN ADDRESS OF ZERO.
         L      WK3,QXIOCCWA
         AR     WK3,WK2 .             FIND 'EXPECTED' CSW1 ADDRESS,
QADROO   DS     OH
         ST     WK3,QMSTRAGE .        STORE EXPECTED CSW1 ADDRESS.
         LA     WK0,QMSTRAGE .        AND CONVERT IT TO EBCDIC.
         BAL    LINK,QCNVRT
         MVC    QMXC1X(6),QWKTEMP+2 STORE IT IN OUTPUT MESSAGE.
         CLC    QMSTRAGE+1(3),5(WK5)
         BE     QMC1ADOK .            IF RCVD ADDR = XPTD ADDR, BRANCH
         OI     QFLGA1,QQAD1
QMC1ADOK DS     OH
         LA     LINK1,1(LINK1)
QMC1ADNO DS     OH
         IC     WK1,QMFLGB

         LR     WK0,WK1
         SRL    WK0,6
         BAL    WK2,QMSUPL1B .        GO GET AND SAVE ANY CSW1 STATUS
         MVC    QEXP1STA,QMSUPSAV . MASK PRESENT.

         LR     WK0,WK1
         SRL    WK0,4
         BAL    WK2,QMSUPL1B .        GO GET AND SAVE ANY CSW1 COUNT
         MVC    QEXP1CNT,QMSUPSVR . MASK PRESENT.

         LR     WK0,WK1
         SRL    WK0,2
         BAL    WK2,QMSUPL1B .        GO GET AND SAVE ANY CSW2 STATUS
         LH     WK0,QMSUPSAV .        MASK PRESENT.
         STH    WK0,QEXP2STA
         TM     QMFLGB,QMFM+QMFN
         BC     12,QMNO2DEF .         BRANCH IF NO DEFAULT MASK (00,01,10)
         MVC    QEXP2STA,=XL2'0400' STORE CSW2 STATUS DEFAULT MASK.
QMNO2DEF DS     OH


         TM     QMFLGB,QMFI+QMFJ
         BC     12,QMDEF1ST .         BRANCH IF NO DEFAULT MASK (00,01,10)
         MVC    QEXP1STA,=XL2'0400' STORE DEFAULT MASK.
         TM     QMFLGA,QMFF
         BO     QMDEF1ST .               0400 IF CC=1 XPTD.
         MVI    QEXP1STA,X'00'
         TM     QMFLGA,QMFG
         BO     QMDEF1ST .               0000 IF XPTD CC NE 1,XPTD INTCT=1
         MVI    QEXP1STA,X'08' .         0800 IF XPTD CC NE 1,XPTD INTCT=2
QMDEF1ST DS     OH
         MVC    QEXP12ST,QEXP1STA

         LA     WK4,QEXP1STA .        GET ADDR OF XPTD CSW1 STATUS.

         MVI    QMCUEBIT,X'00' .      ZERO CUE MASK.
         TM     QDRIVER,X'80'
         BO     QMIDIOSY .            IF RUNNING UNDER A NON-QUIESCED
         TM     QDRIVER,X'FF' .       DRIVER,
         BNZ    QMNORMAL .            OR IF THERE IS NO DRIVER TO PRESENT
QMIDIOSY DS     OH .                  SET-UP CHECK TO ALLOW FOR MULTI-
```

```
         MVI   QMCUEBIT,X'20' .      PROGRAMMING IDIOSYNCRASIES.
         TM    8(WK5),X'20' .
         BZ    QMNOCUE1 .            IF CUE IN CSW1 STATUS,
         OI    QEXP1STA,X'20' SET CUE IN CSW1 EXPECTED STATUS.
QMNOCUE1 DS    0H
         TM    QMFLGA,QMFF .         IF ONLY ONE INTERRUPT WAS EXPECTED
         BZ    QMNORMAL .            BRANCH.
         TM    8(WK5),X'04' .        IF CSW1 STATUS DOES NOT HAVE A DE
         BZ    QMNORMAL .            BRANCH.
         LA    WK4,QEXP12ST .        GET ADDR OF XPTD CSW1+CSW2 STATUS
QMNORMAL DS    0H
         OC    QEXP12ST,QEXP2STA . CREATE CSW1/CSW2 STATUS MASK.

         IC    WK0,QMFLGB
         SRL   WK0,6 .               GET FLAGS,
         LA    WK1,QMXC1X+7 .        STATUS MESSAGE ADDRESS, AND
         LA    WK3,8(WK5) .          TECB STATUS ADDRESS.
         BAL   WK2,QMSTENT .         GO CHECK CSW1 STATUS.
         BE    QMS1OK .              BRANCH IF CSW1 STATUS IS OK.
         OI    QFLGA1,QQST1
QMS1OK   DS    0H


         XC    QMSTRAGE(2),QMSTRAGE
         TM    QMFLGB,QMFK+QMFL .  IF CSW1 COUNT NOT TO BE CHECKED,
         BZ    QMCTOK .              BRANCH.
         BO    QMCTDEF .             BRANCH IF TO CHECK DEFAULT COUNT
         MVC   QMSTRAGE(2),QEXP1CNT STORE CSW1 COUNT MASK.
QMCTDEF  DS    0H
         LA    WK0,QMSTRAGE .        CONVERT XPTD CSW1 COUNT TO EBCDIC
         BAL   LINK,QCNVRT
         MVC   QMXC1X+12(4),QWKTEMP AND PUT IT IN OUTPUT MESSAGE.
         CLC   QMSTRAGE(2),10(WK5) IF XPTD COUNT = RCVD COUNT,
         BE    QMCTOK .              BRANCH.
         OI    QFLGA1,QQCT1
QMCTOK   DS    0H
         TM    QFLGA1,QQAD1+QQST1+QQCT1
         BZ    QMNOC1ER .            IF ANY CSW1 ERROR DETECTED,
         OI    QFLGA,QQERR+QQS1ER .SET CSW1-ERR, PRINT-ERR FLAGS.

         BAL   LINK,QMSERM .         GO SET-UP FOR XPTD CSW1 MESSAGE.
         DC    AL2(QMXC1-SECTID)
         MVI   QMRC1,C'*' .          FLAG CSW1 RCVD AS AN ERROR LINE.
QMNOC1ER DS    0H


         BAL   LINK,QMSERM
         DC    AL2(QMRC1-SECTID) . SET-UP RCVD CSW1 MESSAGE

         DS    0H
         BAL   WK3,QZTENEXT .        GO STEP TO NEXT TECB EVENT FIELD
*                                    AND CONVERT IT TO EBCDIC.
         BNE   QMCKERSN .            GO, IF NO MORE CSW'S RECEIVED.

         OC    QMACUM+1(7),5(WK5) .ACCUMULATE CSW2 ADDR,STAT,COUNT.
         LA    WK2,QWKTEMP+8 .
         LA    WK3,QMRC2R .          GO SET-UP RCVD CSW2 MESSAGE.
         BAL   LINK,QMSTRCSW
```

```
         CLC   5(3,WK5),=AL4(0)
         BE    QMC2ADOK .            CHECK CSW2 ADDR FOR ALL ZEROES.
         OI    QFLGA,QQERR+QQS2ER
QMC2ADOK DS    0H
         CLC   10(2,WK5),=AL4(0)
         BE    QMC2CTOK .            CHECK CSW2 COUNT FOR ALL ZEROES.
         OI    QFLGA,QQERR+QQS2ER
QMC2CTOK DS    0H

         TM    8(WK5),X'20' .
         BZ    QMNOCUE2 .            IF CUE IN CSW2 STATUS, AND IF UNDER
         OC    QEXP2STA(1),QMCUEBIT A NON-QUIESCED DRIVER, OR CUE INTO
                                     CSW2 EXPECTED STATUS.
QMNOCUE2 DS    0H .                  GET ADDR OF XPTD CSW2 STATUS.
         LA    WK4,QEXP2STA .
         IC    WK0,QMFLGB
                                     GET FLAGS,
         SRL   WK0,2 .               STATUS MESSAGE ADDRESS, AND
         LA    WK1,QMXC2X .          TECB STATUS ADDRESS.
         LA    WK3,8(WK5) .
         BAL   WK2,QMSTENT . GO CHECK CSW2 STATUS.
         BE    QMS2OK .              BRANCH IF CSW2 STATUS OK.
         OI    QFLGA,QQERR+QQS2ER

         TM    QFLGA,QQS2ER
         BZ    QMNOC2ER .            IF ANY CSW2 ERROR,
         BAL   LINK,QMSERM
         DC    AL2(QMXC2-SECTID) . SET-UP XPTD CSW2 MESSAGE
         MVI   QMRC2,C'*' .          FLAG CSW2 RCVD AS AN ERROR LINE.
QMS2OK   DS    0H
QMNOC2ER DS    0H


         BAL   LINK,QMSERM
         DC    AL2(QMRC2-SECTID) . SET-UP RCVD CSW2 MESSAGE


QMCKFRSN DS    0H
         MVC   QPRNCCWS(1),QXIOCCWC MOVE CCW CT FROM EXIO TO DRPINT
         L     WK3,QXIOCCWA
         ST    WK3,QADCCW .          MOVE CCW CHAIN ADDR FROM EXIO MACRO
         OI    QPRCTL2,QQCCW .       TO DPRINT MACRO,AND SET PRINT FLAG.

         TM    QFLGA,QQS1ER .        IF AN ERROR WAS NOT FOUND IN CSW1
         BZ    QMSNOUC .             BRANCH.
         L     WK2,QMACUM .          SUBTRACT ADDR OF START OF CHAIN
         SR    WK2,WK3 .             FROM ADDR IN CSW.

         BNP   QMSNOUC .             BRANCH IF CSWS HAD NO ADDRESS.
         SRL   WK2,3 .               CALCULATE # OF FAILING CCW.
         SR    WK3,WK3
         IC    WK3,QPRNCCWS
         SR    WK3,WK2
         BM    QMSNOUC .             IF # OF FAILING CCW IS LT OR EQ TO
         STC   WK2,QPRECCWS .        # OF CCWS,STORE # OF FAILING CCW
         OI    QPRCTL1,QQERCCW .     SET UP TO FLAG FAILING CCW.
QMSNOUC  DS    0H
         TM    QMFLGC,QMT .          IF A TIME-OUT IS EXPECTED,
         BO    QNOTMEOU .            BRANCH.
         CLI   QWAITCDE,X'08' .
         BNE   QNOTMEOU .            IF WAIT MACRO TIMED OUT,
```

```
         BAL   LINK,QMSERM .          GO SET UP TIME OUT ERROR MESSAGE
         DC    AL2(QMTIOUT-SECTID)   AND SKIP SENSE DATA CHECK AND
         B     QMNOSNSD .            PRINTOUT.
QNOTMEOU DS    0H
         LA    WK1,QMEXTO .          CHECK 'EXIO' AND 'WAITIO' MACRO
         LA    WK2,QEXIOCDE .        RETURN CODES.
         BAL   LINK,QCKCODE
         CLI   QWAITCDE,X'08' .      IF 'TIMED OUT' WAITIO CODE,
         BE    QMTMDOUT .            BRANCH.
         LA    WK1,QMWATO
         LA    WK2,QWAITCDE
         BAL   LINK,QCKCODE
QMTMDOUT DS    0H

         CLI   QMRCCR,X'F2' .        IF RCVD CONDITION CODE WAS 0 OR 1
         BL    QMCHKSNS .            GO CHECK SENSE DATA AS REQUESTED
         OI    QFLGA1,QQCC23
QMNOSNSD DS    0H
         TM    QMFLGB,X'03' .        NO SENSE DATA IS AVAILABLE.
         BZ    QMNOSNSR
         LA    LINK1,2(LINK1)
         BO    QMSTPLSN .            STEP LINK REG AROUND THE SENSE-MASK
         BCTR  LINK1,0 .             NUMBER BYTES PRESENT.
QMSTPLSN DS    0H
         B     QMNOSNSR

QMCHKSNS DS    0H
         CLI   QMRCCR,X'F1'
         BNE   QMCHKSN2 .            IF CONDITION CODE 1 RECEIVED,
         TM    QFLGA,QQCCER .        AND
         BZ    QMCHKSN2 .            IF CC 1 NOT EXPECTED,
         TM    QMSTATUS,X'02' .      AND IF UNIT CHECK NOT RECEIVED,
         BZ    QMNOSNSD .            GO. NO SENSE DATA AVAILABLE.
QMCHKSN2 DS    0H
         LH    WK2,QUCSNS .          GET UNIT-CHECK SENSE-LENGTH.
         TM    QMSTATUS,X'02'
         BO    QTMPUCS .             GO SENSE IF OS-OLTEP.      ***TEMP
         BO    QMUCOCCR .            IF NO UNIT-CHECK OCCURRED,
         LH    WK2,QCHSNS .          GET CHAIN'S SENSE-LENGTH.
QTMPRETN DS    0H .                                             ***TEMP
QMUCOCCR DS    0H
         STH   WK2,QSNSLN .          SAVE SENSE-LTH FOR MESSAGE OUTPUT

         LTR   WK2,WK2 .             IF SENSE-LENGTH IS ZERO,
         BZ    QMNOSNSD .            BRANCH.
         OI    QPRCTL2,QQRSNS .      FLAG'PRINT RCVD SENSE'.

         XC    QSNSMSK,QSNSMSK .
         TM    QMFLGB,QMFP .         IF NO 'ON BIT' SENSE MASK NUMBER
         BZ    QMNONM .              PROVIDED, BRANCH.
         IC    WK2,0(LINK1) .        GET 'ON' MASK NUMBER.
         LA    WK3,QSNP1 .           GET ADDRESS OF ON MASK NUMBER 1.
         BAL   LINK,QMFNDMSK .       GO CREATE 'ON' BIT ERROR MASK.
         LA    LINK1,1(LINK1)

QMNONM   DS    0H
         LA    WK3,QSFP0 .           GET ADDRESS OF DEFAULT OFF MASK.
         LA    WK2,1
         TM    QMFLGA,QMFB .         IF DEFAULT 'OFF' MASK SPECIFIED,
```

```
         BO      QMOFDEFF .               BRANCH.
         TM      QMFLGB,QMFO .            IF NO 'OFF' MASK PROVIDED,
         BZ      QMNOOFF .                BRANCH.
         IC      WK2,0(LINK1) .           GET 'OFF' MASK NUMBER.
         LA      WK3,QSFP1 .              GET ADDRESS OF OFF MASK 1.
         LA      LINK1,1(LINK1)
QMOFDEF  DS      0H .                     GO CREATE 'OFF' BIT ERROR MASK
         BAL     RLINK,QMFFOMSK

QMNOOFF  DS      0H
QMNOSNSR DS      0H
         TM      QPRCTL2,QQRSNS .         CK IF TO PRINT SNS DATA
         BZ      QSNMGEX .                BR IF NOT

         XC      QSNMSG1(QSNMSGAL),QSNMSG1 CLEAR SNS MSG ADDRESSES
         MVI     QSNMPOR,0 .              CLEAR SNS MSG ADRS SAVE POINTER
         LA      WK0,QTECSD01 .           CONVERT SNS DATA TO EBCDIC
         BAL     LINK,QCNVRT
         LA      WK3,QRVSNM1 .            MOVE SNS DATA TO OUTPUT AREA
         BAL     LINK,QSNMOVE

         TM      QPRCTL1,QQERSNS .        CK SNS ERROR FLAG
         BZ      QSNMGP .                 BR IF NO ERROR

         MVI     QRVSNM1,C'*' .           SET ERROR FLAG ON SNS DATA LINES
         MVI     QRVSNM2,C'*' .
         MVI     QSNMPOR,4 .              SET SNS MSG ADRS SAVE POINTER
         LA      WK0,QSNSMSK .            CONVERT SNS MASK TO EBCDIC
         BAL     LINK,QCNVRT
         LA      WK3,QMKSNM1 .            MOVE SNS MASK TO OUTPUT AREA
         BAL     LINK,QSNMOVE

QSNMGP   DS      0H
         LA      WK5,QSNMSG1 .            ADRS OF FIRST SNS MSG ADDRESS
         LA      WK0,4 .                  NUMBER OF MESSAGES TOTAL
QSNMGP2  L       WK1,0(WK5) .             FETCH ADRS OF MSG
         LTR     WK1,WK1 .                CK IF VALID ADRS
         BZ      QSNMGP4 .                PLACE IN MG AREA IF YES
         BAL     LINK,QMSERM2

QSNMGP4  LA      WK5,4(WK5) .             POINT TO NEXT MESSAGE
         BCT     WK0,QSNMGP2 .            CONTINUE WHEN ALL MSGS CHECKED
******************************  EXIO MACRO  *************************
*
*********************************************************************
QEXCEXIO DS      0H
         STM     LINK1,WK1,QSVREGS2 .SAVE REGS FROM OLT(S)EP.
QEXIOMAC LA      R14,R0088 .         RETURN ADDRESS
         CNOP    0,4
         BAL     R1,#EXIT .               BRANCH TO LINKAGE SUBROUTIN
QEXIOLST DC      B'00000000' .            CONTROL PROGRAM FLAGS
         DC      AL1(2) .            MACRO LEVEL
         DC      CL2'35' .                MACRO ID
         DC      A(QTECB) .               TECB ADDRESS
         DC      A(QCDST) .          ADDRESS OF CONFIGURATION DATA
         DC      A(*) .              CCW ADDRESS
         DC      AL1(1) .            CCW COUNT
         DC      AL1(0) .                 FLAG BYTE
```

```
*                                          FLAG BYTE DEFINITION
*                                          BIT 0 - ATTNIN
*
R0088    DS     0H
         STC    R15,QEXIOCDE .             STORE RETURN CODE.
         BAL    LINK,QREGRSTR .
         BR     LINK1 .                    RETURN AFTER RESTORING REGS

***************************** WAIT MACRO *************************
*
*******************************************************************
QDELAY   DS     0H
         MVC    QWIOTIME(2),0(LINK1) STORE DESIRED DELAY TIME.
         XC     QWIOTECB(4),QWIOTECB ZERO TECB ADDRESS.
         MVI    QWIOFLAG,X'00' .     ZERO WAITIO FLAGS.
         LA     LINK1,2(LINK1)
         B      QWAITOH
QWAIT    DS     0H
         MVC    QWIOTECB(4),=A(QTECB) STORE TECB ADDR. (IT MAY HAVE
*                                         BEEN WIPED VIA A 'DELAY' OPTION.
QWAITOH  DS     0H
         STM    LINK1,WK1,QSVREGS2 .SAVE REGS FROM DLT(S)EP.
         L      LINK1,QWIOCDS SAVE DEV ADR FOR DPRINT
         MVC    QPRDEVAD(2),2(LINK1)
QWAITMAC LA     R14,R0089 RETURN ADDRESS
         CNOP   0,4
         BAL    R1,#EXIT .               BRANCH TO LINKAGE SUBROUTINE
QWAITLST DC     B'00000000' .            CONTROL PROGRAM FLAGS
         DC     AL1(2) .          MACRO LEVEL
         DC     CL2'36' .                MACRO ID
         DC     A(QTECB) .             TECB ADDRESS
         DC     A(QCDST) .          ADDRESS OF CONFIGURATION DATA.
         DC     AL1(128) .          FLAGS
*                                      FLAG FIELD DEFINITION :
*                                        BIT 0 - WAIT=YES.
*                                              1 - POLL.
*
         DC     AL2(99) .              TIME IN SECONDS.
R0089    DS     0H .                   RETURN ON HALFWORD BOUNDARY.
         STC    R15,QWAITCDE .           STORE RETURN CODE.
         BAL    LINK,QREGRSTR .
         BR     LINK1 .                  RETURN AFTER RESTORING REGS
QTMEDFLT DC     AL2(99) .                WAIT=YES DEFAULT TIME.

*********************************** CDS TABLE ********************
*
*******************************************************************

QCDSLN   EQU    10+6 .          LENGTH OF EACH CDS ENTRY
QCDSFG   EQU    6 .               DEVICE FLAGS AREA LENGTH IN QCDSLN
QCDSADR  DS     1F .                     ADDRESS OF ACTIVE DRIVE CDS
QCDSEND  DS     1F .                     ADDRESS OF LAST CDS TABLE ENTRY
QCDST    DS     CL(QCDSLN*16) .        CDS ENTRY TABLE

******************************** $TECB MACRO *********************
*
*******************************************************************
```

```
QTECB    DS     0F .                    TECB STARTS
QTECFDCT DC     AL1(18) .               NUMBER OF EVENT FIELDS
QTECFDLN DC     AL1(12) .               LENGTH OF EVENT FIELDS
QTECSNLN DC     AL2(27) .               LENGTH OF SENSE FIELDS
         DC     AL1(0) .                FLAGS
QTECSNCT DC     AL1(1) .               NUMBER OF SENSE FIELDS
QTECSNOC DC     AL1(0) .                NUMBER OF SENSES HAVING OCCURRED
QTECEVOC DC     AL1(0) .                NUMBER OF EVENTS HAVING OCCURRED
****   EVENT BLOCKS    ****
QTECFD01 DC     XL12'00'
QTECFD02 DC     XL12'00'
QTECFD03 DC     XL12'00'
QTECFD04 DC     XL12'00'
QTECFD05 DC     XL12'00'
QTECFD06 DC     XL12'00'
QTECFD07 DC     XL12'00'
QTECFD08 DC     XL12'00'
QTECFD09 DC     XL12'00'
QTECFD0A DC     XL12'00'
QTECFD0B DC     XL12'00'
QTECFD0C DC     XL12'00'
QTECFD0D DC     XL12'00'
QTECFD0E DC     XL12'00'
QTECFD0F DC     XL12'00'
QTECFD10 DC     XL12'00'
QTECFD11 DC     XL12'00'
QTECFD12 DC     XL12'00' .              LAST EVENT BLOCK
****    SENSE FIELDS    ****
QTECSN01 DC     XL27'00' .              LAST SENSE FIELD
QTECS001 EQU    QTECSN01+3
QTECBEND EQU    * .                      END OF TECB FIELD
QTECFLTH EQU    12 .            TECB EVENT FIELDS' LENGTHS.
QTECELST EQU    QTECSN01-QTECFLTH . LAST EVENT FIELD'S ADDRESS.
QTECSLTH EQU    27 .              TECB SENSE FIELDS' LENGTH.
QTECSLST EQU    QTECBEND-QTECSLTH LAST SENSE FIELD'S ADDRESS.


************** GENERAL CONSTANT, STORAGE, AND WORK AREAS **********
*
*********************************************************************
QWKTEMP  DS     6D .                    DOUBLE WORD WORKING AREA (12F MIN)

QOLTREGS DS     (LINK-WK0+1)F .          SAVE AREA FOR OLT REGS WK0-LINK.
QSVREGS2 EQU    QPRRLST+4 .              FOUR FULL WDS OF SAVE AREA


QREFNO   DC     XL2'00' .                LAST REF # PASSED VIA 'ZPROF'.
QSNSLN   DC     AL2(24) .                RCVD SNS BYTE COUNT
QSNSDLTH DC     AL2(24) .             SENSE COMMAND DEFAULT FIELD LENGTH.


QDISEXIL DC     AL1(QDISREFL) .           THIS REFERENCE LENGTH VARIES.
QDISEXIO DC     C'AE' .               SUB-SYSTEM,SECTION REFERENCE NUMBER
QDISRTN  DC     CL2' ' .                 ROUTINE NUMBER.
QDISREF  DC     CL2' ' .                   MESSAGE REFERENCE NUMBER.
QDISREFL EQU    *-QDISEXIO .             TOTAL REFERENCE NUMBER LENGTH.
QDISBFRB DC     C' ' .                   SPACE TWIXT REF # AND MESSAGE.
QDISEXIB DC     CL25' ' .             CURRENT EXIO DESCRIPTION
QSNSMSK  DC     CL24' ' .             SENSE ERROR BIT MASK.
```

```
*  DEFAULT 'OFF' BIT SENSE MASK.
QSFPO     DC     AL1(0) .            STARTING POSITION IS BYTE 0.
          DC     AL1(L'QSFMO) .      MASK LENGTH.
QSFMO     DC     X'FFA100F9DABE40FFDF41BDFDFD00000000000080000001'


QEXIOCDE DC      XL1'00' .           LAST 'EXIO' RETURN CODE.
QWAITCDE DC      XL1'00' .           LAST 'WAIT' RETURN CODE.
QLINE     DC     C'-------------------------------'

****************************** STATUS FLAGS ************************
*
********************************************************************

*   ERROR STATUS FLAGS
*         ZEROED BY QIOCK SUBROUTINE.
          DS     0H
QFLGA     DC     AL1(0) .       IF FLAG = 1,
QQERR     EQU    X'80' .              ERROR OCCURRED, PRINT THE ERROR
QQCCER    EQU    X'40' .              CC ERROR
QQISER    EQU    X'20' .              INITIAL STATUS ERROR.
QQS1ER    EQU    X'10' .              CSW1 ERROR.
QQS2ER    EQU    X'08' .              CSW2 ERROR.
QQSNER    EQU    X'04' .              SENSE ERROR.

QFLGA1    DC     AL1(0) .       IF FLAG = 1,
QQCC23    EQU    X'80' .              RCVD CC WAS 2 OR 3.
QQAD1     EQU    X'40' .              CSW1 ADDRESS WAS BAD.
QQST1     EQU    X'20' .              CSW1 STATUS WAS BAD.
QQCT1     EQU    X'10' .              CSW1 COUNT WAS BAD.


*   NON-ERROR STATUS FLAGS
QFLGB     DC     AL1(0) .       IF FLAG = 1,
QQPRT     EQU    X'80' .              PRINT THE MESSAGE
QQLIB     EQU    X'40' .              CURRENT OPERATION IS ON A LIBRARY



QQXCK     EQU    X'20' .              ZEXCK INITIATION.
QQXPE     EQU    X'10' .              ZEXPE INITIATION.
QQLPERR   EQU    X'08' .              LOOPING ON ERROR FLAG
QQCLNUP   EQU    X'04' .              IN CLEANUP SUBROUTINE FLAG
QQFRUAD   EQU    X'02' .              FRU CODE IN ERROR MSG
QFLGL     EQU    *-QFLGA . ********* LENGTH OF FLAGS AREA ***********
*                                     ZEROED BY DEVICE SCHEDULER


*  DEVICE STATUS FLAGS. (SETUP VIA ZSREW MACRO.)
*         NEVER ZEROED. STORED BY ZSREW MACRO SUBROUTINE.
QFLGD     DC     AL1(0) IF FLAG = 1,
QQDNR     EQU    X'80' INTERVENTION REQ'D (DEV NOT READY).
QQDFP     EQU    X'40' DEVICE IS FILE PROTECTED.
QQN7T     EQU    X'20' DEVICE IS NOT A 7-TRACK DRIVE.
QQN9T     EQU    X'10' DEVICE IS NOT A 9-TRK-NRZI DRIVE.
QQNPE     EQU    X'08' DEVICE IS NOT 9-TRACK-PE DRIVE.
QQN79     EQU    X'04' DEVICE IS NOT 7 & NOT 9 TRK NRZI.
QSNFRF    EQU    QQN7T+QQN9T+QQNPE+QQN79 REQUIRED FEATURES FLAGS.
```

```
*  EQUATED LABELS FOR ZSREW USE.
QNRDY     EQU   X'80'
QFP       EQU   X'40'
QN7TRK    EQU   X'20'
QN9TRK    EQU   X'10'
QNPE      EQU   X'08'
QNNRZI    EQU   X'04'

QERRNO    DS    H .                   LOOP ON ERROR REFNUM FROM ZPROE


**************************** CONVERT MAP ************************
CONVMAP   DSECT
          DC    XL1'0' .              CONTROL PROGRAM FLAGS
          DC    XL1'0' .              MACRO LEVEL
          DC    XL2'0' .              MACRO ID
$CNVFROM  DC    A(0) .                FROM ADDRESS
$CNVTO    DC    A(0) .                TO   ADDRESS
$CNVCT    DC    XL2'0' .              TYPE & COUNT

          DC    XL1'0' .              CONTROL PROGRAM FLAGS
          DC    XL1'0' .              MACRO LEVEL
          DC    XL2'0' .              MACRO ID
$XIOTCBA  DC    A(0) .                TECB ADDRESS
$XIOCDSA  DC    A(0) .                CDS  ADDRESS
$XIOCCWA  DC    A(0) .                CCW  ADDRESS
$XIOCCWC  DC    XL1'0' .                OF CCW'S
$XIOFLAG  DC    XL1'0' .              FLAG BYTE
QXIOTCBA  EQU   QEXIOLST-EXIOMAP+$XIOTCBA
QXIOCDSA  EQU   QEXIOLST-EXIOMAP+$XIOCDSA
QXIOCCWA  EQU   QEXIOLST-EXIOMAP+$XIOCCWA
QXIOCCWC  EQU   QEXIOLST-EXIOMAP+$XIOCCWC
QXIOFLAG  EQU   QEXIOLST-EXIOMAP+$XIOFLAG

****************************** WAIT MAP **************************
WTIOMAP   DSECT
          DC    XL1'0' .              CONTROL PROGRAM FLAGS
          DC    XL1'0' .              MACRO LEVEL
          DC    XL2'0' .              MACRO ID
$WIOTECB  DC    A(0) .                ADDRESS OF TECB
$WIOCDS   DC    A(0) .                ADDRESS OF CDS INFO
$WIOFLAG  DC    XL1'0' .             FLAGS
$WIOTIME  DC    XL2'0' .              TIME IN SECONDS
QWIOTECB  EQU   QWAITLST-WTIOMAP+$WIOTECB
QWIOCDS   EQU   QWAITLST-WTIOMAP+$WIOCDS
QWIOFLAG  EQU   QWAITLST-WTIOMAP+$WIOFLAG
QWIOTIME  EQU   QWAITLST-WTIOMAP+$WIOTIME


********************************** ROUTINE MAP *******************
RTNEMAP   DSECT
          DC    XL1'0' .              CONTROL PROGRAM FLAGS
          DC    XL1'0' .              MACRO LEVEL
          DC    XL2'0' .              MACRO ID
$RTNEEXT  DC    A(0) .                ADDRESS OF NEXT ROUTINE
$RTNENUM  DC    XL1'0' .              THIS ROUTINE NUMBER
$RTNEREF  DC    XL1'0' .              REFERENCE NUMBER
$RTNEFLG  DC    XL1'0' .              FLAGS
QRTN#     EQU   QRTNCTL+$RTNENUM-RTNEMAP ROUTINE NUMBER
QRTNREF   EQU   QRTNCTL+$RTNEREF-RTNEMAP ROUTINE REFERENCE NUMBER
```

```
QRTNFLG  EQU  QRTNCTL+$RTNEFLG-RTNEMAP.FLAGS
QRTNMI   EQU  X'80' .            MANUAL INTERVENTION FLAG
QRTNADR  EQU  QRTNCTL+$RTNEEXT-RTNEMAP ROUTINE ADDRESS


******************** CONDITIONAL BRANCH EQUATES *******************

*  AFTER COMPARE INSTRUCTIONS.
BH       EQU  2 .                 BRANCH ON A HIGH.
BL       EQU  4 .                 BRANCH ON A LOW.
BE       EQU  8 .                 BRANCH ON A EQUAL 8.
BNH      EQU  13 .                BRANCH ON A NOT HIGH.
BNL      EQU  11 .                BRANCH ON A NOT LOW.
```

The other flowcharted tests can be similarly implemented in the samq manner as set forth above. Such source code is not included because it would be cumulative, rather than instructive.--

While the invention has been particularly shown and described with reference to preferred embodiments thereof, it will be understood by those skilled in the art that various changes in form and details may be made therein without departing from the spirit and scope of the invention.

What is claimed is:

1. In interfacing circuits for generating an anomalous indication from a subsystem in response to a requesting signal from a controlling data processing system interconnected with said subsystem via said interfacing circuits, means chaining said subsystem to a CPU, means supplying a flag signal, means selectively setting a diagnostic mode, memory means for maintaining a status indication and a flag signal, means gating said status indication, logic means responsive to said requesting signal and another signal to generate a gating signal, the improvement including in combination:

AND circuit means jointly responsive to said requesting signal and a flag signal from said subsystem to supply an enabling signal, said subsystem capable of setting said flag signal only when chained to a CPU and in a diagnostic mode of operation, encoding means responsive to said status indication or to said enabling signal to generate a code permutation representing said status indication, and said gating means being responsive to said enabling signal or to said gating signal to gate said code permutation to said CPU.

* * * * *